(12) United States Patent
Roberts et al.

(10) Patent No.: US 10,314,320 B2
(45) Date of Patent: Jun. 11, 2019

(54) SYSTEMS FOR CONTROLLED LIQUID FOOD OR BEVERAGE PRODUCT CREATION

(71) Applicant: Meltz, LLC, Ipswich, MA (US)

(72) Inventors: Matthew P. Roberts, Ipswich, MA (US); Paul Kalenian, Santa Fe, NM (US); Douglas M. Hoon, Guilford, CT (US); Karl Winkler, Bedford, MA (US)

(73) Assignee: Meltz, LLC, Ipswich, MA (US)

( * ) Notice: Subject to any disclaimer, the term of this patent is extended or adjusted under 35 U.S.C. 154(b) by 0 days.

(21) Appl. No.: 15/688,471

(22) Filed: Aug. 28, 2017

(65) Prior Publication Data

US 2018/0042258 A1    Feb. 15, 2018

Related U.S. Application Data

(63) Continuation-in-part of application No. 15/347,591, filed on Nov. 9, 2016, which is a continuation-in-part
(Continued)

(51) Int. Cl.
*A23F 3/16* (2006.01)
*A23F 5/24* (2006.01)
(Continued)

(52) U.S. Cl.
CPC .............. *A23F 5/243* (2013.01); *A23F 3/163* (2013.01); *A23L 2/385* (2013.01); *A23L 2/42* (2013.01);
(Continued)

(58) Field of Classification Search
CPC ........................... A47J 31/407; B65D 85/8043
(Continued)

(56) References Cited

U.S. PATENT DOCUMENTS 2,312,046 A    2/1943  Warren
2,332,553 A    10/1943 Benedict
(Continued)

FOREIGN PATENT DOCUMENTS

CA         2902391        9/2014
CN      101322523 A      12/2008
(Continued)

OTHER PUBLICATIONS

Chemwiki, "Overview of Alcohol," 3 pages (2015) http://chemwiki.ucdavis.edu/Organic_Chemistry/Alcohols/Properties_of_Alcohols/Overview_of_Alcohol.
(Continued)

*Primary Examiner* — Thien S Tran
(74) *Attorney, Agent, or Firm* — Wilmer Cutler Pickering Hale and Dorr LLP

(57) ABSTRACT

Systems for and methods of controlled liquid food or beverage product creation are provided. A method of producing a liquid product from a receptacle containing frozen liquid contents includes receiving the receptacle containing a frozen liquid contents in a dispenser, identifying a characteristic of the receptacle, the contents, and/or a desired product, melting at least a portion of the contents to generate the product by selectively heating the receptacle and/or the contents without adding liquid to the interior of the receptacle and/or supplying a liquid to the interior of the receptacle, wherein the selectively heating without adding liquid to the interior of the receptacle and/or suppling the liquid is based on the identified characteristic. The method also includes perforating the receptacle and dispensing the product from the receptacle.

25 Claims, 157 Drawing Sheets

Related U.S. Application Data of application No. 15/265,379, filed on Sep. 14, 2016, now Pat. No. 9,615,597, which is a continuation of application No. 15/185,744, filed on Jun. 17, 2016, now Pat. No. 9,487,348, which is a continuation-in-part of application No. 15/099,156, filed on Apr. 14, 2016, which is a continuation-in-part of application No. PCT/US2016/023226, filed on Mar. 18, 2016, which is a continuation-in-part of application No. 14/801,540, filed on Jul. 16, 2015, now Pat. No. 9,346,611.

(60) Provisional application No. 62/344,212, filed on Jun. 1, 2016, provisional application No. 62/275,506, filed on Jan. 6, 2016, provisional application No. 62/136,072, filed on Mar. 20, 2015, provisional application No. 62/380,170, filed on Aug. 26, 2016, provisional application No. 62/350,928, filed on Jun. 16, 2016.

(51) Int. Cl.
  *A23L 2/42* (2006.01)
  *A23L 3/36* (2006.01)
  *A23L 2/385* (2006.01)
  *A47J 31/06* (2006.01)
  *A47J 31/36* (2006.01)
  *A47J 31/40* (2006.01)
  *A47J 31/44* (2006.01)
  *A47J 31/46* (2006.01)
  *A47J 43/042* (2006.01)
  *B65D 85/804* (2006.01)

(52) U.S. Cl.
  CPC ............ *A23L 3/36* (2013.01); *A47J 31/0615* (2013.01); *A47J 31/0673* (2013.01); *A47J 31/3695* (2013.01); *A47J 31/407* (2013.01); *A47J 31/441* (2013.01); *A47J 31/4403* (2013.01); *A47J 31/4492* (2013.01); *A47J 31/462* (2013.01); *B65D 85/8043* (2013.01); *A47J 43/042* (2013.01)

(58) Field of Classification Search
  USPC .... 99/280, 281, 283, 288, 359, 495; 426/77, 426/86, 107, 431, 557
  See application file for complete search history.

(56) References Cited

U.S. PATENT DOCUMENTS

| | | |
|---|---|---|
| 2,432,759 A | 12/1947 | Heyman |
| 2,559,032 A | 7/1951 | Tacchella |
| 2,863,776 A | 12/1958 | Lisher |
| 3,235,390 A | 2/1966 | Vischer |
| 3,385,201 A | 5/1968 | Martin |
| 3,412,572 A | 11/1968 | Kesling |
| 3,589,272 A | 6/1971 | Bouladon et al. |
| 3,914,956 A | 10/1975 | Knight, Jr. |
| 3,920,226 A | 11/1975 | Walt |
| 3,922,361 A | 11/1975 | Vann |
| 4,039,693 A | 8/1977 | Adams et al. |
| 4,110,476 A | 8/1978 | Rhodes |
| 4,136,202 A | 1/1979 | Favre |
| 4,377,970 A | 3/1983 | Kenkel |
| 4,426,573 A | 1/1984 | Fudickar et al. |
| 4,427,701 A | 1/1984 | Morley |
| 4,681,030 A | 7/1987 | Herbert |
| 4,737,374 A | 4/1988 | Huber et al. |
| 4,750,645 A | 6/1988 | Wilson et al. |
| 4,784,678 A | 11/1988 | Rudick et al. |
| 4,811,872 A | 3/1989 | Boyd |
| 4,844,918 A | 7/1989 | Hoashi |
| 4,853,234 A | 8/1989 | Bentley et al. |
| 4,907,725 A | 3/1990 | Durham |
| 5,080,008 A | 1/1992 | Helbling |
| 5,094,153 A | 3/1992 | Helbling |
| 5,114,047 A | 5/1992 | Baron et al. |
| 5,115,730 A | 5/1992 | Gockelmann |
| 5,284,028 A | 2/1994 | Stuhmer |
| 5,323,691 A | 6/1994 | Reese et al. |
| 5,325,765 A | 7/1994 | Sylvan et al. |
| 5,335,589 A | 8/1994 | Yerves, Jr. et al. |
| 5,343,799 A | 9/1994 | Fond |
| 5,347,916 A | 9/1994 | Fond et al. |
| 5,363,745 A | 11/1994 | Lin |
| 5,392,694 A | 2/1995 | Muller et al. |
| 5,398,596 A | 3/1995 | Fond |
| 5,480,189 A | 1/1996 | Davies et al. |
| 5,507,415 A | 4/1996 | Sizemore |
| 5,651,482 A | 7/1997 | Sizemore |
| 5,656,316 A | 8/1997 | Fond et al. |
| 5,669,208 A | 9/1997 | Tabaroni et al. |
| 5,770,003 A | 6/1998 | Tabaroni et al. |
| D395,821 S | 7/1998 | Tabaroni et al. |
| D397,292 S | 8/1998 | Tabaroni et al. |
| 5,789,005 A | 8/1998 | Tabaroni et al. |
| 5,799,501 A | 9/1998 | Leonard et al. |
| 5,847,127 A | 12/1998 | D'Alessio et al. |
| 5,853,785 A | 12/1998 | Nayyar et al. |
| 5,868,062 A * | 2/1999 | Enomoto ............... A47J 31/002 99/282 |
| 5,927,085 A | 7/1999 | Waldman |
| 5,958,481 A | 9/1999 | Hodges |
| 5,997,936 A | 12/1999 | Jimenez-Laguna |
| 6,026,732 A | 2/2000 | Kollep et al. |
| 6,041,697 A | 3/2000 | Maoz |
| 6,079,315 A | 6/2000 | Beaulieu et al. |
| 6,082,247 A | 7/2000 | Beaulicu |
| 6,112,537 A | 9/2000 | Broadbent |
| 6,142,063 A | 11/2000 | Beaulieu et al. |
| 6,180,149 B1 | 1/2001 | Gramm |
| 6,182,554 B1 | 2/2001 | Beaulieu et al. |
| 6,286,415 B1 | 9/2001 | Leung |
| 6,407,224 B1 | 6/2002 | Mironov et al. |
| 6,440,256 B1 | 8/2002 | Gordon et al. |
| 6,444,160 B1 | 9/2002 | Bartoli |
| 6,511,963 B1 | 1/2003 | Maccecchini |
| 6,534,108 B2 | 3/2003 | Jimenez-Laguna et al. |
| 6,551,646 B1 | 4/2003 | Baker |
| 6,589,577 B2 | 7/2003 | Lazaris et al. |
| 6,602,879 B2 | 8/2003 | Murthy et al. |
| 6,606,938 B2 | 8/2003 | Taylor |
| 6,607,762 B2 | 8/2003 | Lazaris et al. |
| 6,609,821 B2 | 8/2003 | Wulf et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 6,727,484 B2 | 4/2004 | Policappelli |
| 6,740,345 B2 | 5/2004 | Cai |
| 6,887,506 B2 | 5/2005 | Kalenian |
| 6,948,420 B2 | 9/2005 | Kirschner et al. |
| 7,004,322 B1 | 2/2006 | Bartoli |
| 7,165,488 B2 | 1/2007 | Bragg et al. |
| 7,168,560 B2 | 1/2007 | Finetti et al. |
| 7,192,629 B2 | 3/2007 | Lammertink et al. |
| 7,258,061 B2 | 8/2007 | Campbell et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,419,692 B1 | 9/2008 | Kalenian |
| 7,464,636 B2 | 12/2008 | Mariller |
| 7,473,869 B2 | 1/2009 | Chun |
| 7,493,930 B2 | 2/2009 | Finetti et al. |
| 7,513,192 B2 | 4/2009 | Sullivan et al. |
| 7,523,695 B2 | 4/2009 | Streeter et al. |
| 7,591,217 B2 | 9/2009 | Kodden et al. |
| 7,640,845 B2 | 1/2010 | Woodnorth et al. |

(56) References Cited

U.S. PATENT DOCUMENTS

| | | |
|---|---|---|
| 7,726,233 B2 | 6/2010 | Kodden et al. |
| 7,820,948 B1 | 10/2010 | Renau |
| 7,875,304 B2 | 1/2011 | Kalenian |
| 7,959,851 B2 | 6/2011 | Finetti et al. |
| 7,959,967 B2 | 6/2011 | Pattenden |
| 8,087,347 B2 | 1/2012 | Halliday et al. |
| 8,151,694 B2 | 4/2012 | Jacobs et al. |
| 8,361,527 B2 | 1/2013 | Winkler et al. |
| 8,475,153 B2 | 7/2013 | Finetti et al. |
| 8,495,949 B2 | 7/2013 | Tinkler et al. |
| 8,516,948 B2 | 8/2013 | Zimmerman et al. |
| 8,524,306 B2 | 9/2013 | Robinson et al. |
| 8,534,501 B2 | 9/2013 | Nevarez et al. |
| 8,535,748 B2 | 9/2013 | Robinson et al. |
| 8,541,042 B2 | 9/2013 | Robinson et al. |
| 8,563,058 B2 | 10/2013 | Roulin et al. |
| 8,573,114 B2 | 11/2013 | Huang et al. |
| 8,609,170 B2 | 12/2013 | Tinkler et al. |
| 8,628,811 B2 | 1/2014 | Panyam et al. |
| 8,663,080 B2 | 3/2014 | Bartoli et al. |
| 8,667,892 B2 | 3/2014 | Cominelli et al. |
| 8,685,479 B2 | 4/2014 | Dogan et al. |
| 8,709,519 B1 | 4/2014 | de Poo |
| 8,722,124 B2 | 5/2014 | Ozanne |
| 8,752,478 B2 | 6/2014 | Nocera |
| 8,758,844 B2 | 6/2014 | Nocera |
| 8,800,431 B2 | 8/2014 | Sullivan et al. |
| 8,808,775 B2 | 8/2014 | Novak et al. |
| 8,826,811 B2 | 9/2014 | Kim |
| 8,834,948 B2 | 9/2014 | Estabrook et al. |
| 8,863,987 B2 | 10/2014 | Jacobs et al. |
| 8,877,276 B2 | 11/2014 | Cominelli et al. |
| 8,889,203 B2 | 11/2014 | York |
| 8,916,215 B2 | 12/2014 | Yoakim et al. |
| 8,920,858 B2 | 12/2014 | Yauk et al. |
| 8,956,672 B2 | 2/2015 | Yoakim et al. |
| 8,960,078 B2 | 2/2015 | Hristov et al. |
| 8,962,048 B2 | 2/2015 | Gerbaulet et al. |
| 8,973,341 B2 | 3/2015 | Bartoli et al. |
| 9,016,196 B2 | 4/2015 | Hensel |
| 9,023,412 B2 | 5/2015 | Doleac et al. |
| 9,079,705 B2 | 7/2015 | Digiuni |
| 9,085,410 B2 | 7/2015 | Beer |
| 9,107,444 B2 | 8/2015 | Lynn et al. |
| 9,113,744 B2 | 8/2015 | Digiuni |
| 9,120,617 B2 | 9/2015 | Beer |
| 9,161,652 B2 | 10/2015 | Kamerbeek et al. |
| D742,679 S | 11/2015 | Bartoli et al. |
| 9,192,189 B1 | 11/2015 | McDermott et al. |
| 9,205,975 B2 | 12/2015 | Giovanni |
| 9,232,871 B2 | 1/2016 | Rivera |
| 9,247,430 B2 | 1/2016 | Kountouris et al. |
| 9,259,114 B2 | 2/2016 | Nevarez et al. |
| 9,277,758 B2 | 3/2016 | Zeller et al. |
| 9,516,970 B2 | 12/2016 | Roberts et al. |
| 2001/0002269 A1 | 5/2001 | Zhao |
| 2001/0006695 A1 | 7/2001 | Jimenez-Laguna et al. |
| 2001/0043954 A1 | 11/2001 | Sweet |
| 2001/0052294 A1 | 12/2001 | Schmed |
| 2002/0048621 A1 | 4/2002 | Boyd et al. |
| 2002/0148356 A1 | 10/2002 | Lazaris et al. |
| 2003/0006185 A1 | 1/2003 | Hepler |
| 2003/0172813 A1 | 9/2003 | Schifferle |
| 2003/0222089 A1 | 12/2003 | Hale |
| 2004/0045265 A1 | 3/2004 | Bartoli et al. |
| 2004/0075069 A1 | 4/2004 | Bartoli et al. |
| 2004/0077475 A1 | 4/2004 | Bartoli |
| 2004/0118290 A1 | 6/2004 | Cai |
| 2004/0144800 A1 | 7/2004 | Danby et al. |
| 2004/0232595 A1 | 11/2004 | Bartoli |
| 2004/0247721 A1 | 12/2004 | Finetti et al. |
| 2004/0250686 A1 | 12/2004 | Hale |
| 2004/0256766 A1 | 12/2004 | Finetti et al. |
| 2005/0008754 A1 | 1/2005 | Sweeney et al. |
| 2005/0017118 A1 | 1/2005 | Finetti et al. |
| 2005/0034580 A1 | 2/2005 | Finetti et al. |
| 2005/0034817 A1 | 2/2005 | Finetti et al. |
| 2005/0039849 A1 | 2/2005 | Finetti et al. |
| 2005/0051033 A1 | 3/2005 | Lassota |
| 2005/0130820 A1 | 6/2005 | Finetti et al. |
| 2005/0138902 A1 | 6/2005 | Bartoli et al. |
| 2005/0160918 A1 | 7/2005 | Winstanley et al. |
| 2005/0160919 A1 | 7/2005 | Balkau |
| 2005/0163892 A1 | 7/2005 | Breslow et al. |
| 2005/0247205 A1 | 11/2005 | Chen et al. |
| 2005/0266122 A1 | 12/2005 | Franceschi et al. |
| 2006/0000363 A1 | 1/2006 | Streeter et al. |
| 2006/0019000 A1 | 1/2006 | Zanetti |
| 2006/0083835 A1 | 4/2006 | Raghavan et al. |
| 2006/0107841 A1 | 5/2006 | Schifferle |
| 2006/0174769 A1 | 8/2006 | Favre et al. |
| 2006/0196363 A1 | 9/2006 | Rahn |
| 2006/0219098 A1 | 10/2006 | Mandralis et al. |
| 2006/0243838 A1 | 11/2006 | Nakato |
| 2007/0175334 A1 | 8/2007 | Halliday et al. |
| 2007/0202237 A1 | 8/2007 | Yoakim et al. |
| 2007/0210105 A1 | 9/2007 | Malachowsky et al. |
| 2007/0251260 A1 | 11/2007 | Baxter et al. |
| 2007/0251397 A1 | 11/2007 | Dorsten et al. |
| 2008/0038441 A1 | 2/2008 | Kirschner |
| 2008/0041236 A1 | 2/2008 | Raouf et al. |
| 2008/0089983 A1 | 4/2008 | Coste |
| 2008/0233264 A1 | 9/2008 | Doglioni Majer et al. |
| 2009/0092724 A1 | 4/2009 | Mattie |
| 2009/0109793 A1 | 4/2009 | Xue |
| 2009/0126577 A1 | 5/2009 | Ternite |
| 2009/0127297 A1 | 5/2009 | Zirps |
| 2009/0214713 A1 | 8/2009 | Banim et al. |
| 2009/0223375 A1 | 9/2009 | Verbeek |
| 2009/0235827 A1 | 9/2009 | Bongers et al. |
| 2009/0266239 A1 | 10/2009 | Noordhuis |
| 2010/0015313 A1 | 1/2010 | Harris |
| 2010/0018405 A1 | 1/2010 | Duvall |
| 2010/0034929 A1 | 2/2010 | Dogan et al. |
| 2010/0083843 A1 | 4/2010 | Denisart et al. |
| 2010/0107889 A1 | 5/2010 | Denisart et al. |
| 2010/0143565 A1 | 6/2010 | McGill |
| 2010/0209563 A1 | 8/2010 | Mark |
| 2010/0215808 A1 | 8/2010 | Versini |
| 2010/0266740 A1* | 10/2010 | Van Den Aker ....... A23G 9/045 |
| | | 426/433 |
| 2010/0282088 A1* | 11/2010 | Deuber .................. A47J 31/52 |
| | | 99/281 |
| 2010/0287951 A1 | 11/2010 | Lynn et al. |
| 2010/0288131 A1 | 11/2010 | Kilber et al. |
| 2010/0303964 A1 | 12/2010 | Beaulieu et al. |
| 2011/0041701 A1* | 2/2011 | Chatterjee .......... A47J 31/3642 |
| | | 99/295 |
| 2011/0045144 A1 | 2/2011 | Boussemart et al. |
| 2011/0071009 A1 | 3/2011 | Bartoli et al. |
| 2011/0094195 A1 | 4/2011 | Bartoli et al. |
| 2011/0117259 A1* | 5/2011 | Storek ..................... A47J 36/14 |
| | | 426/509 |
| 2011/0183043 A1 | 7/2011 | Reati |
| 2011/0200726 A1 | 8/2011 | Tinkler et al. |
| 2011/0203740 A1 | 8/2011 | Finetti et al. |
| 2011/0226343 A1 | 9/2011 | Novak et al. |
| 2011/0244099 A1 | 10/2011 | Perentes et al. |
| 2011/0274802 A1 | 11/2011 | Rivera |
| 2011/0300276 A1 | 12/2011 | Ozanne |
| 2012/0030869 A1 | 2/2012 | Del Saz Salazar |
| 2012/0063753 A1 | 3/2012 | Cochran et al. |
| 2012/0070542 A1* | 3/2012 | Camera .............. B65D 85/8043 |
| | | 426/77 |
| 2012/0100275 A1 | 4/2012 | Bishop et al. |
| 2012/0121779 A1 | 5/2012 | Lai et al. |
| 2012/0207895 A1 | 8/2012 | Rivera |
| 2012/0207896 A1 | 8/2012 | Rivera |
| 2012/0267036 A1 | 10/2012 | Bartoli et al. |
| 2012/0276264 A1 | 11/2012 | Rivera |
| 2012/0291634 A1* | 11/2012 | Startz .................... A47J 31/002 |
| | | 99/300 |
| 2012/0308691 A1 | 12/2012 | Alvarez et al. |
| 2013/0043151 A1 | 2/2013 | Bartoli et al. |

(56) References Cited

U.S. PATENT DOCUMENTS

| | | |
|---|---|---|
| 2013/0055902 A1 | 3/2013 | Berto et al. |
| 2013/0101716 A1 | 4/2013 | Beaulieu et al. |
| 2013/0118360 A1 | 5/2013 | Dogan et al. |
| 2013/0139699 A1 | 6/2013 | Rivera |
| 2013/0156897 A1 | 6/2013 | Goldstein |
| 2013/0180406 A1 | 7/2013 | Hay et al. |
| 2013/0193616 A1 | 8/2013 | Bartoli et al. |
| 2013/0199378 A1 | 8/2013 | Yoakim et al. |
| 2013/0202761 A1 | 8/2013 | McKee |
| 2013/0232992 A1 | 9/2013 | Bisceglie |
| 2013/0239817 A1* | 9/2013 | Starr ............ A47J 31/462 99/280 |
| 2013/0327223 A1 | 12/2013 | Bartoli et al. |
| 2014/0007776 A1 | 1/2014 | Mori et al. |
| 2014/0026761 A1 | 1/2014 | Bartoli et al. |
| 2014/0057033 A1 | 2/2014 | Lai et al. |
| 2014/0076167 A1 | 3/2014 | Boggavarapu |
| 2014/0106033 A1 | 4/2014 | Roberts |
| 2014/0137210 A1 | 5/2014 | Kountouris et al. |
| 2014/0154387 A1 | 6/2014 | Almblad et al. |
| 2014/0199442 A1 | 7/2014 | Orsi |
| 2014/0216276 A1 | 8/2014 | Soderman |
| 2014/0287105 A1 | 9/2014 | Husband et al. |
| 2014/0331987 A1 | 11/2014 | Ford et al. |
| 2014/0342060 A1 | 11/2014 | Bartoli et al. |
| 2014/0352543 A1 | 12/2014 | Boni et al. |
| 2015/0001100 A1 | 1/2015 | Bartoli et al. |
| 2015/0047509 A1* | 2/2015 | Trombetta ........ A47J 31/3676 99/283 |
| 2015/0068405 A1 | 3/2015 | Bartoli et al. |
| 2015/0072052 A1 | 3/2015 | Bartoli et al. |
| 2015/0108011 A1* | 4/2015 | Bartoli ............ B65D 85/8043 206/0.5 |
| 2015/0128525 A1 | 5/2015 | Bartoli et al. |
| 2015/0140251 A1 | 5/2015 | Bartoli et al. |
| 2015/0151903 A1 | 6/2015 | Bartoli et al. |
| 2015/0201790 A1* | 7/2015 | Smith ............... A23F 3/18 426/431 |
| 2015/0210030 A1 | 7/2015 | Bartoli et al. |
| 2015/0217880 A1 | 8/2015 | Bartoli et al. |
| 2015/0217881 A1 | 8/2015 | Bartoli et al. |
| 2015/0232279 A1 | 8/2015 | Bartoli et al. |
| 2015/0257588 A1 | 9/2015 | Stein et al. |
| 2015/0329282 A1 | 11/2015 | Bartoli et al. |
| 2015/0344219 A1 | 12/2015 | Bartoli et al. |
| 2015/0367269 A1 | 12/2015 | Bartoli et al. |
| 2016/0000135 A1 | 1/2016 | Evans et al. |
| 2016/0001903 A1 | 1/2016 | Bartoli et al. |
| 2016/0051079 A1 | 2/2016 | Abegglen et al. |

FOREIGN PATENT DOCUMENTS

| | | |
|---|---|---|
| CN | 101720842 A | 6/2010 |
| CN | 201957705 U | 9/2011 |
| CN | 201987311 U | 9/2011 |
| CN | 102326810 A | 1/2012 |
| EP | 0916266 | 5/1999 |
| EP | 0941668 | 9/1999 |
| EP | 1488838 | 12/2004 |
| EP | 2468159 | 6/2012 |
| GB | 2410998 A | 8/2005 |
| JP | 02-031663 | 2/1990 |
| JP | 2010220642 A | 10/2010 |
| WO | WO-1993/09684 | 5/1993 |
| WO | WO-00/56163 | 9/2000 |
| WO | WO-2002/098759 | 12/2002 |
| WO | WO-2004/091305 | 10/2004 |
| WO | WO-2005/092160 | 10/2005 |
| WO | WO-2006/017893 | 2/2006 |
| WO | WO-2006/077259 | 7/2006 |
| WO | WO-2010/066736 | 6/2010 |
| WO | WO-2012/121779 | 9/2012 |
| WO | WO-2012/174331 | 12/2012 |
| WO | WO-2013/124811 | 8/2013 |
| WO | WO 201312481 A1 * | 8/2013 ......... B65D 85/8043 |
| WO | WO-2014/053614 | 4/2014 |
| WO | WO-2015/001340 | 1/2015 |
| WO | WO-2015/049049 | 4/2015 |

OTHER PUBLICATIONS

Helmenstine, "What is the Freezing Point of Alcohol," 4 pages (2015) http://chemistry.about.com/od/factsstructures/fl/What-Is-the-Freezing-Point-of-Alcohol-Freezing-Temperature-of-Alcohol.htm.

Helmenstine, "What is the Freezing Point of Water," 3 pages (2015) http://chemistry.about.com/od/waterchemistry/f/freezing-point-of-water.htm.

Helmenstine, "What is the Melting Point of Water," 3 pages (2015) http://chemistry.about.com/od/waterchemistry/f/What-Is-The-Melting-Point Of-Water.htm.

International Search Report and Written Opinion for International Application No. PCT/US2016/023226 dated Jun. 27, 2016 (8 pages).

International Search Report and Written Opinion for International Patent Application No. PCT/US2013/064634 dated Mar. 21, 2014 (8 pages).

Karpuschewski and Petzel, "Ice Blasting—An Innovative Concept for the Problem-Oriented Deburring of Workpieces," Burrs—Analysis, Control, and Removal, Springer-Verlag Berlin Heidelberg; pp. 197-201 (2010).

Stewart, "Keep Cool Cubes," http://www.marthastewart.com/356419/flavored-ice-cube-ideas, 9 pages (Jul. 2012).

The Kitchn, "Why You Can Store Vodka But Not Beer in the Freezer," http://www.thekitchn.com/why-doesnt-alcohol-freeze-weve-got-chemistry-217962, 2 pages (2015).

International Search Report and Written Opinion for International Application No. PCT/US2017/048932 dated Nov. 14, 2017 (17 pages).

* cited by examiner

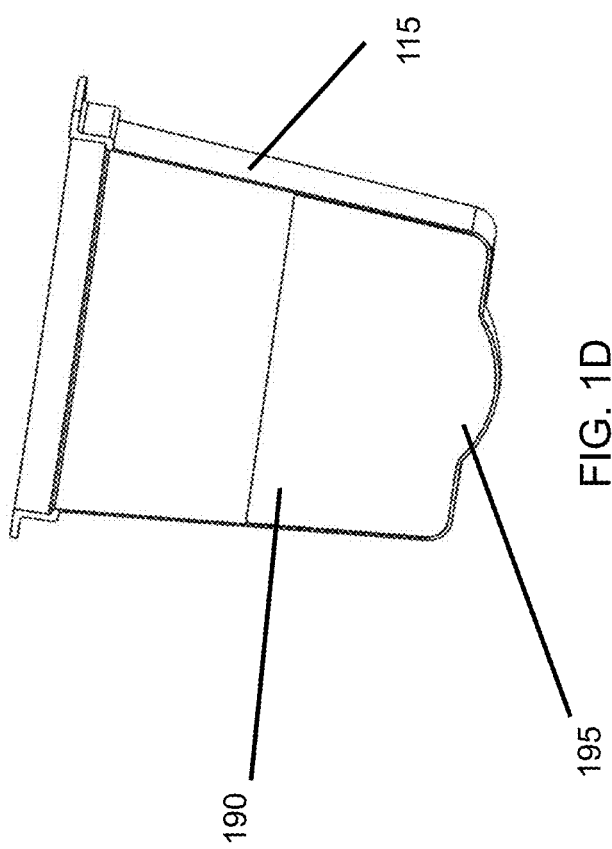

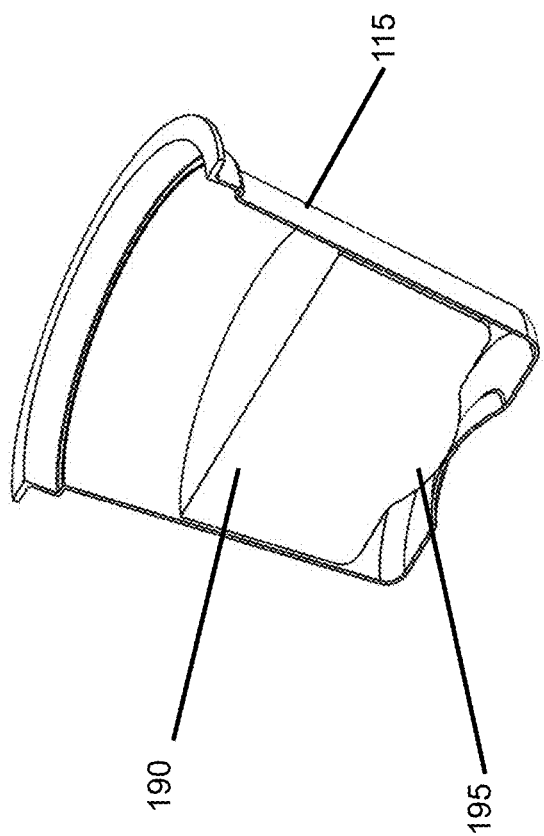

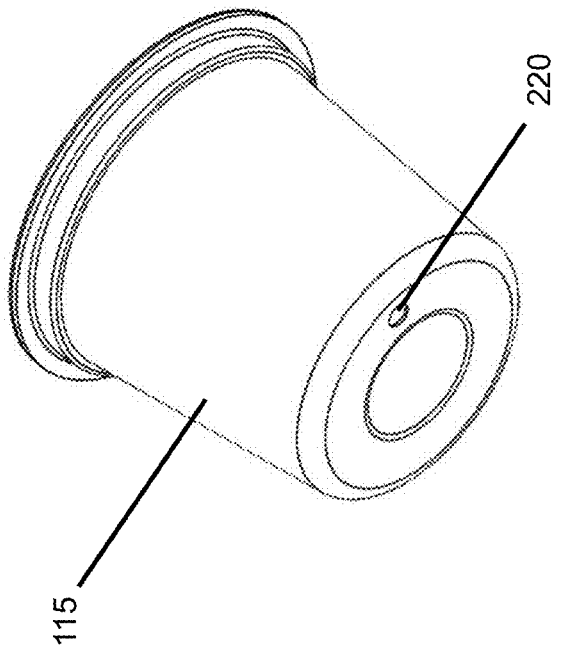

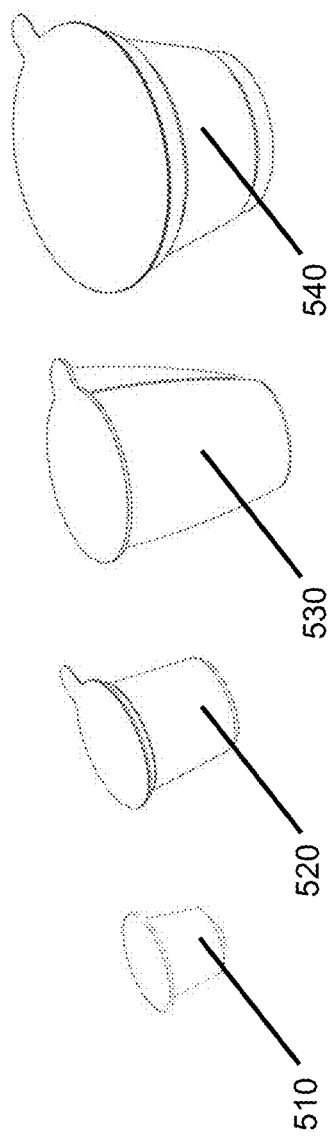

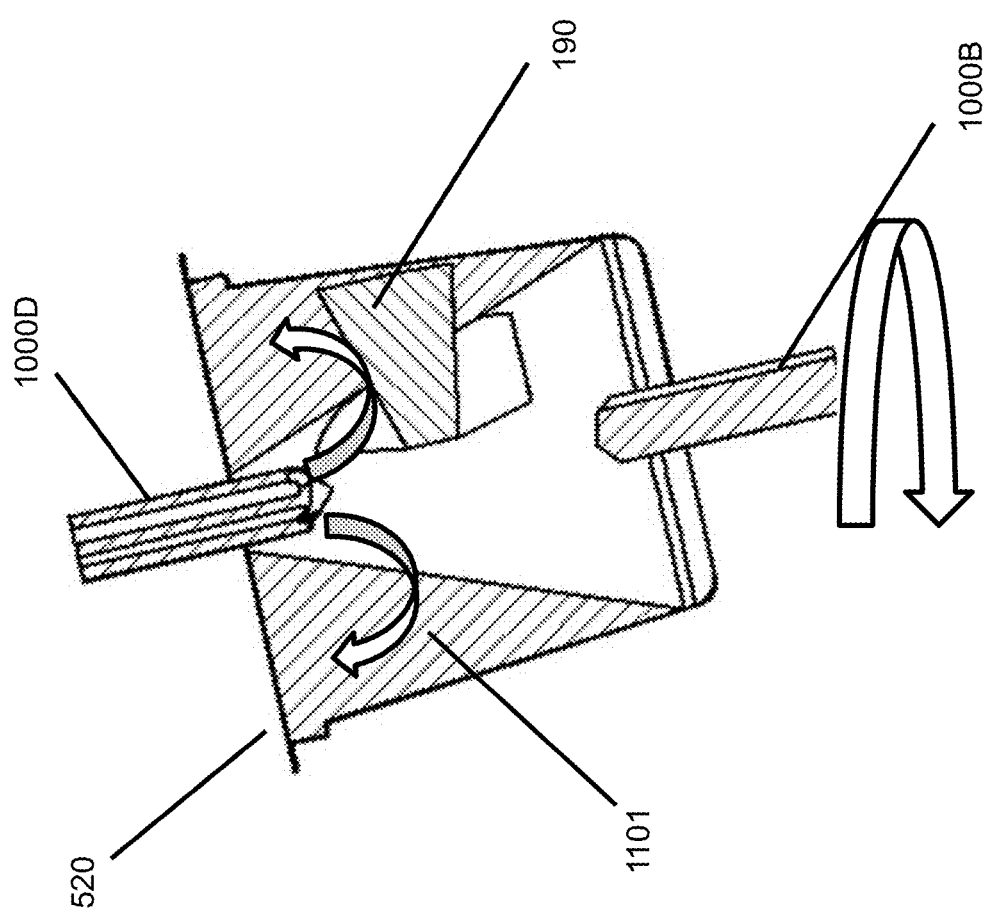

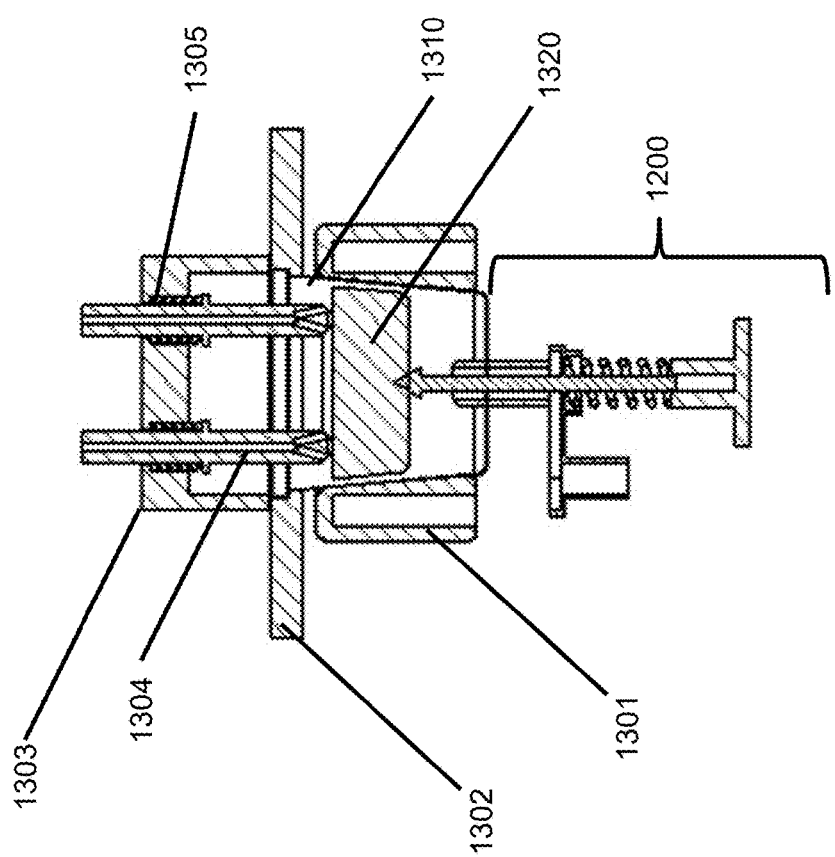

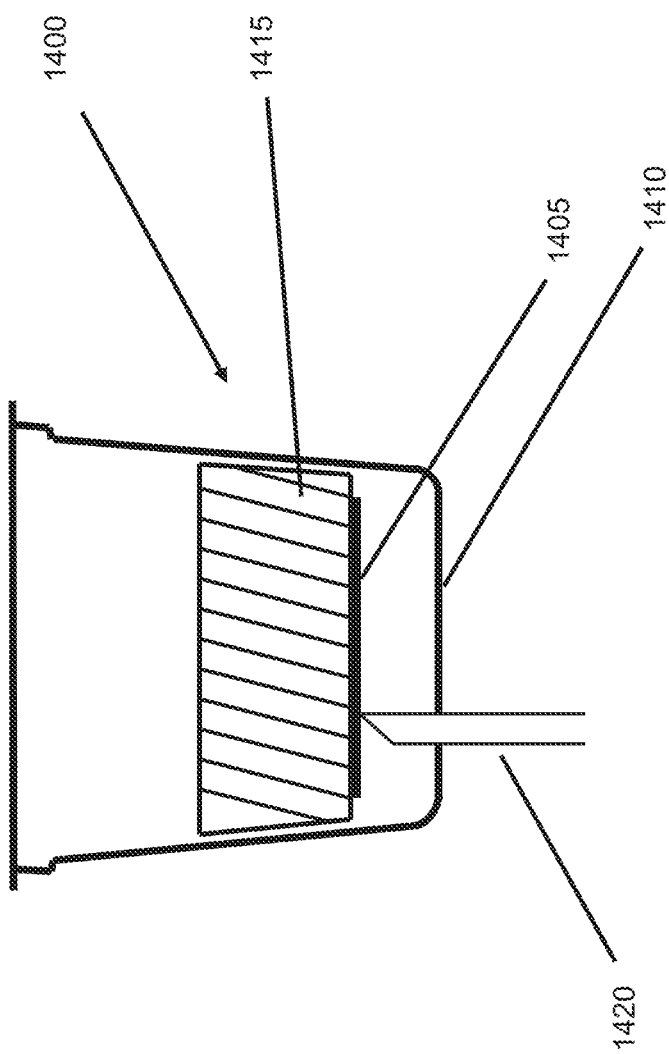

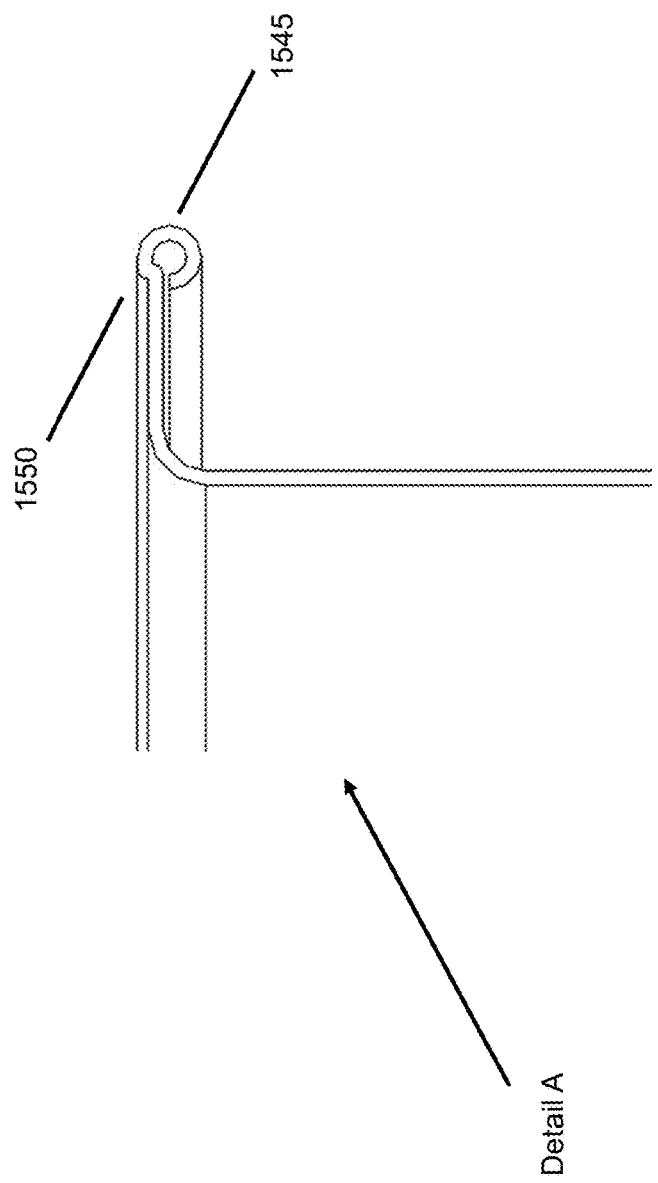

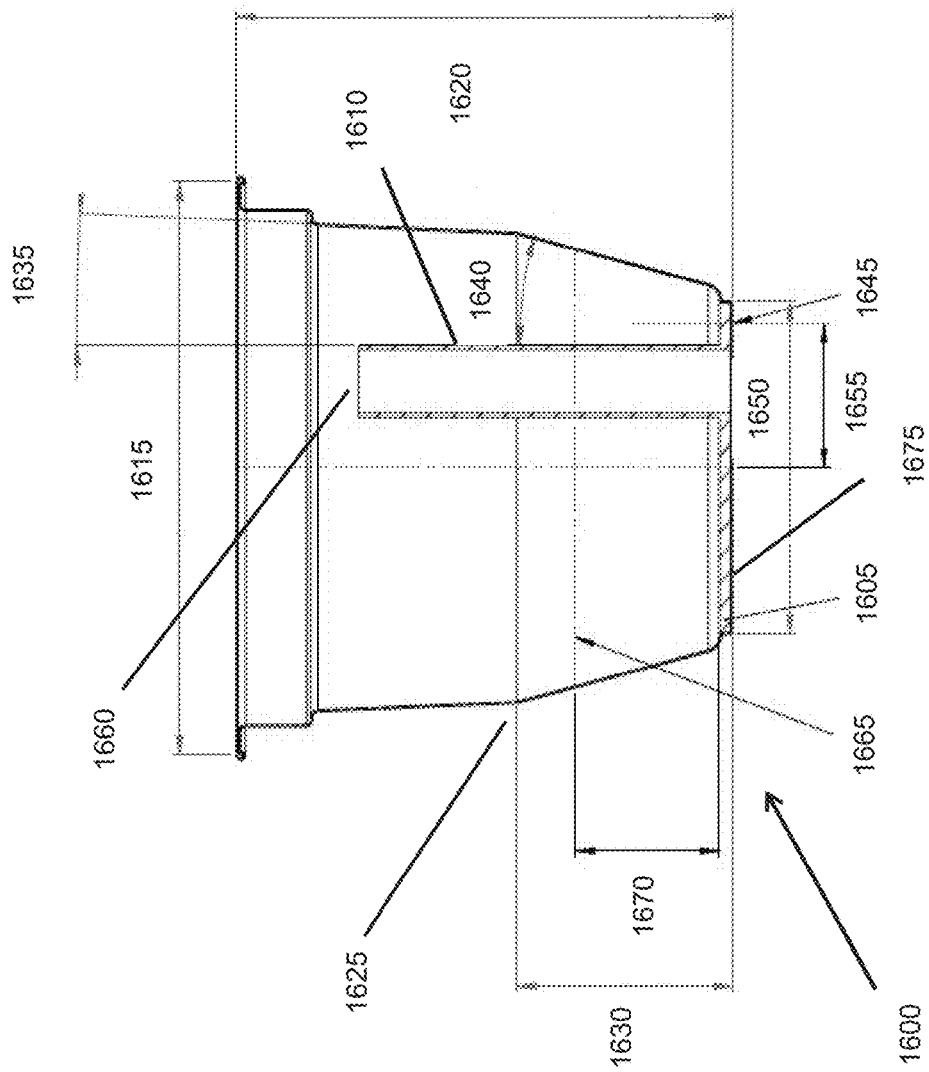

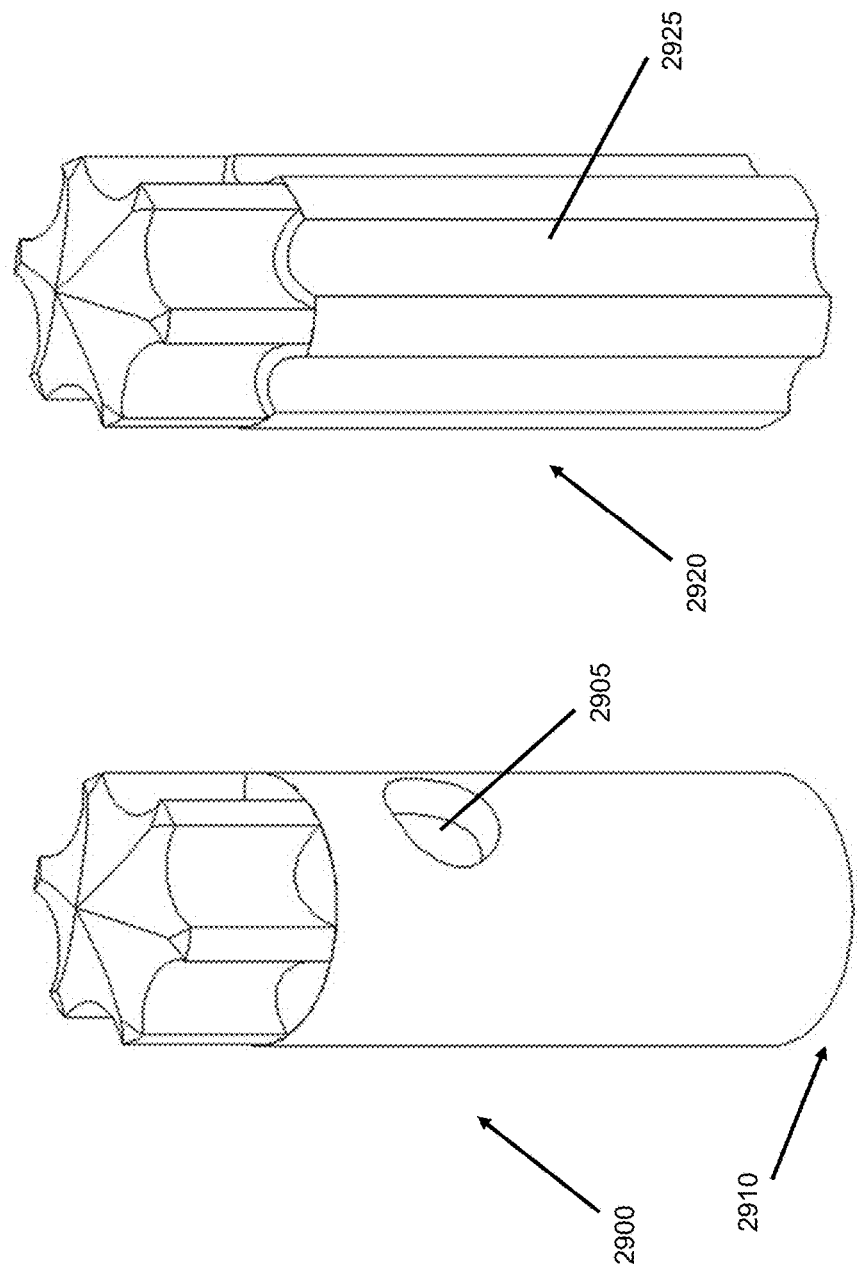

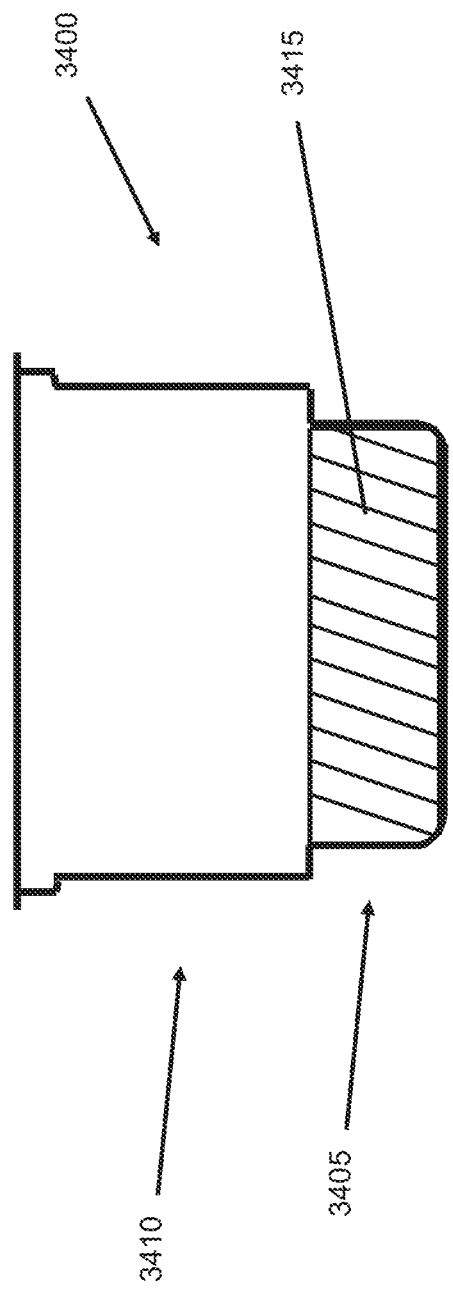

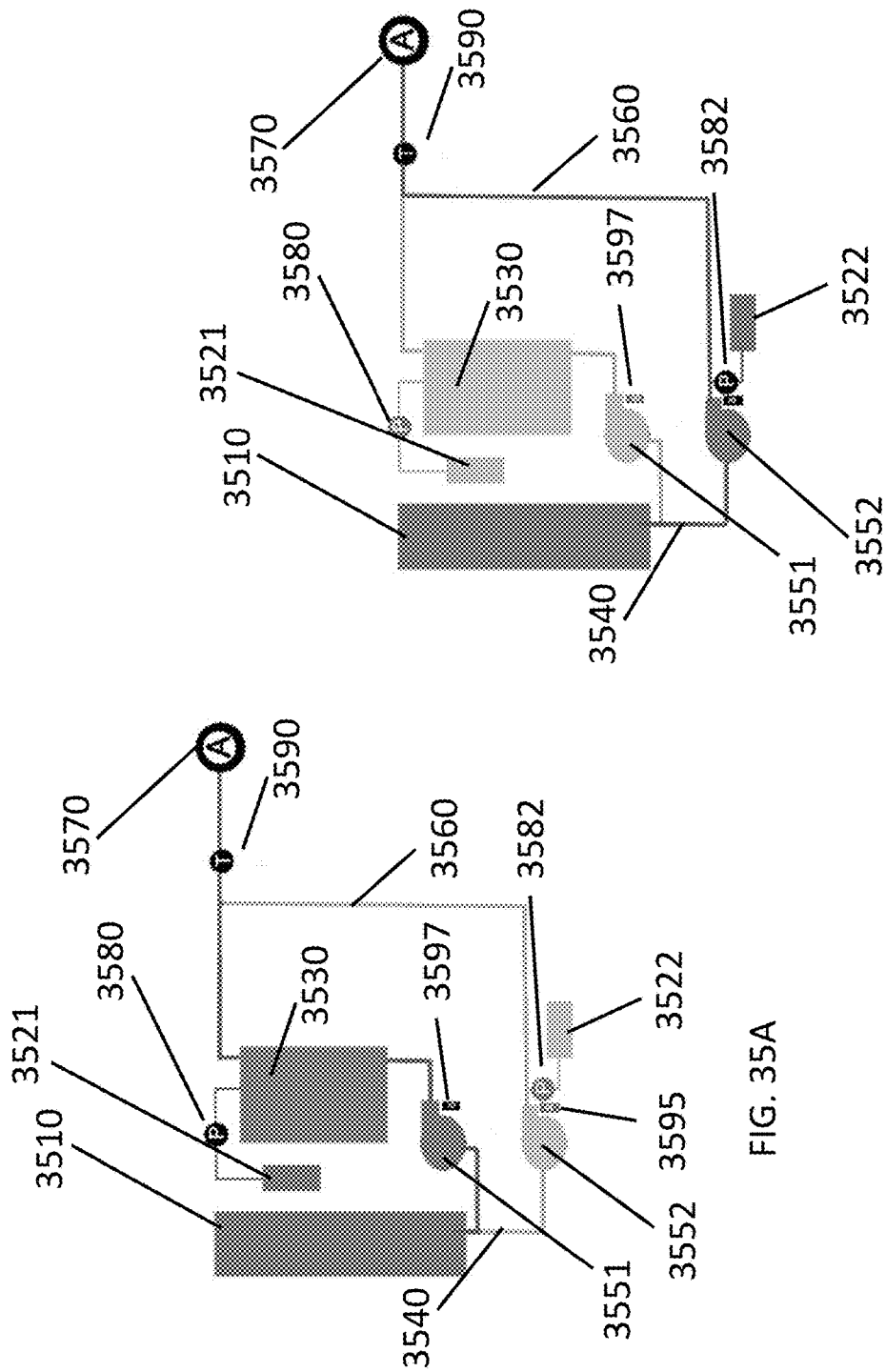

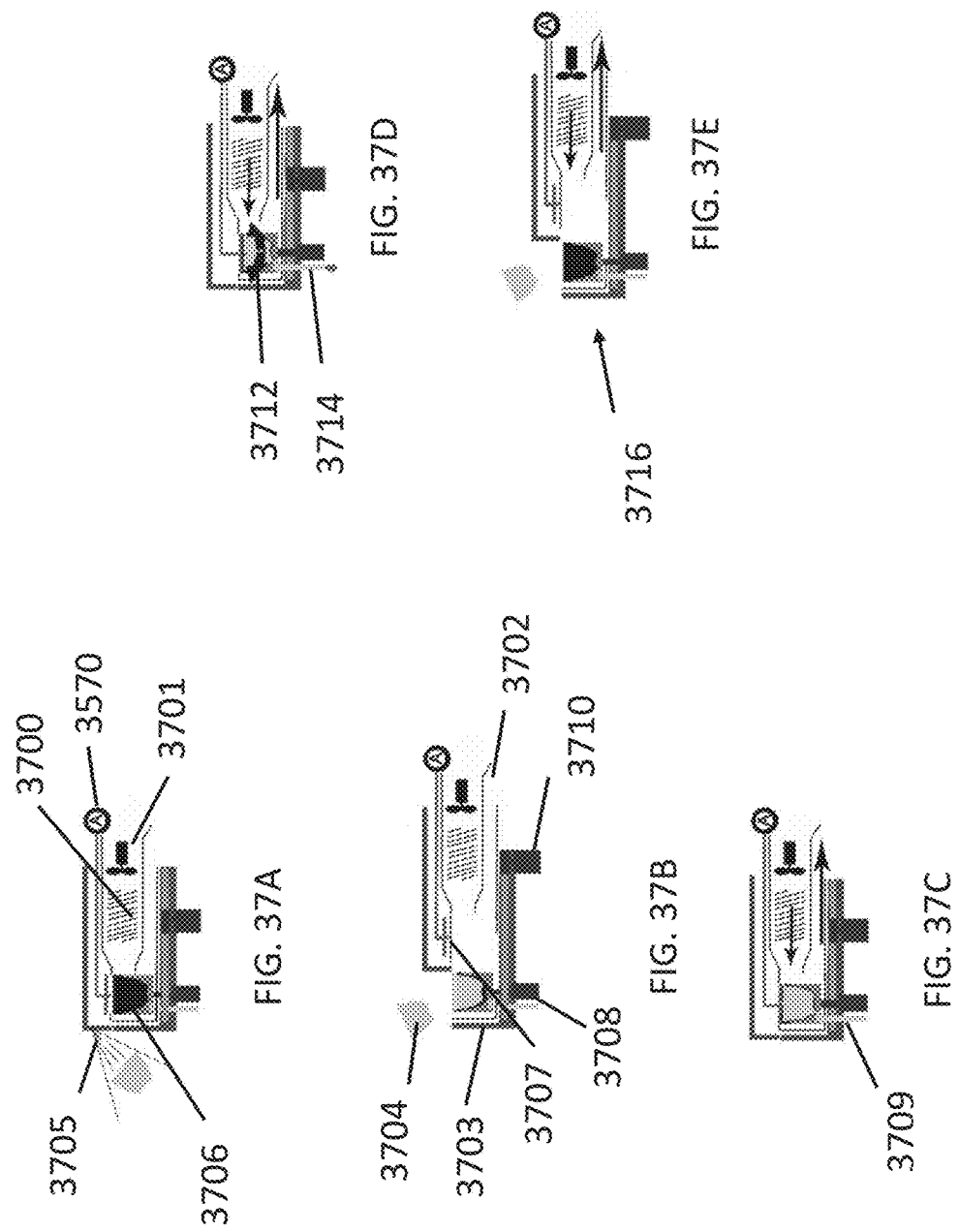

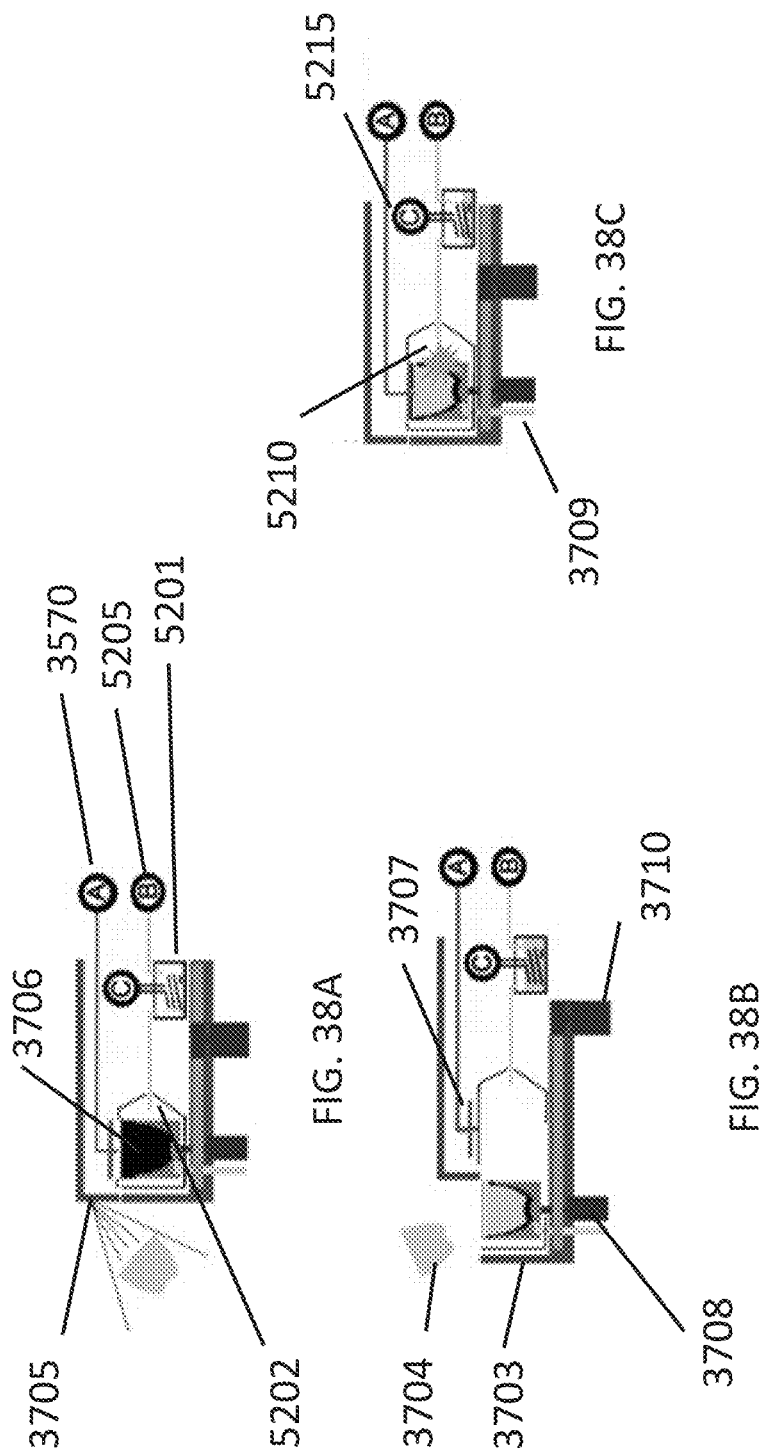

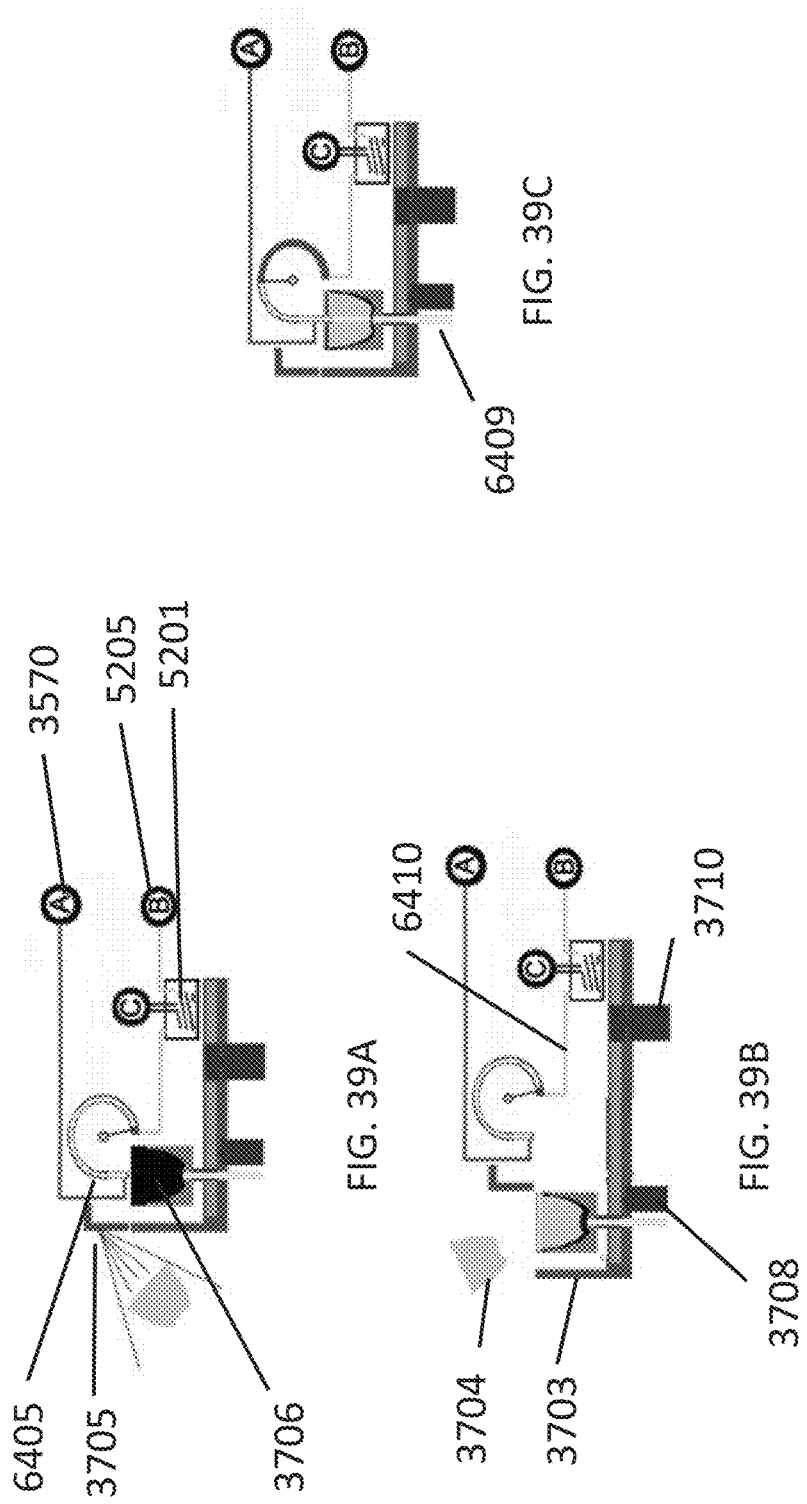

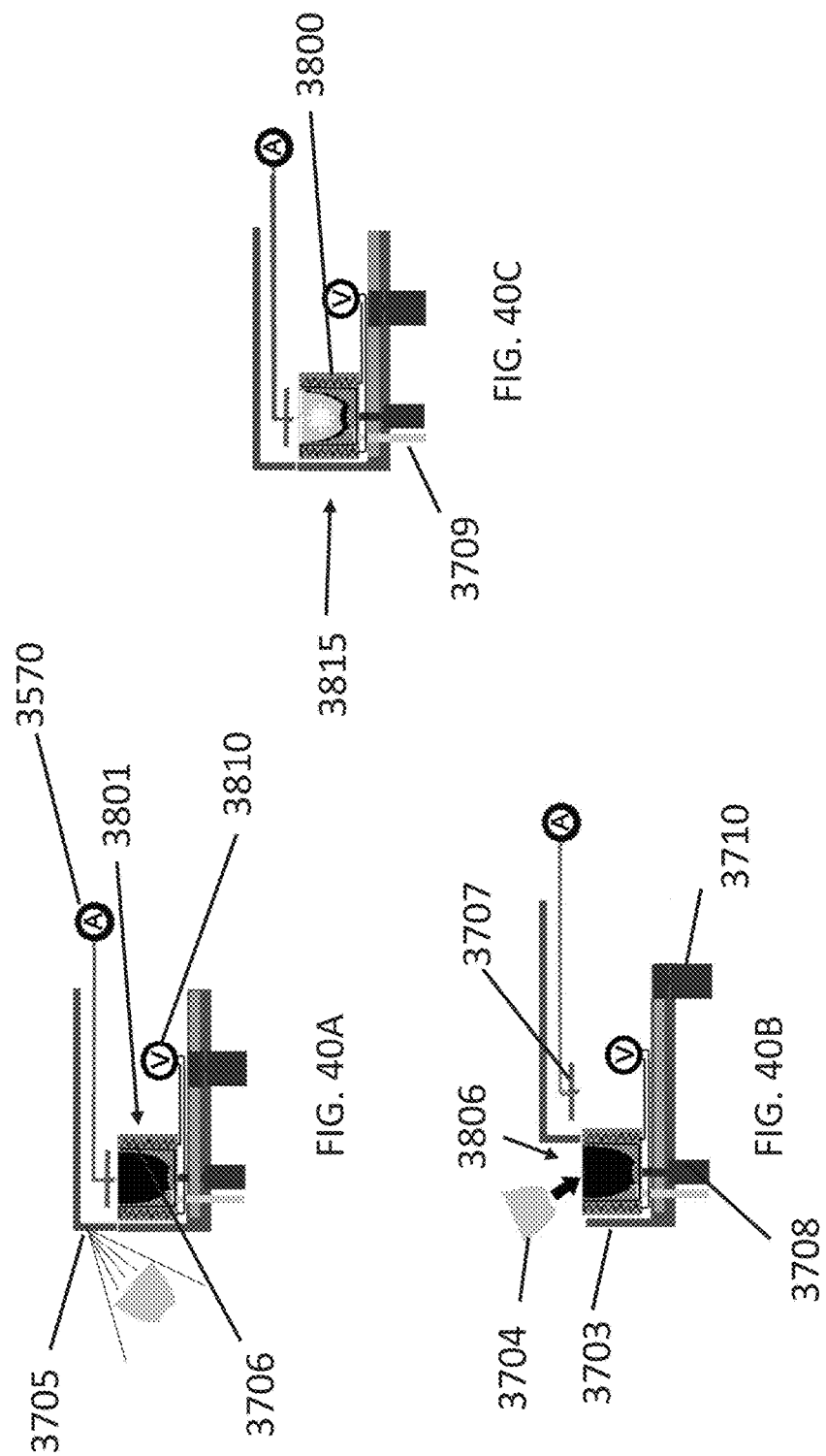

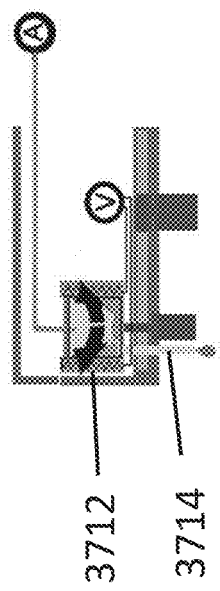
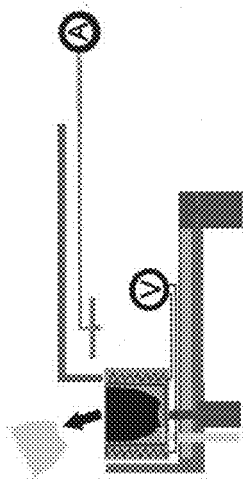
FIG. 40D
FIG. 40E

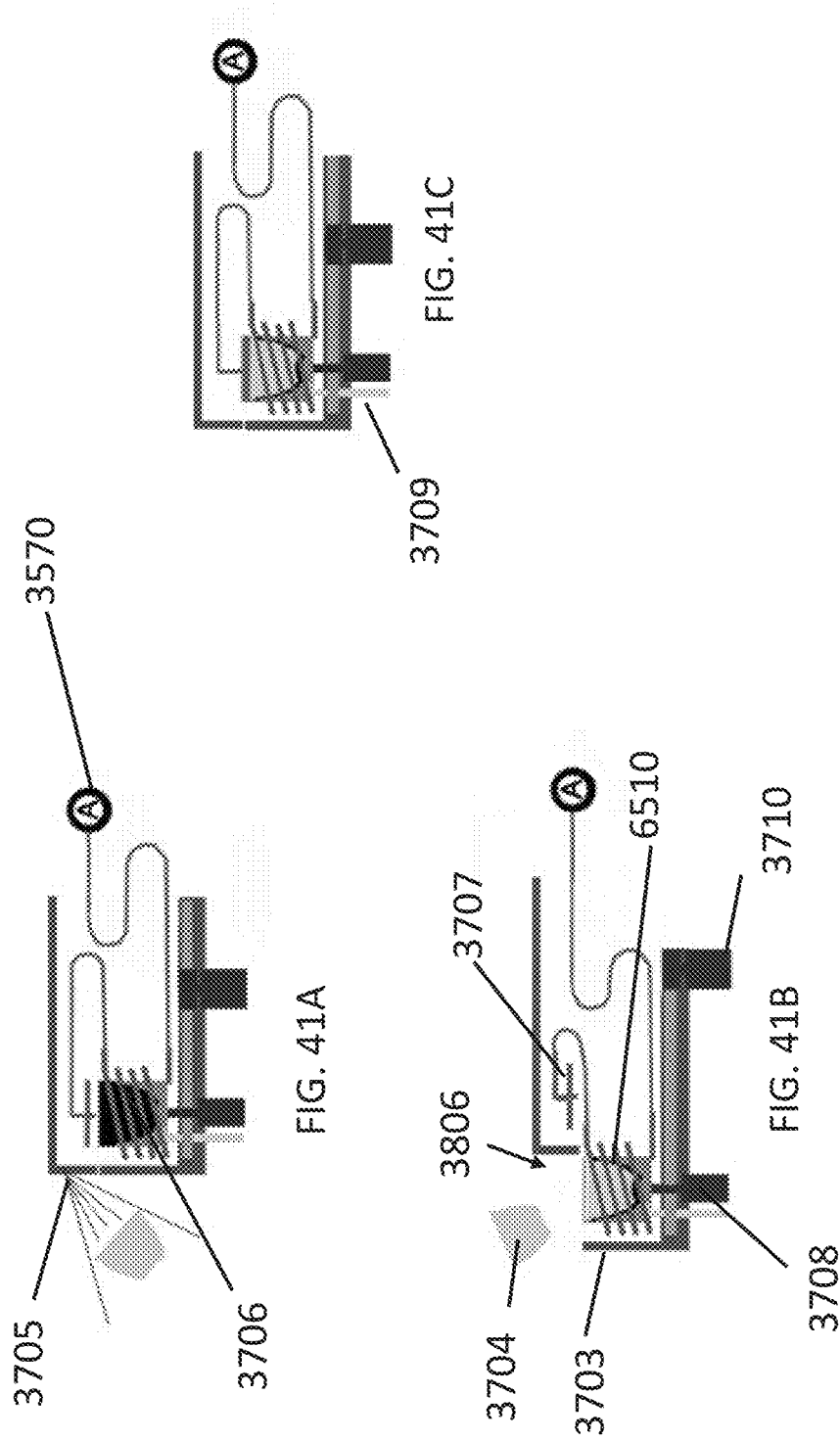

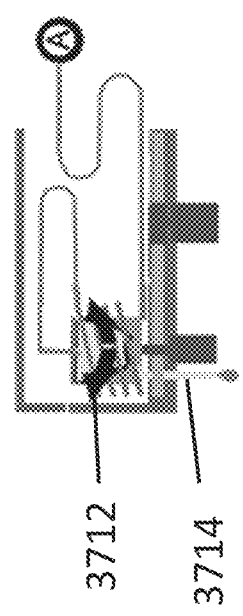
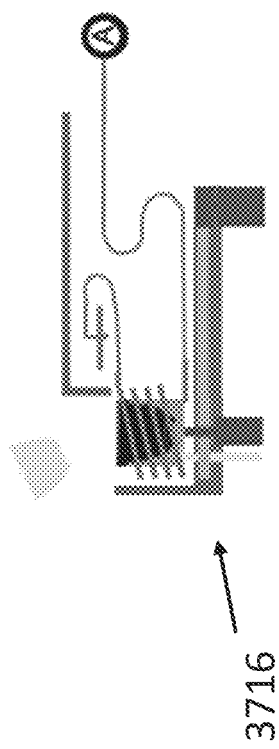
FIG. 41D
FIG. 41E

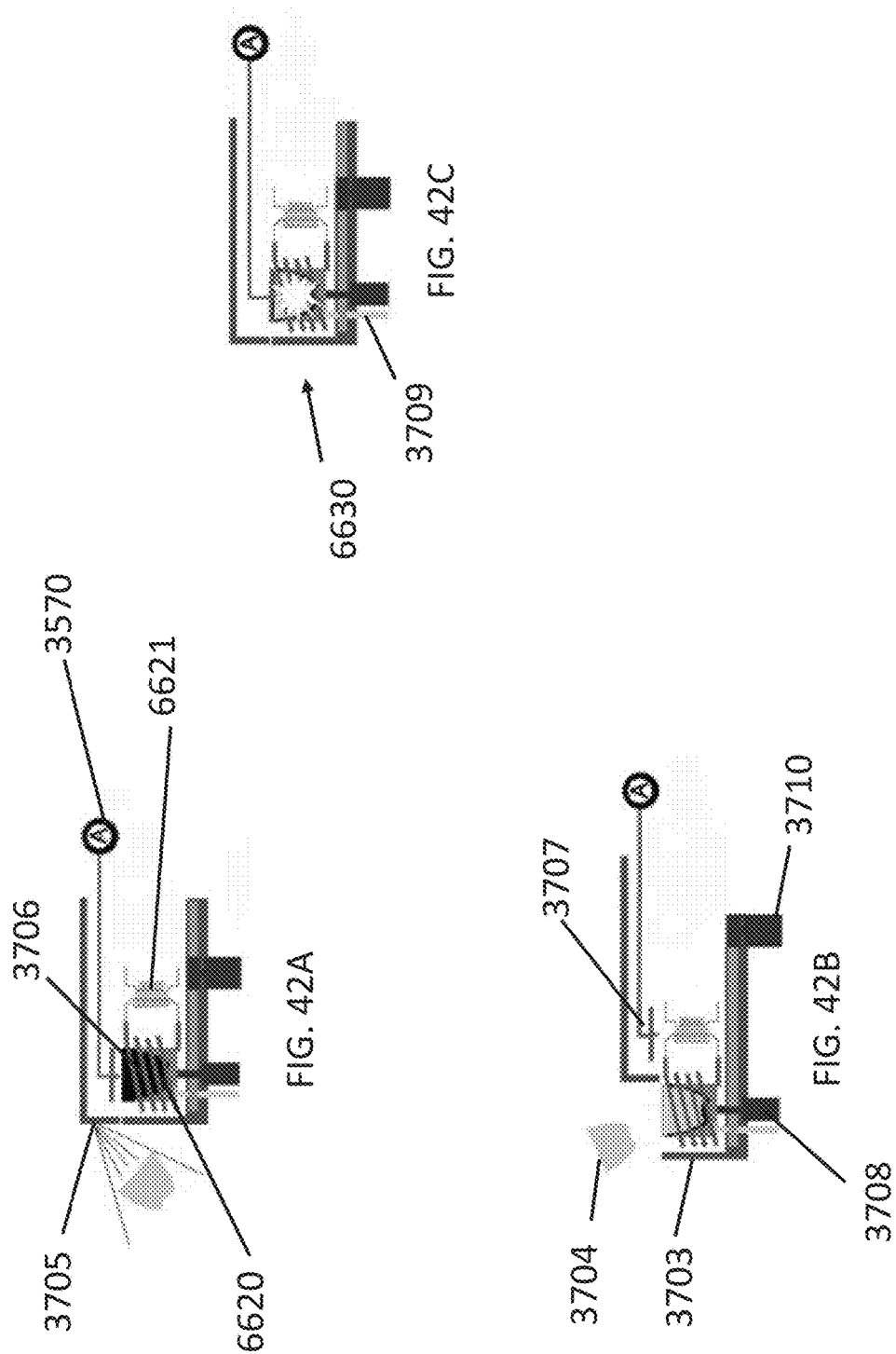

3712
3714

3716

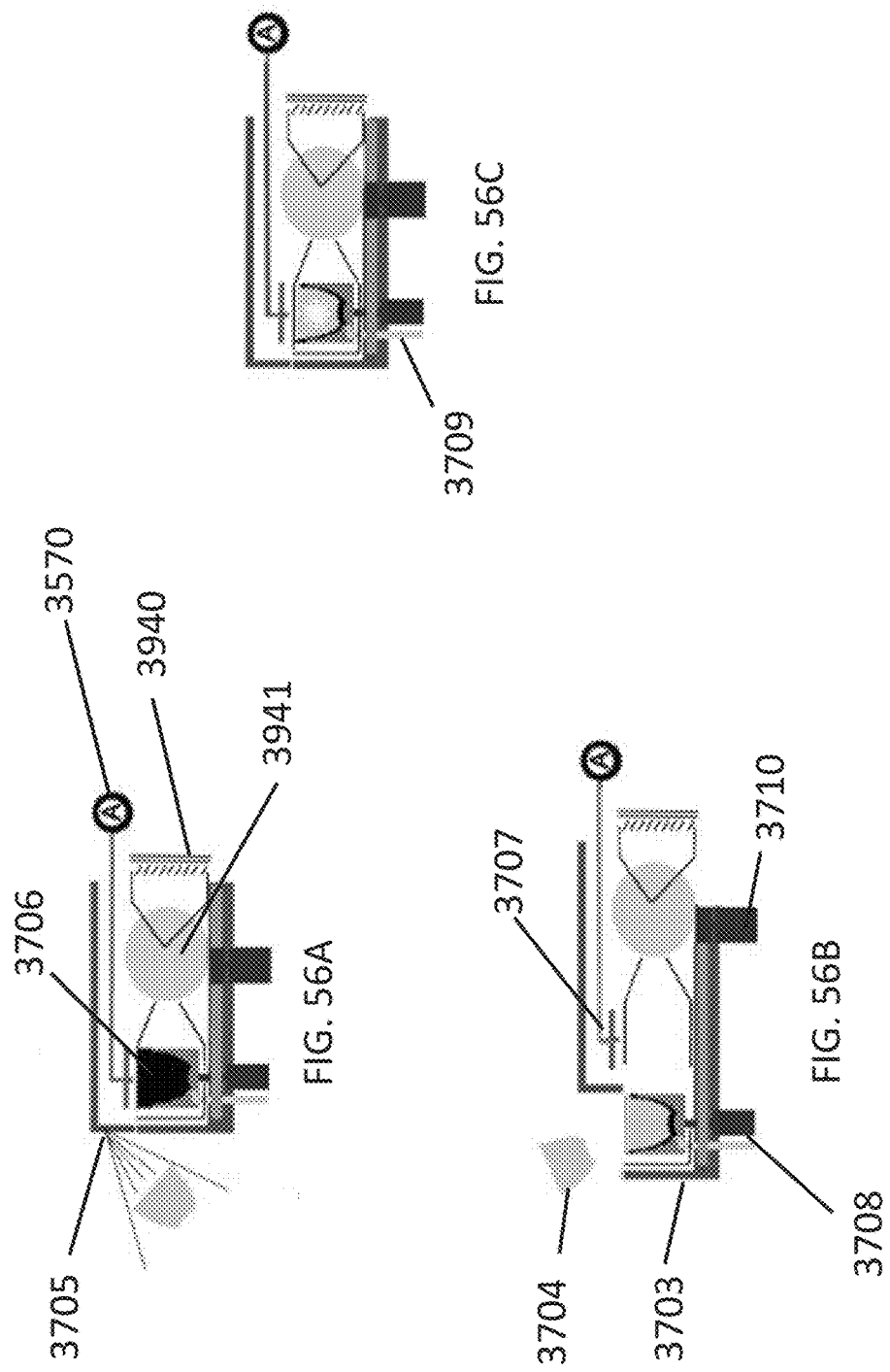

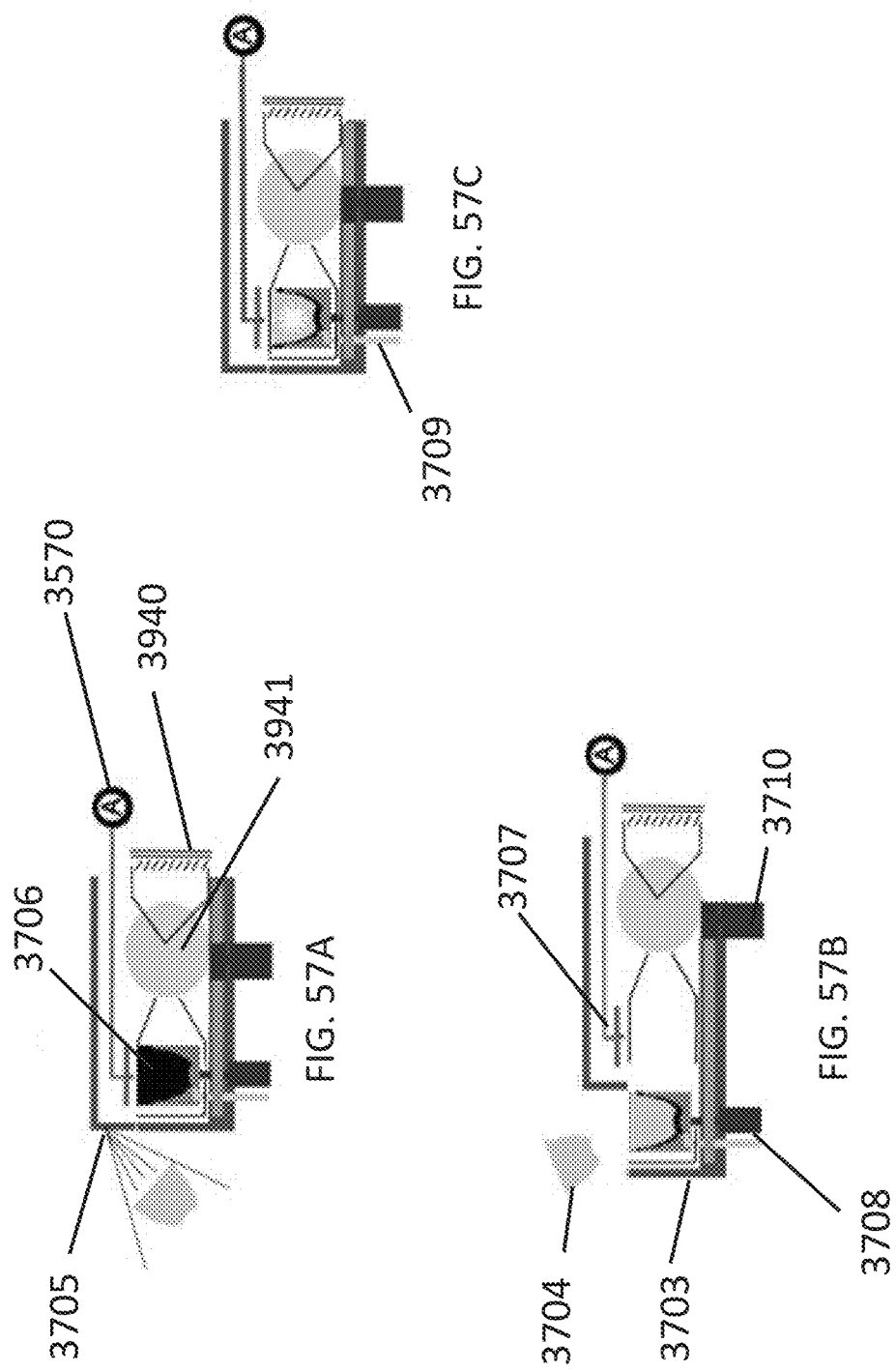

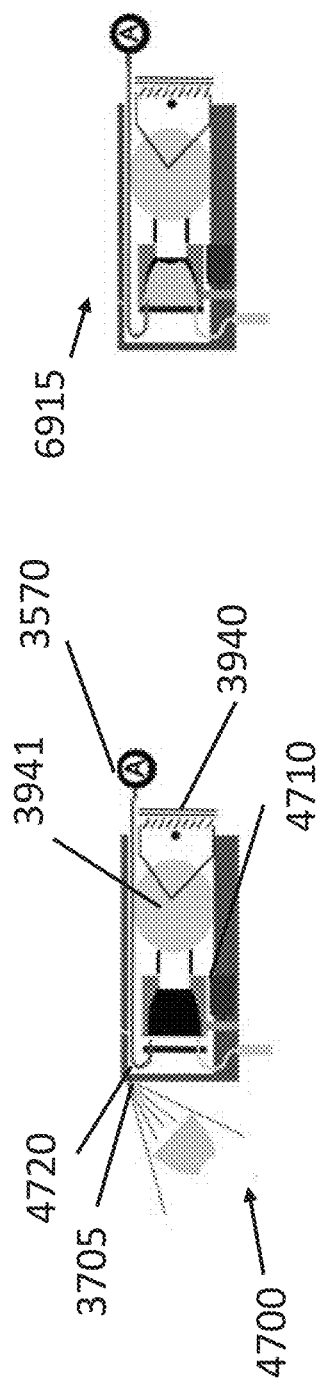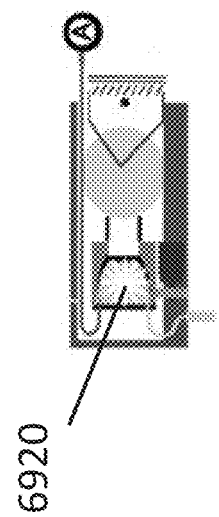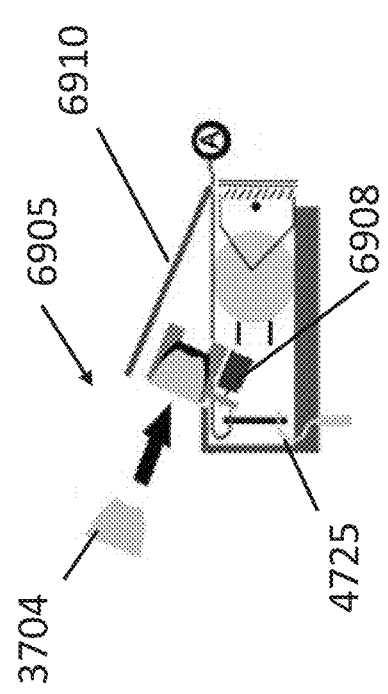

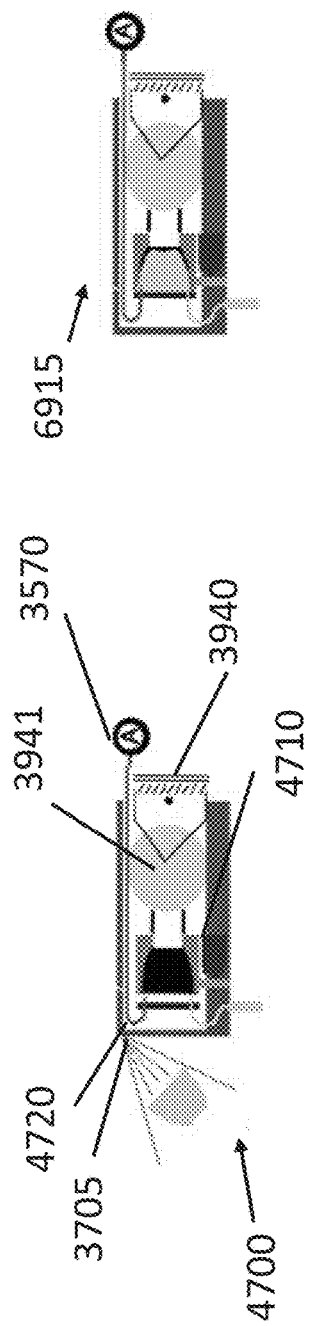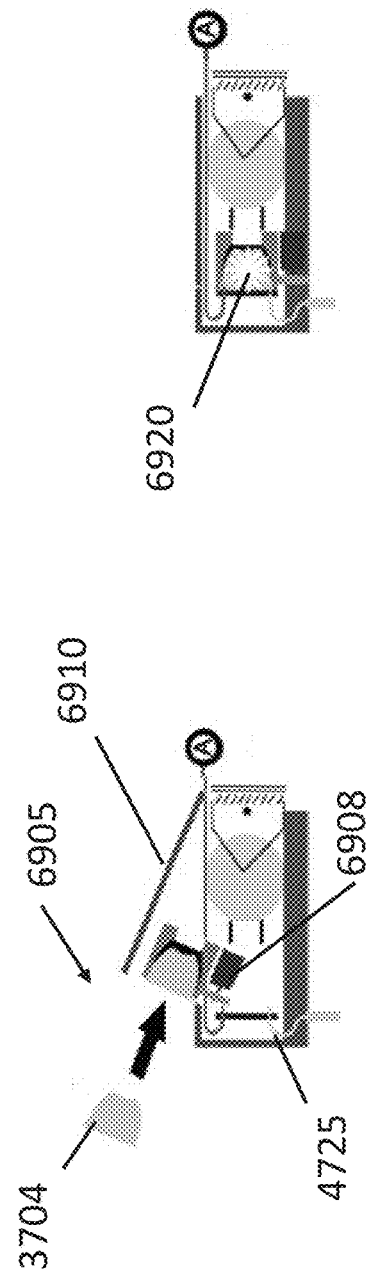

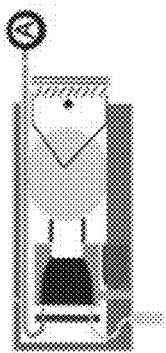
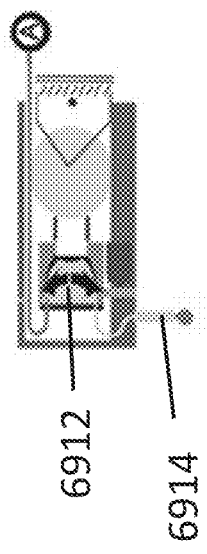
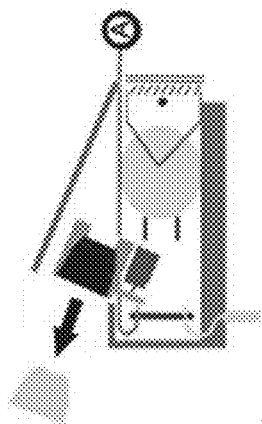
FIG. 59G
FIG. 59E
FIG. 59F

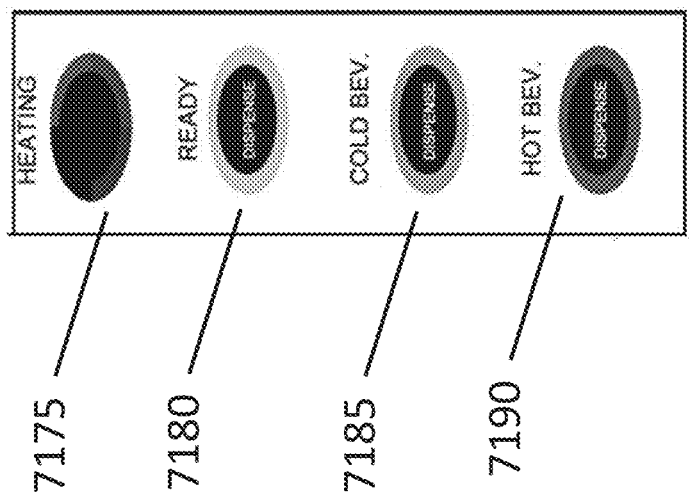

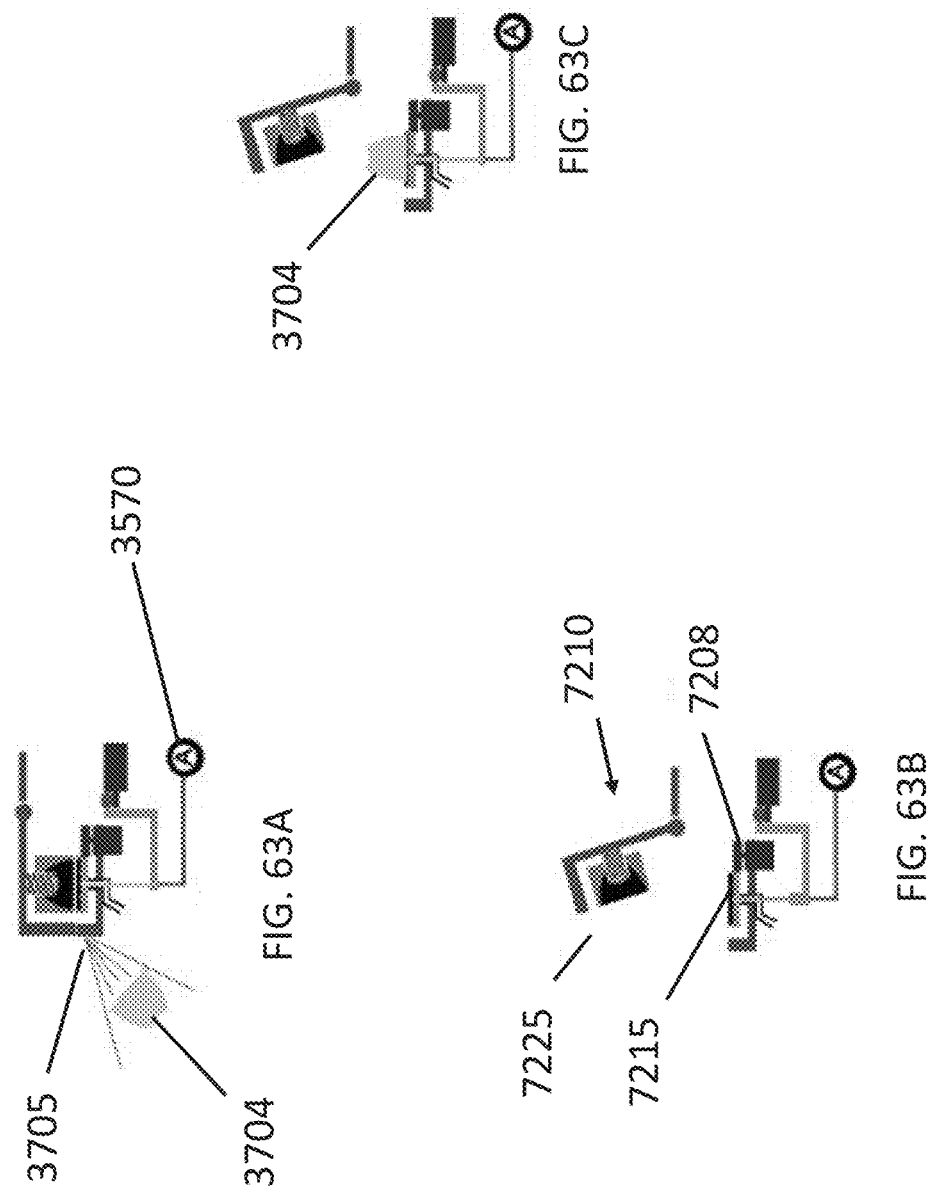

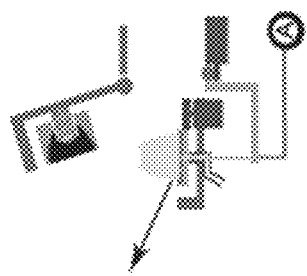
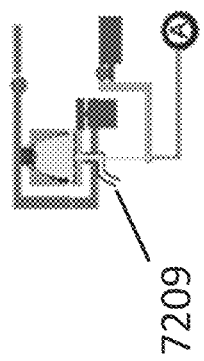
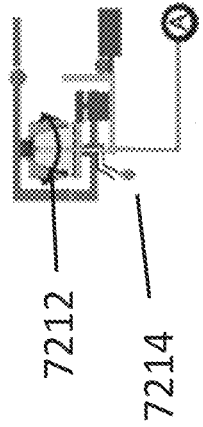

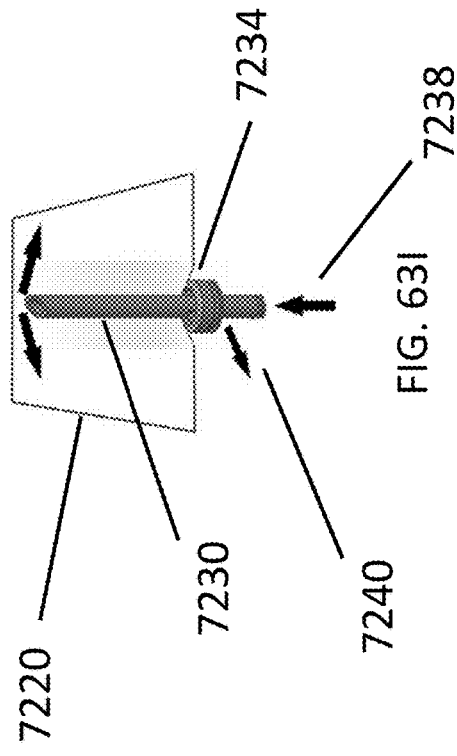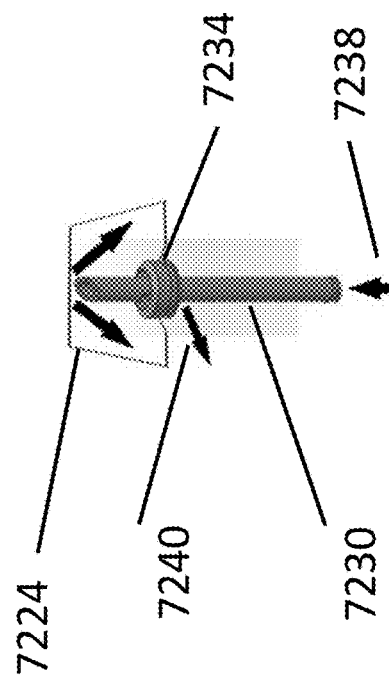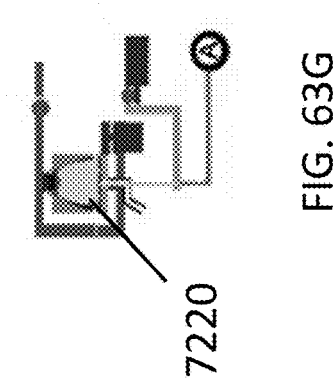

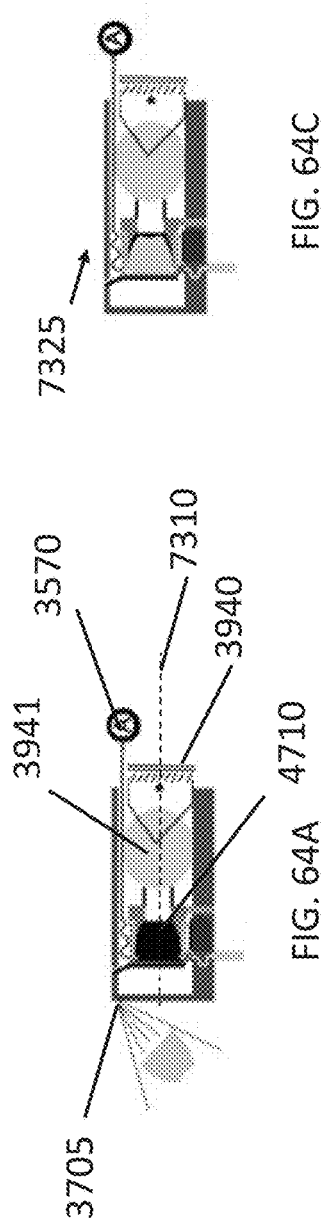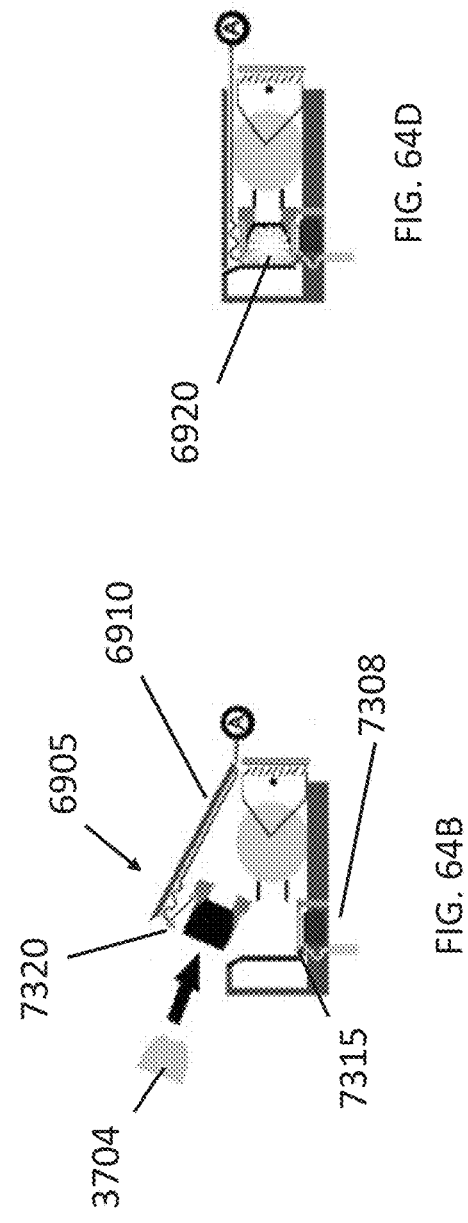

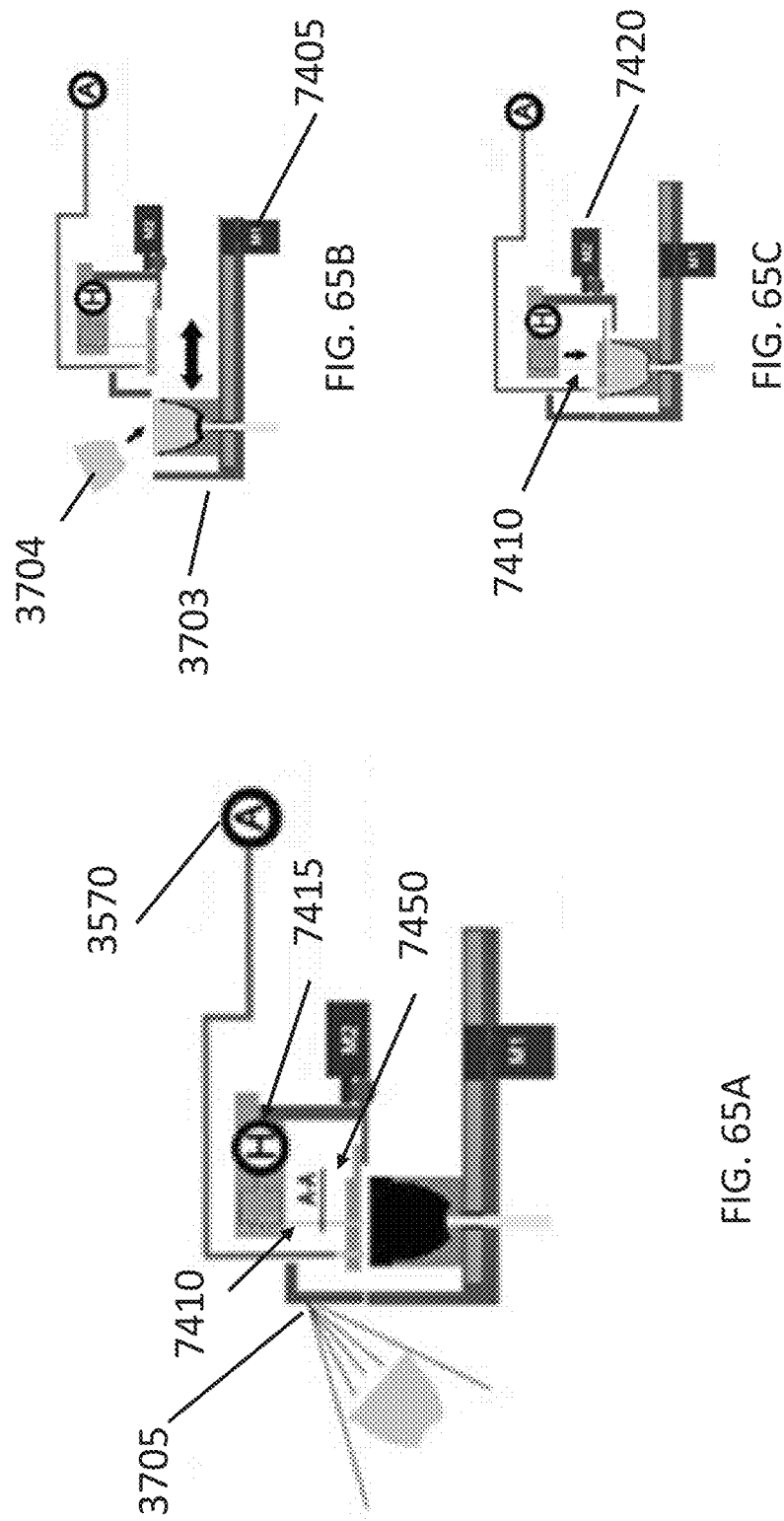

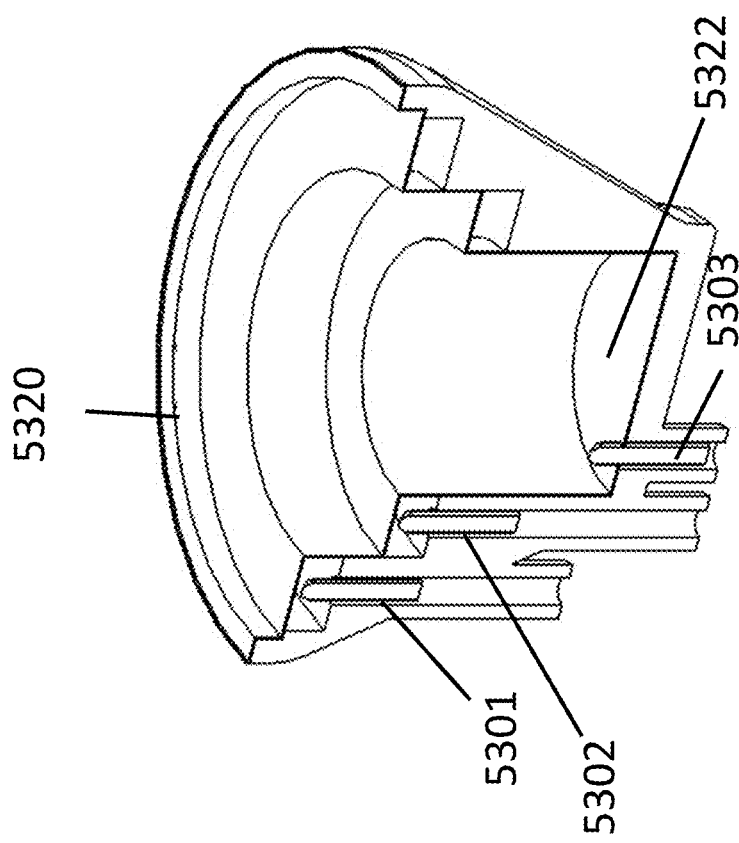

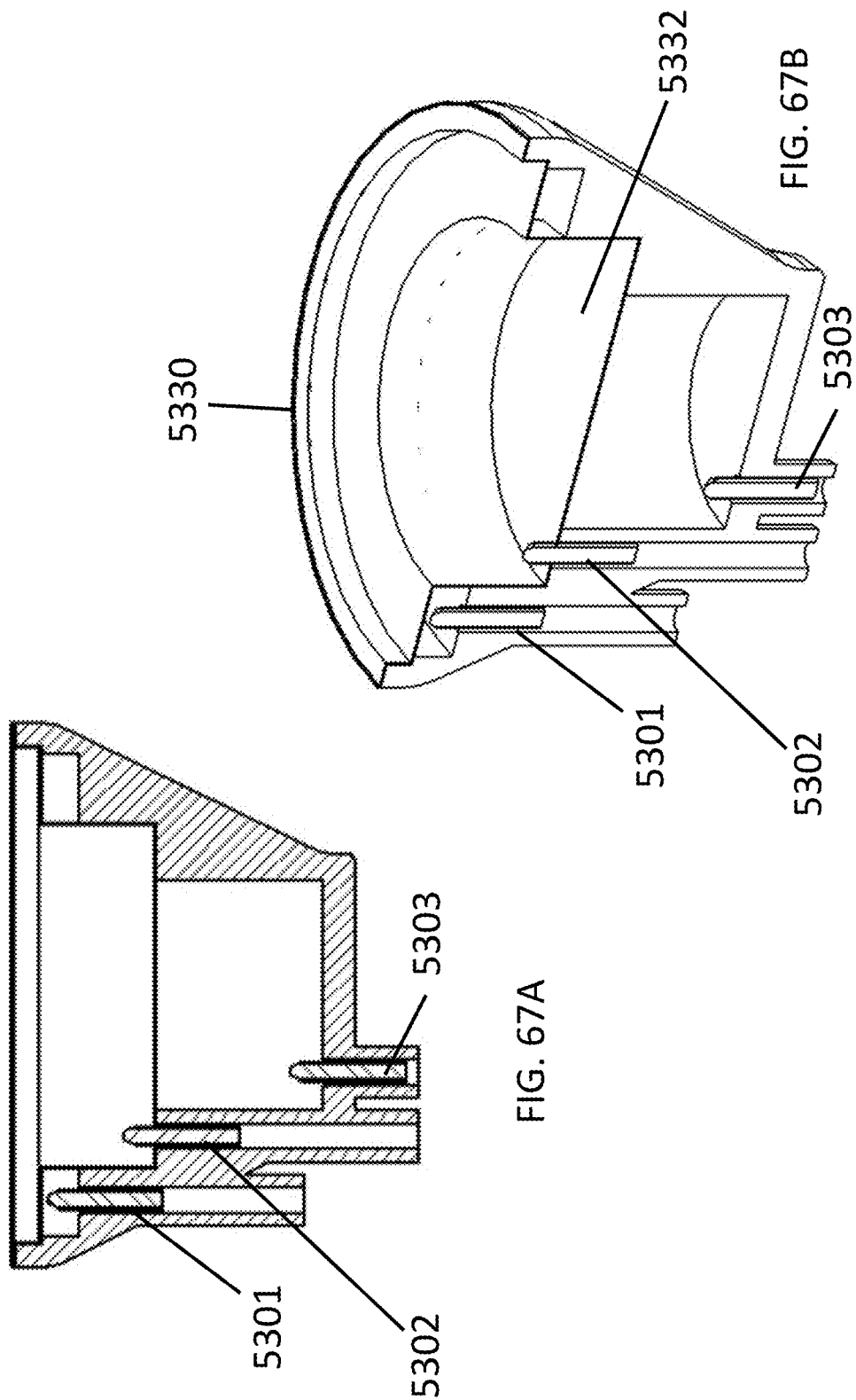

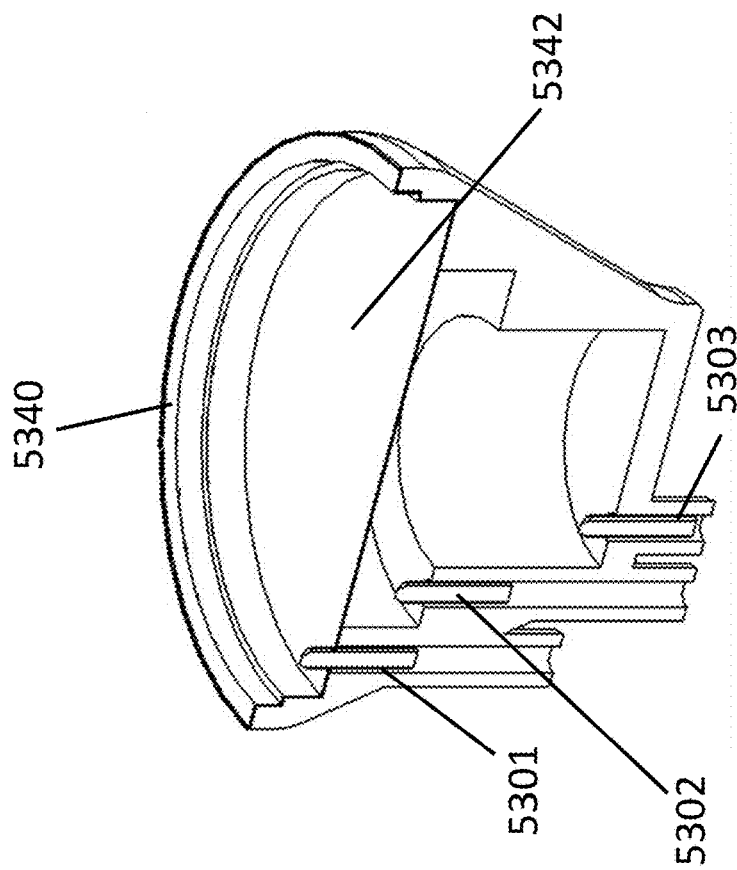
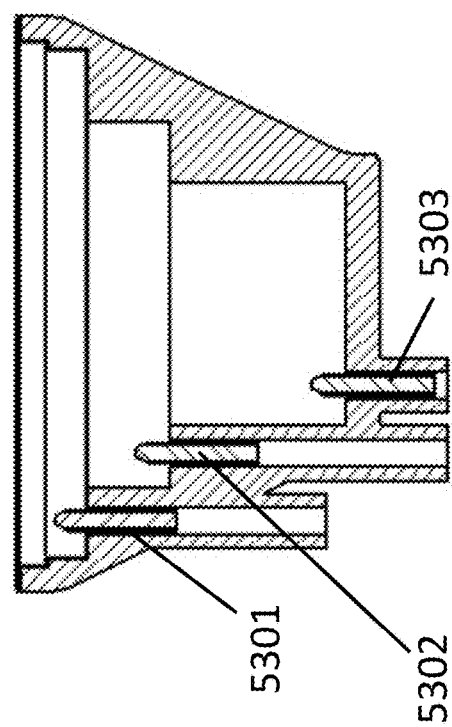
FIG. 68B
FIG. 68A

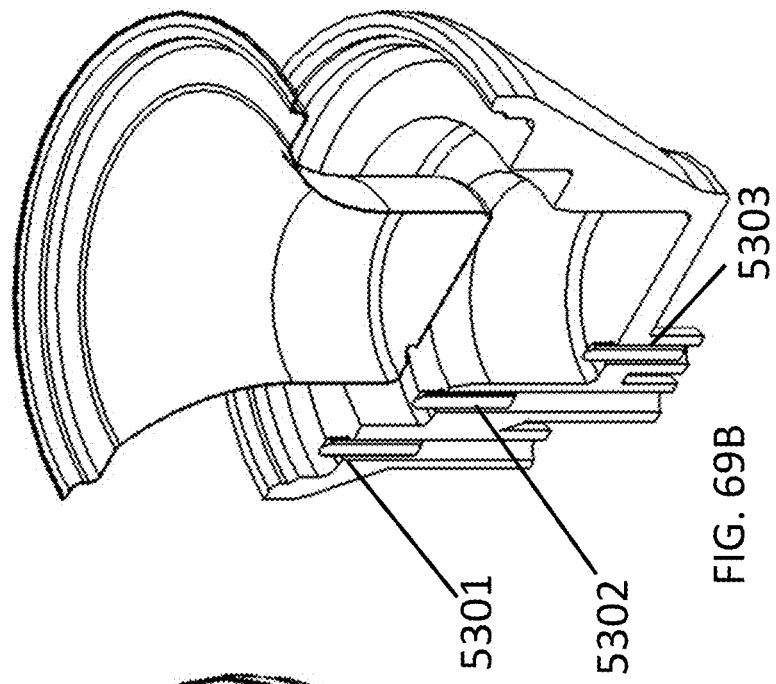
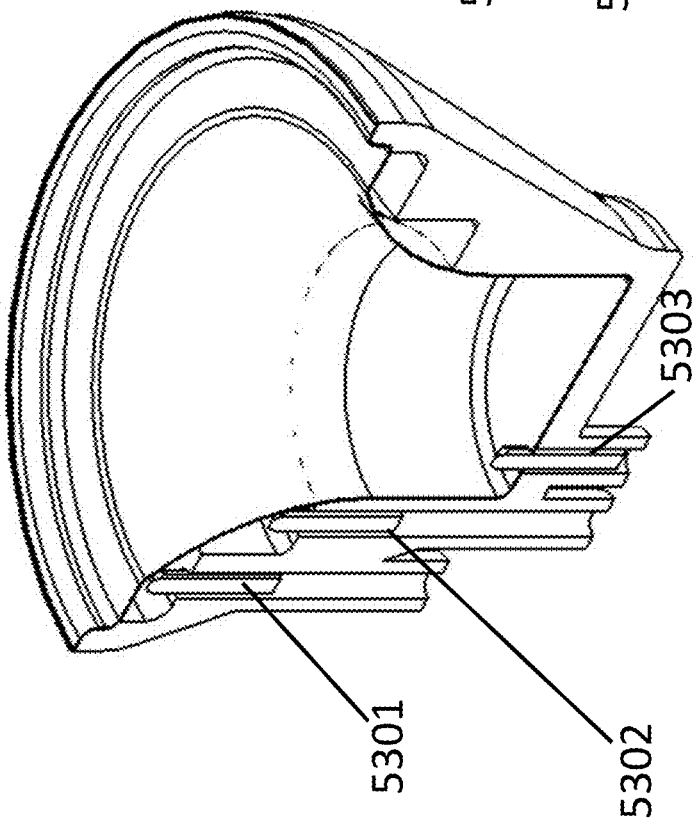
FIG. 69A
FIG. 69B

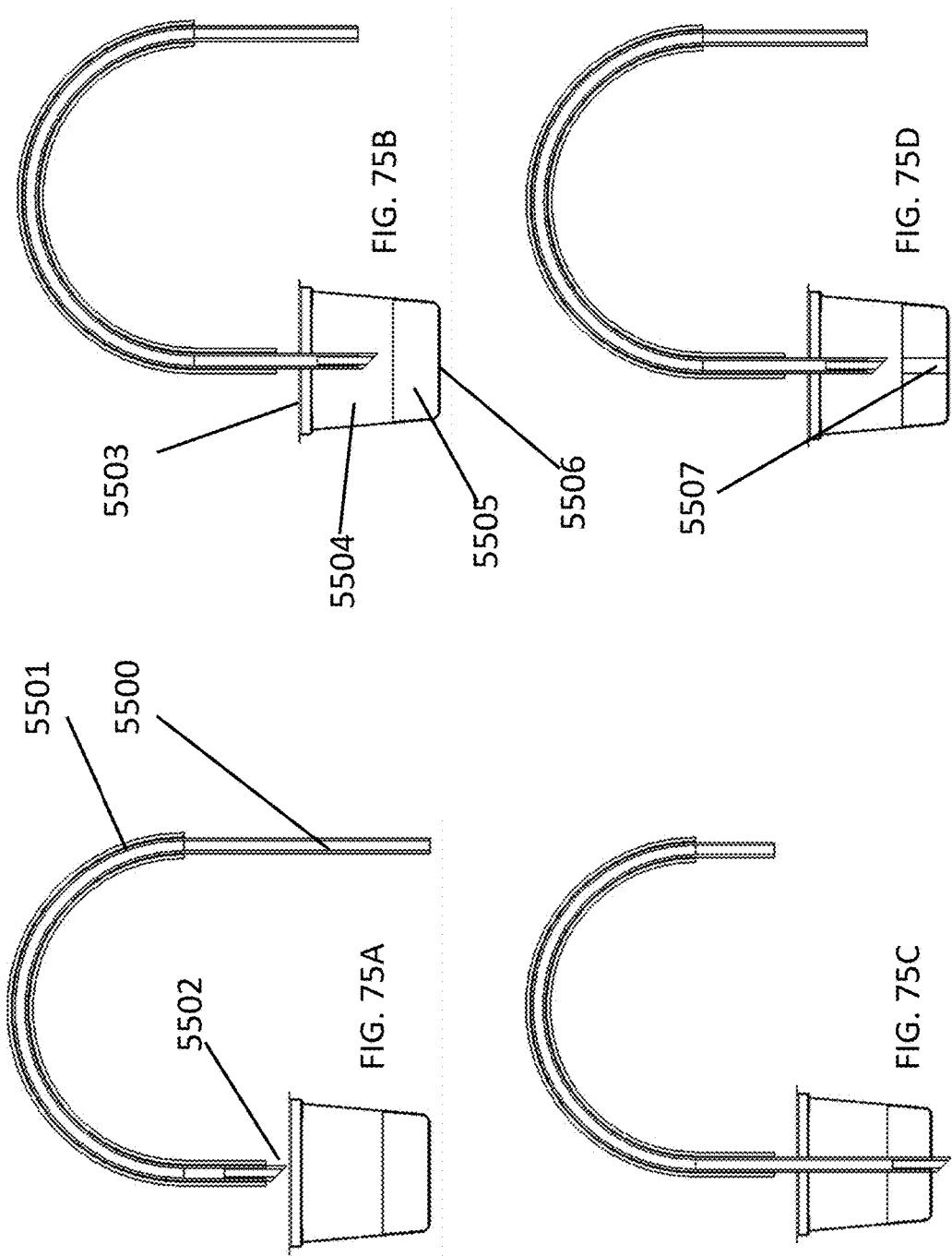

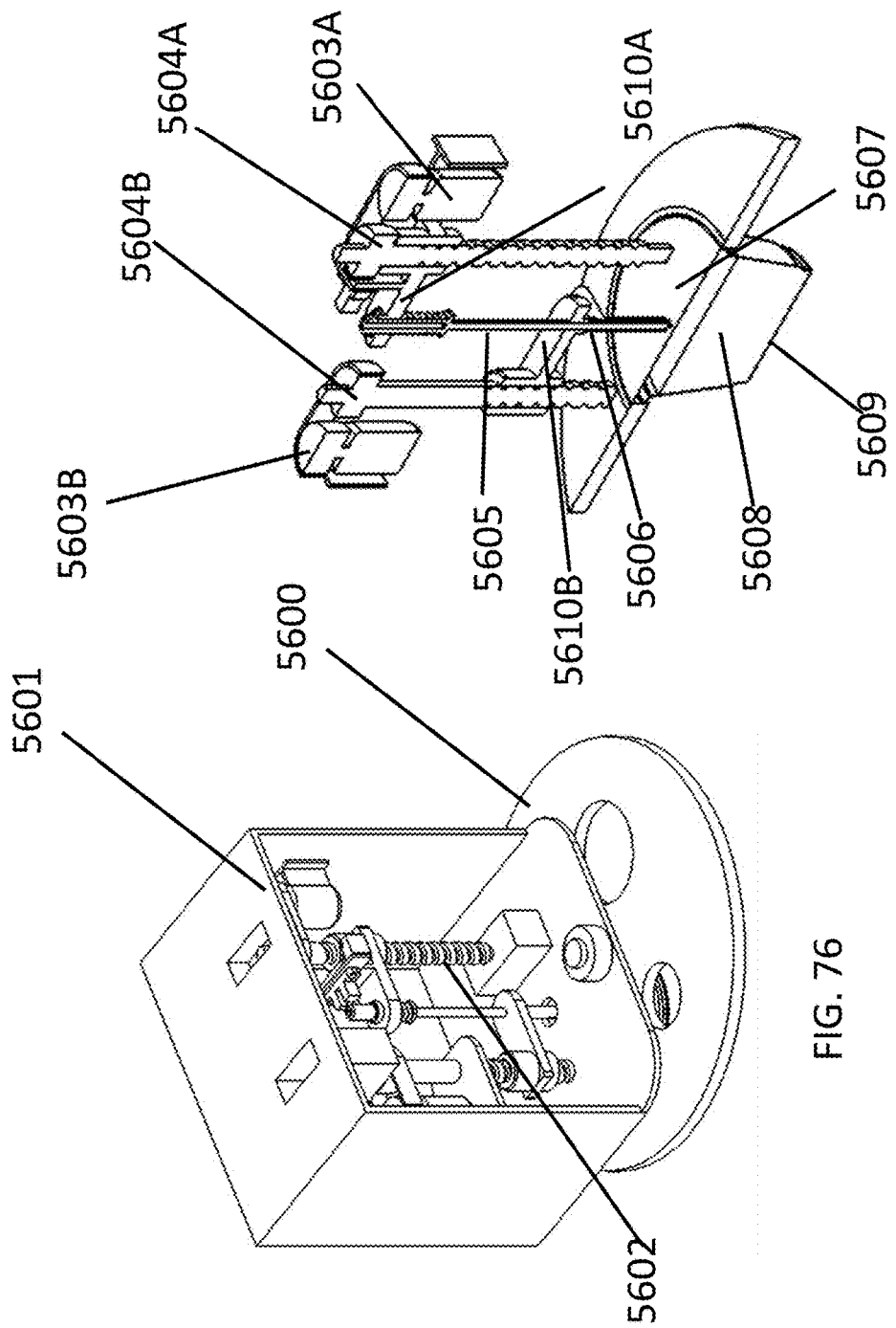

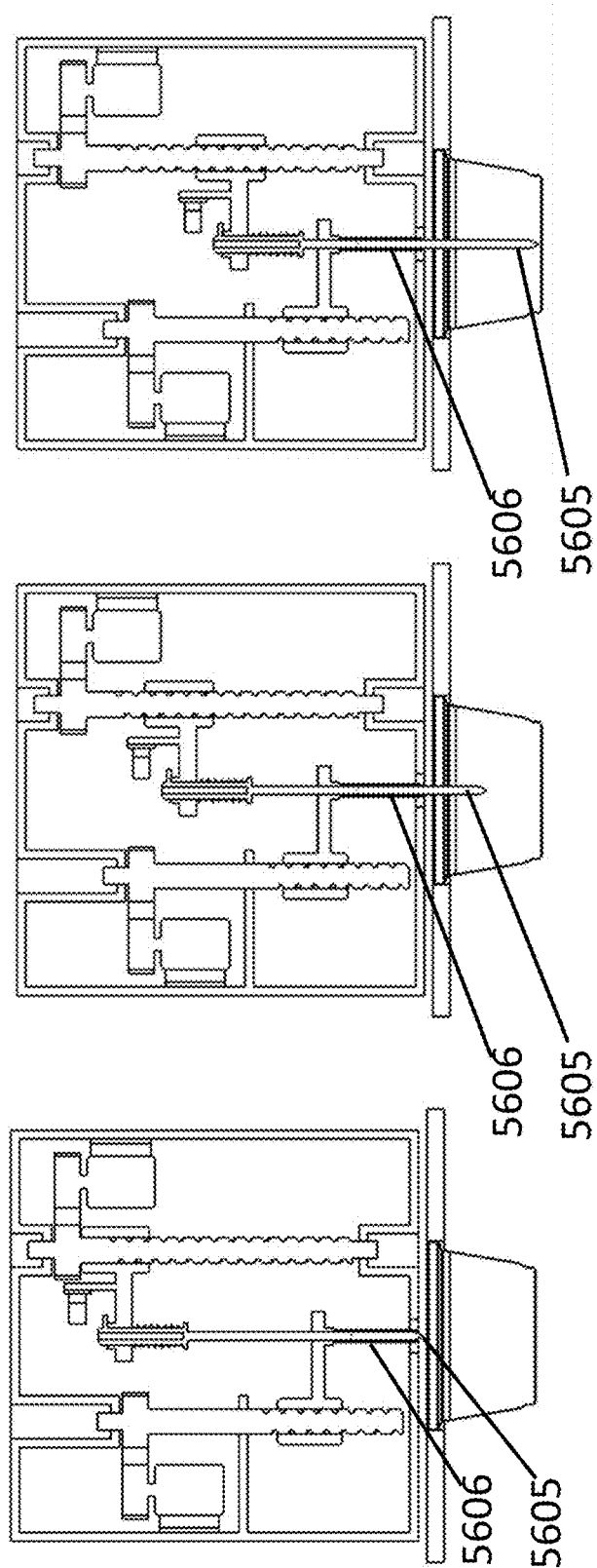

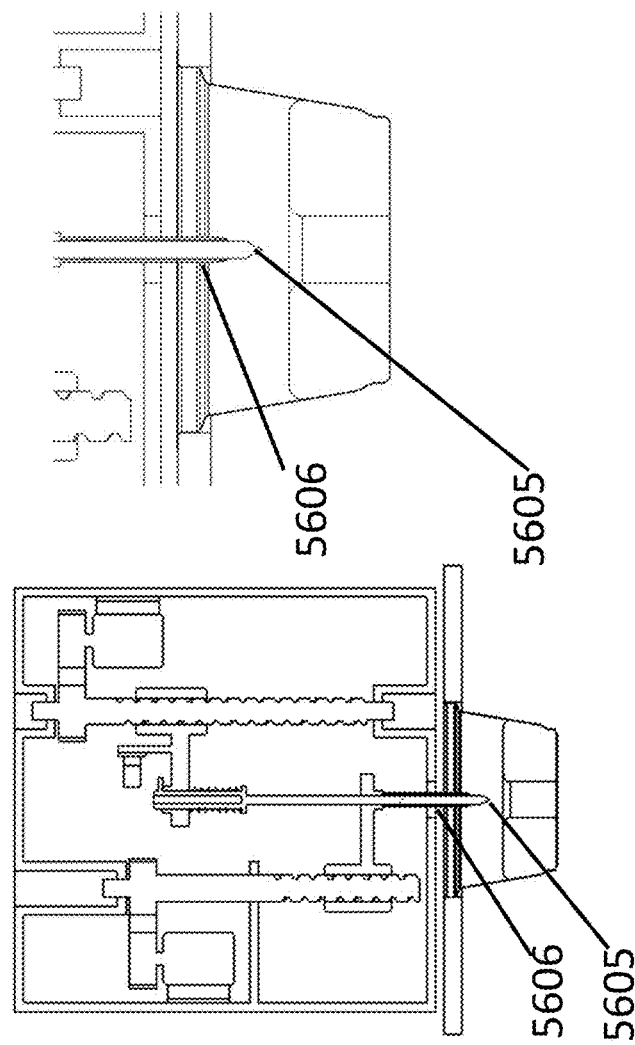
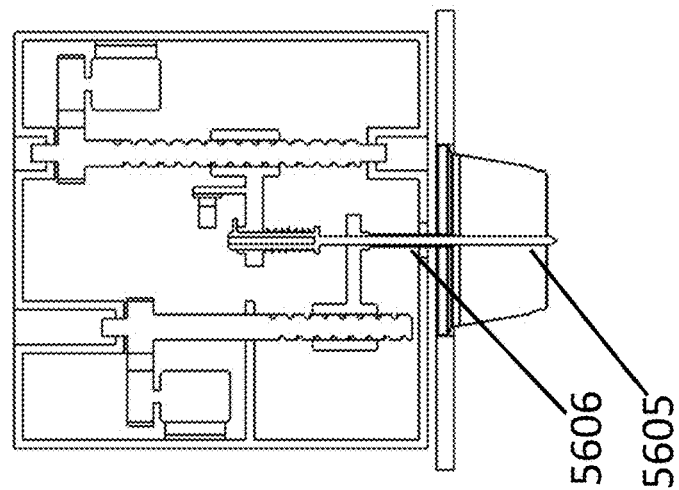

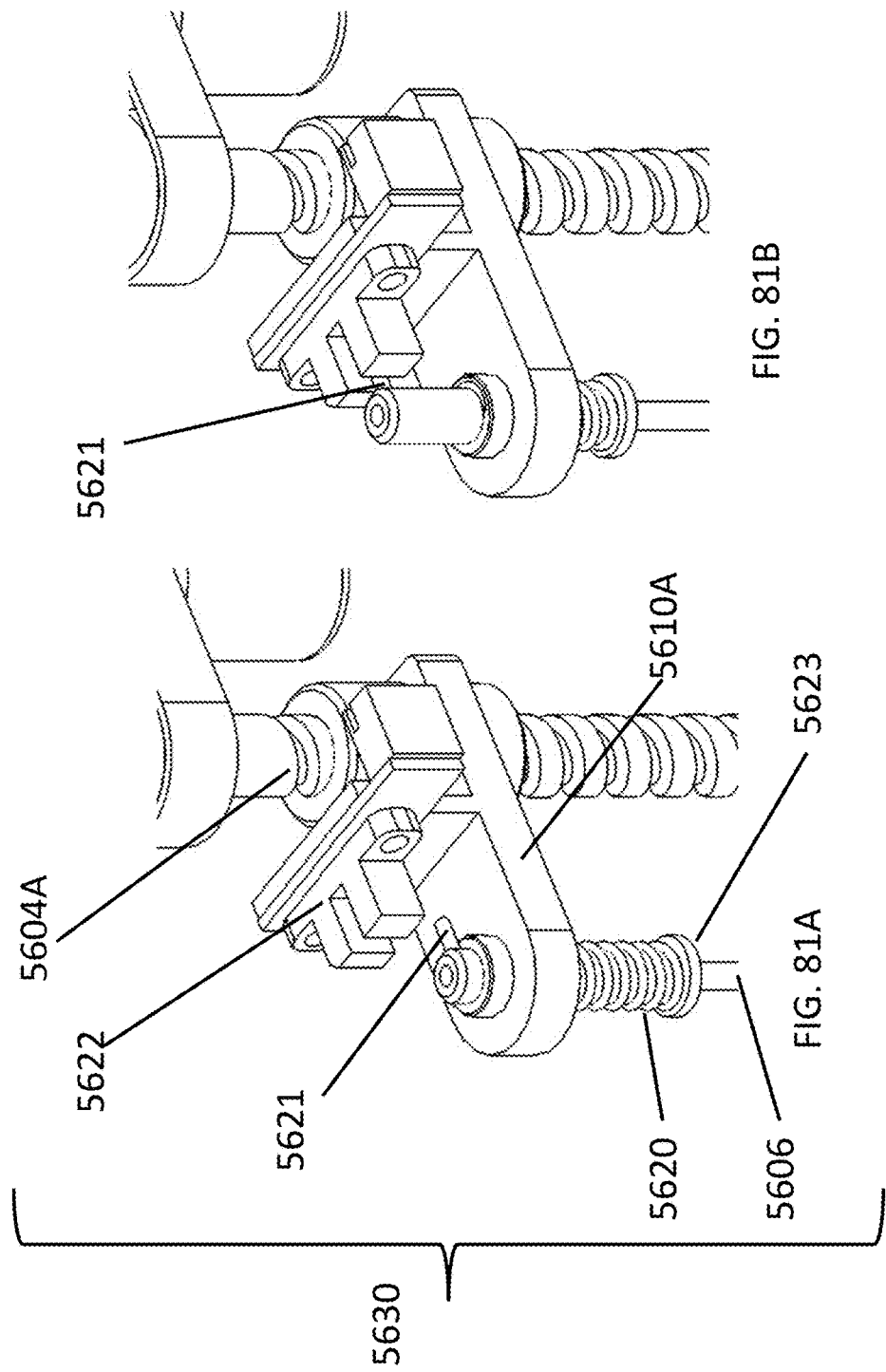

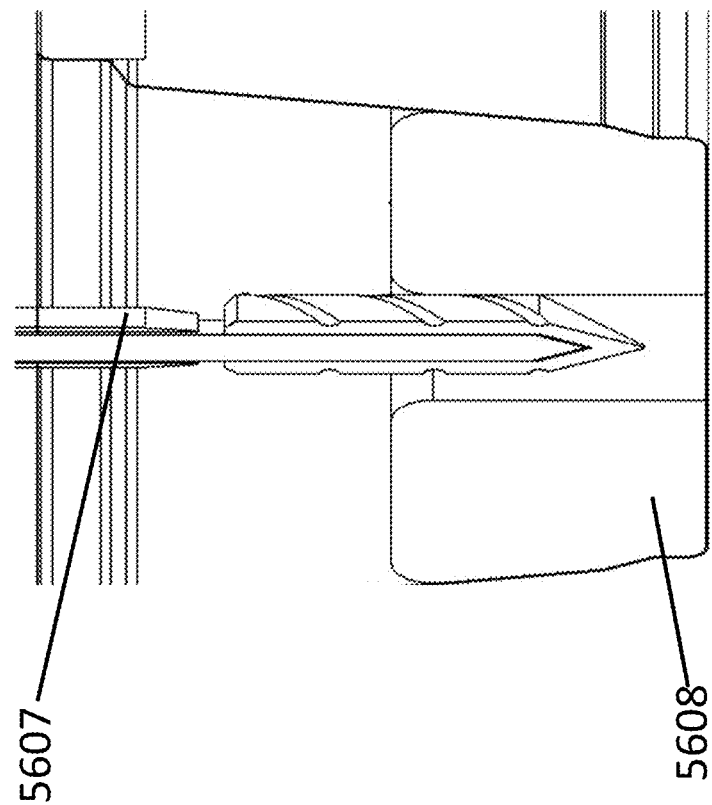
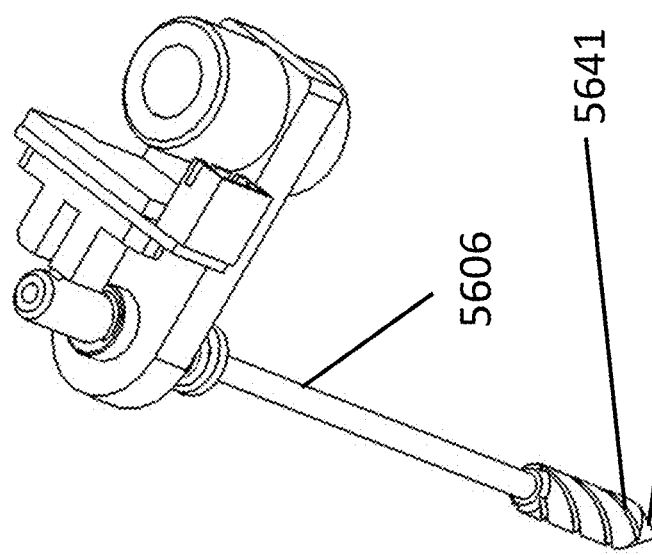
FIG. 82B
FIG. 82A

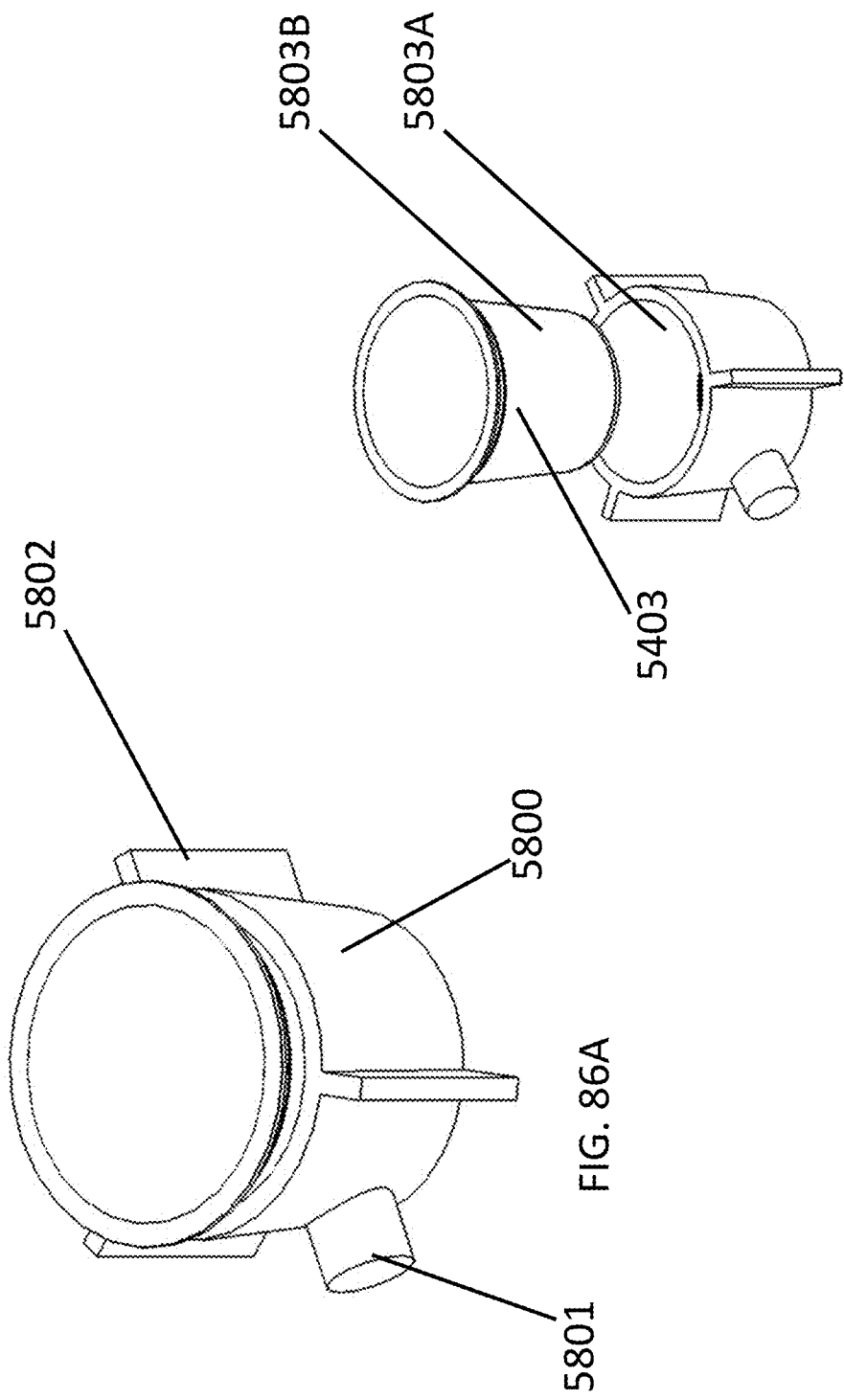

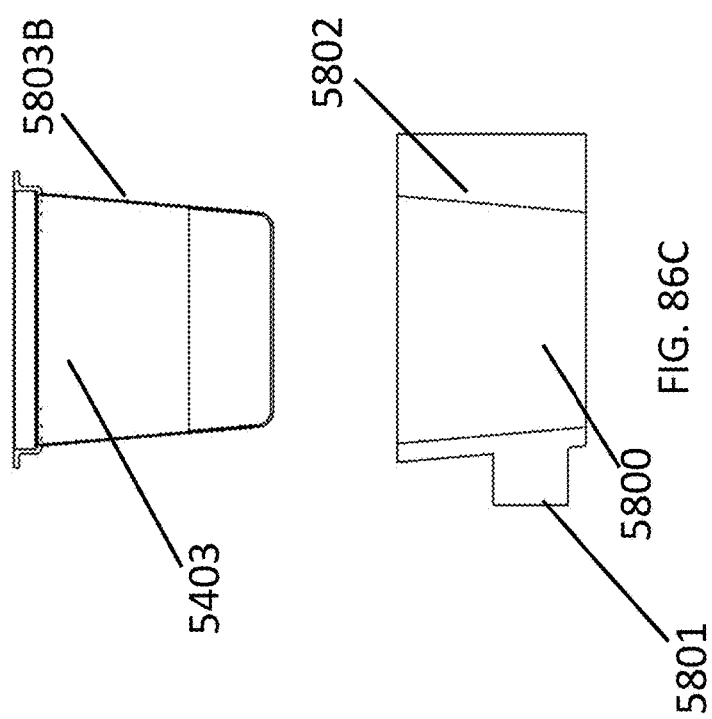

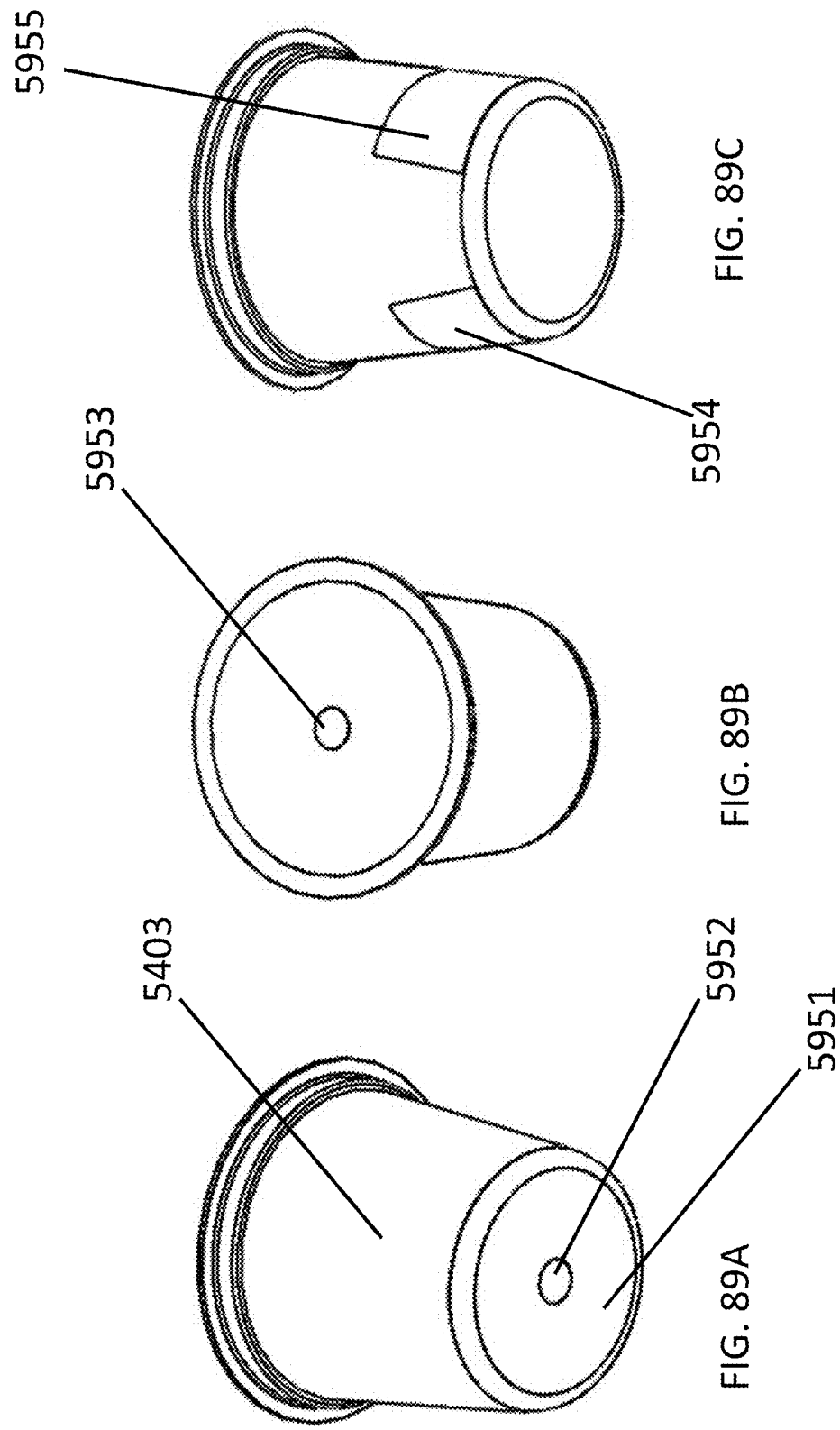

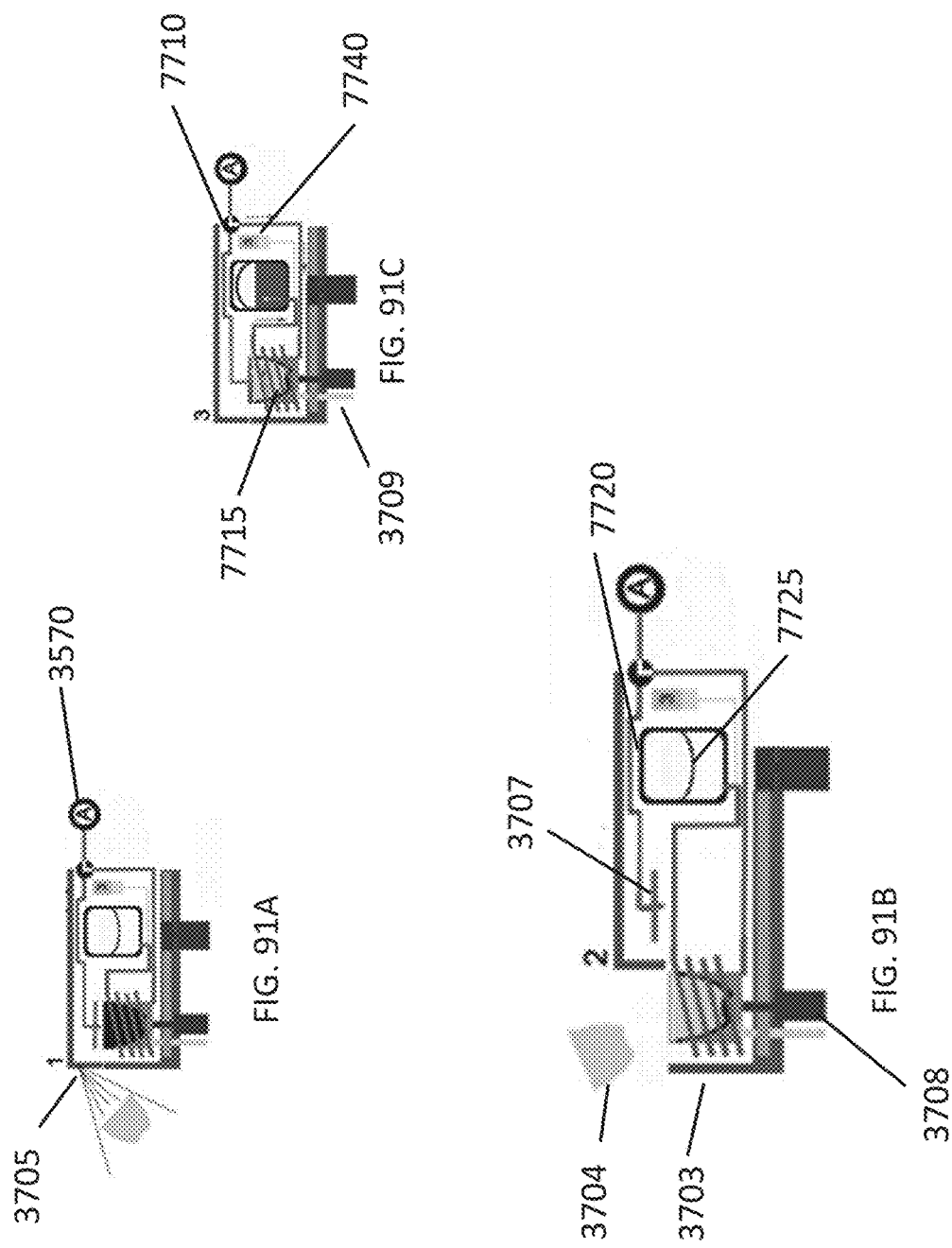

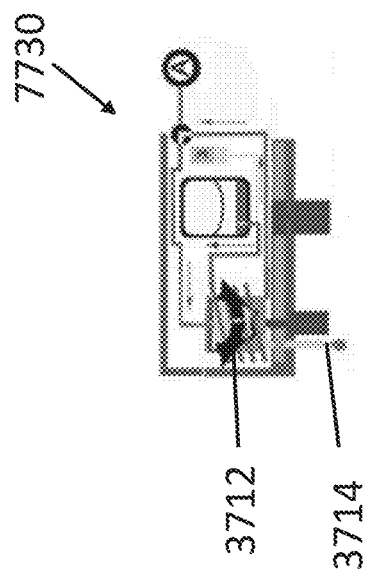
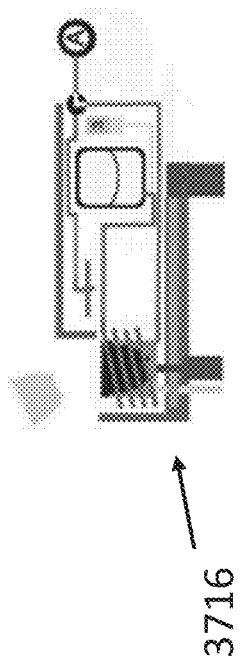
FIG. 91D
FIG. 91E

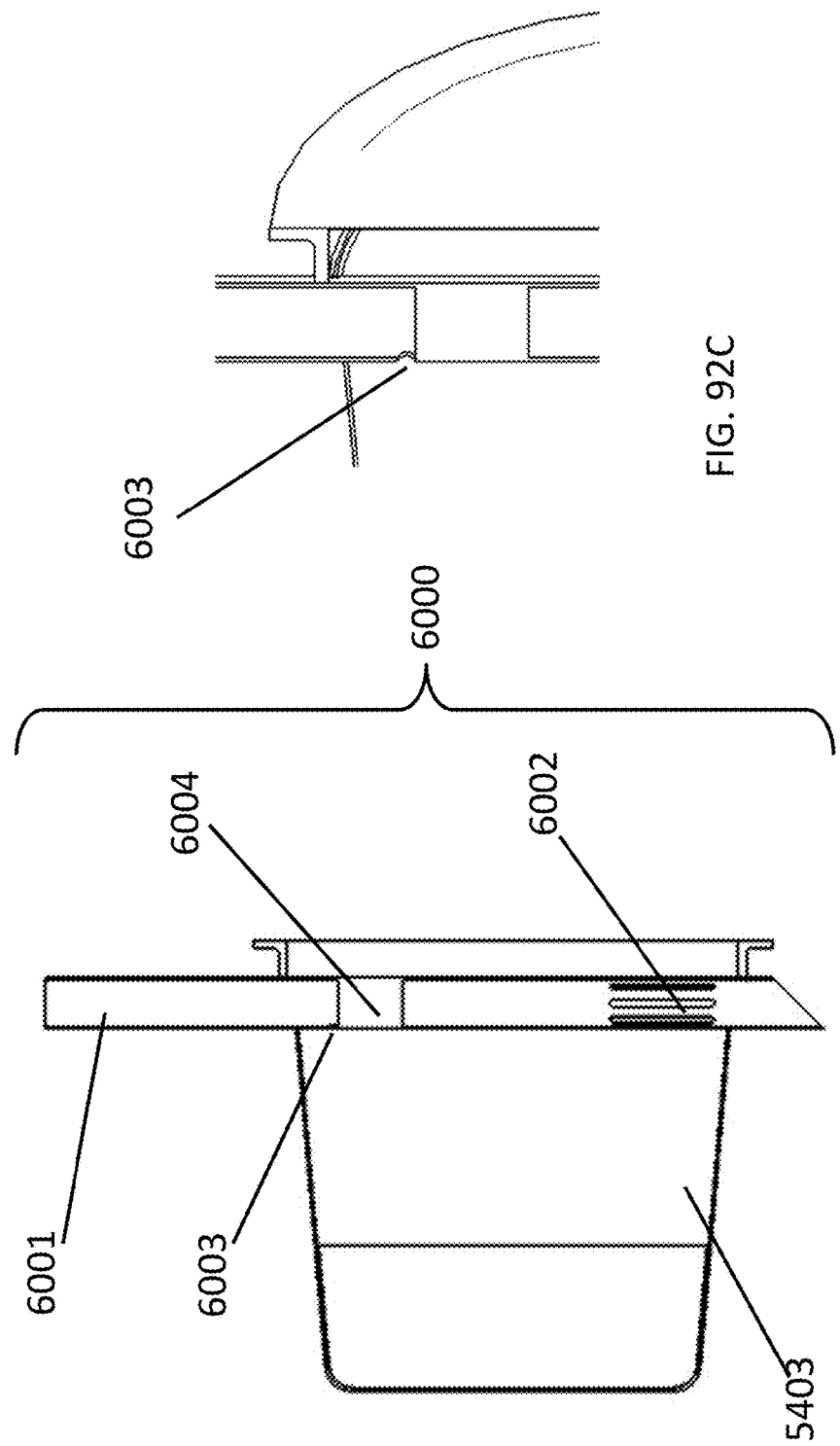

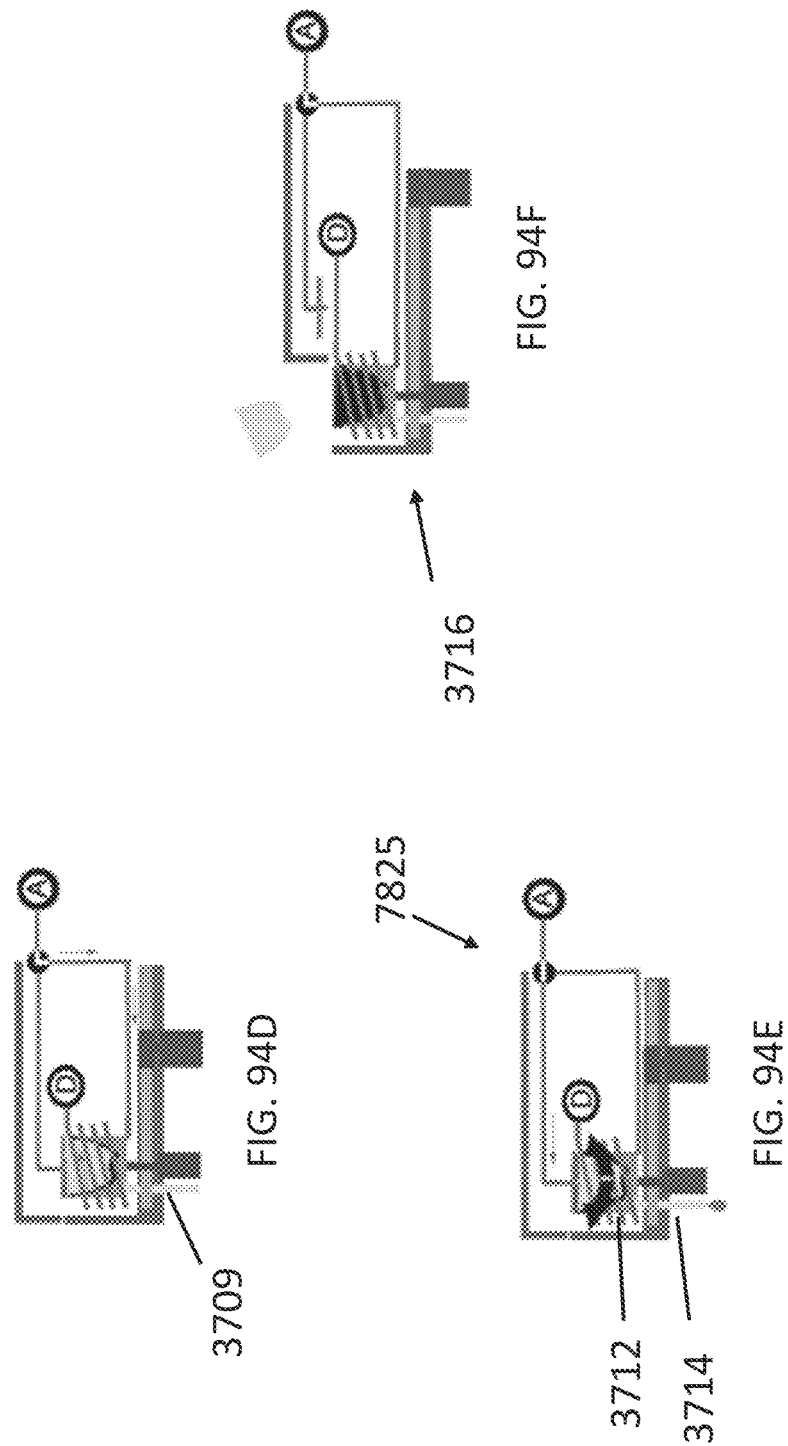

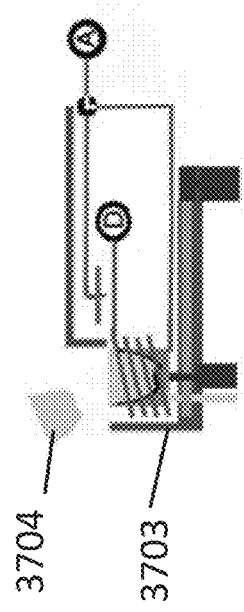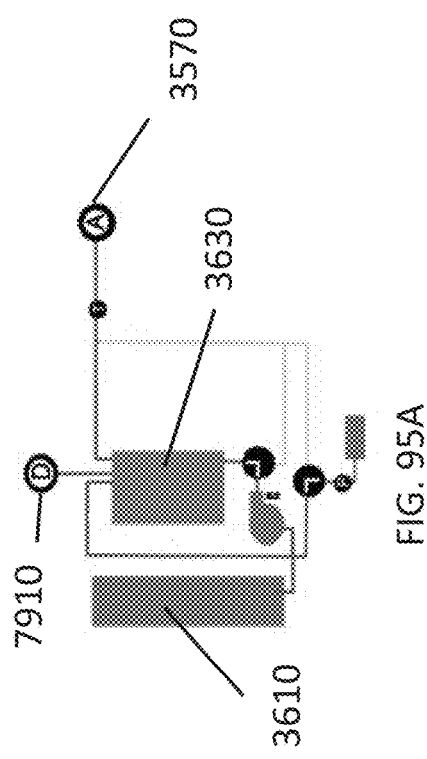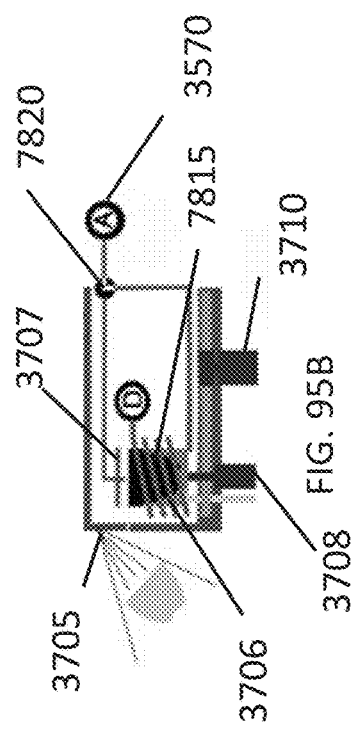

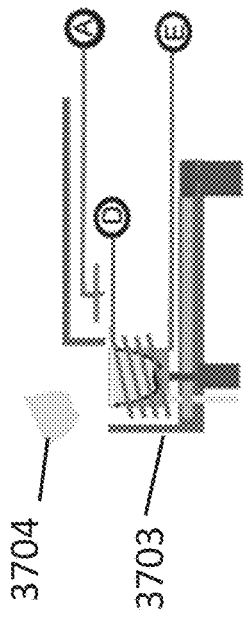
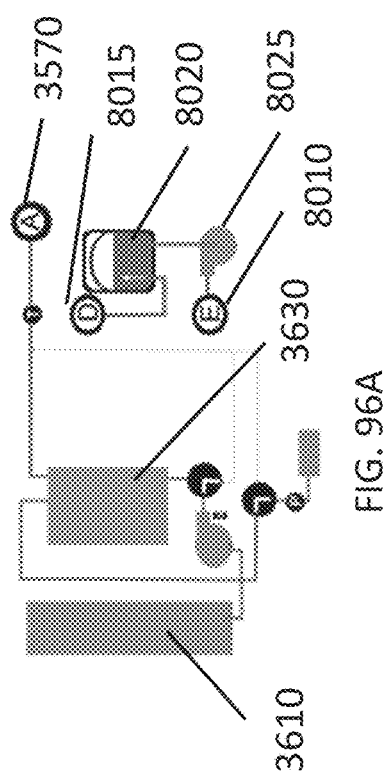
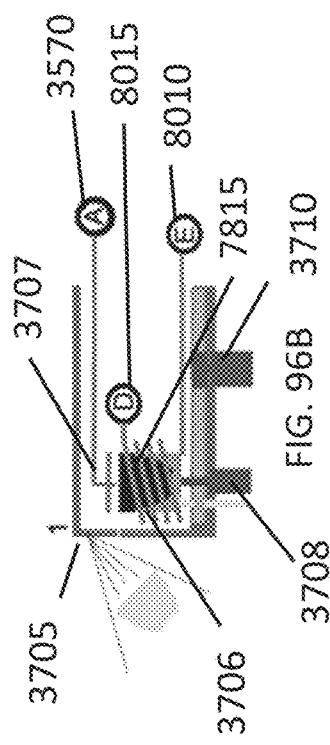
FIG. 96C
FIG. 96A
FIG. 96B

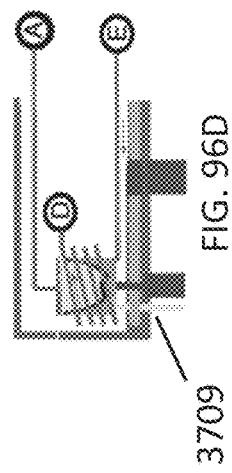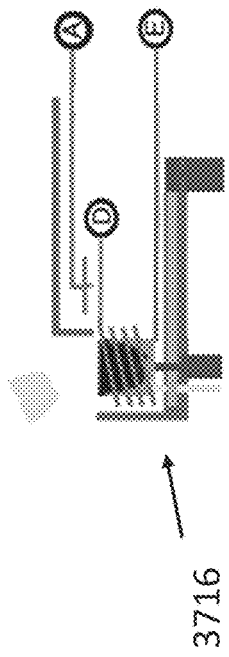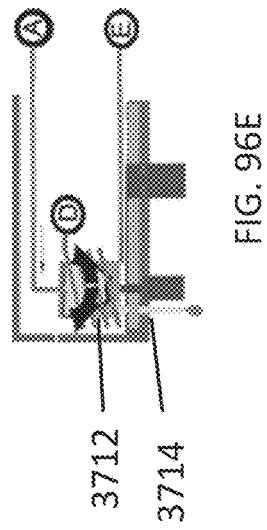

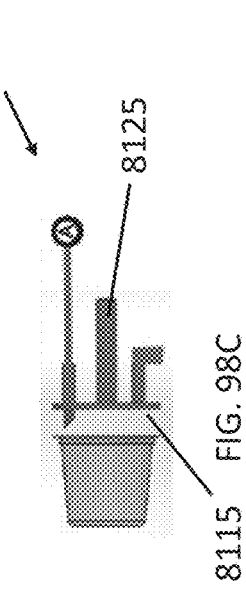
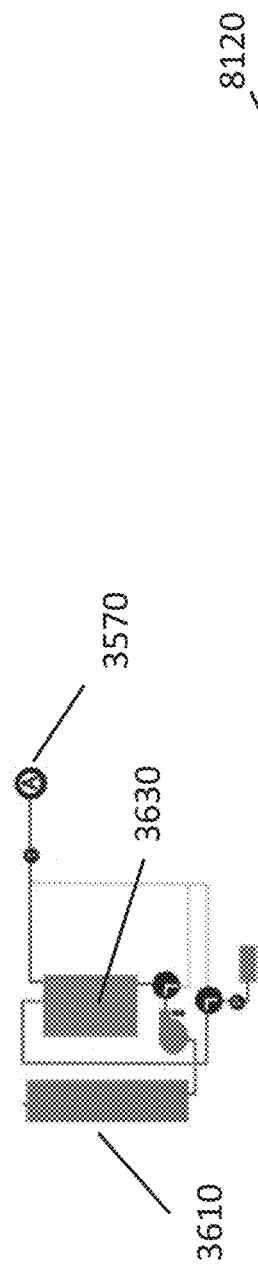
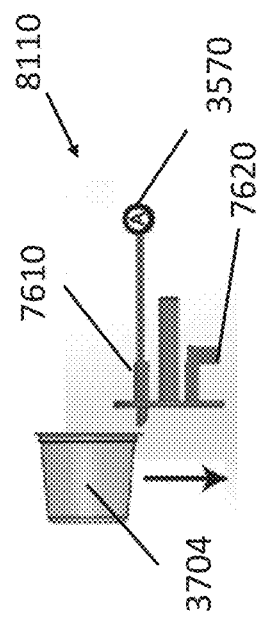
FIG. 98A
FIG. 98B
FIG. 98C

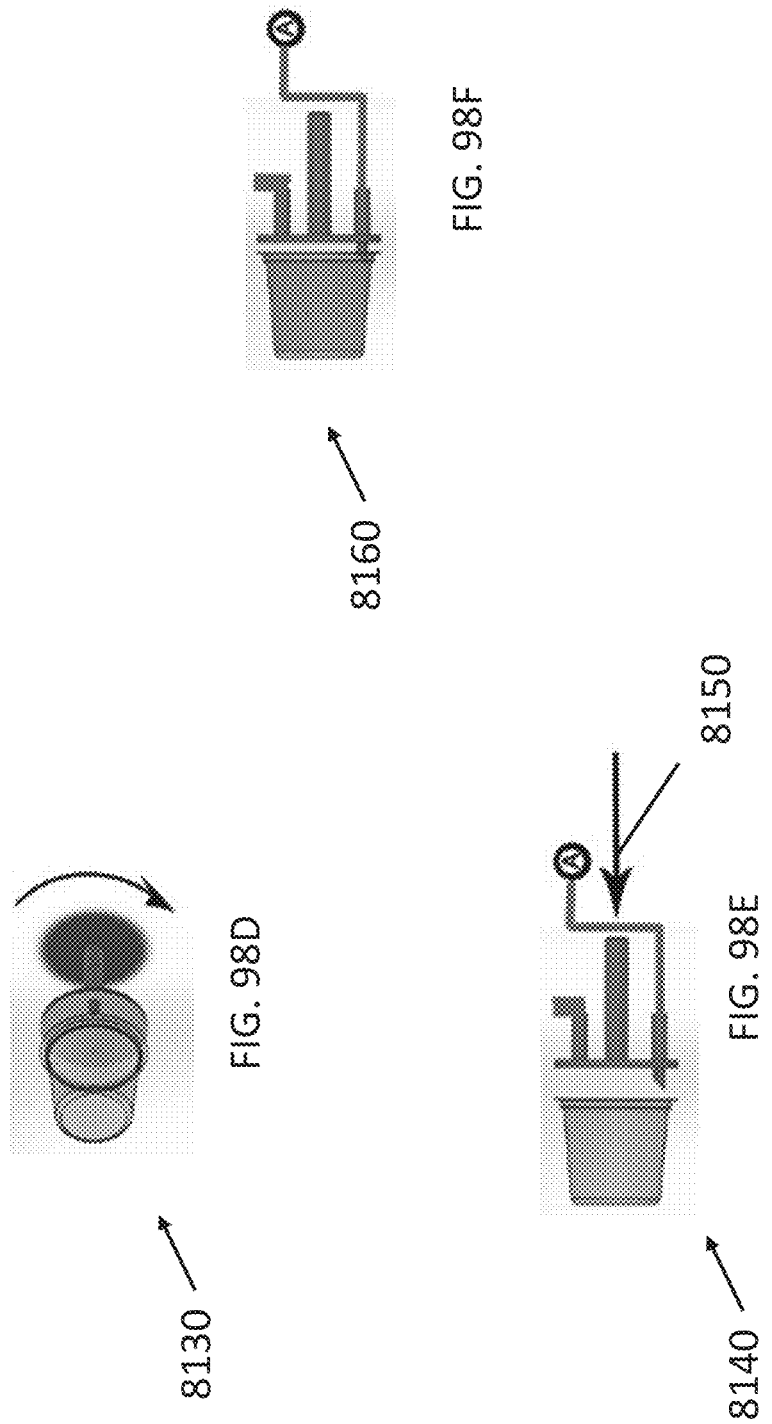

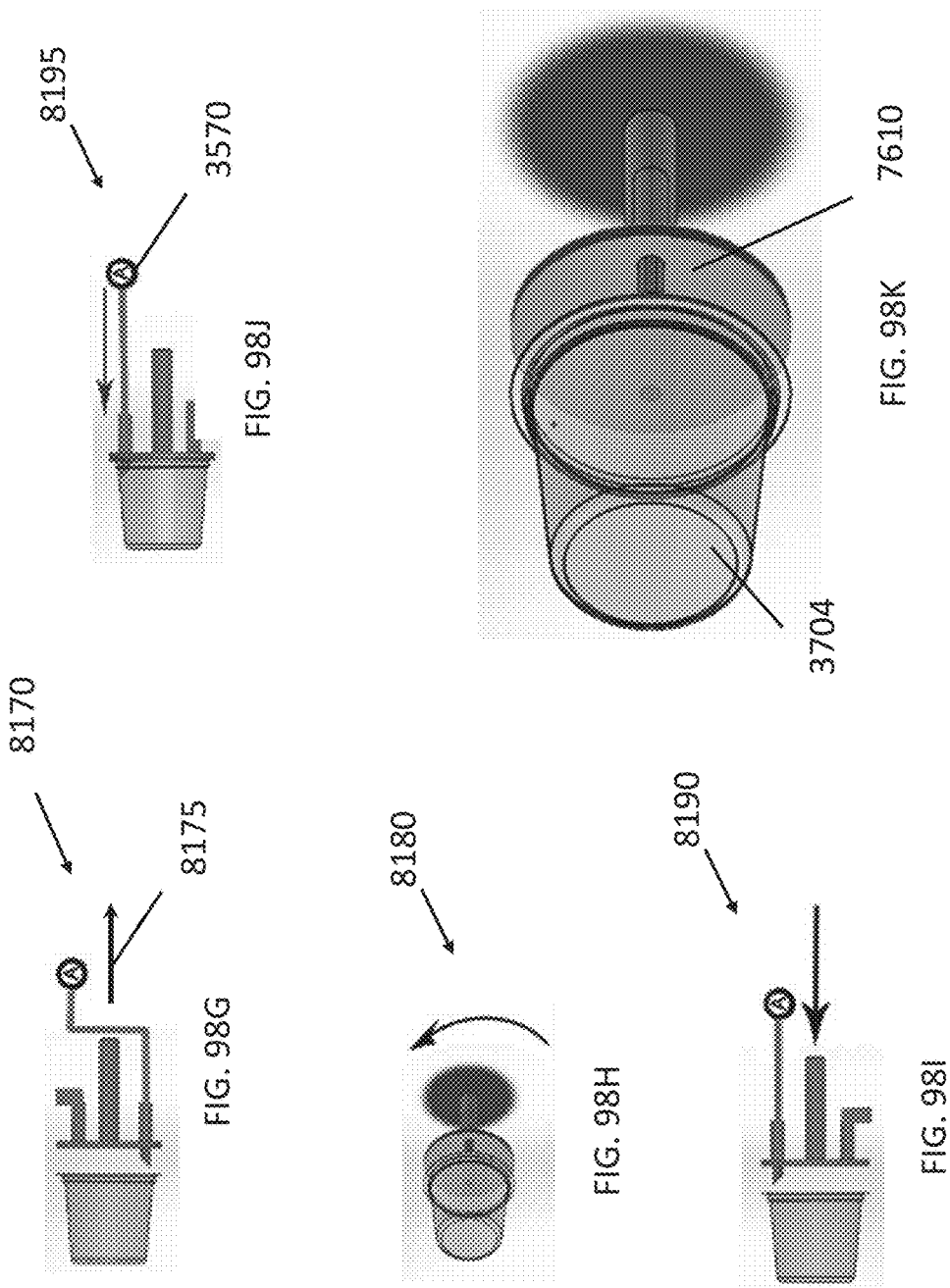

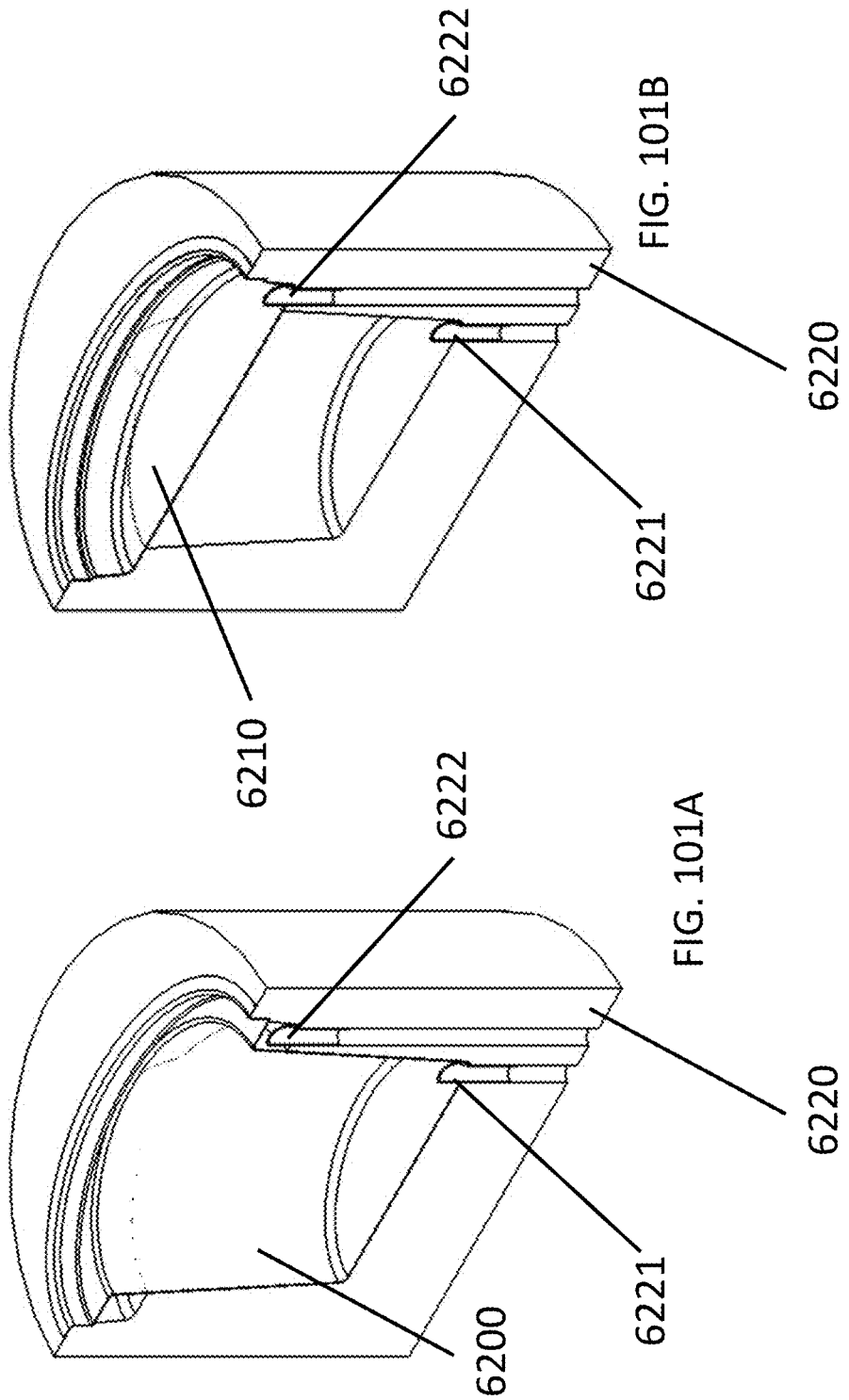

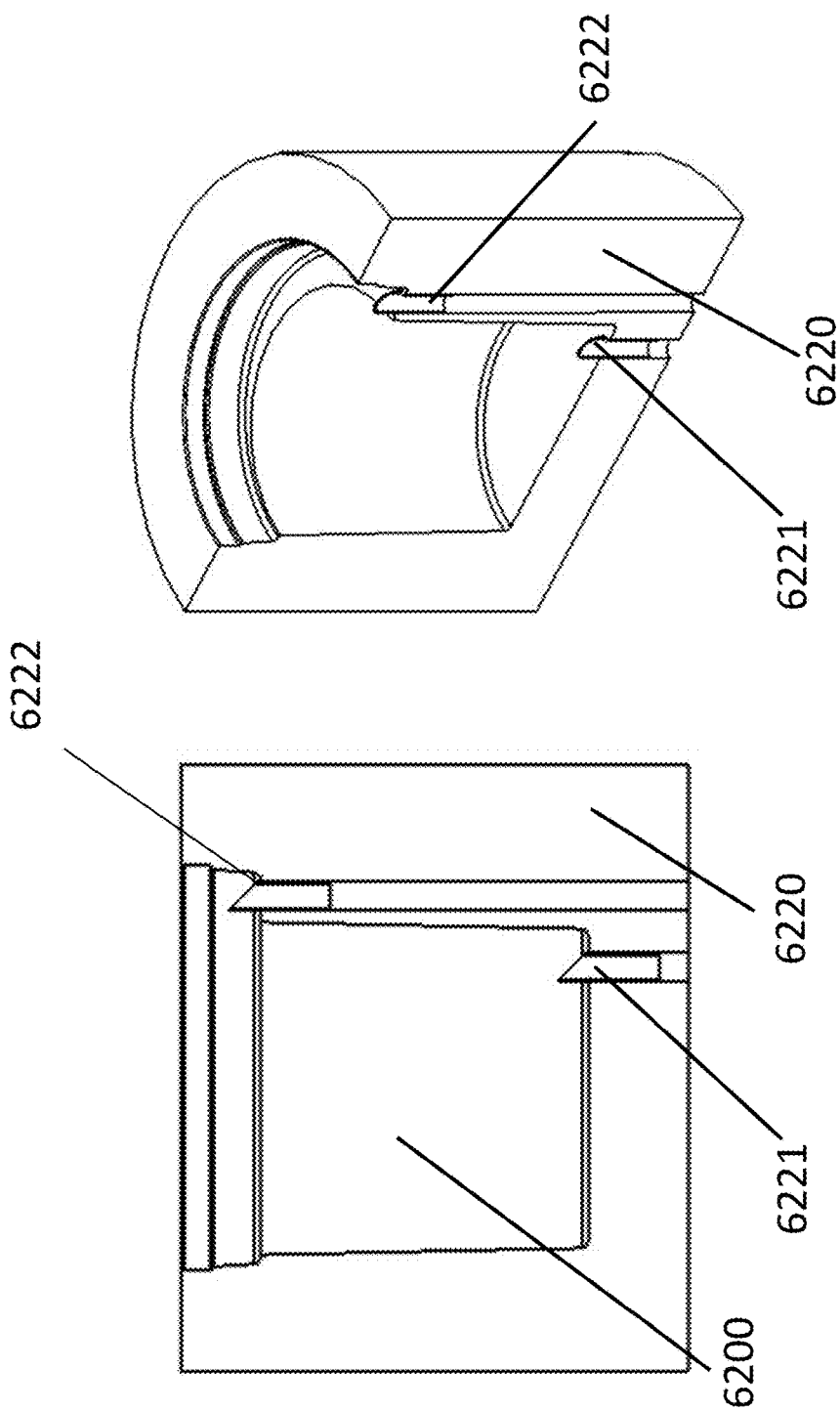

SYSTEMS FOR CONTROLLED LIQUID FOOD OR BEVERAGE PRODUCT CREATION

RELATED APPLICATIONS

This application claims priority under 35 U.S.C. § 119(e) to U.S. Provisional Patent Application No. 62/380,170, entitled "Systems for and Methods of Creating Liquid Food and Beverage Products from a Portion-Controlled Receptacle", filed on Aug. 26, 2016. This application is also a continuation-in-part of and claims priority under 35 U.S.C. § 120 to U.S. patent application Ser. No. 15/347,591, entitled "Systems for and Methods of Controlled Liquid Food or Beverage Product Creation", filed Nov. 9, 2016, which relates to and claims priority under 35 U.S.C. § 119(e) to U.S. Provisional Patent Application No. 62/350,928, entitled "Systems for and Methods of Creating Liquid Food and Beverage Products from a Portion-Controlled Receptacle", filed on Jun. 16, 2016, and U.S. Provisional Patent Application No. 62/380,170, entitled "Systems for and Methods of Creating Liquid Food and Beverage Products from a Portion-Controlled Receptacle", filed on Aug. 26, 2016, and said U.S. patent application Ser. No. 15/347,591 is a continuation-in-part of and claims priority under 35 U.S.C. § 120 to U.S. patent application Ser. No. 15/265,379, entitled "Systems for and Methods of Agitation in the Production of Beverage and Food Receptacles from Frozen Contents", filed Sep. 14, 2016, which is a continuation of U.S. patent application Ser. No. 15/185,744, entitled "Systems for and Methods of Providing Support for Displaceable Frozen Contents in Beverage and Food Receptacles", filed Jun. 17, 2016, now U.S. Pat. No. 9,487,348, which claims priority under 35 U.S.C. § 119(e) to U.S. Provisional Patent Application No. 62/344,212, entitled "Systems for and Methods of Providing Support for Displaceable Frozen Contents in Beverage and Food Receptacles", filed Jun. 1, 2016, and said U.S. patent application Ser. No. 15/185,744 is a continuation-in-part of and claims priority under 35 U.S.C. § 120 to U.S. patent application Ser. No. 15/099,156, entitled "Method of and System for Creating a Consumable Liquid Food or Beverage Product from Frozen Liquid Contents", filed on Apr. 14, 2016, which is a continuation-in-part of and claims priority under 35 U.S.C. § 120 to International Patent Application No. PCT/US16/23226, entitled "Method of and System for Creating a Consumable Liquid Food or Beverage Product from Frozen Liquid Contents", filed on Mar. 18, 2016, which relates to and claims priority under 35 U.S.C. § 119(e) to U.S. Provisional Patent Application No. 62/136,072, entitled "Packaging an Iced Concentrate", filed on Mar. 20, 2015, and U.S. Provisional Patent Application No. 62/275,506, entitled "Method of and System for Creating a Consumable Liquid Food or Beverage Product from Frozen Liquid Contents", filed on Jan. 6, 2016, and said PCT/US16/23226 is a continuation-in-part of and claims priority under 35 U.S.C. § 120 to U.S. patent application Ser. No. 14/801,540, entitled "Apparatus and Processes for Creating a Consumable Liquid Food or Beverage Product from Frozen Contents", filed on Jul. 16, 2015, now U.S. Pat. No. 9,346,611, which relates to and claims priority under 35 U.S.C. § 119(e) to U.S. Provisional Patent Application No. 62/136,072, filed Mar. 20, 2015, all of which are incorporated by reference herein in their entirety.

TECHNICAL FIELD

The technical field relates generally to systems for and methods of creating liquid food and/or beverage products from frozen contents in a controlled manner, and to controlling the melting of the frozen contents into a liquid of a desired temperature and potency.

BACKGROUND

For ease of description only, much of the following disclosure focuses on coffee and tea products. It will be understood, however, that the discussion applies equally well to other compounds that can be first ground, powdered, extracted, concentrated, and the like and then put into a cup or receptacle, and finally brewed or diluted to create a consumable food or beverage. Current or prior machine-based coffee brewing systems and coffee packed in filtered pods allow consumers to produce purportedly fresh-brewed beverages at the touch of a button while eliminating the need for additional process steps such as measuring, handling of filters, and/or messy disposal of used grounds. These machine-based systems typically utilize a receptacle that contains dry solids or powders such as dry coffee grinds, tea leaves, or cocoa powder, as well as a filtration media to prevent migration of unwanted solids into the user's cup or glass, and some type of cover or lid. The receptacle itself is often thin-walled so it can be perforated with needles or other mechanisms so that a solvent (e.g., hot water) can be injected into the receptacle. In practice, the receptacle is inserted into a machine and, upon closing the machine's cover, the receptacle is pierced to produce an inlet and an outlet. Thereafter, the hot solvent is delivered to the inlet, added into the receptacle, and a brewed beverage exits via a filter to the outlet.

Such systems often suffer from problems with being able to maintain freshness of the contents in the receptacle, brew strength from a finite sized package, and/or the inability to conveniently recycle the large number of filtered receptacles with spent grinds/leaves created each year.

The issue of maintaining freshness can occur, for example, when the dry solid is a finely ground coffee. This issue is largely the result of unwanted oxidation of critical flavor and aroma compounds in the coffee grounds, a problem that can be exacerbated by the fact that ground coffee presents a very large surface area to its ambient environment. While some manufactures may attempt to address this problem using MAP (Modified Atmosphere Packaging) methods (e.g., the introduction of a non-oxidizing gas such as nitrogen in place of ambient air), their efforts are often largely unsuccessful for a number of reasons. For example, freshly roasted whole bean or ground coffee profusely outgases $CO_2$, thus requiring a pre-packaging step to allow the grounds to "degas" prior to packaging so the receptacle does not swell or puff outwardly due to pressure created from within the receptacle, which in turn would cause the receptacle to take on the appearance of spoiled product or actually rupture the lid. In addition, this $CO_2$ outgassing carries with it and depletes a rich mixture of fresh coffee aromas from the ground coffee. Further, coffee beans and grinds are approximately 44% oxygen by composition, which may impact the flavor and fragrance of the coffee internally after the roasting process.

Another downfall of these receptacles that contain dry solids or powders is often their inability to create a wide range of beverage potency and serving sizes from a given packaging size. A pod that holds ten grams of ground coffee can only produce about two grams of actual brewed coffee compounds if brewed according to SCAA (Specialty Coffee Association of America) brewing guidelines. In turn, when two grams of brewed coffee compounds are diluted in a ten-oz. cup of coffee, a concentration of about a 0.75% total dissolved solids (TDS) results. TDS (in % throughout) is a measure of the combined content of inorganic and organic substances contained in a liquid in molecular, ionized or micro-granular colloidal solids suspended form. Therefore, such a cup of coffee is often considered a very weak cup of coffee for many consumers. Conversely, some brewers can over-extract the same ten grams of coffee grounds to create a higher TDS; however, the additional dissolved solids that are extracted are often harsh on the palate and can ruin the flavor integrity of the coffee. Soluble/instant coffee is often added to reduce this drawback. In addition, most brewers designed for extracting cannot deliver sufficient pressure and temperature to remove all desired compounds from the ground product, therefore often good coffee is wasted, up to 25%, and an often weaker or smaller cup of coffee is produced than desired.

Turning to the matter of recycling, the presence of leftover coffee grounds, tea leaves and/or other residual waste after brewing (e.g., spent filters left within the receptacles) typically makes receptacles unsuitable for recycling. Consumers could remove the cover from the spent receptacles and rinse out the residual material, but this is time consuming, messy, a waste of water, and/or a waste of valuable soil nutrients that could otherwise be recycled back into the farming ecosystem. Therefore, most consumers will not bother to recycle in return for such an insignificant apparent ecological gain. Recycling can also be impacted by the type of thermoplastic material used in some receptacles. For example, to minimize loss of freshness as discussed above, some manufacturers have chosen to use materials that have exceptional vapor barrier properties, for example, a laminated film material with an inner layer of ethylene vinyl alcohol (EVOH) copolymer. The combination of different thermoplastic materials in such a laminated film, which could be some combination of EVOH, polypropylene, polyethylene, PVC and/or others material, is unsuited to recycling.

Despite the disadvantages above, there still exist several different machine-based systems on the market today that create beverages from single-serving capsuled products. These have become extremely popular with consumers, primarily for the convenience they offer in making an acceptable (not necessarily excellent) cup of coffee, often causing the consumer to swap café quality brewed coffee for the convenience of a single serving home-brewed cup.

In addition to single serving capsule products, there exist frozen products such as coffee extracts and juice concentrates that are currently packaged in large containers and cans (e.g., 2 liters) for creating multiple servings of beverages from a single container. However, it is usually inconvenient and time-consuming to prepare a beverage from these frozen extracts or concentrates. Some coffee products, for example, must be slowly melted prior to use, typically over a period of several hours or days. The product is required to be stored in a refrigerator thereafter to preserve its product safety when less than all servings are consumed. Further, for beverages that are enjoyed hot, like coffee and tea, the melted extract must then be heated appropriately. Many of these products are not shelf stable, for example coffee that has a high percentage of solids in the grounds, as these solids are the result of hydrolyzed wood, which are subject to decomposition and spoilage. Accordingly, the flavor and quality in these large batch frozen products can deteriorate in a matter of hours even at refrigeration temperatures. In addition, the method of forming the final consumable beverage is not often not automated and is therefore subject to over- or under-dilution, leading to an inconsistent user experience.

As used herein, the packaging in which the frozen liquid contents are sealed, before or hereinafter, is referred to as a "receptacle." The packaging could also be described as a cartridge, a cup, a package, a pouch, a pod, a container, a capsule, or the like.

As used herein, the space occupied by a receptacle when placed in the dispenser, before or hereinafter, is alternatively referred to as a cavity, a creation cavity, and a chamber.

As used herein, the device which is used to penetrate the bottom, sidewall or lid of a receptacle is alternatively referred to as a penetrator, needle, and/or perforator.

SUMMARY

The packaging, heating, agitation, puncture, detection, programming, plumbing, and other techniques and systems described herein include integrated systems that enable a wider variety of food and beverage products to be dispensed than known portion control brewing systems currently available. In certain embodiments, the systems include a multi-function and multi-use dispenser that works in cooperation with multi-content frozen receptacles. The receptacles contain previously-prepared concentrates and extracts in a frozen state in a sealed MAP gas environment. Because the food or beverages contained therein are maintained in a freeze-preserved state, they exist in an FDA food-safe format. In addition, the frozen liquid contents preserve the peak levels of flavor and fragrance which existed at the time of packaging without the use of conventional preservatives or additives. This preservation is the result of the dramatically slowed or arrested chemical reactions and enzymatic activity that occurs at very low temperatures and when reactive molecules are essentially deprived of oxygen, locked into a crystalline structure, and otherwise prevented from convective transport.

Meanwhile, the dispenser may prepare these foods and beverages in both hot or cold format by utilizing specific receptacles containing the frozen liquid content. The integrated system that includes the dispenser and receptacles can safely provide, e.g., coffee, tea, cocoa, sodas, soups, nutraceuticals, vitamin waters, medicines, energy supplements, lattes, cappuccinos, and chai lattes, to name a few. During the final stages of dispensing the product, the receptacles are rinsed substantially clean, free of grounds, leaves, filters, powders or crystals by the dispensing system, thereby qualifying them for recycling without further efforts by the user.

In some examples, the receptacle is configured such that the receptacle can be perforated before the receptacle is inserted into the apparatus, can be perforated after the receptacle is inserted into the apparatus, or both. The receptacle may include an unfilled region, e.g., headspace between the frozen liquid content and the closure/lid, wherein the region is configured to include an inert or reduced reactivity gas in place of atmospheric air in the receptacle. This region also allows movement of the frozen liquid contents within the receptacle to allow for creation of a flow path for diluting/melting fluids around the frozen liquid contents during product preparation should that be necessary.

The disclosed subject matter includes a process for producing a liquid food or beverage from a package containing frozen liquid contents. The process includes providing frozen liquid contents in a sealed container, wherein the container is configured to store the frozen liquid contents. In this embodiment, the process always includes melting the frozen liquid contents in the sealed container to generate a melted liquid. The process includes perforating the sealed container at a first location to permit dispensing of the melted liquid from the container to create a consumable liquid food or beverage.

In some examples, melting the frozen liquid contents includes perforating the sealed container at a second location to permit injection of a heated liquid or heat in another format into the container to melt and dilute the frozen liquid contents in the sealed container. Melting the frozen liquid contents can include applying heat or electromagnetic energy externally to the sealed container or within the sealed container via an injected liquid, gas, or steam to melt the frozen liquid contents into a consumable liquid form.

In addition to the food and beverage packaging system, the systems and techniques described herein include an apparatus for melting and/or diluting frozen liquid contents stored within this packaging system, wherein the frozen liquid contents of the package are made from food and beverage concentrates, extracts and other consumable fluid types with or without nutrients, and various methods for delivering these melted and/or diluted contents for immediate consumption. The techniques described herein allow, for example, consumers to conveniently and spontaneously create a single-serve, or multi serve consumable beverage or liquid-based food directly from a receptacle such that the product has the desired fresh taste, potency, volume, temperature, texture and/or the like. To achieve this goal, frozen liquid contents and preferably flash-frozen liquid contents, made from concentrates, extracts, and other consumable fluid types can be packaged in a gas impermeable, MAP packaged, full barrier and residue-free filterless recyclable receptacle. Further, this receptacle is designed to be accommodated and used by a machine-based dispensing system to facilitate the melting and/or diluting of the contents and deliver a product with desired characteristics, including taste, aroma strength, volume, temperature, color and texture, so that consumers can consistently and conveniently experience a level of superb taste and freshness that is unavailable by any other means in use today. Unlike current single-serve coffee makers, which create a finished product via a brewing process (e.g., the extraction of soluble products from solid coffee grounds), the disclosed approach creates a product by melting and diluting a frozen extract or concentrate created through an earlier manufacturing process, one which can take place in a factory environment under ideal conditions to capture and preserve flavor.

In one aspect of the invention, a dispenser for producing a food or beverage liquid product from a frozen contents in a receptacle includes a chamber configured to hold the receptacle and a non-diluting heater configured to heat at least one of the receptacle when held in the chamber and the frozen contents within the receptacle when held in the chamber. The non-diluting heater does not add liquid to an interior of the receptacle when held in the chamber. The dispenser also includes a reservoir configured to contain a liquid in which the reservoir includes a reservoir outlet configured to withdraw liquid from the reservoir. The dispenser further includes a product outlet configured to withdraw a food or beverage liquid product from the receptacle when held in the chamber and a controller and a computer readable memory comprising instructions that when executed by the controller cause the dispenser to selectively perform at least one of: heating at least one of the receptacle and the frozen contents within the receptacle using the non-diluting heater and withdrawing liquid from the reservoir through the reservoir outlet.

In another aspect of the invention, a method of producing a melted food or beverage liquid product from a receptacle containing frozen liquid contents includes receiving a receptacle in a chamber of a dispenser. The receptacle defines an enclosed inner volume containing a frozen liquid contents. The method also includes identifying a characteristic of at least one of the receptacle and the frozen liquid contents and melting at least a portion of the frozen liquid contents to generate a melted food or beverage liquid product by selectively performing at least one of: heating at least one of the receptacle when held in the chamber and the frozen liquid contents within the receptacle when held in the chamber without adding liquid to an interior of the receptacle when held in the chamber, supplying a dilution liquid to the interior of the receptacle, and applying motion to at least one of the receptacle and the frozen liquid contents. The selectively performing at least one of heating, supplying a dilution liquid, and applying motion is based on the identified characteristic. The method further includes perforating the receptacle and dispensing the melted food or beverage liquid product from the receptacle.

In a further aspect of the invention, a method of producing a melted food or beverage liquid product from a receptacle containing frozen liquid contents includes receiving a receptacle in a dispenser. The receptacle defines an enclosed inner volume containing a frozen liquid contents. The method also includes identifying a characteristic of at least one of the receptacle and the frozen liquid contents and removing the frozen liquid contents from the receptacle into a chamber. The method further includes melting at least a portion of the frozen liquid contents to generate a melted food or beverage liquid product by selectively performing at least one of: heating the frozen contents without combining a liquid with the frozen liquid contents, combining a dilution liquid with the frozen liquid contents, and applying motion to the frozen liquid contents. The selectively performing at least one of heating, combining a dilution liquid, and applying motion is based on the identified characteristic. The method still further includes dispensing the melted food or beverage liquid product.

In yet another aspect of the invention, a dispenser for producing a food or beverage liquid product from a frozen contents in a receptacle includes a chamber configured to hold a receptacle defining an enclosed inner volume containing a frozen liquid contents and a dilution liquid inlet configured to supply a dilution liquid to the inner volume of the receptacle when held in the chamber. The dispenser also includes a perforator configured to perforate the receptacle and form a product outlet from the receptacle for a food or beverage liquid product and an agitator configured to impart motion to at least one of the receptacle and the frozen liquid contents in the receptacle to at least one of increasing a flow path from the dilution liquid inlet to the product outlet taken by at least a portion of dilution liquid, when supplied, relative to a flow path from the dilution liquid inlet to the product outlet taken by the portion of dilution liquid without the imparted motion or disrupting the liquid boundary layer around the surface of the liquid frozen contents to increase the rate of heat transfer between the liquid frozen contents and the dilution liquid.

In an aspect of the invention, a dispenser for producing a food or beverage liquid product from a frozen contents in a receptacle includes a chamber configured to hold a receptacle defining an enclosed inner volume containing a frozen liquid contents and a perforator configured to perforate the receptacle and remove at least a portion of the frozen liquid contents from the receptacle into a melting vessel. The dispenser also includes an agitator configured to impart motion to at least one of the melting vessel and the frozen liquid contents in the melting vessel and a non-diluting heater configured to heat at least one of the melting vessel and the frozen contents within the melting vessel. The non-diluting heater does not add liquid to an interior of the receptacle when held in the chamber. The dispenser further includes a product outlet configured to dispense the food or beverage liquid product.

In some implementations, the dispenser includes one or more reservoirs of a liquid, such as water, for use in diluting the frozen contents and/or melting a portion or all of the frozen contents. In some embodiments, the liquid in these reservoirs may take different plumbed pathways to a dispense head to control the temperature of the liquid before it may enter a frozen receptable. These reservoirs and associated pumping mechanisms, diluting liquid heaters, check valves, etc. can deliver the diluting liquid at a variety of temperatures and can also be used to rinse a receptacle, perforator and empty cavity of the dispenser for receiving the receptacles, clean after use or rinse system components to prevent carry-over of product or flavors to the next dispensed beverage or growth of bacteria.

The dispenser may also include a control system and user interface that (1) allows a user to specify various beverage parameters such as preferred volume and delivered beverage temperature and (2) create the internal instruction set for each beverage to achieve the right combination of heated, unheated, or refrigerated diluting agent as well as the appropriate amount of supplemental heater and agitation energy to be delivered to the receptacle. Alternatively, the receptacle may have a characteristic that communicates a set of instructions to the dispenser to adjust the heating of a diluting liquid, the amount of non-diluting heat supplied to the pod, an amount of agitation, a time of perforation, or the choice of a pathway from the reservoir to the inlet in the dispensing chamber. The dispenser may also monitor its reservoir temperatures and dispenser altitude and barometric pressure, amongst other variables to be monitored and reacted to.

Accordingly, there has thus been outlined, in broad terms, features of the disclosed subject matter in order that the detailed description thereof that follows may be better understood, and in order that the present contribution to the art made by the apparatus and techniques disclosed herein may be better appreciated. There are, of course, additional features of the disclosed apparatus and techniques that will be described hereinafter. It is to be understood that the phraseology and terminology employed herein are for description and should not be regarded as limiting. Moreover, any of the above aspects and embodiments can be combined with any of the other aspects and embodiments and remain within the scope of the invention.

BRIEF DESCRIPTION OF THE DRAWINGS

Various objects, features, and advantages of the disclosed techniques can be more fully appreciated with reference to the following detailed description of the disclosed subject matter when considered in connection with the following drawings, in which like reference numerals identify like elements.

FIGS. 1A-1G illustrate various embodiments of receptacle geometries and frozen liquid contents configured in different forms and packaged to allow a desired flow of a liquid through the frozen liquid contents, according to some embodiments of the invention.

FIGS. 2A-2D illustrate various embodiments showing how the dilution system may add or deliver a liquid to/from the frozen liquid contents by piercing the packaging and externally and controllably heating the packaging so melting and dilution is a result, according to some embodiments of the invention.

FIG. 5 illustrates a range of exemplary packaging options and receptacle shapes that could be accommodated by a machine-based apparatus, according to some embodiments of the invention.

FIG. 11 illustrates the use of centrifugal motion to expedite liquefying a frozen liquid content, according to some embodiments of the invention.

FIGS. 13A-13D illustrate a process for producing a food or beverage from a frozen liquid content, according to some embodiments of the invention.

FIG. 14B illustrates a side cross-sectional view of a receptacle with an inner platform and a dislodged frozen liquid contents, according to some embodiments of the invention.

FIG. 14C illustrates a liquid frozen contents platform, according to some embodiments of the invention.

FIG. 14D illustrates a liquid frozen contents platform with an overflow tube, according to some embodiments of the invention.

FIG. 15B illustrates a side cross-sectional view of a detail A of FIG. 15A, according to some embodiments of the invention.

FIG. 16 illustrates a side cross-sectional view of a receptacle with a platform having an overflow tube, according to some embodiments of the invention.

FIGS. 29A and 29B illustrate perforator internal and external channels permitting liquid flow, according to some embodiments of the invention.

FIG. 34 illustrates a side cross-sectional view of a receptacle, according to some embodiments of the invention.

FIGS. 35A-B illustrate portions of the back end of a dispenser system, according to some embodiments of the invention.

FIGS. 37A-E illustrate portions of the front end of a dispenser system, according to some embodiments of the invention.

FIGS. 38A-E illustrate portions of the front end of a dispenser system, according to some embodiments of the invention.

FIGS. 39A-E illustrate portions of the front end of a dispenser system, according to some embodiments of the invention.

FIGS. 40A-E illustrate portions of the front end of a dispenser system, according to some embodiments of the invention.

FIGS. 41A-E illustrate portions of the front end of a dispenser system, according to some embodiments of the invention.

FIGS. 42A-E illustrate portions of the front end of a dispenser system, according to some embodiments of the invention.

FIGS. 56A-E illustrate portions of the front end of a dispenser system, according to some embodiments of the invention.

FIGS. 57A-E illustrate portions of the front end of a dispenser system, according to some embodiments of the invention.

FIGS. 58A-G illustrate portions of the front end of a dispenser system, according to some embodiments of the invention.

FIGS. 59A-G illustrate portions of the front end of a dispenser system, according to some embodiments of the invention.

FIGS. 62A-I illustrate user interactions with the dispenser and a dispenser interface for dispenser monitoring and control according to an embodiment of the invention.

FIGS. 63 A-J illustrate portions of the front end of a dispenser system, according to some embodiments, and detail views of an inverted receptacle puncture embodiment of the invention.

FIGS. 64A-G illustrate portions of the front end of a dispenser system, according to some embodiments of the invention.

FIGS. 65A-H illustrate portions of the front end of a dispenser system and a graph of several example water duty cycles, according to some embodiments of the invention.

FIGS. 66A-C are front, perspective and exploded perspective views of a cavity designed to accept multiple sizes of receptacles, according to some embodiments of the invention.

FIGS. 67A and 67B are front and perspective views of the cavity from FIGS. 66A-C filled with a mid-sized receptacle for which it was designed, according to some embodiments of the invention.

FIGS. 68A and 68B are front and perspective views of the cavity from FIGS. 66A-C filled with the smallest-sized receptacle for which it was designed, according to some embodiments of the invention.

FIGS. 69A and 69B are perspective and exploded perspective views of a cavity similar to that of FIGS. 66A-C, but for receptacles that have a smooth concave profile to their sidewalls as opposed to the stepped cylindrical profile of FIGS. 66A-C, 67A, 67B, 68A, and 68B, according to some embodiments of the invention.

FIGS. 75A-D are side views of a receptacle and a flexible needle penetrator designed to penetrate the full length of the receptacle and its frozen contents, according to some embodiments of the invention.

FIGS. 76-84 are a series of perspective and frontal views, some in cross-section and some with the housing component missing, all illustrating various features for embodiments of long penetrating needle systems designed to pass through the receptacle and frozen contents parallel to the axis of symmetry of the receptacle.

FIGS. 86A-C are perspective and cross section views of a contact heater for adding secondary (non-diluting) thermal energy to the frozen contents, according to some embodiments of the invention.

FIGS. 89A-C are perspective views of a receptacle which has been modified to incorporate the RF electrode plates directly onto surfaces of the receptacle, according to some embodiments of the invention.

FIGS. 91A-E is a schematic which illustrates an embodiment wherein water used to heat a pod is collected in an expansion tank and thereafter this water is used to melt and dilute the frozen contents in the pod, according to some embodiments of the invention.

FIGS. 92B and 92C are side views of a long needle which can be used to penetrate the sidewalls of a receptacle and used both as an entry needle and as an exit needle, according to some embodiments of the invention.

FIGS. 94A-F is a schematic which illustrates an embodiment wherein water used to heat a pod is returned to the water reservoir, according to some embodiments of the invention.

FIGS. 95A-F is a schematic which illustrates an embodiment wherein water used to heat a pod is returned to the hot water tank, according to some embodiments of the invention.

FIGS. 96A-F is a schematic which illustrates an embodiment wherein water used to heat a pod is pumped from and to an expansion tank, according to some embodiments of the invention.

FIGS. 98A-K are a schematic which illustrates an embodiment in which a single needle creates both the entrance and exit penetrations in the lid of a receptacle, according to some embodiments of the invention.

FIGS. 101A-D are side and perspective views of one embodiment of a cavity configured to receive and puncture the bottoms of non-circular receptacles of different depths, according to some embodiments of the invention.

DETAILED DESCRIPTION OF THE DRAWINGS

Figure 1A:
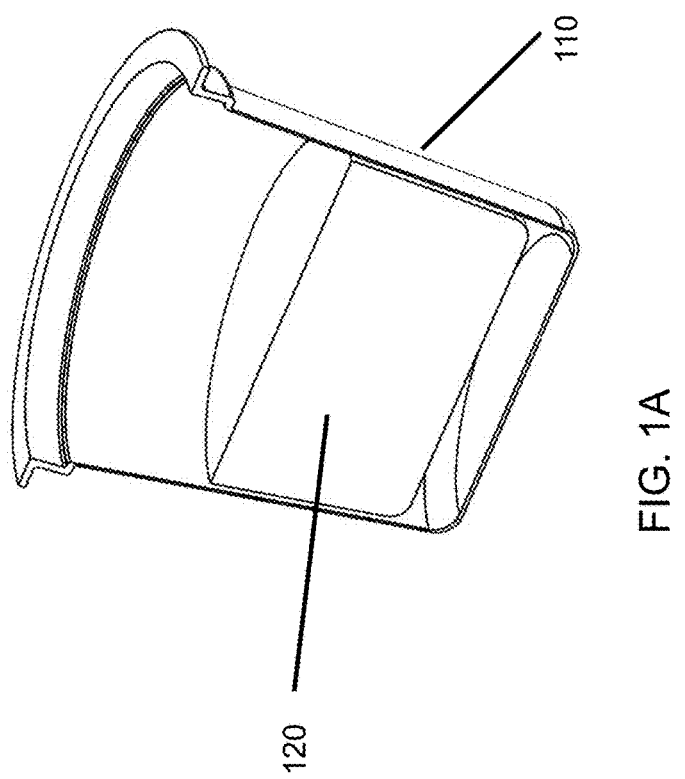

In the following description, numerous specific details are set forth regarding the systems and methods of the disclosed subject matter and the environment in which such systems and methods may operate to provide a thorough understanding of the disclosed subject matter. It will be apparent to one skilled in the art, however, that the disclosed subject matter may be practiced without such specific details, and that certain features, which are well known in the art, are not described in detail to avoid complication of the disclosed subject matter. In addition, it will be understood that the embodiments described below are exemplary, and that it is contemplated that there are other systems and methods that are within the scope of the disclosed subject matter.

The various techniques described herein provide for the packaging of one or more frozen foods or beverage liquids, using a filterless receptacle, and how to efficiently convert this frozen liquid contents into a high quality, tasty food or beverage product. The single chamber filterless receptacle can be designed such that a machine-based system may accommodate the receptacle and facilitate the melting and/or diluting of the frozen liquid contents to conveniently produce a consumable liquid beverage or food product directly therefrom with a desired flavor, potency, volume, temperature, and texture in a timely manner without the need of brewing. For simplicity, a frozen food or beverage liquid may be referred to as the "frozen liquid contents" or "frozen liquid content".

In some embodiments, the liquid that is frozen to create the frozen liquid content may be any frozen liquid matter, which in some embodiments can be derived from a so-called extract, e.g., a product obtained through the removal of certain dissolvable solids using a solvent. For example, the extract may be created using water to remove certain desirable dissolvable solids from coffee grounds or tea leaves. Somewhat confusingly, certain liquid extracts with a high-solids content are often referred to as a concentrated extract. The use of the term "concentrated" in this context may or may not be entirely accurate depending on whether the high solids content was achieved purely through solvent extraction of the solids using a limited amount of solvent to ensure a high level of dissolved solids as-made, or through a secondary step of concentration wherein solvent was removed from the liquid by some technique and/or process, for example, by reverse osmosis or evaporation using heat or refrigeration, to increase its potency or strength. The former example is a high-solids extract; the second example is a concentrate.

In contrast to a "brewer", which is a system for creating beverage products through extracting or dissolving solids (e.g., separately at a factory where the grinds/leaves etc. may be processed in bulk), the apparatus described herein to facilitate beverage creation is not a brewer. Rather, it melts and/or dilutes a previously brewed or extracted concentrate with dispensing functions that may be used to create a beverage from a previously brewed frozen liquid content.

The liquid used to make the frozen liquid content may also be a pure concentrate, e.g., a product obtained only by removing water or another solvent from a consumable compound such as a fruit juice or a soup, to create a fruit juice concentrate or a broth concentrate. In some embodiments, water may be removed from milk to create condensed milk. High TDS values and/or concentrations may be desirable either to reduce transportation costs and shelf space, or for convenience, for potency and serving size versatility of created products via dilution, or for enhanced shelf life due, for example, to enhanced anti-microbial activity due to reduced water activity. These specifics are intended to exemplify variation, but any liquid food or beverage product, regardless of how it is created, and regardless of its solids content falls within the scope of the present disclosure.

FIGS. 1A-1E show various embodiments of how the frozen liquid contents may be structured and packaged to allow for a desired flow of a pressurized or gravity fed diluting liquid by a machine-based system through the receptacle holding the frozen liquid contents. In addition to facilitating heat transfer to the frozen liquid contents, the diluting liquid may be effective at creating turbulent motion to thereby expedite melting in a variety of ways that are not outside the scope of the techniques described herein. Within the receptacle, the frozen liquid contents may be frozen into any useful shape or size.

In FIG. 1A, is a section view of receptacle 110, is shown (without a sealing lid in place), wherein the receptacle defines a cavity for packaging of the frozen liquid contents 120. The frozen liquid contents 120 can be frozen in-place by filling the receptacle with a liquid and then freezing the liquid, or the frozen contents can be frozen into a shape and then placed in the receptacle. In this instance, the frozen liquid contents are shown displaced away from the bottom portion of the receptacle to allow clearance for an exit needle perforation and to create a pathway around the outer surface of the frozen liquid contents in the receptacle for creating a desired flow of a melting/diluting liquid through the receptacle and around the frozen liquid contents to produce a beverage of a desired flavor, strength, volume, texture and temperature.

Figure 1B:
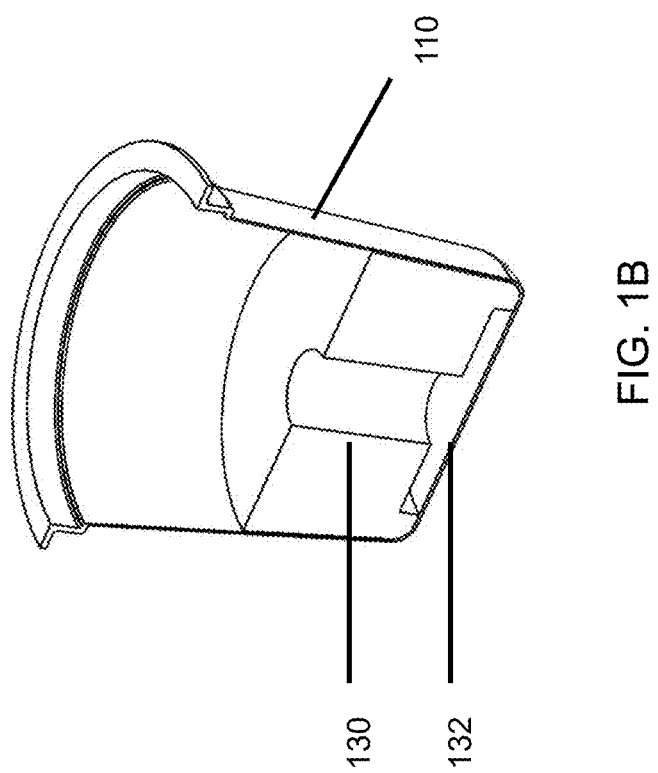

FIG. 1B illustrates another embodiment, wherein the frozen liquid contents have been molded to a shape configured to match the outside of the receptacle and subsequently loaded, such that the pre-molded shape defines a through-hole 130 in its body and a relief portion 132 below for accommodating an exit needle perforation to provide for a desired liquid flow there through without blockage or back pressure.

Figure 1C:
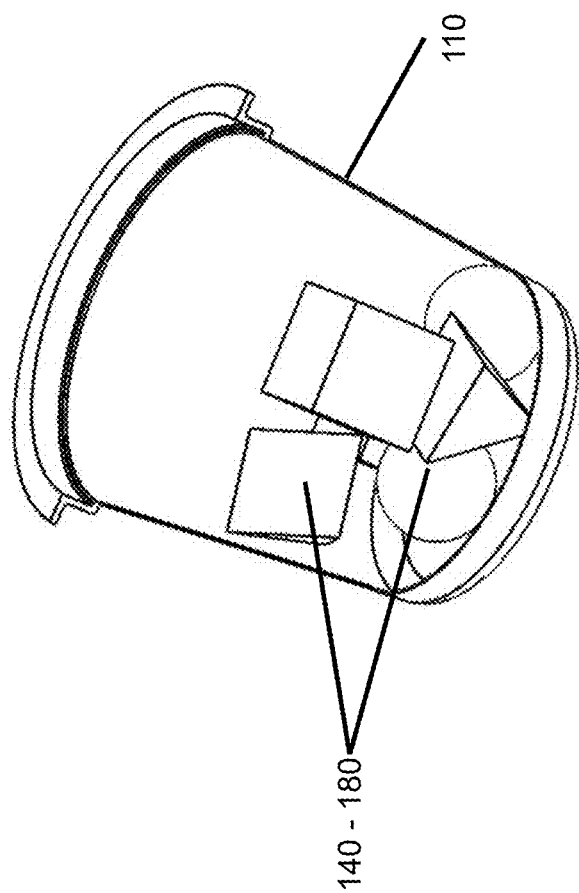

FIG. 1C shows a plurality of frozen liquid content pieces 140-180 provided in multiple and various shapes and sizes, with large interstitial spaces to provide for a desired liquid flow though the receptacle and around the frozen liquid contents. In some embodiments, the frozen liquid contents within the sealed receptacle may include a plurality of concentrates and compositions. For example, frozen liquid contents 140 and 150 could comprise a lemonade concentrate, while frozen beverage concentrates 160, 170, and 180 may comprise a tea concentrate, resulting in an "Arnold Palmer".

FIGS. 1D and 1E illustrate an embodiment for an alternatively shaped receptacle 115 that includes a bottom portion having a dome 195 (bistable or otherwise). In FIG. 1D the receptacle 115 is shown in its initial condition when the frozen liquid contents are added and frozen in place, complete with a frozen dome structure 195 in the bottom, with the dome structure in a primary or initial position, distended outwardly from the receptacle. FIG. 1E shows the condition of the receptacle 115 after the dome 195 has been displaced to a secondary position directed inward into the cavity of the receptacle such that the liquid frozen liquid contents 190 are displaced upwardly, into the headspace, reverting or "exchanging" the space or void between the inside bottom of the receptacle and the bottom portion of the frozen liquid contents. This displacement desirably creates a space for an exit perforation needle in the bottom of the receptacle and creates flow paths for any melting/dilution liquid to pass around the outside of the frozen liquid contents.

Figure 1F:
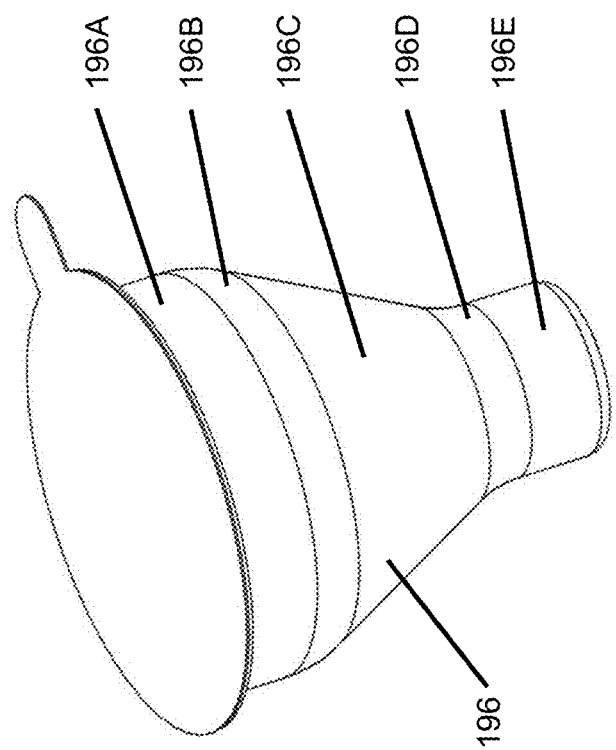

FIG. 1F illustrates a receptacle 196 comprising a multi-faceted shape. In this embodiment, the receptacle 196 includes different shape portions 196A-E. In some embodiments, the process of filling, melting and diluting a frozen liquid content may be generally unaffected by the size or shape of the receptacle. In some embodiments, certain design considerations can be considered regarding using geometries that may, for example, promote and facilitate unrestricted release of the frozen liquid contents, accommodate needle perforation, enable the development of clearance around the frozen liquid contents to promote a ready flow path for diluting liquids, and/or the like. For example, one or more of such design considerations can be met with positive (non-locking) draft in the sidewalls of the receptacle where it is in contact with the frozen liquid contents. Draft can be achieved by, for example, tapering the sidewalls of the receptacle, such as tapering the sidewalls outward from bottom of the receptacle to top of the receptacle (e.g., the diameter of the receptacle gets larger nearer the top of the receptacle). This can create a positive draft such that pushing the frozen liquid contents away from the bottom of the receptacle creates clearance around the sides of the frozen liquid contents (e.g., which avoids mechanical locking of the frozen liquid contents against the sides of the receptacle). Such positive draft can be used to create a natural flow path for diluting liquids to travel through the receptacle, such as liquids flowing from an entry needle to an exit needle that perforate the receptacle.

Figure 1G:
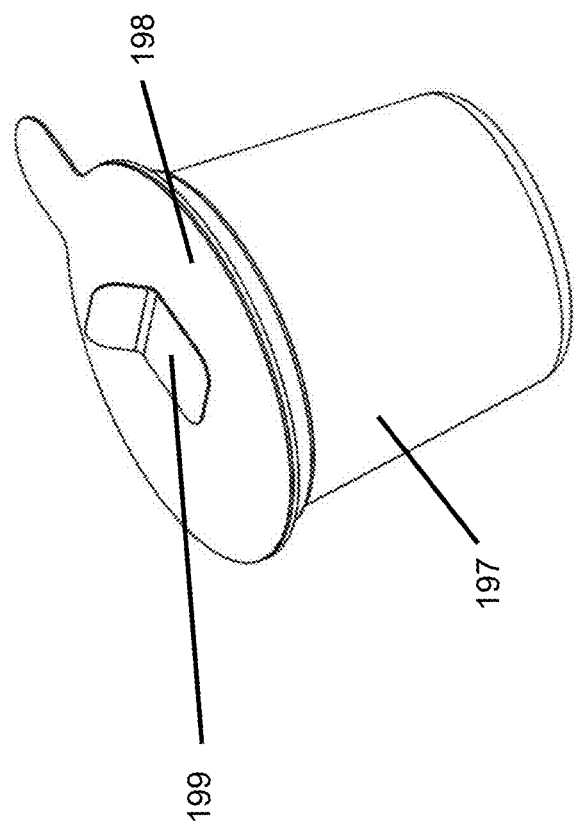

FIG. 1G illustrates a receptacle 197 with a lid 198 that includes a pull tab 199 that may be removed by the consumer. The pull tab 199 can be removed to facilitate use of a straw or similar device in combination with the receptacle 197. As another example, the pull tab 199 can be removed to facilitate introduction of diluting fluids into the receptacle 197.

FIGS. 2A-2D illustrate various embodiments showing how the dilution system may add or deliver a liquid to/from the frozen liquid contents by piercing the packaging and externally and controllably heating the packaging so melting and dilution is a result, according to some embodiments.

Figure 2A:
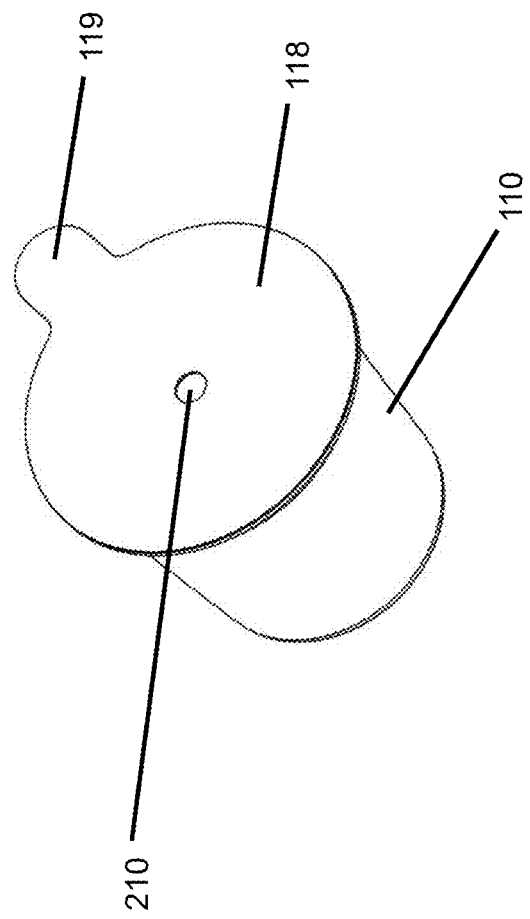

FIG. 2A illustrates a perspective view of the receptacle, including a formed seal closure such as a lid structure 118, which may include a puncture 210 therein, whereby, in some embodiments, a dilution fluid, which may also act as a melting agent, can be introduced into the receptacle. The lid structure 118 can include a tab 119 for allowing manual removal of the lid to access the frozen liquid contents without a need for perforation of the lid in certain instances. This lid structure can be made from the same material as the receptacle to better support efforts toward single-stream recycling. The lid structure can be made of sufficient gage thickness to adequately withstand internal pressure created by, for example, the melting/diluting liquid, which may increase and decrease with forces created by the accommodating system. For example, a vibratory, centrifugal, or rotation platform or the like that facilitates melting, or the flow rate of a diluting liquid injected will affect the pressure put on the lid, seal, and receptacle. Furthermore, the perforations made by the accommodating system may impact the pressures created on the hermetic seal, lid, and receptacle. The lid may be attached to the receptacle by any suitable technique such as, for example, heat sealing or crimping, radial folding, sonic welding, and the function can be achieved by any mechanism or form of the lid that seals the internal cavity and acts as a barrier against gas or moisture migration.

Figure 2B:
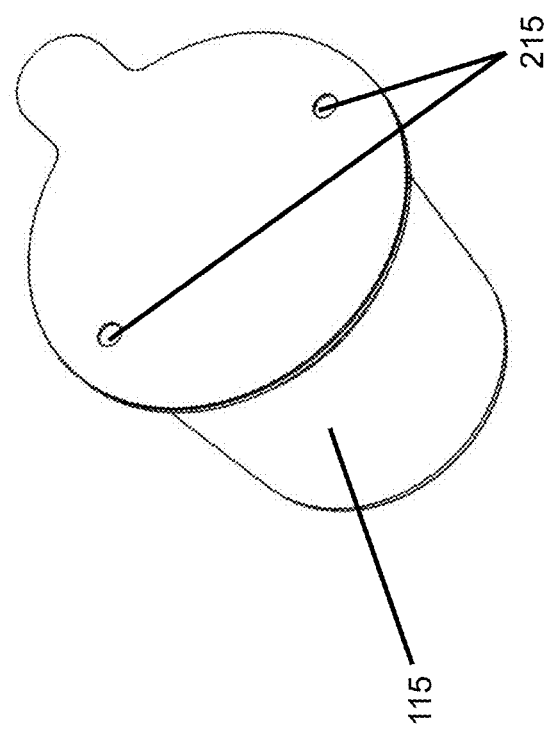

FIG. 2B shows an alternative embodiment of a punctured lid including two perforations 215.

FIG. 2C illustrates a bottom puncture 220 to allow the dilution liquid to exit the sealed receptacle. These examples are meant to be illustrative, however, as the puncture, or punctures, may be made anywhere on the receptacle. The punctures may be made in a specific location to dispense a solvent, diluting agent, liquid, such as water, gas or steam for a desired melting and dilution environment, and ultimately the creation of a desired beverage in a timely manner.

The punctures may be of any size as needed, for example, to allow oversize solids (frozen or non-dissolvable solids) to be dispensed from the receptacle. In some variations, the perforation may be made to allow frozen structures of a specific size to escape and to be distributed from the receptacle to create a fluid, iced, slush, or smoothie-like beverage. In addition, multiple punctures may be advantageous in providing venting of the receptacle when melting/diluting fluid is input therein.

Figure 2D:
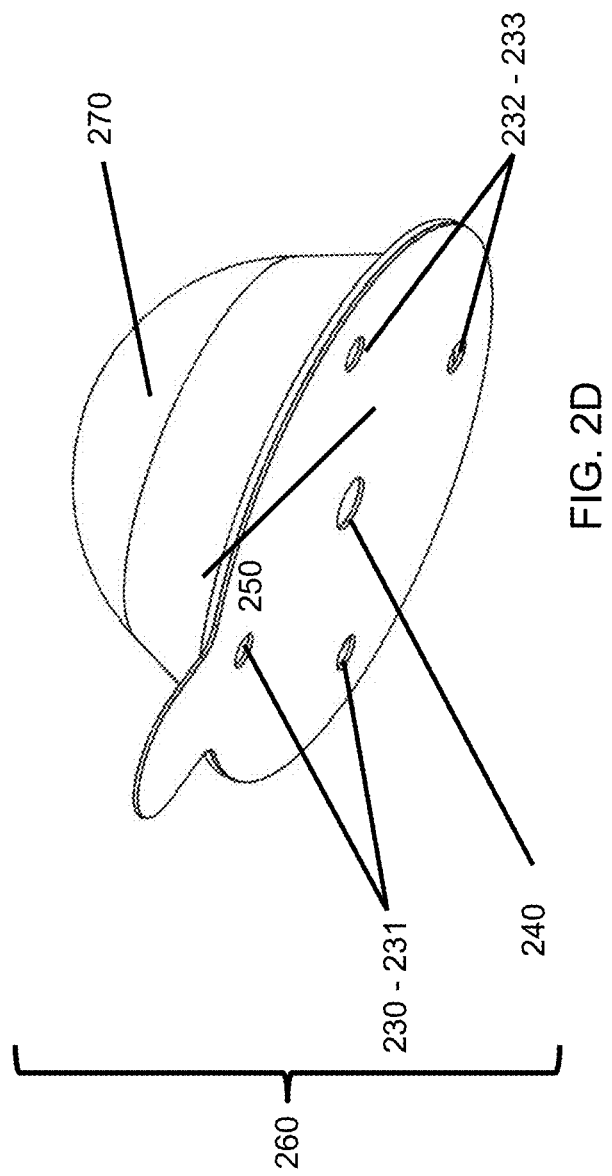

FIG. 2D illustrates an embodiment having four punctures (230-233) situated in proximity to the periphery of a receptacle 270 for entry of a liquid through the lid 250 of a receptacle 260 that is loaded top-down into a machine-based system. As shown in this embodiment, a puncture 240 may be provided near the center of the receptacle lid for allowing the melted and diluted frozen liquid contents to exit the receptacle. In this figure, the frozen liquid contents (not shown) are frozen within the domed bottom of the upside-down receptacle to allow for a desired flow environment, wherein the liquid is redirected by the tapered sides of the receptacle to the exit perforation. The melted and diluted liquid, in this example, may flow out of the receptacle into a secondary receptacle for consumption from a single or plurality of nozzles provided by an accommodating apparatus.

Figure 3:
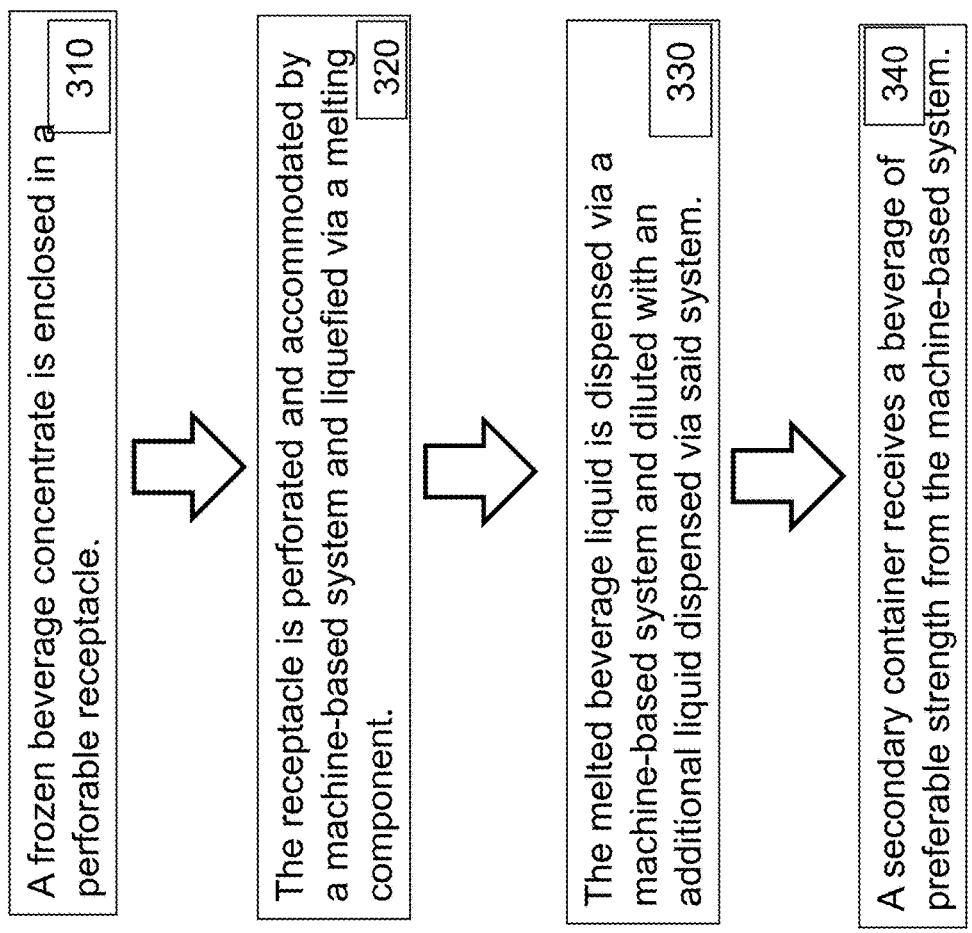
FIG. 3 illustrates a method of melting the frozen liquid contents without the use of a melting/diluting liquid, but rather with some alternative source of heat, according to some embodiments of the invention.

FIG. 3 illustrates a process for creating a food or beverage product. A frozen beverage concentrate is enclosed in a perforable receptacle 310. The receptacle is placed into a system and perforated 320. The melted beverage content 330 exits its receptacle and is diluted with an additional liquid dispensed via the machine-based system in a secondary step or in unison with a desired diluting agent. The melted contents may be dispensed undiluted, before, after, or simultaneously with the addition of a distinct liquid for dilution. This may include capturing the melted beverage content in a liquid reservoir that mixes the two liquids before being dispensed together by the machine-based system. When distributed, a secondary receptacle 340 receives the melted contents and diluting agent when appropriate.

In some embodiments, a secondary receptacle used to collect the melted/diluted contents may include any receptacle known to hold liquid food or beverages. This secondary receptacle could be a container, drinking glass, thermos, mug, cup, tumbler, bowl, and/or the like. This secondary receptacle may or may not be included in the secondary packaging. Note: an example of this would be a consumer package with a soup bowl containing instant rice or noodles sold along with a receptacle of frozen liquid broth concentrate that combines to make a bowl of soup after the frozen liquid contents are melted and/or diluted and discharged into the secondary packaging. Alternatively, the secondary receptacle may be separately provided by the consumer.

FIGS. 4A through 4D illustrate an exemplary machine-based apparatus that can accommodate a variety of different receptacles, according to some embodiments. The system can be, for example, a melting system. The receptacles can include, for example, a variety of different filterless receptacles, of varying sizes and shapes, each holding some amount of frozen liquid contents. The apparatus can be configured to perform melting, diluting, and delivery functions for creating a beverage or food product with desired characteristics, as described herein.

Figure 4A:
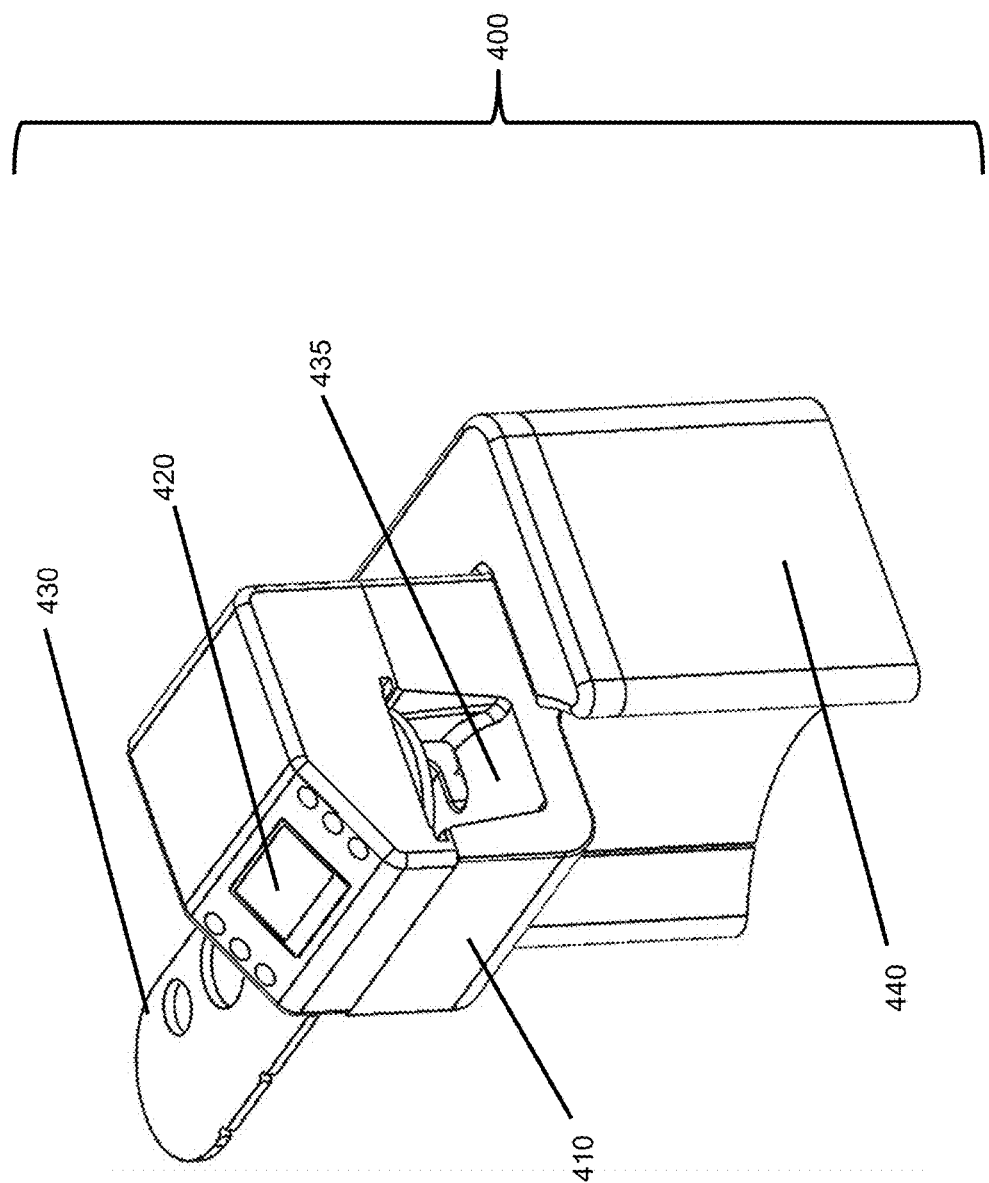
FIGS. 4A-4D illustrate an exemplary machine-based apparatus that can accommodate a variety of receptacles geometries, according to some embodiments of the invention.

In FIG. 4A, the system 400 (also called a "dispenser" herein) includes a cassette 430 into which receptacles of different sizes and/or shapes can be loaded. Once loaded with a single receptacle, the cassette 430 can be slid into place, with the receptacle passing through a clearance tunnel 435 until it is centered on the main system body 410. Instructions for use of the melting system 400 can be communicated to a user via a display 420. Solvent (e.g., water) to be used for melting/diluting the frozen liquid contents of the receptacle is stored in the holding tank 440 until needed.

Figure 4B:
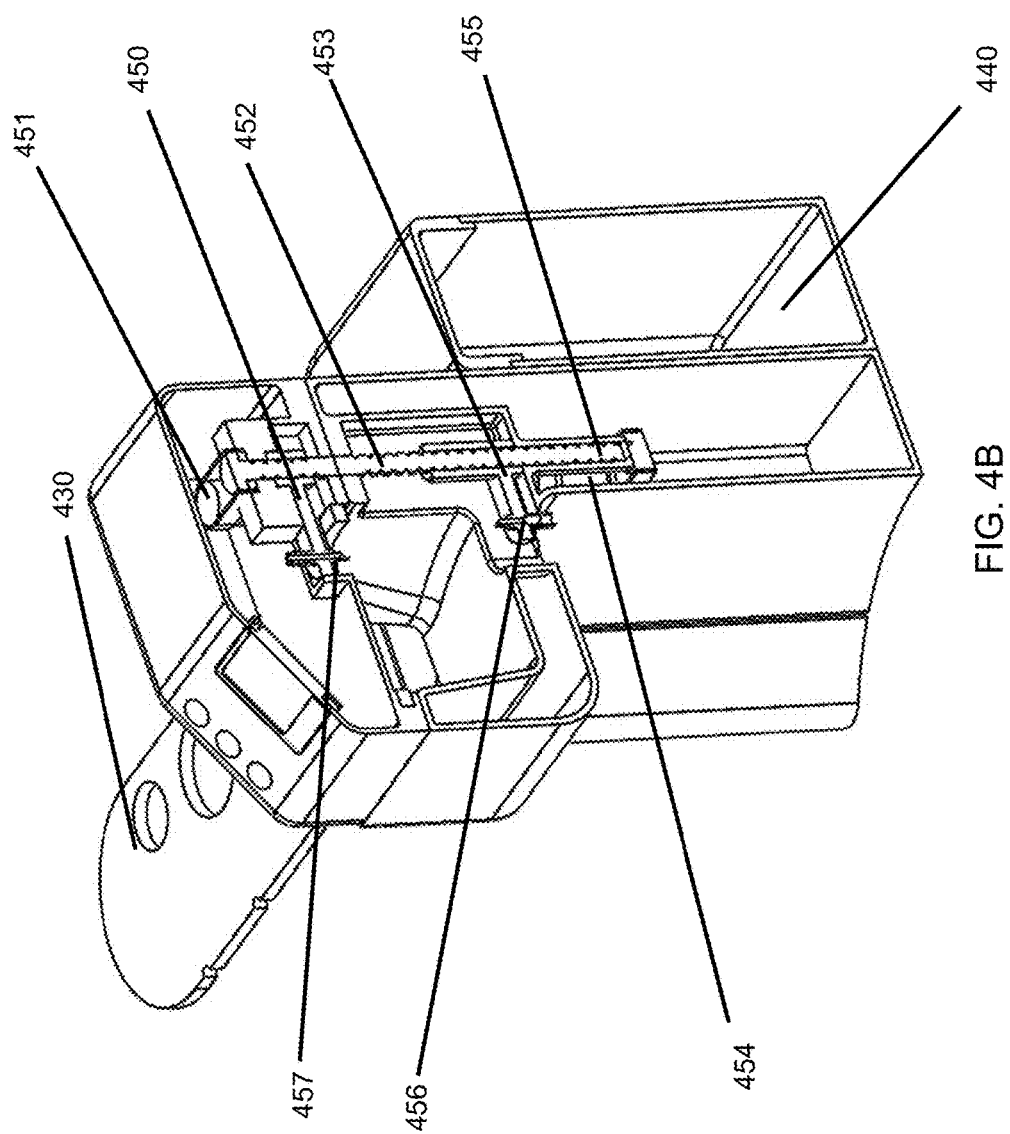
Figure 4C:
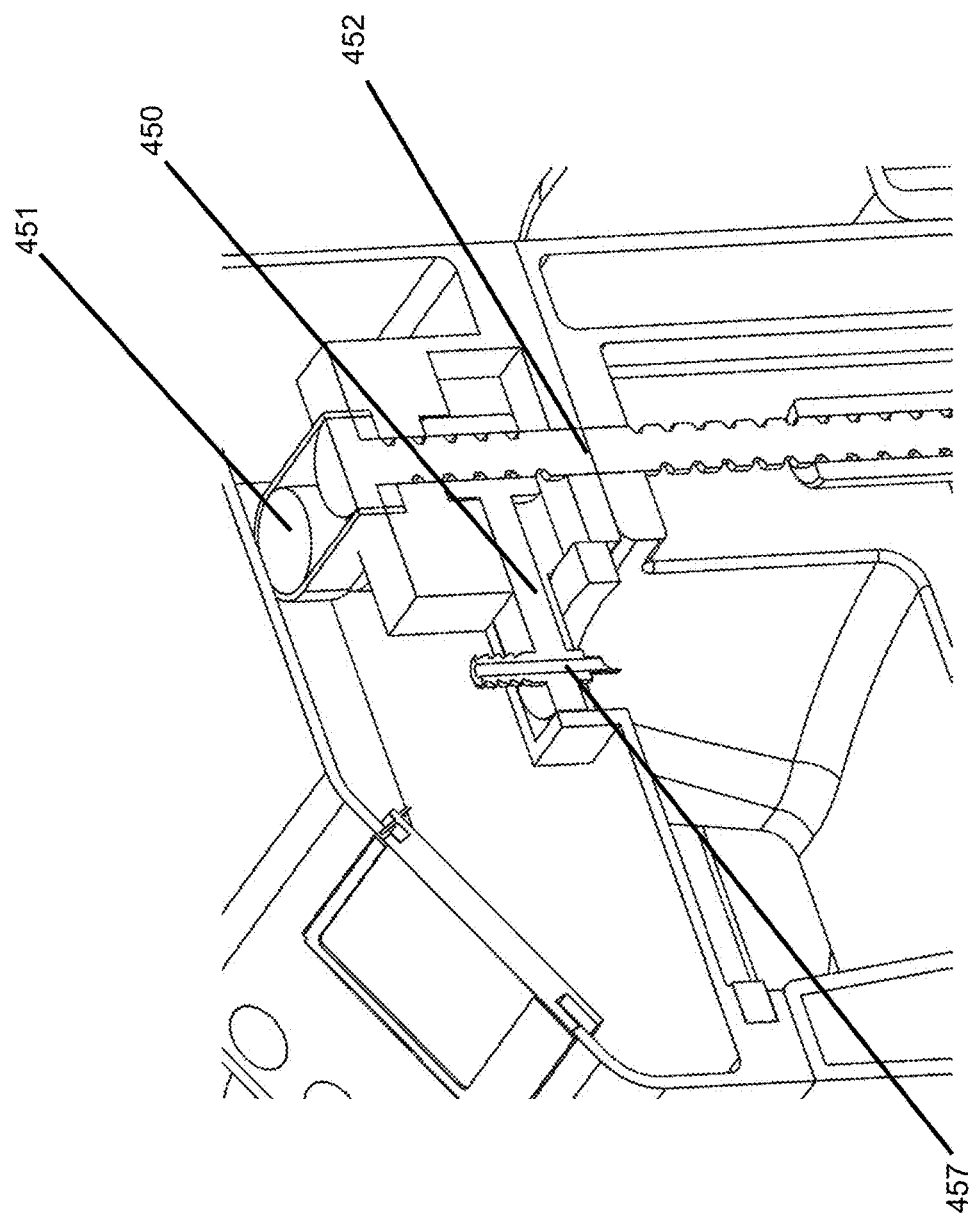

Referring to FIGS. 4B and 4C, once the receptacle is properly placed for interaction with the system, a needle support arm 450 is moved toward the receptacle using any known technique and/or process, which, by way of example only, could include a motor 451, including electric or gas-driven variations and/or a screw 452, until the needle 457 punctures the closure end of the receptacle. Use of a manual lever to puncture the receptacle is also within the scope of the invention. The shape of the needle may comprise a protruding tip such that it may be inserted into the receptacle to a certain depth and angle to chip, fracture, or dislodge a portion of frozen liquid content to promote flow paths to an exit point. The needle 457 may spin in a screw motion at a certain depth to facilitate penetration of the receptacle and/or frozen liquid content. Alternatively, the needle may retract after puncture to a second depth within the receptacle or from the receptacle completely to ease initial dispensing pressures or provide unobstructed perforation exits. The needle may be heated before or during insertion into the receptacle. A heated probe may be inserted into the receptacle through one of the puncture to accelerate melting of dispensed contents. Depending on the receptacle design and its contents, a second needle support arm 455 can be moved toward the receptacle to penetrate the bottom of the receptacle using a similar motor 454 and drive screw 455. A heater, such as a plate heater or an IR heating source (not shown) may be used to preheat or melt the frozen liquid contents depending on the selected product and process desired. When needed, a melting/diluting liquid stored in a holding tank 440 can be passed through a heat exchanger (not shown), using tubing (not shown), to pass through needle 457 and into the now punctured receptacle. Thereafter the melted liquid can exit from the receptacle through needle 456 on needle support arm 453. In one embodiment, the perforation needle 457 may inject a hot liquid, steam, gas, or any combination thereof directly into the pod to aerate the liquefied product for creating, in a specific example, a froth-like texture for a coffee-based dairy product like cappuccinos and lanes. In one embodiment, a needle injected into the pod may include no exiting structure and be used purely to stabilize a pod.

Figure 4D:
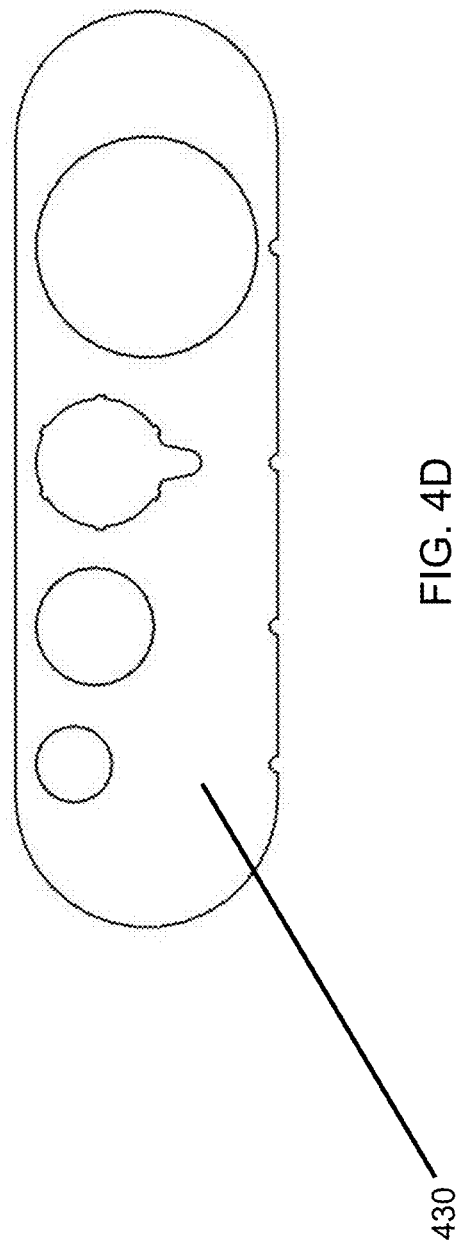

FIG. 4D illustrates one embodiment for a cassette or other device capable of holding a variety of receptacle sizes and shapes to allow a wide range of beverages, soups, etc. to be used with a melting apparatus.

FIG. 5 illustrates a range of receptacle sizes and shapes (510, 520, 530, and 540) that could be accommodated by the cassette of the machine (e.g., cassette 430 of FIG. 4A). With different cassettes, each interchangeable with the original, but with differing hole sizes and shapes, an unlimited number of different receptacles can be accommodated by the brewer. It will be recognized by one skilled in the art that the process of filling, melting and diluting a frozen liquid content may be, in some embodiments, generally unaffected by the size or shape of the receptacle.

The system 400 includes internal electronic components, memory, and the appropriate controllers, along with programming instructions to automatically create the desired food and/or beverage. The system 400 can be given instructions by a user via a display or other known methods, e.g., wireless instructions from a handheld device.

Figure 6:
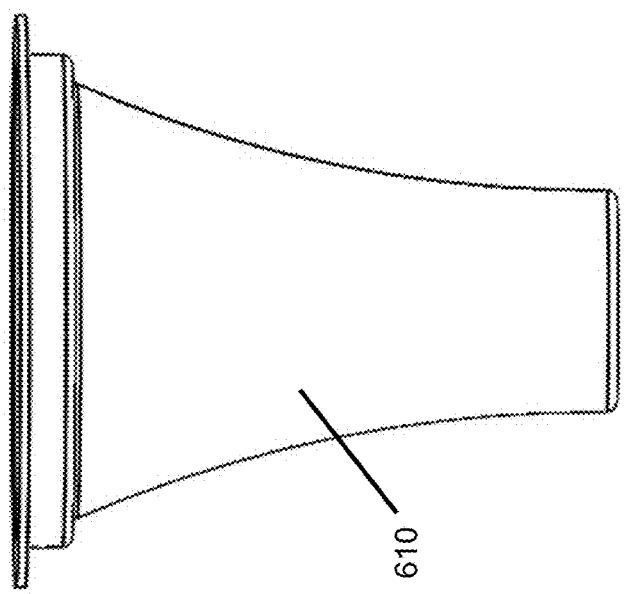
FIGS. 6 and 7 illustrate two versions of receptacles with identical end geometries and height, but different sidewall profiles, according to some embodiments of the invention.
Figure 7:
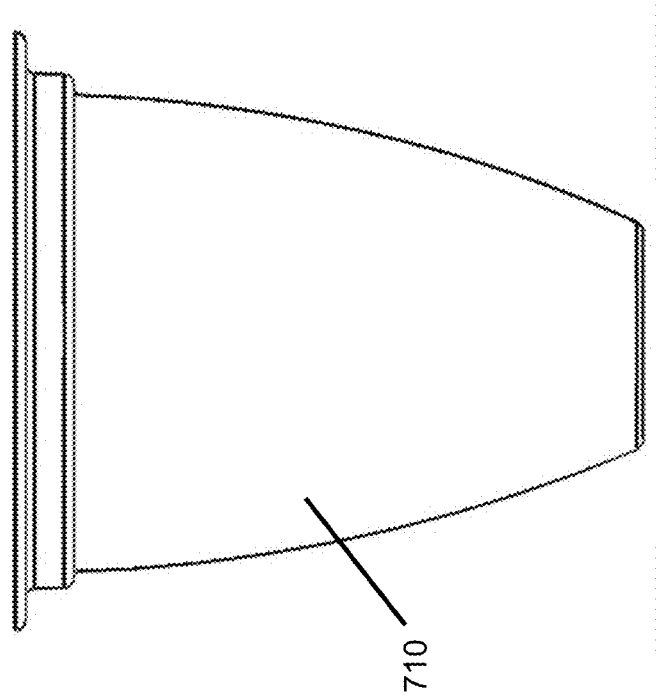

FIGS. 6 and 7 illustrate two versions of receptacles 610 and 710 with identical end geometries and height, but different sidewall profiles. The differently curved sidewalls produce different internal volumes available for the frozen liquid contents and headspace, but the diameter of their two ends and their overall heights are the same.

In some embodiments, the receptacle's outer surface is colored or coated with material designed to enhance absorption of infrared energy that may be used to heat and/or melt the frozen liquid contents. In some embodiments the shape of the receptacle's sidewall, when seen in section view from a first or second end, would be the shape of a star or other non-circular shape, e.g., one whose perimeter surface area would be much greater than that of a smooth cylinder or cone and thereby promote heating and melting of the frozen concentrate proportionally faster. This may effectively facilitate melting in many ways, including increasing that surface area for heat to be transferred to the frozen liquid content through the receptacle, creating a more turbulent environment in the receptacle that expedites melting, or directing liquid away from the exit perforation(s) to promote greater heat transfer efficiency within the receptacle.

Figure 8:
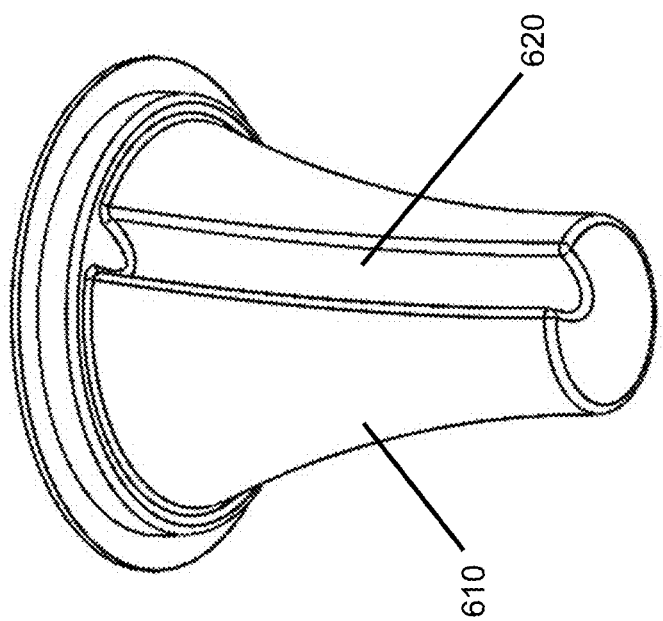
FIGS. 8 and 9 illustrate two versions of a sidewall indentation in a receptacle, a feature that may be used both for expediting liquefaction and for product identification, according to some embodiments of the invention.
Figure 9:
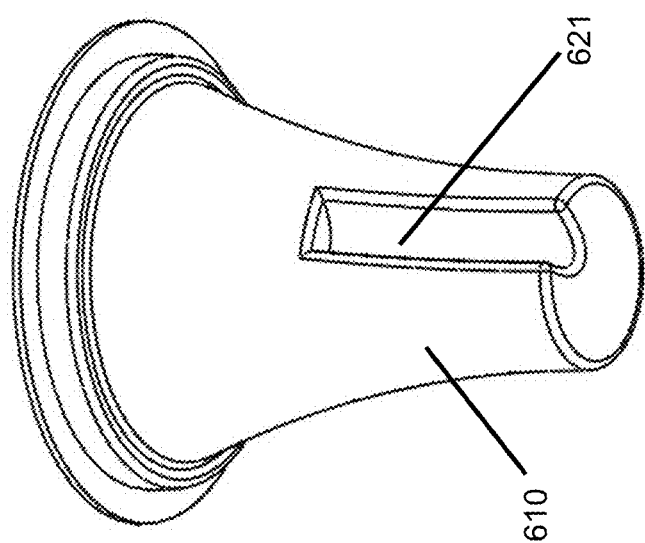

FIGS. 8 and 9 illustrate two embodiments wherein there are "keying feature" 620 or 621, which can help to promote internal turbulence during melting and dilution of the frozen liquid contents and can also be of use in identifying the contents or family of products used to fill the receptacle.

In some embodiments the cavity may have other special locking features to secure the receptacle in place. In some embodiments, this locking feature resembles a conformateur as used by a master hatter years ago to carefully measure the shape of a body, such as a head. In other embodiments, the receptacle's shape acts like a key and informs the dispenser of certain go/no go conditions. Similarly, the cavity of the dispenser may read the shape of the receptacle to identify a corresponding recipe for use with the frozen contents of the receptacle. For example, the locking mechanism could be a clamp which bears against a flange around the opening of the receptacle to hold it in place. Alternatively, the locking mechanism could be a series of lugs which slide into mating recesses in the side wall of the receptacle or a spring load that forces the receptacle into a certain position. In some embodiments, a localized vacuum may be created to cause the receptacle to bear against a portion of the cavity wall. In another embodiment, the locking feature could be a hook, vise, press, or inflatable bladder that hugs and warms the receptacle, then retracts and releases, or any other mechanical feature to pressure the pod into a stable position.

Figures 10A, 10B, 10C, 10D, 10E:
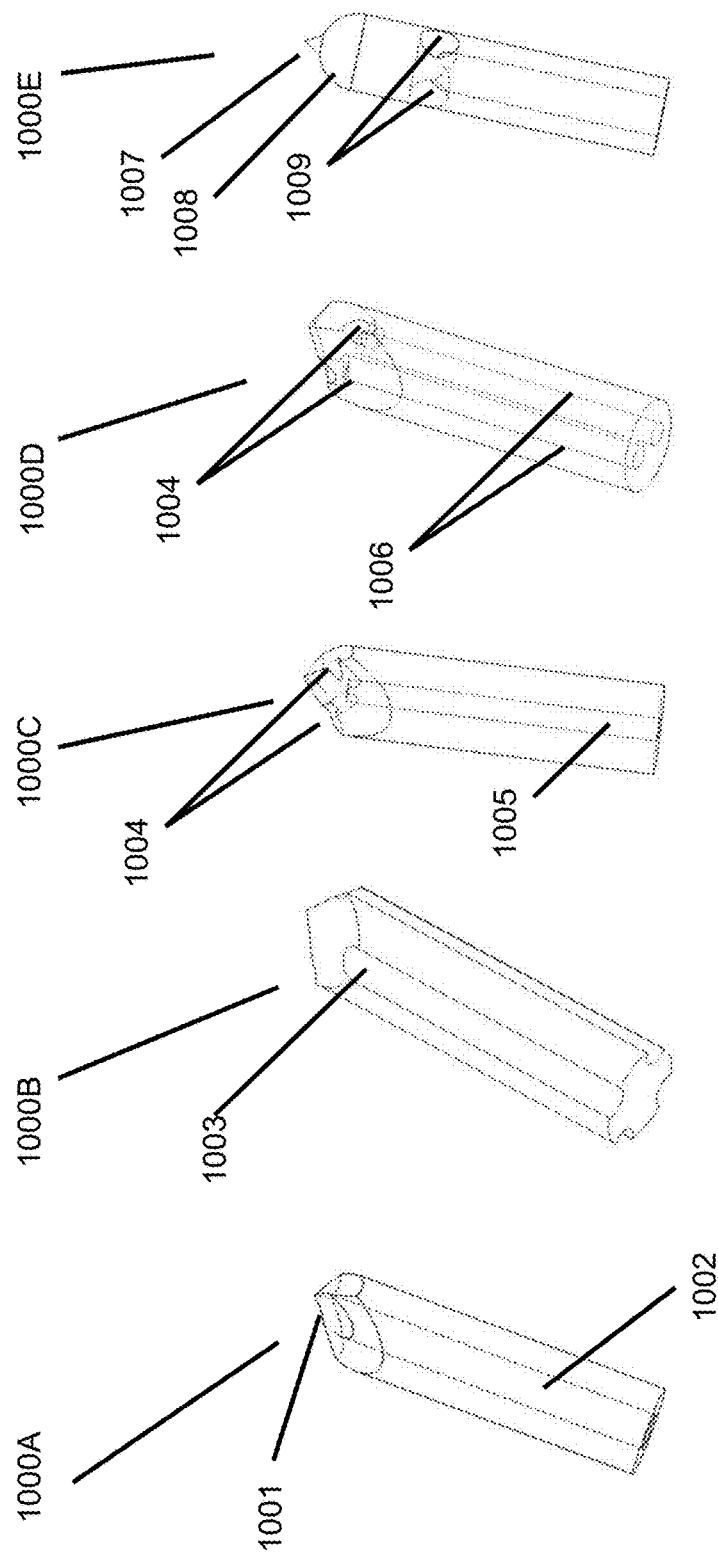
FIGS. 10A-10E illustrate five possible needle geometries that may be used to perforate a receptacle, according to some embodiments of the invention.

FIGS. 10A-10E illustrate dispensing or drain orifice(s) or reliefs of the needle which may be located at its point 1001, as in 1000A, or elsewhere and aligned axially as in FIG. 10A (1002) or to the sides 1004 as in FIGS. 10C and 10D, but in fluid communication with axial passage(s) 1005, 1006, so the liquid injected into the receptacle can be directed away from the center of the frozen liquid contents, possibly to help move or rotate the frozen liquid contents relative to the side walls of the receptacle. Concerns about needle strength and durability may be addressed with a cruciform 1003 needle structure 1000B as in FIG. 10B. Example 10E might be used to first easily pierce the closed end of the receptacle with the sharp point 1007 and then bear against the frozen liquid contents with the domed end 1008 without penetration, while melted/diluted liquid drains out of the side holes 1009 of the needle, wherein those side holes are positioned adjacent to the inside surface of the closed end of the receptacle. A screw like section of a perforation needle that spins may be used like an Archimedes pump to direct the flow of exiting fluid.

Referring to FIG. 10E, in some embodiments, a blunt tip 1008 on the discharge needle 1000E displaces the receptacle's frozen liquid content away from the receptacle's closed bottom and into the tapered headspace, where it is supported by that same blunt-tipped discharge needle. In one implementation, this blunt discharge needle utilizes a T-shaped passageway 1009 with openings in the sidewall of the needle located closer to the receptacle bottom to allow dual discharge flow without interference from the supported frozen liquid content, thereby emptying/venting the receptacle.

In some embodiments, a secondary piercing head 1007, as shown in FIG. 10E, emerges out of the domed needle 1000E. This piercing head easily creates an initial puncture which is more easily expanded by the domed surface 1008 of the needle, allowing the needle to move further into the receptacle and enlarge the space around the periphery of the frozen liquid contents. In some embodiments, the emergence of the piercing head 1007 of the needle is driven by a pneumatic cylinder. In some embodiments, this movement forms a slight tear in the closed end of the receptacle such that the domed end 1008 can expand the breach and easily pass through. Meanwhile, the piercing head 1007 can immediately retreat back into the needle body.

FIG. 11 illustrates a specific example wherein a receptacle with tapered sides 520 is punctured on the top and bottom of the receptacle, and an ambient-temperature liquid is injected via a top-puncturing needle 1000D. As the liquid is injected into the receptacle, the machine-based apparatus spins, torques, and cooperates with the receptacle in such a manner that the liquid 1101 in the receptacle flows in an indirect path away from the exit perforation(s) of the receptacle, formed by the bottom-puncturing needle 1000B. Thus, the diluting liquid may interact with the frozen liquid content 190 for a longer duration of time within the receptacle and provide more thermal exchange between the frozen content and diluting liquid before any portion of water exits the receptacle. The exit of the liquid may be controlled effectively by the flow of the water in, which will push water out when the pod nears or hits capacity or by decreasing or stopping the agitating motions. Optionally, the bottom-puncturing needle 1000B dislodges the frozen liquid content from the bottom of the receptacle.

In some implementations of the embodiment shown in FIG. 11, the dispensing system includes a motor or other known mechanism to spin or oscillate the receptacle 520 around an axis of rotation. In cooperation with the radius and geometry of the receptacle, the spinning motion imparted to the liquid by the rotation around the axis overcomes the normal pull of gravity on the liquid, thereby displacing the liquid along the sides of the receptacle and away from the bottom of the receptacle 1101. The puncture formed by needle 1000B is positioned to be in the empty space created when the liquid is displaced.

In some embodiments, the inertia of the spinning liquid holds the liquid against the sidewall of the receptacle until the addition of new liquid into the receptacle forces out a desired product, or rotation speed is decreased. In other words, the motion imparted to the receptacle and/or the frozen liquid contents increases the length of the flow path the liquid takes from the liquid inlet (via top-puncturing needle 1000D) to the liquid outlet (via bottom-puncturing needle 1000B). Without imparted motion, the injected liquid would tend to take a more direct path from inject to outlet; whereas, with imparted motion, the injected liquid travels along the outer walls of the receptacle to the outlet. In such embodiments, the flow rate of liquid entering the receptacle, in part, controls the amount of time the melted frozen content is in the receptacle. This residence time influences the temperature exchange between the frozen content and diluting liquid, and ultimately the temperature of the exiting liquid product. In some embodiments, the flow rate and pressure of the diluting liquid supplied into the receptacle influence the amount of liquid pushed through the exit perforation(s) by overcoming the displacing force imparted by the rotational motion applied to the receptacle for a clean, uniform flow out of the receptacle. In some embodiments, the motor, or other mechanism to drive the spinning of the receptacle is positioned such that it is not an obstacle for supplied or exiting liquid. For example, a belt or gear system, or the like, is used to drive the receptacle around the axis without the need to position the motor or other mechanism above or below the receptacle.

In embodiments in which the frozen liquid content is displaced away from the bottom of the receptacle, the displacement may be accomplished by domed needle 1000E. In some implementations, the displacement by the domed needle is coupled with inversion of a dome (bistable or otherwise) mentioned above. In such case, the dome takes a new stable position curved inward toward the interior of the receptacle and holds the frozen contents away from the bottom of the receptacle. This can occur even if the domed needle 1000E does not remain in contact with the receptacle. In some embodiments, the domed needle 1000E pushes against the receptacle bottom and creates a small displacement through bending or plastic deformation of the receptacle material. In some embodiments, a delayed action takes place to perforate the bottom of the receptacle with the needle. This may occur simply by applying enough force to the needle that the domed end ruptures the closed end.

Figure 12B:
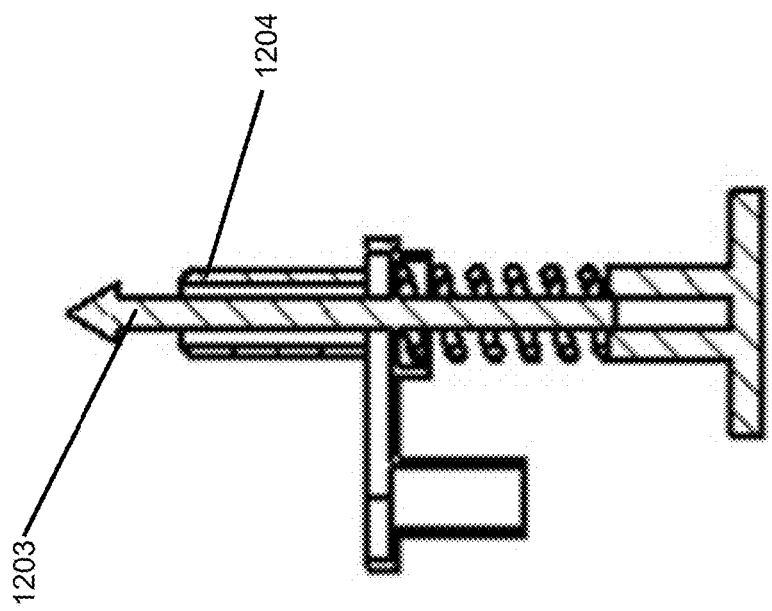
FIGS. 12A and 12B illustrate a spring-loaded needle, according to some embodiments of the invention.
Figure 12A:
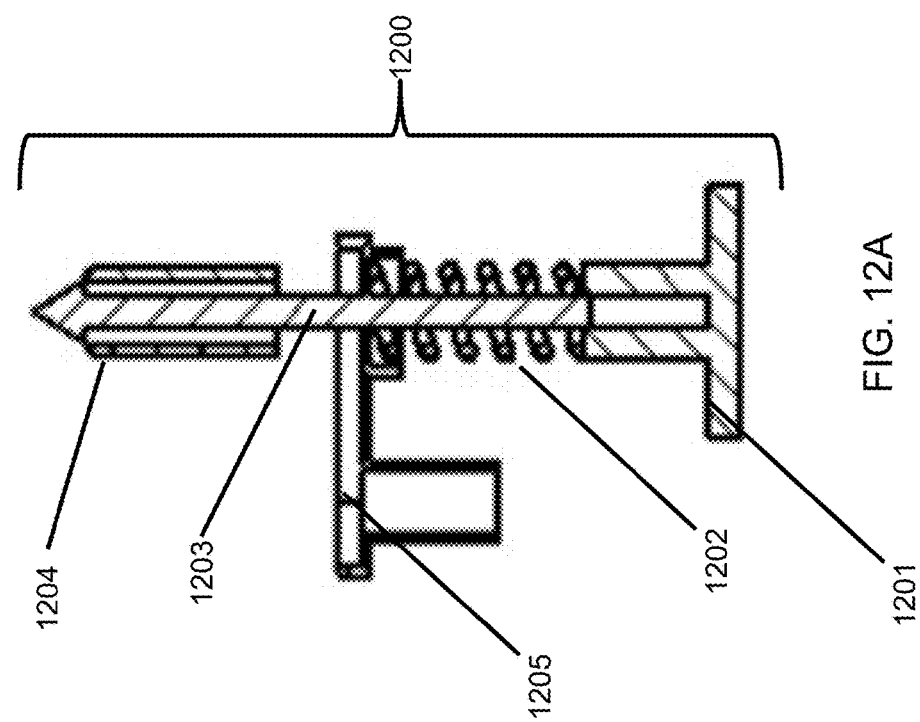

FIGS. 12A and 12B illustrate an exit needle assembly. The needle assembly is anchored by a part of the dispenser frame 1201 and comprises a penetrator 1203, a compression spring 1202, a dome-shaped needle housing 1204, and a fluid collecting tray 1205. When the needle assembly 1200 first penetrates the closed end of the receptacle, the penetrator 1203 bears against needle housing 1204 and seals it to prevent fluid exiting the receptacle. Subsequently, penetrator 1203 is forced upward by spring 1202, opening a channel on the inside of needle housing 1204, allowing fluid to exit the receptacle and be collected by tray 1205, and thereafter dispensed into the user's cup.

Figure 13A:
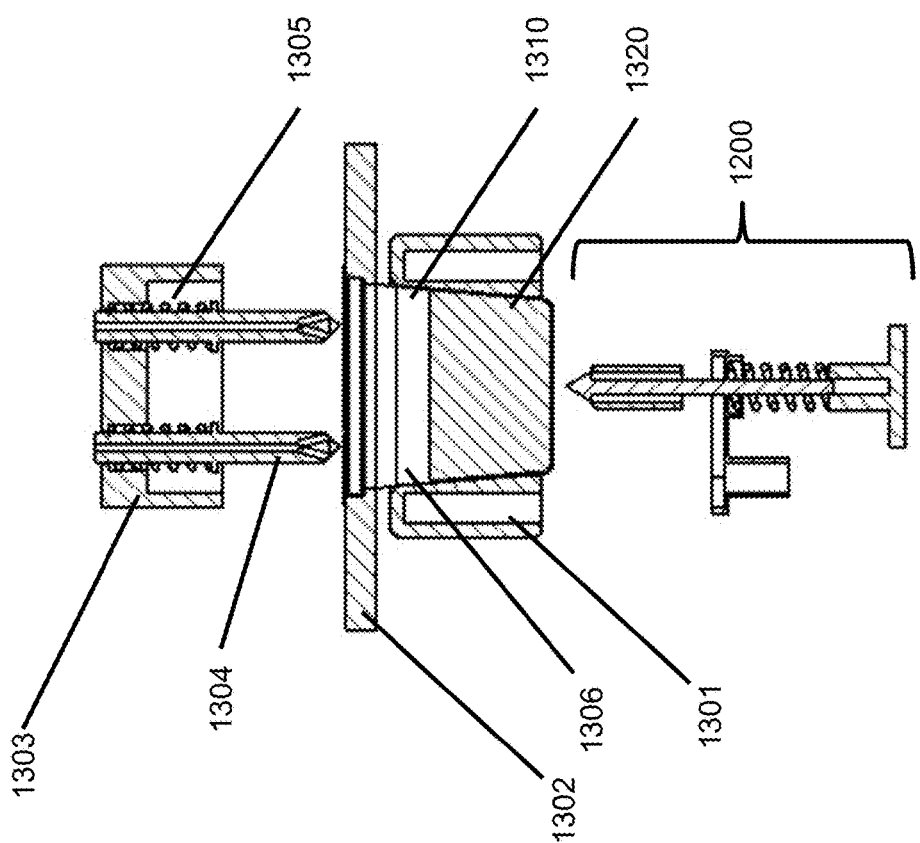

In one embodiment, as shown in FIG. 13A, a filterless receptacle 1310 with frozen liquid content 1320 and a headspace 1306 is placed into a supporting tray 1302 and a heatable receiver 1301 of a dispenser designed to receive the receptacle so that the sidewalls of the receptacle 1310 are in close contact with the walls of the receiver 1301 and the flange of the receptacle is supported by tray 1302. When the dispenser's cover 1303 is closed by the user, the dispenser will capture and seat that receptacle in the close-fitting tray 1302 and receiver 1301. The receiver is heatable using any of the techniques disclosed herein, and the close contact between the receiver walls and the receptacle sidewalls enable the dispenser to efficiently heat the receptacle's contents.

FIGS. 13A-13D illustrate how the spring-loaded needles of FIGS. 12A-B might be utilized in a dispenser assembly to, for example, penetrate the base of a receptacle.

Figure 13B:
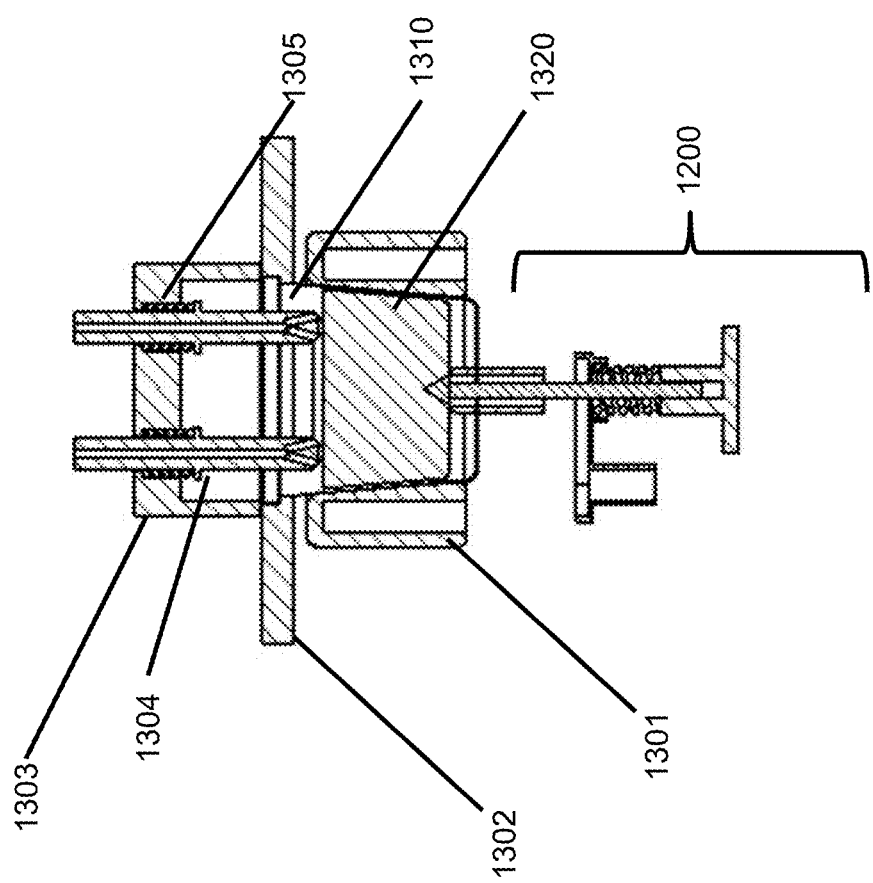

Referring to FIG. 13B, during closing of the receiver cover 1303, one or more spring-loaded supply needles 1304 penetrate the top lid of the receptacle, and one or more discharge needles 1200 penetrate the receptacle's bottom. The actuation of the needles can be powered by the manual force of the user closing the dispenser's receiver, or, alternatively, one or both of these actions can be done by a controlled actuator. As illustrated in FIG. 13B, these needles may also be made compliant with the help of a spring mechanism 1305 that limits the force applied by the needles in attempting to penetrate the frozen contents 1320.

Meanwhile, sharp tip(s) of the spring-loaded supply needle(s) 1304 penetrate the receptacle's lid and come to rest against the recently displaced frozen content 1320, where they may be stopped from further penetration due to the interference between the needle tips and the top surface of the frozen liquid content. The dispenser's heatable receiver 1301 controllably warms and thaws the receptacle's frozen liquid content thereby softening the recently repositioned frozen liquid content within the receptacle, readying the frozen liquid content for additional thawing and/or dilution. In some embodiments, a measured portion of liquid is injected into the receptacle simultaneously with needle insertion to help transfer heat from the receiver through the gap created when the frozen content was displaced away from the receptacle bottom (and, potentially, the sidewalls) to accelerate the melting process.

In some embodiments, the injection of liquid into the receptacle is delayed until the supply needle(s) move further into the frozen liquid content of the receptacle under the influence of the spring pressure behind them as the frozen liquid content is softened due to the heating. This action further thaws and/or dilutes the frozen liquid content. In some implementations, the contents controllably flow out the twin T-shaped passageway 1009 of the blunt discharge needle 1000E at this point. In other implementations, the discharge needle is closed along its flow path as shown in FIG. 12A, thereby preventing contents discharge until the supply needle(s) reach a selected deployment depth as shown in FIG. 13C. Likewise, the injection of liquid is delayed, preventing receptacle rupture and/or overflow.

Figure 13D:
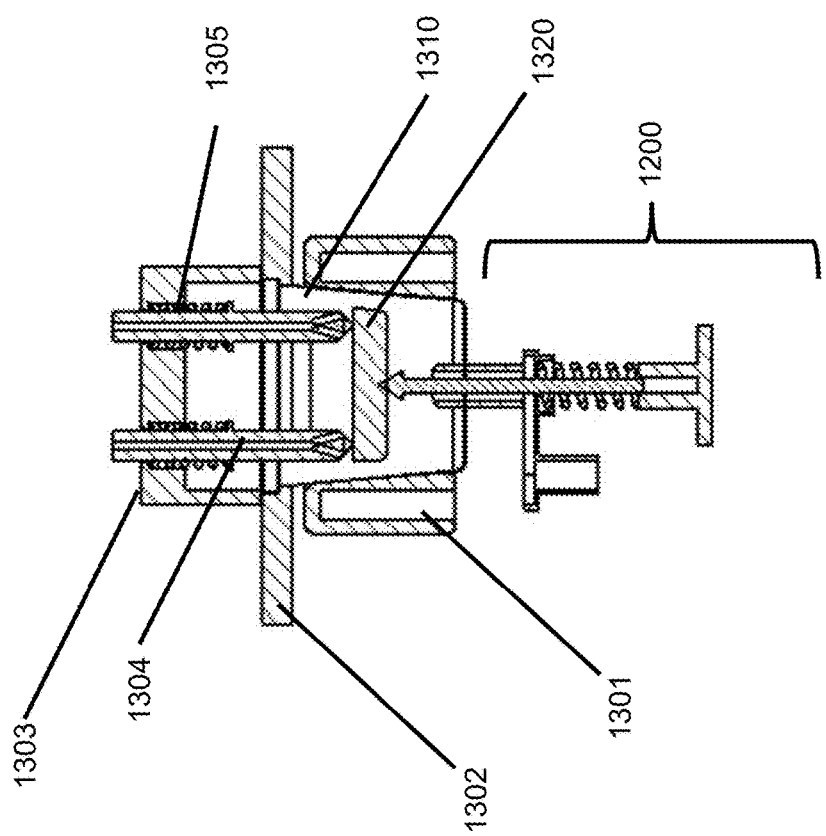

As the dispenser continues to thaw and dilute the frozen liquid content, the supply needle(s) extend fully by spring action to their fully deployed length as shown in FIG. 13D, which stops short of contacting the bottom of the receptacle. The supply needles may supply fluid within a range of temperatures and volumes as required by the food or beverage in the receptacle. In some embodiments, as shown in FIGS. 10C and 10D, these needles 1000C, 1000D have one or two internal passageways that are "L" shaped with an exit orifice that may direct the incoming fluid somewhat tangentially to the sidewall of the receptacle. This geometry is intended to controllably agitate the receptacle's frozen liquid content to provide better mixing, a cleaner spent cup, and to speed thawing through such mechanical agitation. This agitation inside the fixed receptacle can be rotational in any direction, or tumbling in an ever-changing turbulent action, as designed by the needles' outlets and the flow control valves of the dispenser. Moreover, in some embodiments, the liquid is supplied to the supply needles in an alternating fashion to introduce a back and forth motion, a rotational motion, or other turbulent action. Such a liquid supply can be accomplished using a multi-way valve controlled by the dispenser system. Further embodiments include a supply needle with a cruciform cross-sectional shape (e.g., as described elsewhere herein) that engages the top of the frozen liquid contents. The supply needle is motorized and directly agitates the frozen liquid contents inside the receptacle.

Optionally, a locking mechanism keeps the springs compressed until certain criteria are met, e.g., a quantity of heat has been applied to the receptacle to sufficiently soften and liquefy the frozen content such that the needles will penetrate the content. In a further implementation, heat, in the form of gas, liquid, or steam is supplied through the supply needle(s) upon initial deployment. The supply of gas, liquid, or steam is continued until the needle(s) are fully extended or until other criteria are met.

FIGS. 14-31 illustrate a range of embodiments intended to address two types of problems. The first occurs when the hardness of the frozen contents is insufficient and the needle will likely embed into the contents and the contents will clog the needle, or the contents will flex away from the needle without dislodging from the receptacle chamber inner walls. For this situation, one solution is a disc, herein referred to variously as a "platform", a "pusher plate", a "displacement disc", or simply a "disc". The second occurs when there is a high level of adhesion between the frozen contents and the inside walls and bottom of the receptacle.

As noted, for the frozen liquid contents to be displaced by the needle, the frozen liquid contents must be of sufficient hardness (at its temperature when placed into the dispenser/brewer) to prevent the needle from embedding in the frozen liquid contents. If the needle embeds into the frozen liquid contents, the contents are not displaced from the bottom layer of the receptacle, and the exit flow path for the final product formed by the mixing of the frozen liquid contents and incoming liquid is blocked. Similarly, if the frozen liquid content bends at the point of impact of the needle, the frozen liquid contents will not be released from the inner walls of the receptacle chamber. This, too, will result in blockage of the exit flow path. Thus, in certain embodiments of the invention, the frozen liquid content is sufficiently hard that when force is applied to it with a dispenser needle (e.g., a hollow cylindrical needle of about 2.5 mm outer diameter with about a 4 mm long diagonal pointed section), the frozen liquid contents is dislodged from the inner surface of the receptacle rather than the needle embedding into the contents or the contents deflecting away from the needle without dislodging. The illustrative dimensions of the needle given elsewhere is not limiting, as the frozen liquid contents of these embodiments with work with a variety needle dimensions, including those with larger or smaller bores as well as those with non-cylindrical cross-sections.

It is believed that hardness levels of between about 1 and about 6 on the Mohs scale (at between about 0° F. and about 32° F.) provide sufficient hardness to dislodge from the inner surface of the receptacles described herein rather than experience the undesirable effects set forth above. Thus, certain embodiments of the invention have a hardness of between about 1 and 5 on the Mohs scale at between about 0° F. and about 32° F. Other embodiments of the invention have a hardness of between about 1 and 4 on the Mohs scale at between about 0° F. and about 32° F. Still other embodiments of the invention have a hardness of between about 1 and 3 on the Mohs scale at between about 0° F. and about 32° F. Further embodiments of the invention have a hardness of between about 1 and 2 on the Mohs scale at between about 0° F. and about 32° F. Certain embodiments of the invention have a hardness of between about 0.5 and 1.5 on the Mohs scale at between about 0° F. and about 32° F. Other embodiments of the invention have a hardness of between about 1.5 and 2.5 on the Mohs scale at between about 0° F. and about 32° F. Yet further embodiments of the invention have a hardness of between about 0.75 and 1.25 on the Mohs scale at between about 0° F. and about 32° F. In some embodiments, the hardness of the frozen liquid contents is enhanced by the addition of food-grade hardening agents, e.g., thickeners, stabilizers, and emulsifiers. Other examples include guar gum, agars, alginates, carrageenan, gum Arabic, locust bean gum, pectin, sodium carboxymethyl cellulose, various starches, and xanthan gum.

Figure 14A:
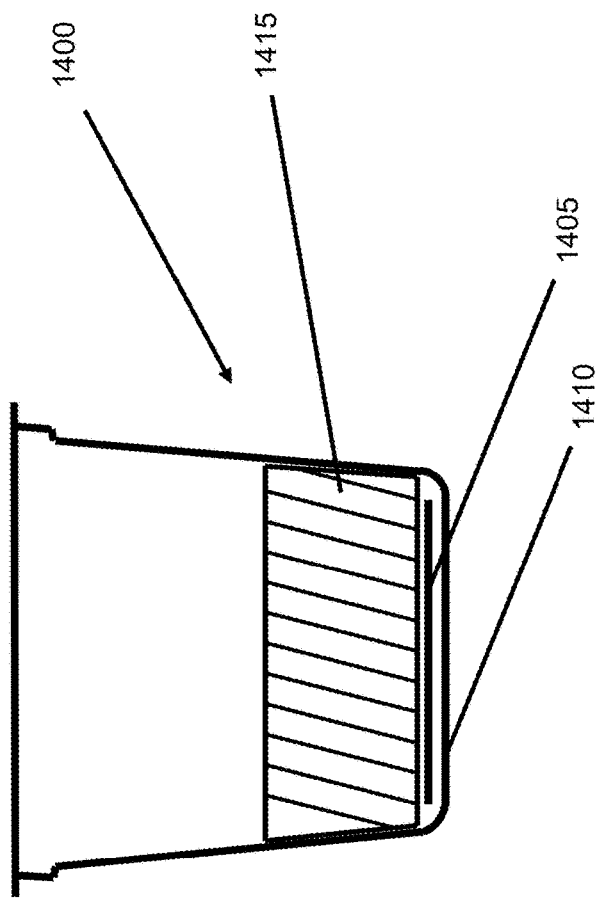
FIG. 14A illustrates a side cross-sectional view of a receptacle with an inner platform, according to some embodiments of the invention.

FIG. 14A illustrates a side cross-section view of a receptacle 1400 with pusher plate 1405. The pusher plate 1405 is located between an end layer 1410 of the receptacle 1400 and a frozen liquid contents 1415. In FIG. 14A, the pusher plate 1405 is shown spaced apart from end layer 1410 and frozen liquid contents 1415. In some embodiments, the pusher plate 1405 rests on and is in contact with the end layer 1410, and the frozen liquid contents 1415 is in contact with the pusher plate 1405 and, optionally, a portion of the end layer 1410.

FIG. 14B illustrates a side cross-sectional view of the receptacle 1400 with the pusher plate 1405 displaced away from the end layer 1410 and supporting the dislodged frozen liquid contents 1415. As shown in the FIG., dispenser/brewer needle 1420 perforates the end layer 1410, but does not perforate pusher plate 1405. Rather, the needle 1420 contacts the pusher plate 1405 and dislodges the frozen liquid contents from the inner surface of the receptacle 1400. Thus, the pusher plate 1405 enables frozen liquid contents to be displaced by a needle that on their own may otherwise lack sufficient hardness to be displaced by the needle. The various platforms described herein may also be used with frozen liquid contents that have sufficient hardness alone to be displaced through contact with a needle. Using a platform inside of the receptacle with a wide range of frozen liquid contents provides uniform displacement behavior. Pusher plate 1405 is, optionally, made from the same material as receptacle 1400 to maintain the receptacle's recyclability (e.g., aluminum), but it may also be made from a different material than the receptacle to enhance its suitability for contact with food or for cost. The pusher plate 1405 can be made harder than end layer 1410 by hardening treatments known in the art, and/or pusher plate 1405 can be made of thicker material than end layer 1410. The platform may be made of a material known to have a higher or lower coefficient of friction than the receptacle material to aid in creating bypass flow around it or thru it.

FIGS. 14A and 14B show the pusher plate 1405 as a flat disc. However, other embodiments include those shown in FIGS. 14C and 14D. FIG. 14C shows a platform 1430 with a scalloped circumference 1435, and FIG. 14D shows a scalloped platform 1440 with an overflow tube 1445. The overflow tube 1445 forms a channel between the space above a frozen liquid contents disposed on the platform 1440 and the space created below the platform when the platform is raised by the dispenser needle (e.g., as in needle 1420 of FIG. 14B) or a compressed gas or liquid. Further details describing the overflow tube 1445 follow below. Still further embodiments include platforms that are slightly concave or convex (relative to the end layer), frusto-conical, corrugated, have stamped convolutions, or possess other non-flat profiles. Such embodiments reduce the likelihood that the platform would adhere to the end layer and/or reduce the likelihood of acting as a barrier to liquid flow through an outlet formed in the end layer. Platforms 1430 and 1440 may be flat or possess any other non-flat profile. Platforms 1430 and 1440 may have smooth edges or scalloped edges as shown in the figure.

Figure 15A:
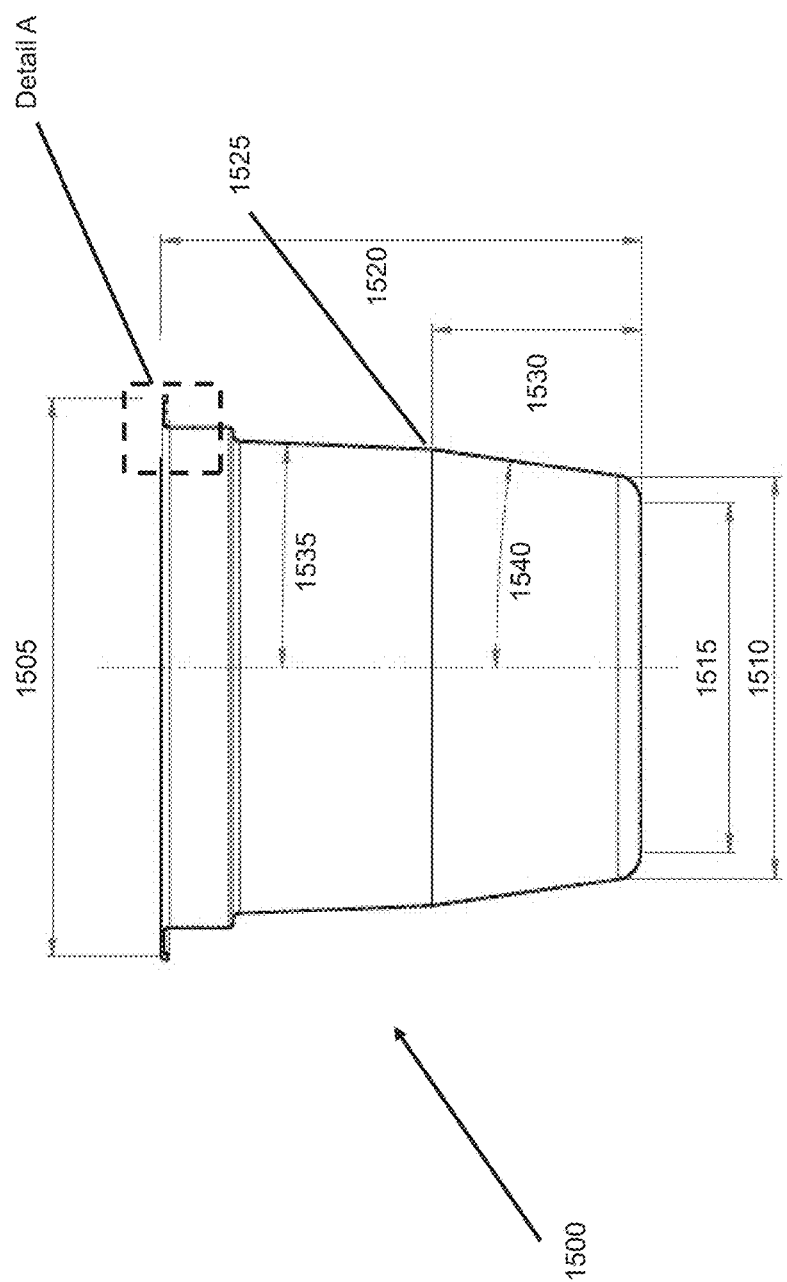
FIG. 15A illustrates a side cross-sectional view of a receptacle, according to some embodiments of the invention.

FIG. 15A shows an embodiment of a receptacle 1500 with a compound draft angle. Receptacle 1500 has a top flange diameter 1505 of about 2.00 inches, a bottom transition diameter 1510 of about 1.44 inches, and an end layer diameter 1515 of about 1.26 inches. Receptacle 1500 has a height 1520 of about 1.72 inches. Receptacle 1500 has a sidewall with a compound draft angle with a transition point 1525 that occurs about 0.75 inches from the end layer (1530). Above the transition point 1525, the draft angle 1535 is about 2.5 degrees, while the draft angle below the transition point 1540 is about 8 degrees. The greater draft angle in the lower portion of the sidewall facilitates release of frozen liquid content that rests on the end layer of the receptacle. Meanwhile, the lower draft angle of the upper section aids in securing the receptacle in a receiver of a dispenser and/or known single serving brewer.

FIG. 15B shows Detail A of the receptacle 1500 of FIG. 15A. This figure illustrates a rolled lip 1545 portion of the flange of the receptacle as well as an indentation 1550 that sits below the highest part of the rolled lip 1545. Certain materials, e.g., aluminum, will retain a sharp edge when machined or stamped. Such an edge can present a safety hazard to users of receptacles having such an edge. Rolled lip 1545 tucks the edge of the flange under the body of the flange, thereby protecting the user from any remaining sharp edges. Meanwhile, indentation 1550 allows a lid to be mounted to the flange body and maintain the top lid surface below the highest part of the rolled lip 1545. The specific sizes set forth above for receptacle 1500 can be varied while maintaining the compound draft angle and remain within the scope of the invention.

FIG. 16 illustrates a side cross-sectional view of a receptacle 1600 with a platform 1605 having an overflow tube 1610. Although platform 1605 is shown as a flat disc, it can be any of the shapes described herein. The receptacle has a flange diameter 1615 of about 2.00 inches and a height 1620 of about 1.72 inches. Receptacle 1600 has a sidewall with a compound draft angle with a transition point 1625 that occurs about 0.75 inches from the end layer (1630). Above the transition point 1625, the draft angle 1635 is about 2.5 degrees, while the draft angle below the transition point 1640 is about 15 degrees. The end layer of the receptacle 1600 has a stepped portion 1645 that accommodates the platform 1605 with little to no space between the outer circumference of the platform 1605 and the step. In the illustrated embodiment, the diameter of the platform 1650 and the stepped feature is about 1.16 inches. The close fit between the platform 1605 and the stepped portion 1645 reduces or prevents liquid contents from settling between the platform 1605 and the end layer 1675 before the contents is frozen, which could increase the amount of force required to dislodge the frozen liquid contents from the inner surface of the receptacle 1600 and allow frozen contents to flow into the bottom of the overflow tube 1610 blocking intended flow during the melting/dispense cycle. The close fit between the platform 1605 and the stepped portion 1645 acts to hold the platform firmly in place during liquid filling and until the liquid contents are frozen.

In other embodiments (not shown), a further stepped region exists below the platform 1605 to create a space between the platform 1605 and the end layer 1675 that is not occupied by frozen liquid contents. This space allows fluid to flow down the overflow tube 1610 and into the space between the platform and end layer to exit the receptacle through a perforation in the end layer.

In FIG. 16, the platform 1605 and overflow tube 1610 are show in cross-hatch to distinguish the platform and overflow tube from the end layer (bottom) 1675 of the receptacle 1600. The overflow tube 1610 is disposed inboard of a point about 0.50 inches from the receptacle center line (1655).

This point is a common entrance point for one or more outflow needles of known single-serving and multi-serving brewers. Thus, when the outlet needle penetrates the end layer of the receptacle, the needle will lift the platform 1605 and frozen liquid contents (not shown) in a manner like that described for the embodiment in FIG. 14B rather than the needle entering the channel of the overflow tube 1610. The top of the overflow tube 1660 is above a nominal fill line 1665 for frozen liquid contents at about 0.50 inches from the top surface of the platform (1670). The specific sizes set forth above for receptacle 1600 can be varied while maintaining the compound draft angle and remain within the scope of the invention.

Figure 17:
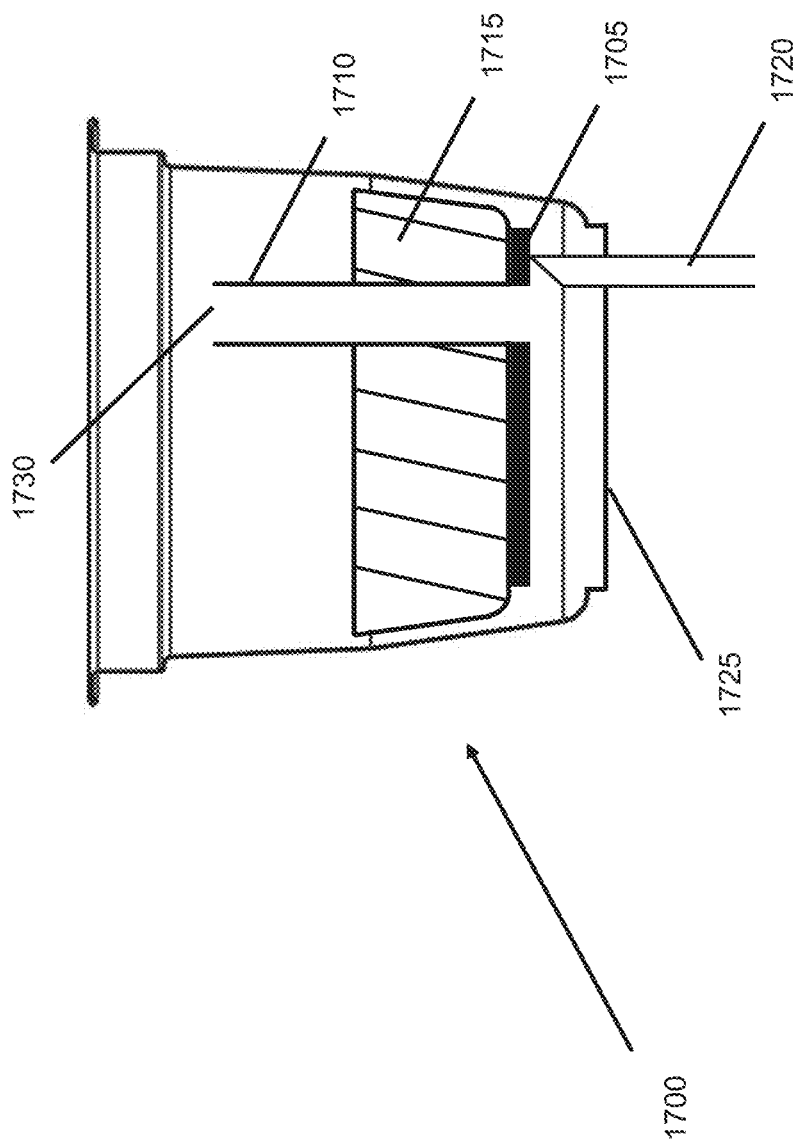
FIG. 17 illustrates a side cross-sectional view of a receptacle with a platform having an overflow tube, according to some embodiments of the invention.

FIG. 17 shows a receptacle 1700 with a platform 1705 and overflow tube 1710; a frozen liquid contents 1715 rests on the top surface of the platform 1705. This figure shows a needle 1720 of a dispenser or known single serving brewer that has penetrated an end layer 1725 of the receptacle 1700 and lifted the platform and frozen liquid contents. The overflow tube 1710 provides an alternate flow path for liquid injected into the receptacle 1700 (e.g., by an inlet needle that perforates a top lid (not shown)) if the flow path around the frozen liquid contents becomes blocked or is insufficient for the incoming liquid flow. Rather than the excess liquid building-up inside the receptacle and overflowing outside the mixing chamber of the receptacle 1700, when the liquid level reaches the top inlet 1730 of the overflow tube 1710, the liquid is channeled to the space below the platform 1705 so it may exit via the needle 1720. During this process, water that is being introduced into the receptacle via a needle penetrating the lid must also be prevented from passing directly into the overflow tube, thereby defeating its purpose of melting and diluting the frozen contents. In certain embodiments, a needle geometry like that shown in FIG. 10C or 10D would be effective at directing the incoming water away from overflow tube 1610 and constructively toward the sidewalls of the receptacle.

Figure 18:
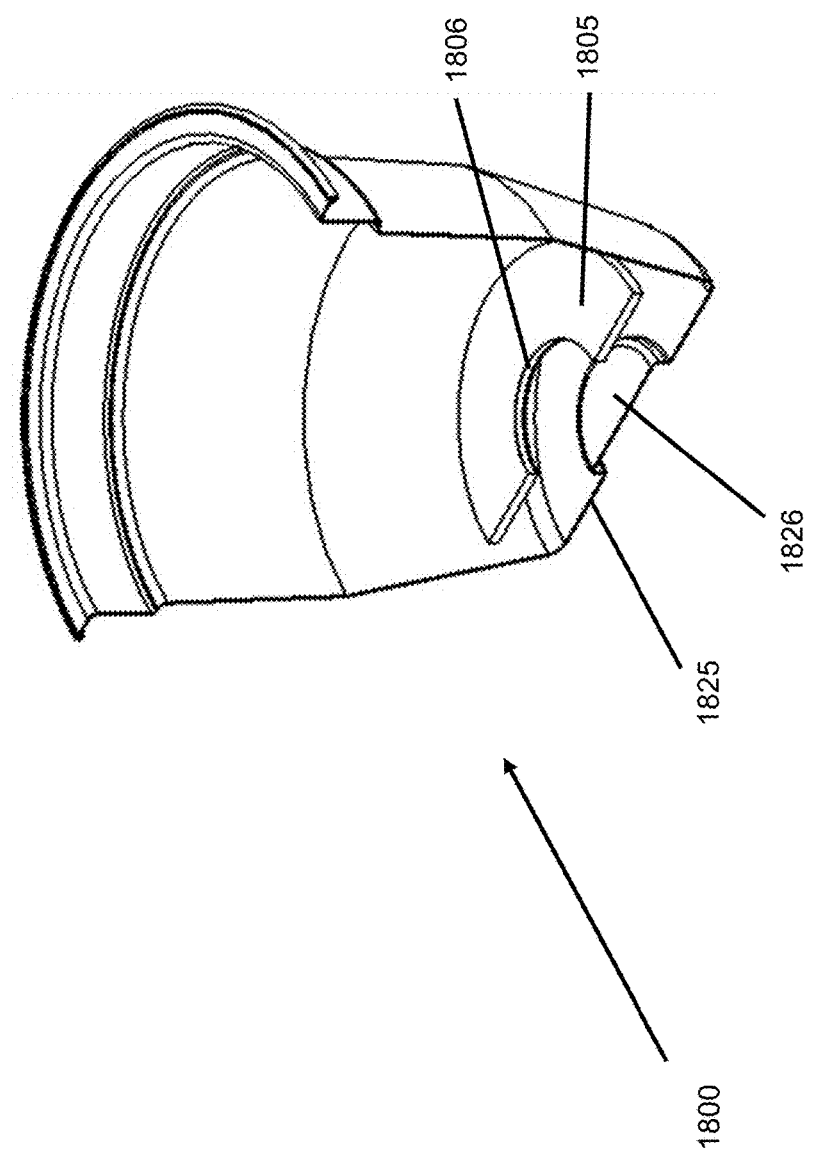
FIG. 18 illustrates a side cross-sectional view of a receptacle with an annular platform designed and sized to fit over a raised protrusion on the end layer of the receptacle, according to some embodiments of the invention.

FIG. 18 illustrates a receptacle 1800 with a raised circular protrusion 1826 (providing a depression 1825) in the end layer and an annular platform 1805 shown in a slightly raised position. This platform is designed and sized such that its center circular opening 1806 fits tightly around the raised protrusion 1826 in the receptacle during normal liquid filling and handling, with the friction created by a light interference fit between the two components holding the platform in place during filling and until the liquid contents have frozen. During use, the needle which penetrates the bottom of the receptacle dislodges the annular platform and helps displace the frozen contents to a second position. This annular shape for the platform serves the secondary function of reducing its weight and, when the platform is made from a different material than the receptacle, allowing the receptacle to be more easily recycled. For example, if a high-density polyethylene (HDPE) platform is used in an aluminum receptacle, the recyclability of the entire assembly may be maintained, without requiring the platform to be separated from the receptacle, if the total percentage of HDPE in the receptacle assembly is kept below a threshold amount. In this embodiment, the size of the annular opening in the platform may be increased to the edge of the needle perforation zone to maximize weight reduction. Alternatively, the disc might be a hybrid design as, for example, a metallic washer shape enclosed in a plastic approved by the FDA for contact with food.

In some implementations, rather than, or in addition to, the interference fit between the platform and the raised protrusion 1826, the platform can have an interference fit between the circumferential edge of the platform and the sidewall of the receptacle. In these implementations, the platform can be any of the embodiments described herein.

Figure 19:
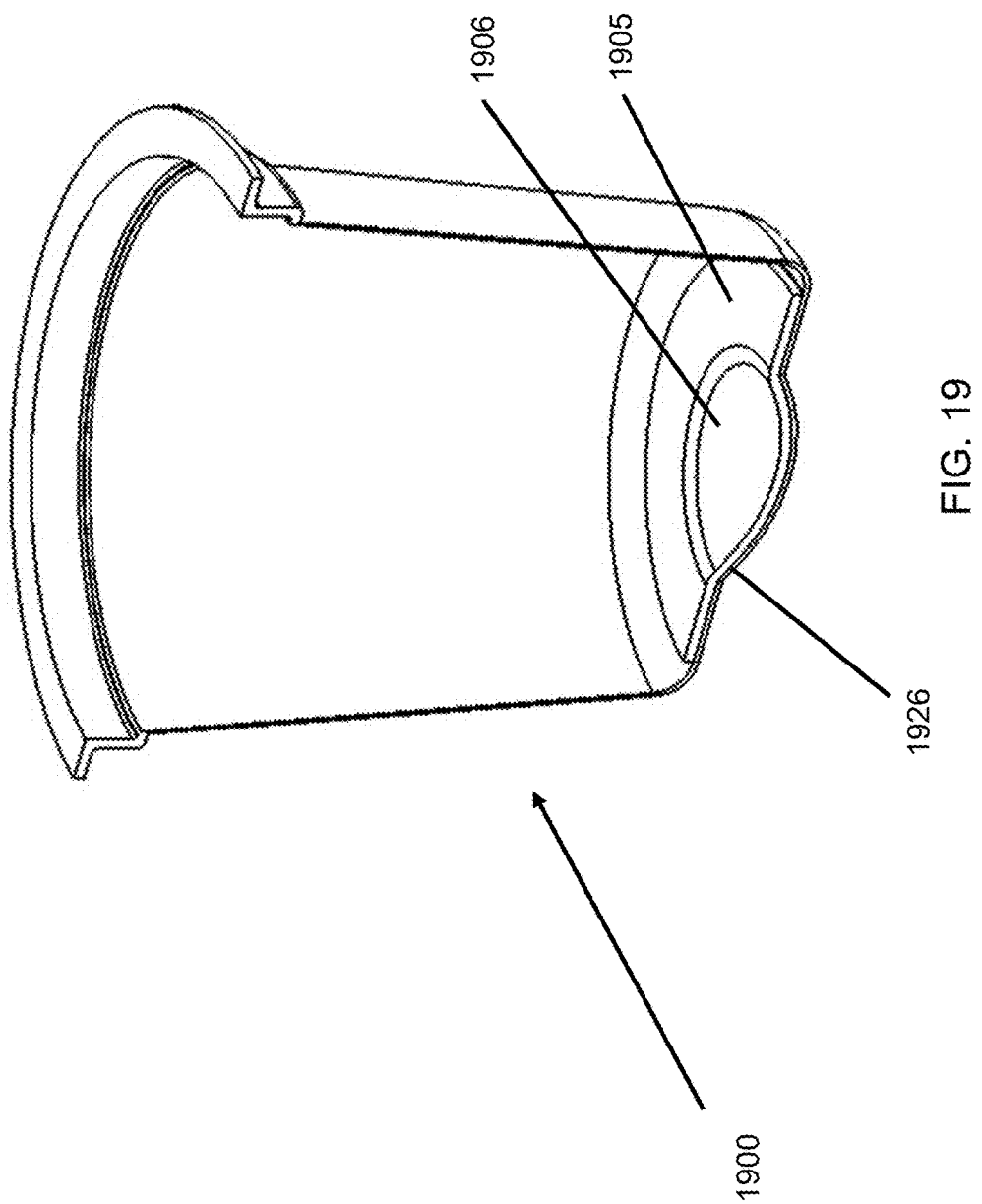
FIG. 19 illustrates a side cross-sectional view of a receptacle with a domed end layer, according to some embodiments of the invention.

FIG. 19 illustrates a receptacle 1900 with a domed end layer 1926 and a matching pusher plate 1905 whose convex surface section 1906 is sized and designed to match the outward extension of the dome in the receptacle. Prior to insertion into a dispensing machine, or as part of the machine operation, the receptacle dome 1926 is intended to be pushed inward where it achieves a new stable position and holds or displaces the frozen contents into a second position with flow paths around its exterior surfaces. The convex surface 1906 of the platform is pushed upward, but does not reverse its position, i.e., does not become concave as seen from the closed end of the receptacle. Thus, in this embodiment the platform supports partially frozen or gummy/flexible contents in this raised position by bearing against the now inwardly protruding receptacle dome on the bottom and carrying the frozen contents above. Needle penetration from the bottom of the receptacle may assist in the displacement of the platform and the frozen contents. And as with other embodiments, the platform prevents the needle from being clogged by the partially frozen contents.

Figures 20A, 20B:
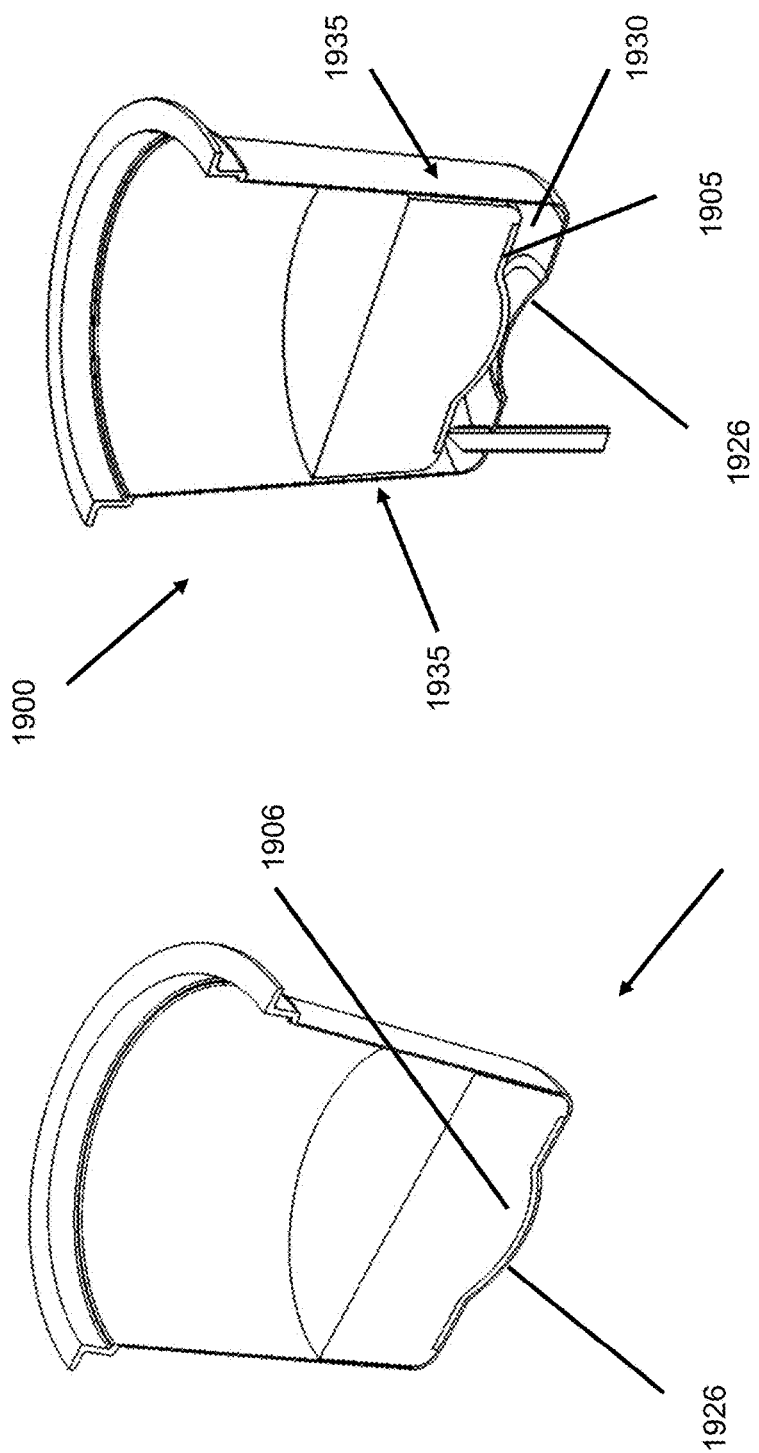
FIGS. 20A and 20B illustrate an operation of a receptacle with a domed end layer, according to some embodiments of the invention.

FIGS. 20A and 20B illustrate the operation of an end dome. More specifically, FIG. 20A illustrates the operation of receptacle 1900 shown in FIG. 19. In its initial position, domed end layer 1926 is in the convex configuration with respect to the outside surface of the receptacle, which conforms to the surface of the pusher plate 1905. In its second position, shown in FIG. 20B, domed end layer 1926 is in the concave configuration. A portion of the concave end layer interferes with the still convex portion of the pusher plate 1905 to create a space 1930 between the bottom surface of pusher plate 1905 and the top surface of the end layer 1926. This interference also creates and maintains flow paths 1935 around the frozen contents that rests upon the top of the platform 1935. Either or both domed sections of the end layer and platform can be bistable.

Figure 21:
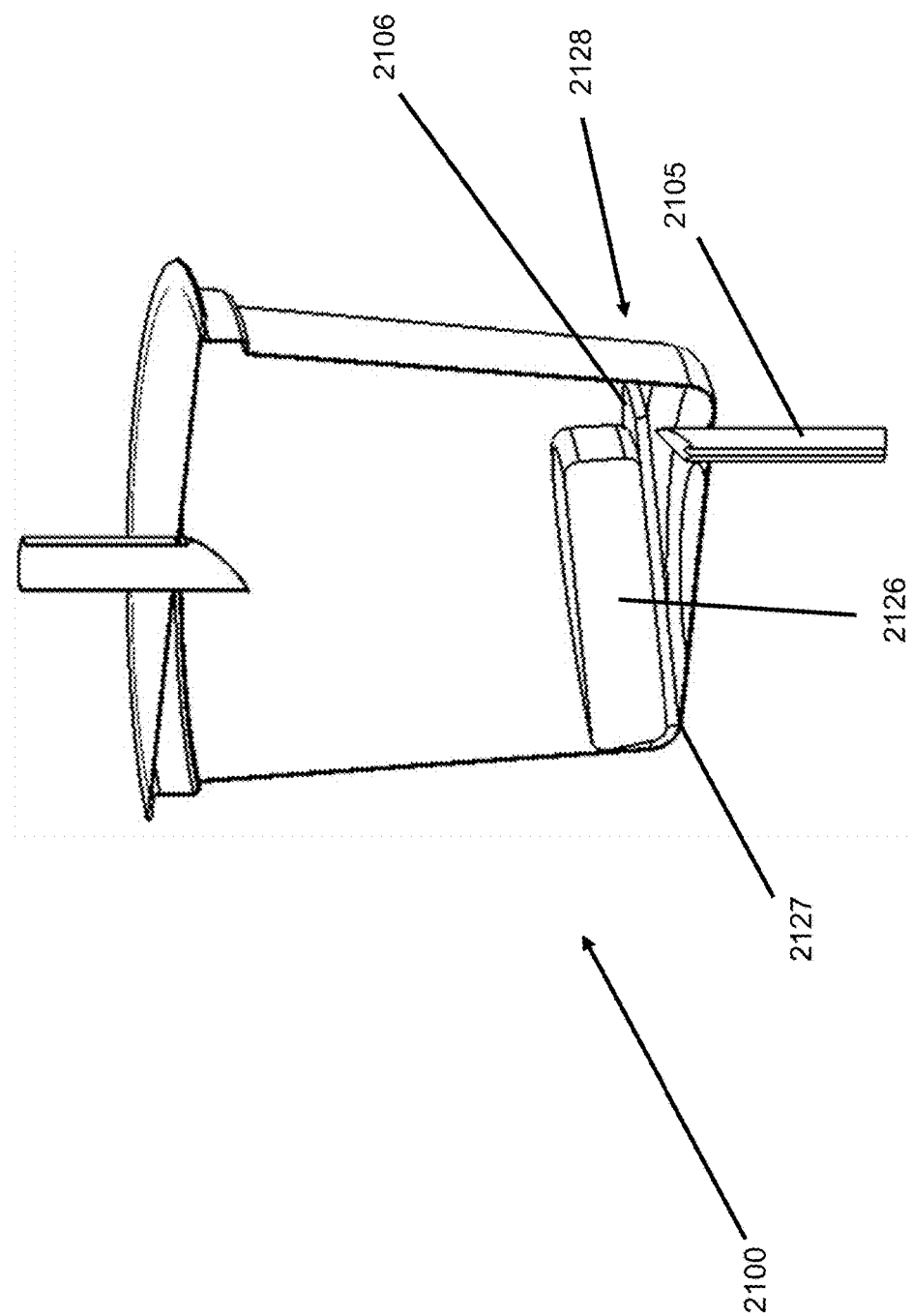
FIG. 21 illustrates a side cross-sectional view of a receptacle with a flat end layer and with partially melted frozen contents, according to some embodiments of the invention.
Figure 22:
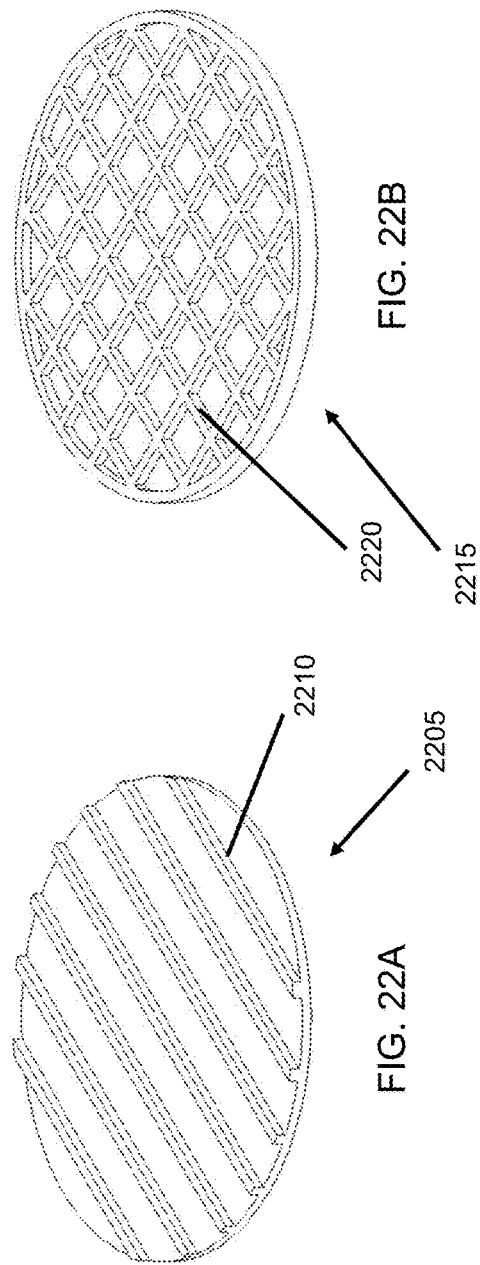
FIGS. 22A-D illustrate various features for increasing the rigidity of a platform for holding frozen contents, according to some embodiments of the invention.

FIG. 21 illustrates a receptacle 2100 with a flat end layer and a flat platform 2106 supporting partially melted frozen contents 2126, held in place by the bottom needle 2105. This figure clearly shows a flow path 2128 around the frozen contents when the platform is raised off the end layer. In this embodiment, the frozen content is seen to have shifted slightly off-center of the platform and coming to rest against the side of the receptacle. In some embodiments, to prevent the platform from moving out of place, the edge 2127 in contact with the end layer is physically attached with a hinge mechanism such as a small spot weld (e.g., to create a living hinge). This embodiment may also require a keying feature such that the bottom needle always penetrates the end layer diametrically opposite the hinge.

FIGS. 22A-22D illustrate some embodiments wherein the pusher plate includes ridges to increase the section moment of inertia of the platform to thereby increase the platform's resistance to deformation.

As shown in FIG. 22A, one such embodiment 2205 includes single direction ridges 2210. Another embodiment 2215, shown in FIG. 22B, includes a cross-hatch pattern 2220. FIG. 22C shows a platform 2225 that includes sandwich structures 2230 with ridges set at perpendicular orientations to provide increased bending stiffness in all directions. A similar effect can be achieved by layering materials having anisotropic rigidity. FIG. 22D shows a platform 2235 that includes radial ridge structures 2240. In some implementations, the ridge height is kept sufficiently low and the ridges are spaced sufficient close together to not interlock with a needle contacting the platform.

In further embodiments, the platform is maintained above the end layer so that some amount of the frozen contents is between the bottom surface of the platform and the top surface of the end layer. In these embodiments, the distance between the bottom surface of the platform and the top surface of the end layer is kept to a maximum such that a needle or other perforator can pass through the frozen contents, contact the platform, and still lift the platform sufficiently to create flow paths around the frozen contents.

FIGS. 23-30 illustrate several other embodiments involving pusher plates, including pusher plate adapted to helping to agitate the frozen liquid contents. This agitation will assist in melting and mixing the frozen contents and the dilution liquid. In certain implementations, a perforator is designed to engage the platform to impart agitation or a stirring action.

Figure 23:
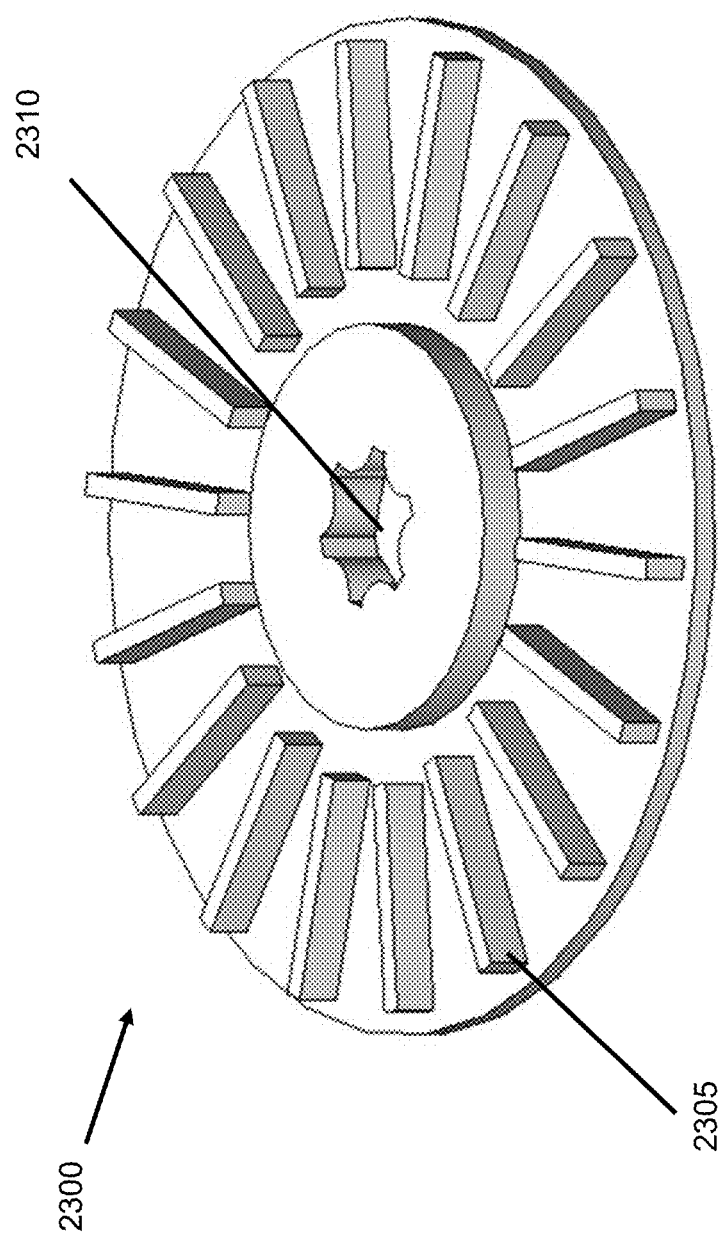
FIG. 23 illustrates a platform with mixing tabs protruding from the surface of the platform, according to some embodiments of the invention.

FIG. 23 illustrates one embodiment wherein the top surface of a platform 2300 may have "tabs" 2305 that extend perpendicular to the top surface of the platform. Platform 2300 also has a keyed opening 2310 along its central axis. Keyed opening 2310 is shown in the figure as passing through the entire platform, however, in some embodiments, the opening is closed on the top surface of the platform that is in contact with the frozen liquid contents to prevent frozen contents from filling the opening.

Figure 24:
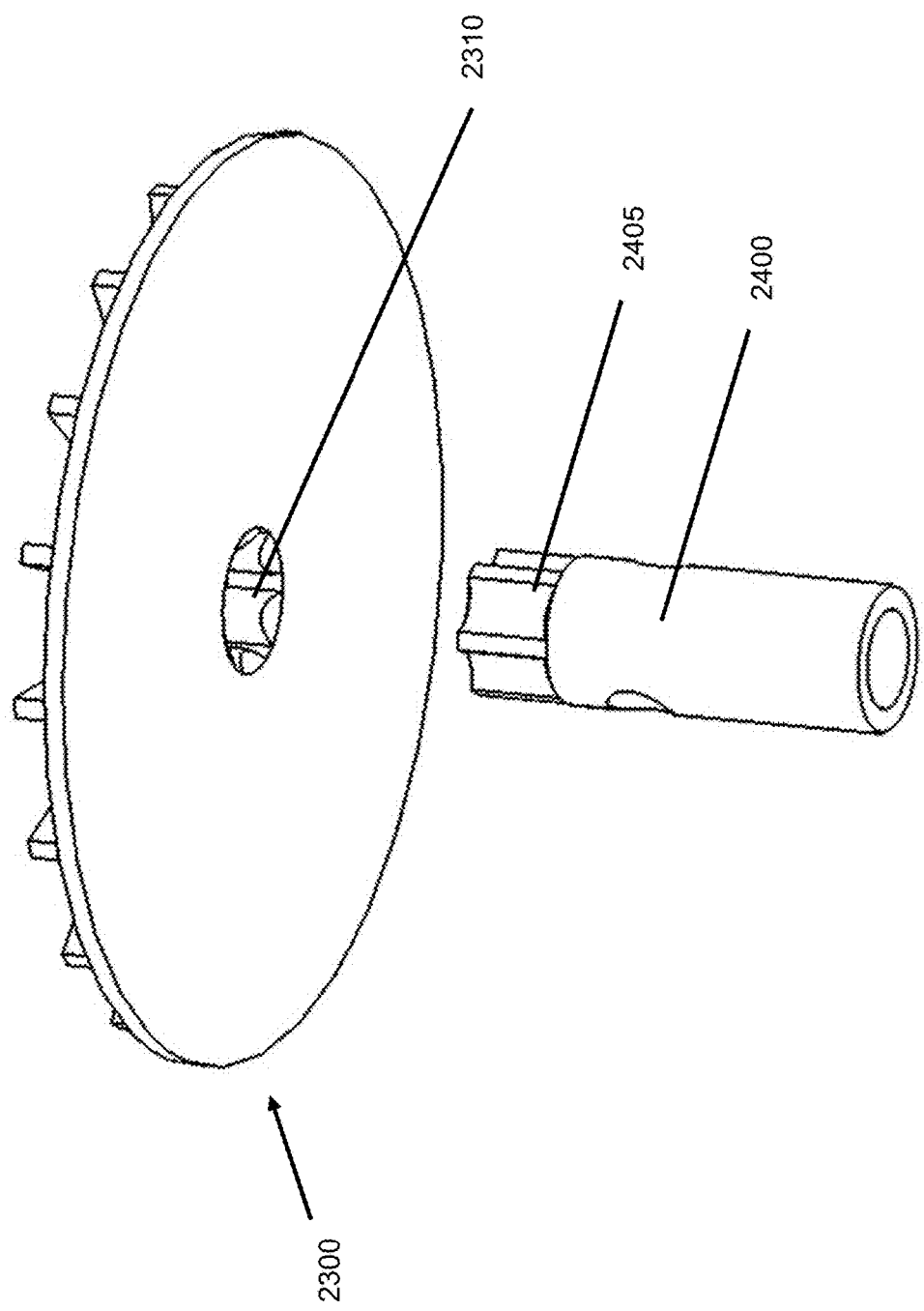
FIG. 24 illustrates an underside view of a frozen content mixing platform preparing to engage a perforator, according to some embodiments of the invention.

FIG. 24 shows an underside view of the platform 2300. A perforator 2400 has a keyed portion 2405 that has a shape that is complementary to keyed opening 2310 of the platform.

Figure 25:
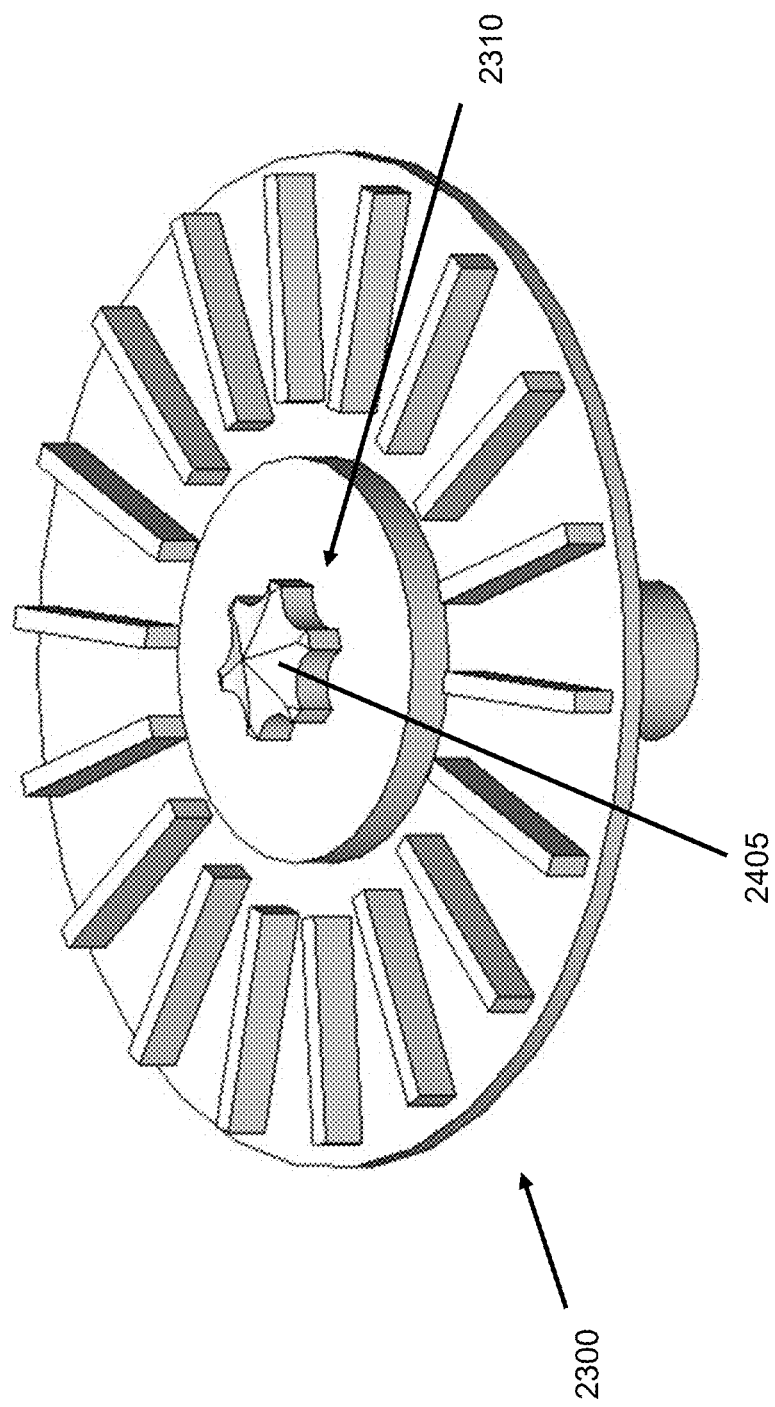
FIG. 25 illustrates engagement between a perforator and a frozen content mixing platform, according to some embodiments of the invention.

FIG. 25 shows the keyed portion 2405 of the perforator engaged with the keyed opening feature 2310 of the platform 2300. This allows the perforator to impart a spinning, reciprocal, or other agitating motion to the platform by way of a drive mechanism such that the perforator spins the platform and frozen contents within the receptacle.

Figure 26:
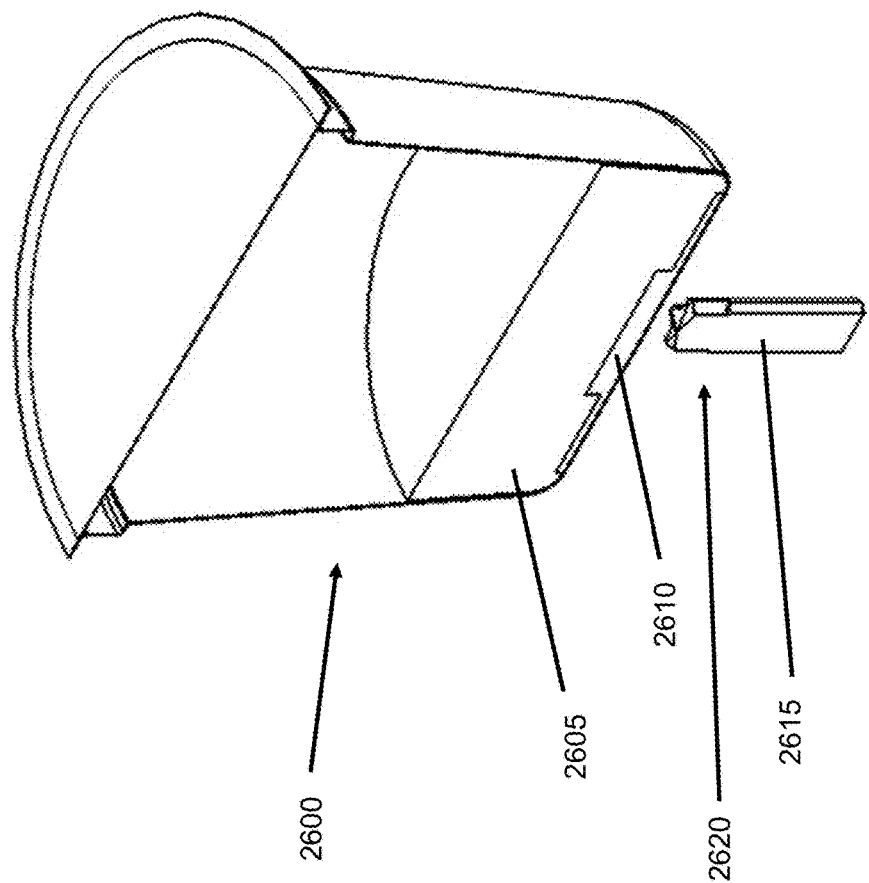
FIG. 26 illustrates a perforator outside of a receptacle preparing to engage a frozen content lifting platform within the receptacle, according to some embodiments of the invention.

FIG. 26 shows a cross-sectional view of a receptacle 2600 with a frozen liquid contents 2605 disposed on a platform 2610 that has tabs and a keyed opening, as described above. The figure shows a perforator 2615 with a keyed portion 2620 positioned to perforate an end layer of the receptacle 2600.

Figure 27:
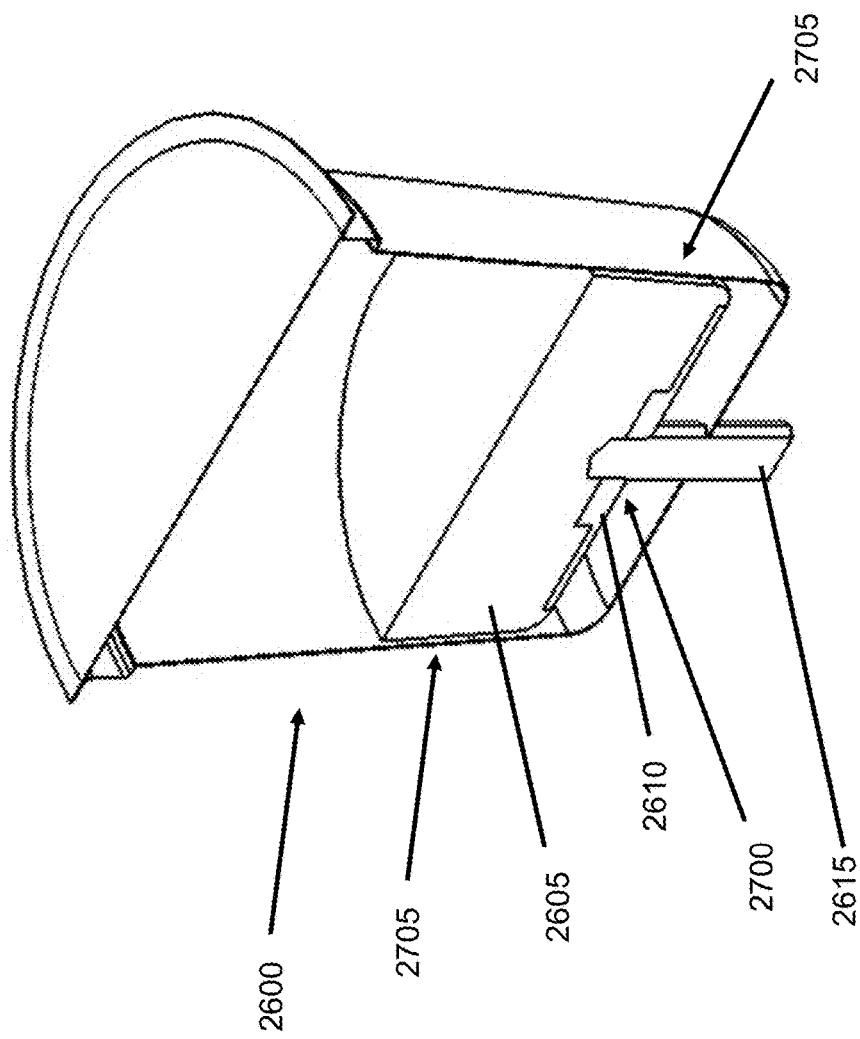
FIG. 27 illustrates engagement between a perforator and a frozen content mixing platform, according to some embodiments of the invention.

FIG. 27 shows a cross-section view of the receptacle 2600, with frozen liquid contents 2605, disposed on platform 2610. Perforator 2615 has perforated the end layer of the receptacle and engaged the platform via the keyed opening of the platform and keyed portion of the perforator 2700. The perforator 2615 has raised the platform 2610 and frozen liquid contents 2605 to create space between the platform and end layer as well as to create flow paths around the frozen liquid contents 2705. When the receptacle 2600 and/or platform 2610 are rotated about its central axis by the perforator 2615, the tabs encourage the frozen contents 2605 to spin with the receptacle. As the frozen contents releases from the platform and liquid covers the top surface of the platform, the tabs introduce turbulence in the liquid and encourage mixing of still frozen portions of the frozen contents and the liquid in the receptacle.

Figure 28:
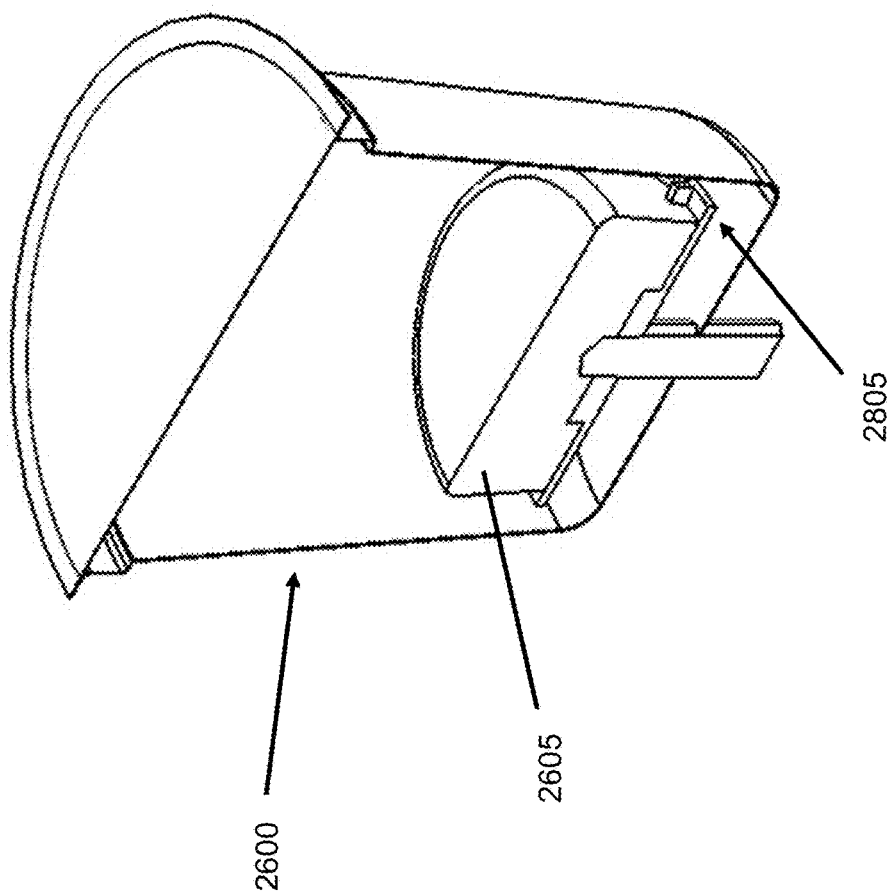
FIG. 28 illustrates partial melting of a frozen content disposed on a frozen content mixing platform, according to some embodiments of the invention.

FIG. 28 shows receptacle 2600 of FIG. 27 after some of the frozen liquid contents 2605 has melted, exposing a portion of tabs 2805 embedded in the frozen contents.

FIG. 29A shows a perforator 2900 with an opening 2905 along the length of the perforator. Opening 2905 communicates with one or more lumens in the perforator (not shown) to allow liquid to exit the receptacle via an opening 2910 at the base of the perforator 2900 that communicated with the lumen(s). Similarly, FIG. 29B shows a perforator 2920 that has channels 2925 on the outside of the perforator to enable liquid to exit the receptacles along the channels.

Figure 30B:
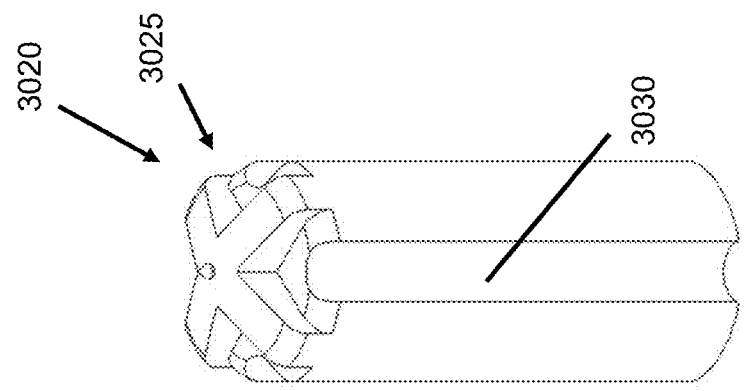
FIGS. 30A-D illustrate various perforators having channels or shapes to permit liquid flow through or past the perforator, according to some embodiments of the invention.
Figure 30A:
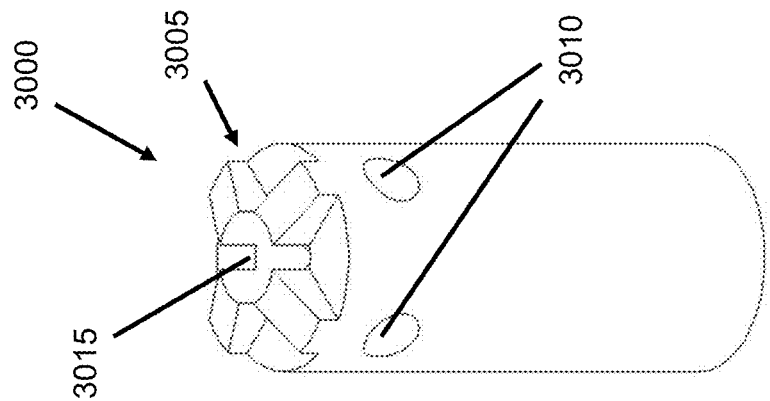

FIG. 30A shows a perforator 3000 that has a cruciform keyed portion 3005, side openings 3010, and a top opening 3015. Side openings 3010 and top opening 3015 communicate with a central lumen that passes through the perforator to a base of the perforator.

FIG. 30B shows a perforator 3020 that also has a cruciform keyed portion 3025. Perforator 3020 has channels 3030 along the outside surface of the perforator.

Figure 30D:
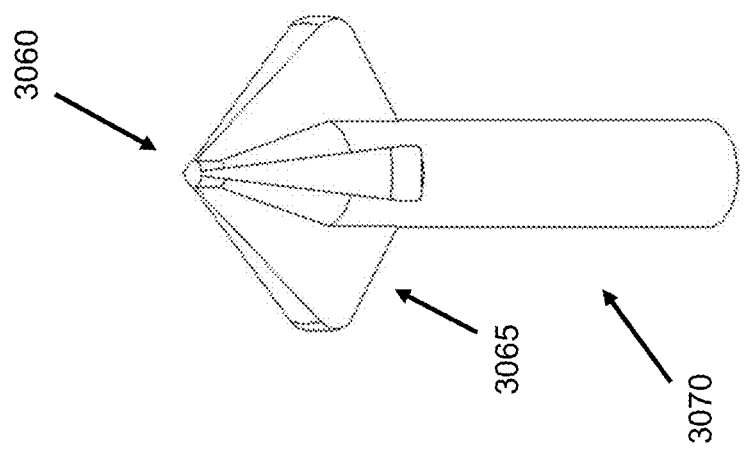
Figure 30C:
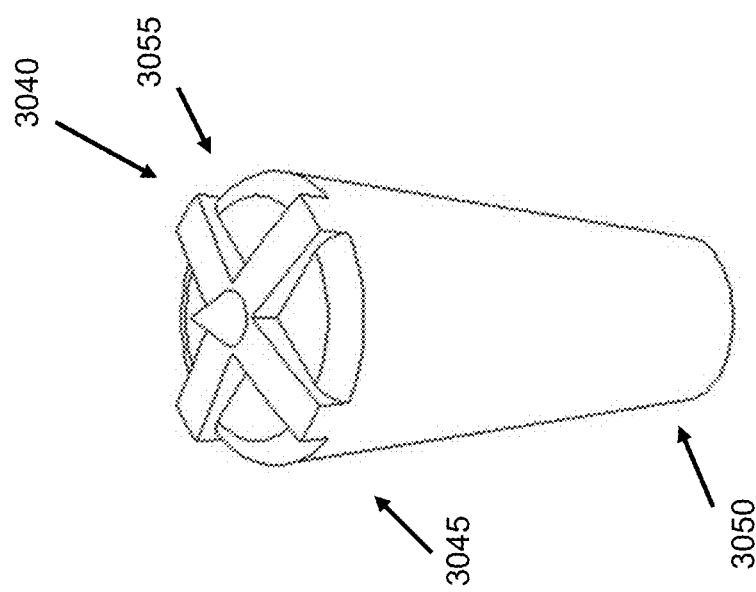

FIG. 30C shows a tapered perforator 3040 with a greater dimension at its distal end 3045 relative to the dimension at its proximate end 3050. Perforator 3040 also has a cruciform keyed portion 3055. Such a perforator would create a hole in an end layer of a receptacle that is larger than the proximate portion of the perforator, thereby leaving a flow path around the perforator for liquid to exit the receptacle.

FIG. 30D shows a perforator 3060 that has a cruciform head portion 3065 that has a larger dimension than a stem portion 3070. The head portion 3065 creates a perforation that is larger than the stem's diameter, creating a flow path for liquid to exit a receptacle. The cruciform portions of the above described perforators are designed to engage cruciform-shaped opening in platforms.

Figure 31:
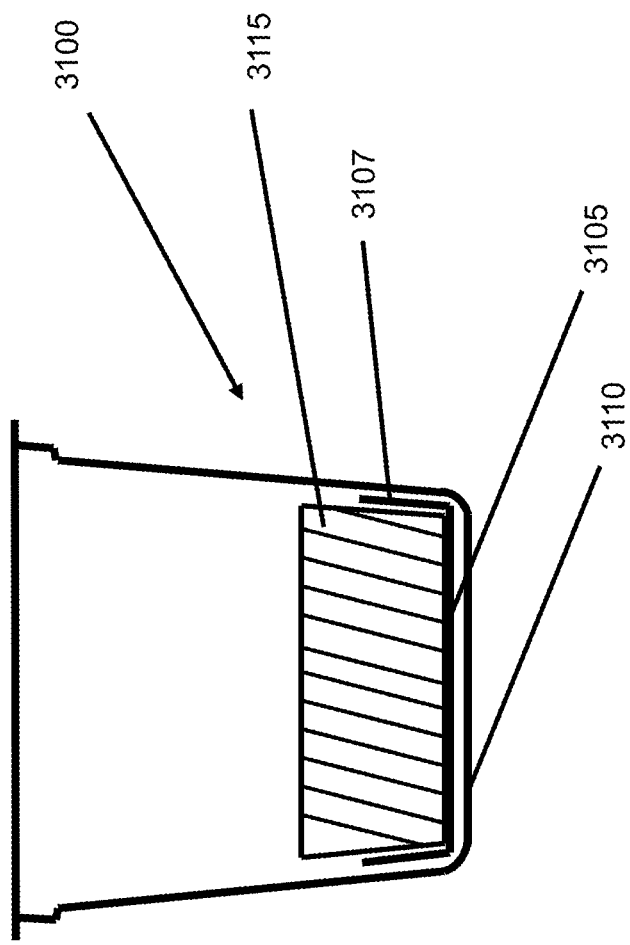
FIG. 31 illustrates a side cross-sectional view of a receptacle with a raised lip, according to some embodiments of the invention.

FIG. 31 illustrates a side cross-section view of a receptacle 3100 with an pusher plate 3105 that is in the form of a cup with a raised lip 3107. Raised lip 3107 is shown spaced apart from frozen liquid contents 3115 and the side wall of the receptacle for illustration purposes only. In the envisioned embodiments, the raised lip 3107 may contact the receptacle side wall or be spaced apart. Moreover, the frozen liquid contents may contact the interior of the raised lip 3107. Raised lip 3107 may extend only partially along the side of the frozen contents, or the raised lip may extend to the top of the frozen contents or beyond. The pusher plate 3105 is located between an end layer 3110 of the receptacle 3100 and the frozen liquid contents 3115. The pusher plate 3105 is shown spaced apart from end layer 3110 and frozen liquid contents 3115. In some embodiments, the pusher plate 3105 rests on and is in contact with the end layer 3110, and the frozen liquid contents 3115 is in contact with the pusher plate 3105 and, optionally, a portion of the end layer 3110. In some implementations, the raised lip 3107 has an interference fit with the side wall of the receptacle, while still enabling the platform to be displaced from its position near the end layer. In some embodiments, the material of the pusher plate 3105 and/or raised lip 3107 is perforated to enable any liquid remaining in the space defined by the platform and raised lip to drain.

Figure 32:
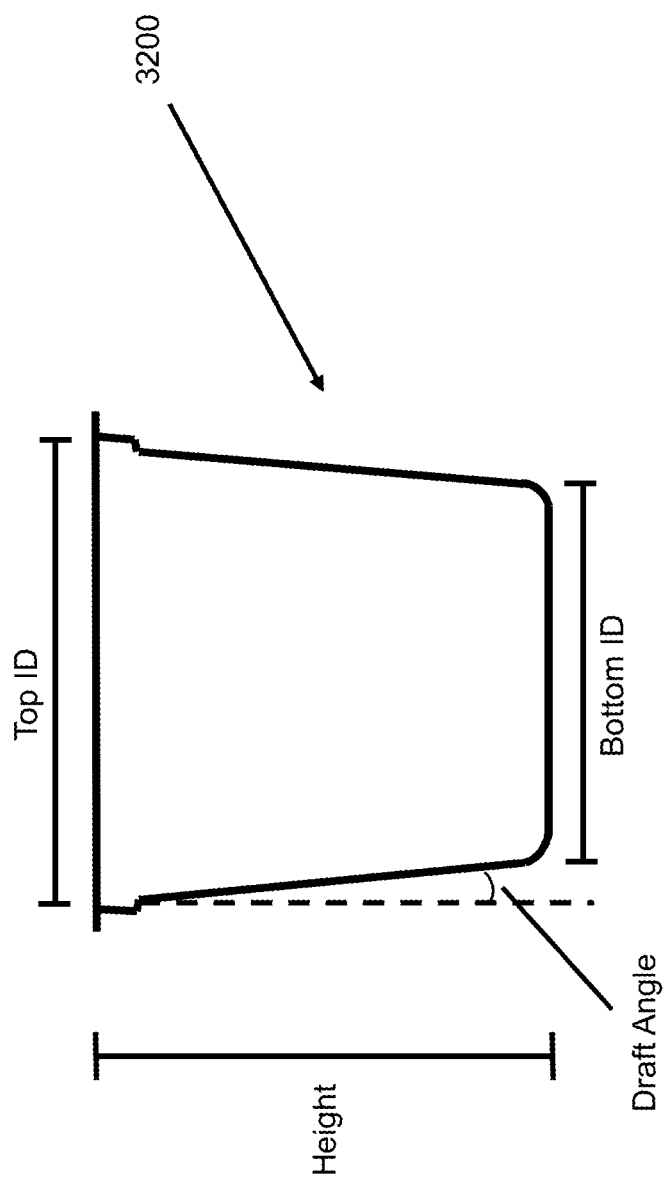
FIG. 32 illustrates a side cross-sectional view of a receptacle, according to some embodiments of the invention.

FIG. 32 illustrates an embodiment for a receptacle geometry similar, but somewhat different to that shown in FIG. 16. In various embodiments of the receptacle 3200 in FIG. 32, the tapered cylindrical profiles have a height ranging from 1.65 inches to 1.80 inches, top inner diameters (top ID) ranging from 1.65 inches to 2.00 inches, draft angles ranging from 4 to 6 degrees, and bottom inner diameters (bottom ID) ranging from 1.30 inches to 1.75 inches (while maintaining the draft angle within the recited range.) In certain embodiments, the height ranges from 1.70 inches to 1.75 inches, the top ID ranges from 1.70 inches to 1.95 inches, the draft angle ranges from 4 to 6 degrees, and the bottom ID ranges from 1.35 inches to 1.70 inches (while maintaining the draft angle within the recited range.) In other embodiments, the height ranges from 1.65 inches to 1.80 inches, the top ID ranges from 1.75 inches to 1.90 inches, the draft angle ranges from 4 to 6 degrees, and the bottom ID ranges from 1.40 inches to 1.65 inches (while maintaining the draft angle within the recited range.) In still further embodiments, the height ranges from 1.65 inches to 1.80 inches, the top ID ranges from 1.80 inches to 1.90 inches, the draft angle ranges from 4 to 6 degrees, and the bottom ID ranges from 1.45 inches to 1.60 inches (while maintaining the draft angle within the recited range.) In one embodiment, the height is about 1.72 inches, the top ID is about 1.80 inches, the draft angle is about 5 degrees, and the bottom ID is about 1.45 inches. Other ranges of these parameters are within the scope of the invention.

Figure 33:
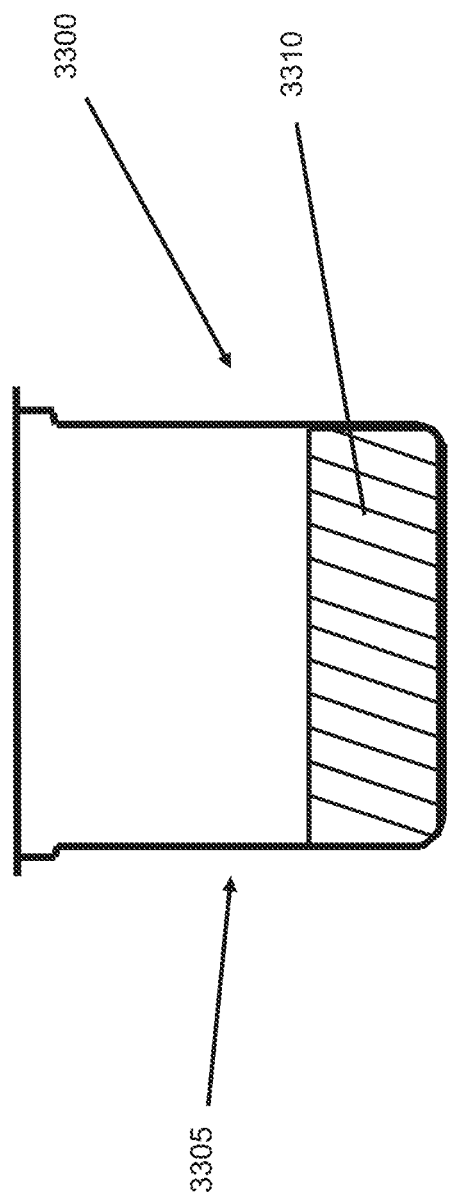
FIG. 33 illustrates a side cross-sectional view of a receptacle, according to some embodiments of the invention.

FIG. 33, in contrast to the profile shown in FIG. 32, shows a cross-sectional view of a receptacle 3300 with straight sidewalls 3305 that have a uniform diameter from the top end to the bottom end of the receptacle. Embodiments having straight sidewalls can incorporate any of the various platform features described above. When using such embodiments to create a final food or beverage product, a dispenser can at least partially melt the frozen contents 3310 to provide a flow path from an inlet near the top of the receptacle, past the frozen contents, to an outlet near the bottom of the receptacle. Profiles of this straight cylindrical geometry are well known in the container manufacturing industry and would employ fabrication technologies similar to those used for manufacturing soda cans.

FIG. 34 shows a cross-sectional side view of a receptacle 3400 with a first straight sidewall section 3405 and a second straight sidewall section 3410. First sidewall section 3405 has a smaller diameter than second sidewall section 3410 such that when the frozen content 3415 is displaced, e.g., by an outlet perforator, a flow path through the receptacle is created. A platform with a raised lip, such as the embodiment shown in FIG. 31, can be used with receptacle 3400 to assist in displacing the frozen contents from the first sidewall section 3405 as described in more detail above. In such an embodiment, the raised lip of the platform can conform to the lower straight sidewall section 3405, or the raised lip of the platform can be displaced from the inner surface of the sidewall.

As generally used herein, the "back end" of the dispenser is the set of equipment, sensors, controls, etc. needed to store, optionally heat, and deliver metered amounts of water during set periods of time, depending on the product being dispensed. The "front end" of the dispenser is the set of equipment, sensors, controls, etc. needed to hold the receptacle, apply secondary heat, agitate, and inject and drain dilution liquid.

FIGS. 35A, 35B, 36A and 36B illustrate two different embodiments of portions of a dispenser for creating liquid food and beverage products. As noted above, portions of the dispenser include equipment, sensors, controls, etc. needed to store, optionally heat, and deliver liquid to a dispenser head (an inlet to supply liquid into a receptacle) as metered amounts of liquid in a set periods of time depending on the product being dispensed. In the following examples, water is used as the dilution liquid. A metered amount of water within a set temperature range is passed into the dispenser head in either continuous flow, pulsed or separated into volumes of water between air pulses. After the dispensing, air is blown through the lines to the dispenser head to purge the air/water lines and deal with residual water, thereby reducing sanitation issues. These two embodiments differ in the way they use pumps and diverter valves to accomplish the same objective.

FIGS. 35A and 35B represent one embodiment in which separate fluid pumps 3551 and 3552, and separate air pumps 3521 and 3522, are used to route the dilution fluid (e.g., water) from the primary storage reservoir 3510 either through the heater 3530 or directly to the dispenser head via Transfer Point A 3570 through a flow path without a heater (3540 and 3560). This solution does not include any diverter valves.

FIG. 35A illustrates the case in which fluid pump 3551 and air pump 3521 are active, taking fluid from reservoir 3510 and pumping it through heater 3530 such that the fluid arrives at the transfer point A at some temperature greater than that in the reservoir. Air pump 3521, when activated, purges the heater 3530 and the air lines leading to point A 3570.

FIG. 35B illustrates the case in which fluid pump 3552 and air pump 3522 are active, taking fluid from reservoir 3510 and delivering it to point A 3570 at the same temperature as while stored in the reservoir 3510. In some embodiments, it is possible to combine the operations shown in FIGS. 35A and 35B at different times during the product generation/dispense cycle such that the final beverage temperature can be tailored to meet the users expectation. As an example, for a cold beverage selection such as orange juice, it may be desirable to dispense a small amount of hot water at the beginning of the cycle to slightly warm the frozen contents in the receptacle and create a clear exit path for fluids to the receptacle exit. Then, to avoid producing an overly warm beverage, the balance of the dispense cycle is conducted using ambient temperature water directly from the reservoir with the expectation that this water will be somewhat cooled by the process of melting the remaining frozen contents in the receptacle. The air pumps 3521 and 3522 can be activated during dispense of water to increase cavitation/turbulence in the receptacle. Once the dispense cycle is complete, at least through the point that the consumer removes the beverage from the dispenser, a final portion of hot water may be passed through the system to clean various components in the dispenser head. This cleaning purge of hot water could then be followed by short air purges from both air pumps 3521 and 3522 to clear the lines. In some embodiments, this cleaning water is directed to a drip tray where it either evaporates or is periodically emptied by the user.

Figure 36B:
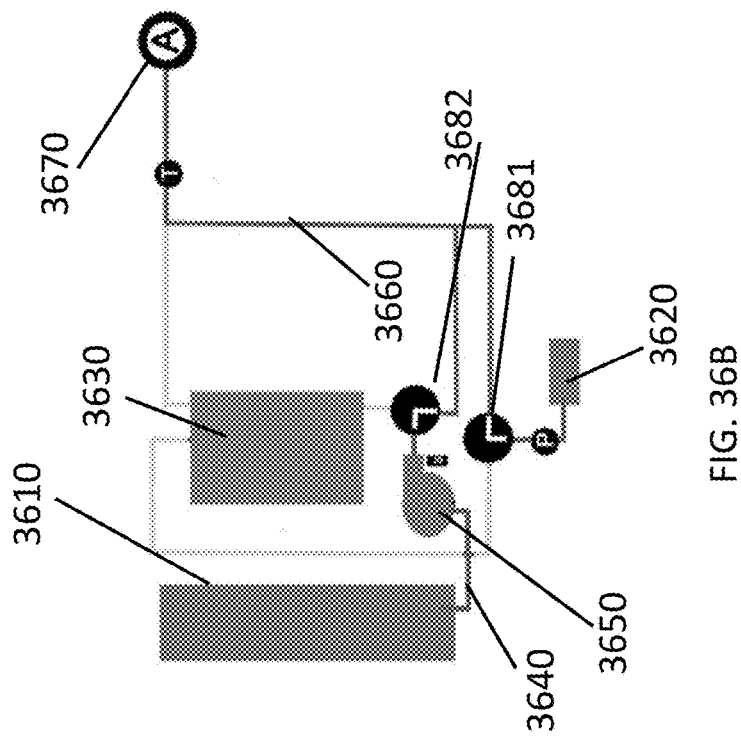
FIGS. 36A-B illustrate portions of the back end of a dispenser system, according to some embodiments of the invention.
Figure 36A:
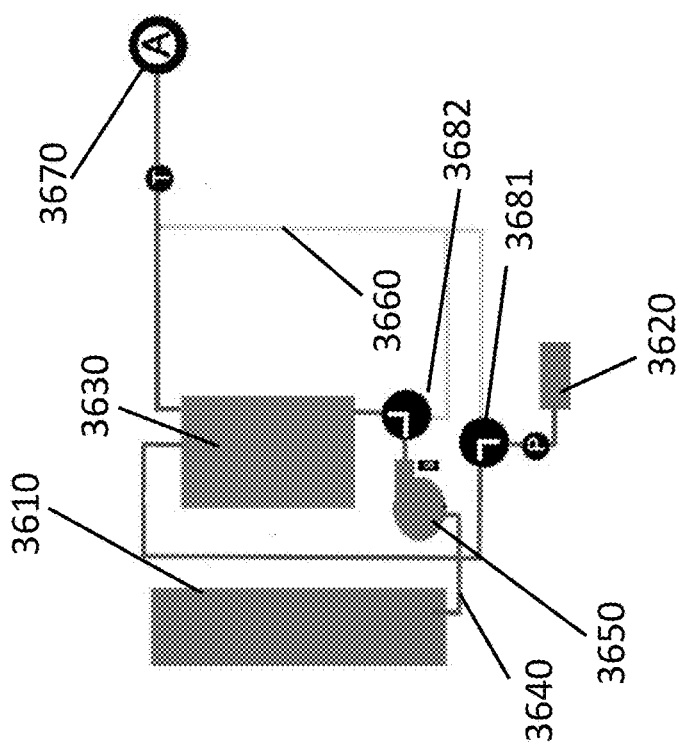
Figure 38D:
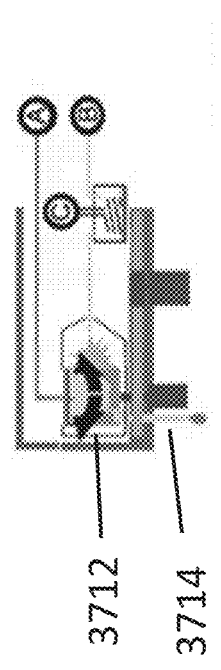
Figure 38E:
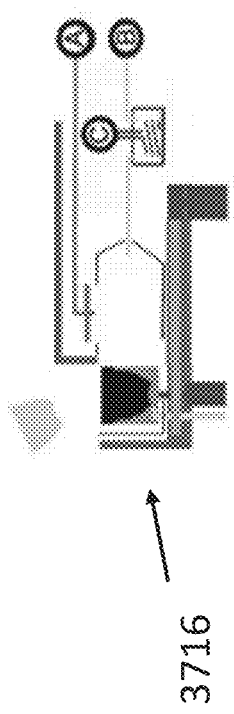
Figure 39D:
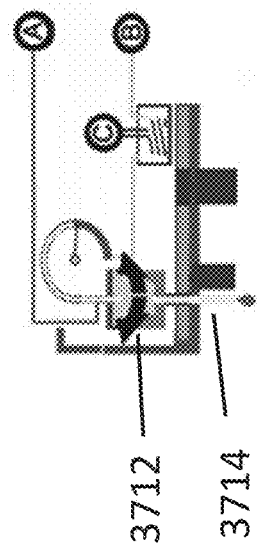
Figure 39E:
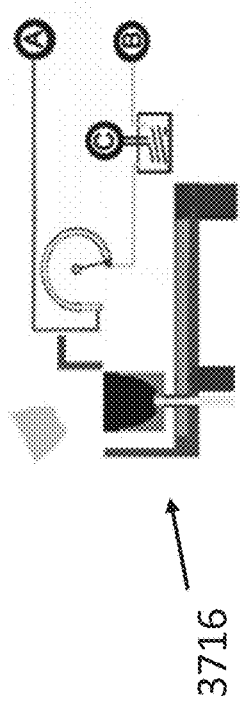
Figure 42D:
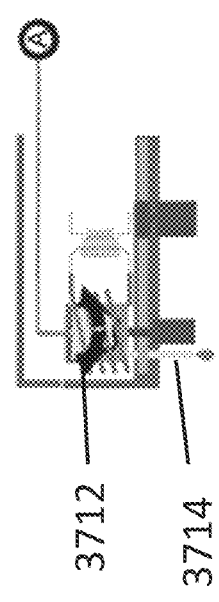
Figure 42E:
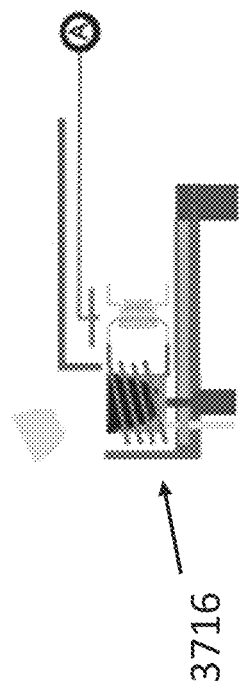

FIGS. 36A and 36B represent a different embodiment in which only one fluid pump 3650 and one air pump 3620 are used with diverting valves 3681 and 3682 employed to control whether the fluids go through the heater 3630 or directly to the transfer point 3670.

FIG. 36A illustrates a case where diverting valve 3682 is configured to divert fluid from the reservoir 3610 to heater 3630 and on to Transfer Point A, item 3670. Meanwhile, diverting valve 3681 is also configured to send air to heater 3630.

FIG. 36B illustrates a case where diverting valve 3682 is configured to divert fluid from the reservoir 3610 directly to Transfer Point A 3670 by way of a separate flow path lacking a heater (3640 and 3660). Meanwhile, diverting valve 3681 is also configured to send air to directly to Transfer Point A 3670.

For some embodiments, reservoir 3510 contains an unheated fluid that may be at ambient/room temperature or may contain a chilled fluid, even one such as water containing ice cubes. (This temperature in the reservoir may alternatively be described as the "ambient temperature" or "room temperature." While some incidental heating may occur as the result of passive contact with warmer temperatures in the dispenser housing as the water from the reservoir flows through various tubing, the intent is to minimally heat the fluid during cold dispense operations to yield the lowest possible dispensed beverage temperature.) For some embodiments where warmer or hotter water is needed at the dispenser head, some supplemental heating of the dilution fluid drawn from the reservoir is needed. For some embodiments, heater 3530 is an electrically heated vessel like those well known in the art for quickly heating small volumes of fluids. Heater 3530 may or may not be pressure rated and suitable for creating steam instead of hot liquid water. In some implementations, reservoir 3510 is insulated from heater 3530, e.g., to prevent the heater 3530 from heating the liquid in reservoir 3510. Although not shown, certain implementations of the dispensers include a filter disposed in the flow path of liquid exiting the reservoir. Similarly, a water conditioner, e.g., a water softening device, or a filter, including an activated carbon filter, can be included in the flow path of liquid exiting the reservoir. In some embodiments, the reservoir is removable. Unlike a brewer, where some level of hardness is desired to enhance extraction of certain dissolvable solids in coffee and high levels of filtration may be counterproductive, here a very efficient filter may be desirable to remove any compounds in the supplied water that may detract from the taste of the melted and diluted extract.

For some embodiments, pumps 3551 and 3552 are constant displacement pumps, e.g., piston pumps or peristaltic pumps or even dual lobe pumps. For some embodiments, pumps 3551 and 3552 are combined with a flow sensor for measuring and controlling the rate of flow as well as the absolute volume of the flow. Any of these pumps can be an axial or centrifugal pump that does not pump a constant volume over time or per revolution, but instead are controlled in a closed-loop process to deliver a measured amount of fluid as measured by a flow sensor. In some embodiments valves 3681 and 3682 are 3-way ball valves well known in the art. In some embodiments valves 3681 and 3682 are multi-port solenoid valves also well known in the art. In some embodiments valves 3681 and 3682 are motorized compression valves. In some embodiments pressure sensors 3580 and 3582, temperature sensor 3590 and stroke sensors for some pumps 3595 and 3597 are used to provide system performance information back to the controller for use in various feedback algorithms to keep the system operating as required to dispense a fluid in the right volume and at a preferred temperature to yield a final beverage that satisfies the user's preferences. In some embodiments, the pressure sensor information is used to adjust the stroke of the pumps to fine tune the dispensed liquid for either system, hot or cold.

With either system, a metered amount of water within a set temperature range is passed into the dispense head in either continuous flow, pulsed flow or separated into volumes or packets of water between air pulses. After the dispensing, air is blown through the lines to the dispense head to purge the air/water lines and deal with residual water that may have settled somewhere, otherwise creating sanitation issues.

In some embodiments, it is possible to combine the operations shown in FIGS. 35 and 36 at different times during the dispense cycle such that the final beverage temperature can be tailored to meet the user's expectation. As an example, for a cold beverage selection such as orange juice, it may be desirable to dispense a small amount of hot water at the beginning of the cycle to slightly warm the frozen contents in the receptacle and create a clear exit path for fluids to the receptacle exit. Then, to avoid producing an overly warm beverage, the balance of the dispense cycle is conducted using ambient temperature water directly from the reservoir with the expectation that this water will be somewhat cooled by the process of melting the remaining frozen contents in the receptacle. The air pumps can be activated during dispense of water to increase cavitation in the receptacle. Once the dispense cycle is complete, at least through the point that the consumer removes the beverage container from the dispenser, a final portion of hot water may be passed through the system to clean various components in the dispense head. This cleaning purge of hot water could then be followed by short air purges from both air pumps to clear the lines. In some embodiments, this cleaning water is directed to a drip tray where it either evaporates or is periodically emptied by the user.

FIGS. 37-62 illustrate various potential configurations for the front end. Any of the front ends described herein can be used with the various back end configurations also set forth herein. Similarly, the various elements of the front end embodiments can be interchanged with other elements. For example, the various techniques for supplying secondary thermal energy in one front end embodiment can be interchanged with other techniques for supplying secondary thermal energy in other embodiments.

One beneficial aspect of this dispenser is the system for supplying secondary (non-diluting) thermal energy to the receptacle and its frozen contents to help manage the final average temperature of the dispensed food or beverage product. As described herein, techniques for adding thermal energy can include direct conduction through the sidewall of the receptacle from an electrically heated or water heated collar, impingement of hot gases, air or steam against the outside of the receptacle, use of various forms of electromagnetic energy which can heat either the receptacle or directly heat the frozen contents. Some examples of the latter include infrared radiation, RF heating, microwave heating, and the like.

FIGS. 37-62 are schematic drawings, perspective drawings and cross-sections representing a wide range of potential embodiments for the front end of the dispenser, illustrating how this secondary (non-diluting) metered thermal energy can be combined with (a) melting/diluting fluids delivered through Transfer Point "A" from the back end described above, (b) different forms of agitation to help expedite liquefaction of the frozen contents, and (c) different strategies for holding and perforating the receptacles to allow for venting, fluid addition, draining, and even some heating/melting using heated needles/perforators.

To be clear, the characterization of these sources of heat as "secondary" does not require that the heat be applied second in time to another heat source or that the secondary heat source supplies less heat than some other source of heat. It is, instead, simply a second heater which may complement the hot water heater in supplying energy to the receptacle for hot beverages and may act independently for cold beverages. The term "non-diluting" describes a heat source that does not directly or intentionally touch or heat the dilution liquid supplied to the interior of the receptacle.

FIGS. 37-39 show several embodiments of the front end of a dispenser system, illustrating how this secondary (non-diluting) metered thermal energy can be delivered using impinging hot air or steam. An element shown in a figure that describes a feature of a particular embodiment of a front end of a dispenser system that bears the same numeral as an element described in connection with a different embodiment has the same purpose and function as described herein. The same applies to any other elements sharing the same numeral for the back end of the dispenser and any other feature or aspect of the inventions described here.

FIGS. 37A-E illustrate one embodiment, among many possible, wherein a system for impinging hot air against the receptacle provides the secondary (non-diluting) thermal energy. In this exemplary system, a variety of different technologies are combined to create the overall system used for melting, diluting and dispensing the frozen contents within the receptacle into a beverage of desirable potency and volume satisfactory to the user. One skilled in the art will recognize that the various technologies illustrated in FIGS. 37A-E and throughout the other illustrations that follow can be combined in many different variations and combinations to realize the same objective.

In some embodiments, the receptacle is first scanned to determine the nature of its contents using some type of optical sensor 3705. In some embodiments, a successful scan (e.g., the system recognizes the receptacle as acceptable via the scanned information) causes drawer 3703 to open so the receptacle cavity 3706 can be filled with the user's receptacle of choice 3704. In some embodiments, the user initiates the continuation of the dispense cycle by pushing a button, reengaging the drawer with the dispenser housing, or some other step to positively indicate a decision to proceed. In other embodiments, the drawer closes automatically once a pod is sensed in the cavity. In certain implementations, the dispenser has a lock that engages after the drawer 3703 is closed so that the drawer 3703 cannot be reopened until the dispenser completes the dispense cycle or otherwise unlocks the drawer.

In some embodiments, upon this signal, drawer 3703, supported by some structural elements 3710 in the dispenser slides closed. In some embodiments, a mechanism such as plate 3707 is driven down onto the top of the receptacle to reinforce the receptacle lid against leakage and, in some embodiments, to puncture the lid with a liquid dispensing needle. In some embodiments, either before the start of agitation or during the addition of a diluting liquid or simultaneously with these steps, some amount of non-diluting thermal energy is added to the receptacle 3704 to warm or partially or fully melt the frozen contents. In some embodiments, this thermal energy is supplied by air blown by a fan 3701 through a duct 3702 and over a heater 3700. In some embodiments, the heater 3700 is electrically heated. In some embodiments, the heater 3700 is a water-to-air heat exchanger using hot water from the heater tank (item 3530 in FIG. 35A) or some secondary heater (not shown). In some embodiments, the heater 3700 is an element of a thermoelectric device that can be used to cool the receptacle or the cavity at some point later in the cycle or after the cycle to remove excess heat (e.g., a Peltier cooler and/or heater).

While the embodiment just discussed applies to a receptacle and cavity oriented with the axis of symmetry of the receptacle oriented vertically, it will be obvious that similar systems could be described and constructed in which the receptacle is oriented horizontally, either with the lid toward the front or back of the dispenser to toward one side.

The effectiveness of hot air heating will be greatly enhanced if the sides of the receptacle are directly impinged by the hot air. Accordingly, in some embodiments, cavity 3706 is an open or porous structure which allows much or all the sidewalls of receptacle 3704 to be directly contacted by the impinging air. For example, the cavity may consist solely of a collar which captures the uppermost portions of the receptacle sidewalls or stacking ring and does not extend downward in any way to shield the receptacle from the flow of air. In some embodiments, as noted above, either in conjunction with the addition of secondary thermal energy or later in the cycle in conjunction with the addition of a dilution fluid (e.g., water), some level of agitation of the receptacle and the frozen contents inside is initiated to increase the rate of flow between the dilution liquid and the frozen contents, break up any stagnant layers of diluting liquid, etc. to hasten the liquefaction of the frozen contents. In some embodiments, this agitation is caused by motor 3708. In some embodiments, the agitation is rotary 3712. In some embodiments, the rotation is reciprocating with either large motions (e.g., 90-120° in one direction before reversal and then repeated) or small motions (e.g., vibratory or <<90°). In alterative implementations, a solenoid is used to impart agitation.

In some embodiments, in conjunction with the agitation or before agitation begins, a melting/diluting liquid is added to the receptacle. This liquid is delivered from the portions of the dispenser described above via Transition Point A 3570. In some embodiments, this melting/diluting liquid is delivered directly from the water reservoir and arrives at approximately its original temperature as stored in the reservoir. This reservoir water temperature may be at or near room temperature, also referred to as "ambient temperature" or it may be chilled, as for example, using ice cubes. In some embodiments, this ambient temperature or chilled liquid pathway is insulated to reduce heat gain during travel to the receptacle. In other embodiments, the heated liquid pathway is insulated to reduce heat transfer to other liquid pathways. In some embodiments, this melting/diluting liquid is passed through a heater tank en route to Transition Point A. In some embodiments, in conjunction with the addition of melting/diluting liquids, the bottom of the receptacle 3704 is punctured with a second needle or perforator 3709 so the melted liquids can drain into the user's cup 3714. In some embodiments, once the dispense cycle is finished and almost all the melting/diluting liquid has drained from the receptacle, having fully melted the frozen contents and washed the inside of the receptacle clean, drawer 3703 reopens and receptacle 3704 can be removed and discarded 3716. Optionally, before the drawer reopens, the system can cool the receptacle by forcing ambient, or cooled, air through the duct 3702 into contact with the receptacle 3704. Optionally, after the receptacle is removed, additional fluid can be delivered through the entry perforator to rinse the lines clean in preparation for the next dispense cycle and to prevent carry-over of taste or aroma to the next beverage.

FIGS. 38A-E illustrates a system which uses low pressure steam, impinging directly on the receptacle, to add the thermal energy. In some embodiments water is delivered from a reservoir in the back end via a Transition Point "B" 5205 to a small boiler 5201 with a heat supply 5215. For example, any of the reservoirs or heaters can feed Transition Point "B" 5205. Likewise, a separate supply of liquid can be fed to Transition Point "B" 5205. In some embodiments, the steam generated by boiler 5201 escapes through dedicated plumbing to a small enclosure 5202 surrounding the receptacle wherein there is a sufficient gap or passageway around the receptacle created by the walls of enclosure 5202 to allow the steam to flow freely around the receptacle perimeter and transfer its heat both through convection and conduction 5210 and through condensation on the cold walls of the receptacle. This condensation is managed and can be directed into a drip tray for collection and disposal. The drip tray is described below.

FIGS. 39A-E illustrates an alternative or complimentary use for the steam. In some embodiments, a longer heated needle 6405 is used to penetrate the lid structure and then bore through the frozen contents and thereafter puncture the closed end of the receptacle, creating an exit path for the melted contents via an exit flow path 6409 that is aligned with the puncture created by needle 6405. This concept is described in greater detail as part of FIGS. 75A-84 below. For the long needle or cannula to penetrate through the frozen contents easily, it is helpful for the end to be heated so it melts a path through with minimal resistance. In the current illustration steam is passed through special plumbing 6410 to the needle 6405 and used locally at the tip of the needle to heat and melt the frozen contents. In some embodiments, this needle is deployed as part of a cylindrically wound structure shown and described in FIGS. 75A-D that slowly unreels as it advances downward. Not shown (for clarity) in this illustration is a form of secondary heating that could be any of the embodiments or implementations already discussed or others as described below. In other embodiments, as described in subsequent figures, the needle may be a straight, rigid tube, splined or bayonet shaped, or solid rod that is advanced using some form of mechanical or pneumatic mechanism well known in the art (e.g., an acme screw or ball screw; a rodless cylinder or standard pneumatic cylinder; a cable mechanism linear gear).

FIGS. 40A-E illustrate another system and technique by which the receptacle can be captured in the dispenser and the frozen contents melted, diluted and dispensed. Because many of the features of this alternative system were described in FIGS. 37A-39E, further explanation will focus on the alternative technique for adding secondary (non-diluting) thermal energy.

In some embodiments, as shown in FIG. 40A, a receptacle is scanned and inserted into a chamber 3801. The receptacle 3704 is held by a closely matched conical surface 3806 of the chamber. As an analogy which will be readily understood by one knowledgeable in the art, the mating tapered sidewall surfaces of the receptacle and the heater are ideally in contact much the same way that a machine tool and a holding chuck, both machined with matching Morse Tapers, are in intimate contact. In some embodiments, the external matching surface 3806 is a part of an electrical resistance heater 3800 which may be controllably heated 3815 to a desired temperature, e.g., 195-205° F. (below the boiling point of the frozen contents once melted) by voltage source 3810.

As with the previous example involving hot air, in some embodiments this heater 3800 can be activated for a period calculated by the dispenser controller using knowledge about the frozen contents gained from the initial scan and various on-board sensors. This period may be designed to warm, partially melt or fully melt the frozen contents depending on the desired final dispensed beverage/food temperature and planned volume. For this heating process, especially if the intent is to partially melt the frozen contents, knowledge of the freeze/thaw temperature of the frozen contents is needed. This information, which can be gathered from scanning the receptacle 3704, as described elsewhere herein, is used within a temperature feedback loop control. The nominal freeze/thaw point may also be estimated based on knowledge of the contents of the frozen contents (% water, % sugar, % fat, % protein, etc.). As described above in FIGS. 37A-39E, the receptacle can be agitated before, during, or after heating, and the liquid food or beverage product is dispensed (FIG. 40D). FIG. 40E shows the removal of the empty and cleaned receptacle 3716. Although not shown in the figures, the close-fitting relationship between the receptacle and the inner surface of the chamber could be achieved by submersing the receptacle in a heated liquid bath.

FIGS. 41A-E illustrates a system like that shown in FIGS. 40A-E except that close fitting jacket 3806 utilizes a hot water-based heating element 6510 fed by Transfer Point "A" 3570, which also relies primarily on conductive heat transfer.

FIGS. 42A-E illustrates the use of an RF coil to provide the source of secondary thermal heat to the receptacle, otherwise operating in the manner described for the embodiment in FIGS. 39A-E. In some embodiments, a power supply 6621 sends a high frequency electrical current to coil 6620. The oscillating electrical field is known to interact with ice, but with substantial dielectric losses that convert to heat. Oscillation frequencies in the range of 3 MHz have been shown to be particularly efficient in this heating process. As in the other illustrations presented herein, this secondary heat is managed by a micro-controller within the dispenser to coordinate the timing, duration and power with other events throughout the melting/diluting/dispensing cycle including agitation, addition of fluids inside the receptacle, and the schedule of different needle punctures.

In one embodiment of the invention, a radio frequency (RF) dielectric heating system provides secondary heat (i.e., non-diluting heat) to the receptacle and/or the frozen liquid contents in the receptacle 6630. In one implementation, the process uses a high frequency electrical signal, e.g., in the range of 6-42 MHz, to cause rapid vibration of the water molecules in the compound. It is believed that the heating occurs throughout the entire volume of the contents of the receptacle simultaneously rather than being an outside-in process. Thus, RF dielectric heating, in some cases is faster at heating liquids than other known techniques, such as contact or convective heating. There are issues, however, in dealing with frozen compounds that need to be addressed.

Figure 43:
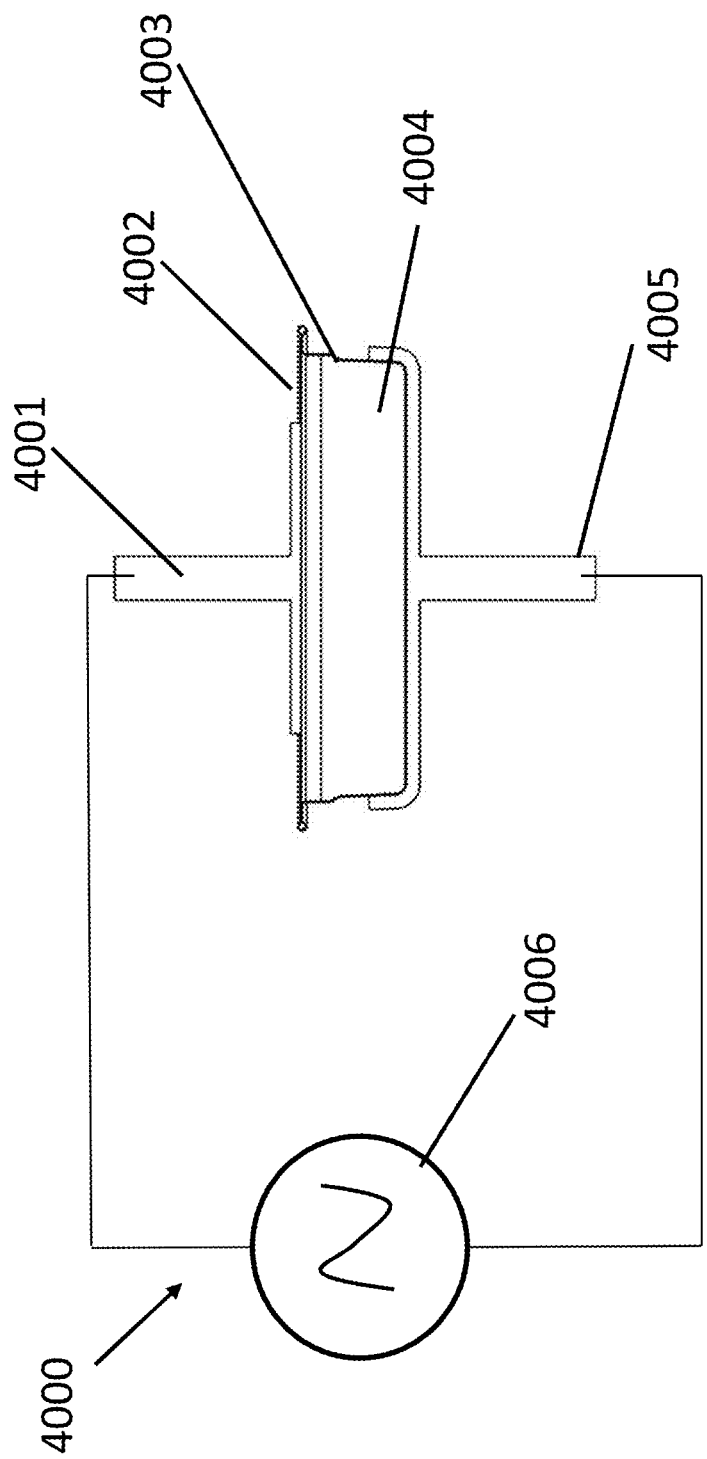
FIG. 43 is a cross-section view of a system for heating frozen liquid contents of a receptacle using radio frequency dielectric heating according to an embodiment of the invention.

FIG. 43 illustrates a cross-section view of a system 4000 for heating frozen liquid contents of a receptacle using RF dielectric heating. The system comprises a receptacle housing 4003, a lid 4002; and a receptacle that holds a frozen liquid contents 4004. The receptacle housing 4003 is metallic and conductive while the lid 4002 material is a non-conductive plastic, such as polypropylene. An RF power source 4006 is electrically connected to an upper contact 4001 and lower contact 4005. Lower contact 4005 is also in electrical contact with metallic receptacle housing 4003. The application of an alternating voltage between 4001 and 4005 creates an alternating electrical field which passes through the frozen contents 4004. Optionally, upper contact 4001 is sized to achieve uniform field lines/gradients through the frozen liquid contents to reduce hot spots. In one embodiment, the diameter of the upper contact 4001 is chosen to create an approximately equal gap between the edges of the upper contact and the side walls of the receptacle housing 4003.

In another implementation, again referring to FIG. 43, both the receptacle housing 4003 and lid 4002 are non-conductive plastic materials. Optionally, upper contact 4001 and lower contact 4005 are identically shaped and sized with the contact being flat (i.e., without un-turned sidewalls as depicted in FIG. 43), and the diameter of both would extend 1-2 mm beyond the edge of the receptacle lid 4002.

FIGS. 44-51 illustrate various embodiments for ohmic heating as a secondary heat source.

Figure 44:
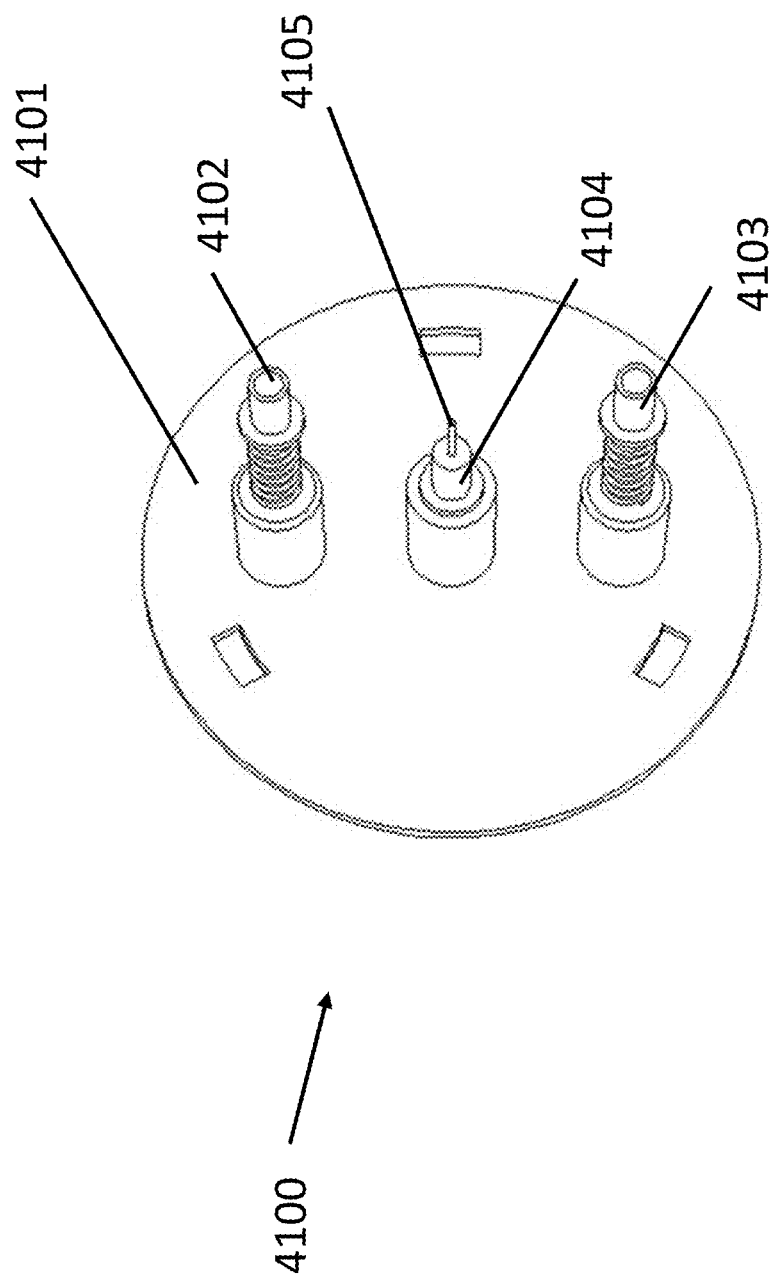
FIG. 44 is an isometric view of a cavity cover including two fluid delivery needles and a central electrode for ohmic heating according to an embodiment of the invention.

FIG. 44 is an isometric view of a cavity cover 4100 including two fluid delivery needles 4102, 4103 and a central electrode 4105 for ohmic heating. Ohmic heating can serve as an alternative to dielectric heating for heating the frozen liquid contents, and can still operate on a volumetric basis. This process requires frozen contents that conducts electricity, but still offers some resistance to electron flow. In one implementation, electric current is introduced at one contact, causing the electricity to flow through the frozen liquid contents or melted liquid, to a second contact. In this end view of assembly 4100, the cavity sealing plate 4101, made from a non-conducting material such as an injection molded plastic, locates and holds needles or penetrators 4102, 4103 for flowing a dilution liquid and/or a melted product. The plate 4101 also locates and holds the electrode 4105, which includes an insulating sheath 4104.

In some embodiments, the electrode assembly, the combination of sheath 4104 and electrode 4105, is fixed in place with one end protruding beyond the back of plate 4101. Optionally, this assembly is spring loaded, allowing the electrical contact to progressively move further into the receptacle as portions of the frozen contents melt to maintain contact with the frozen core. In some embodiments, insulator 4104 is a ceramic material, for example aluminum oxide, that has favorable strength and relatively high electrical resistivity.

Figure 45:
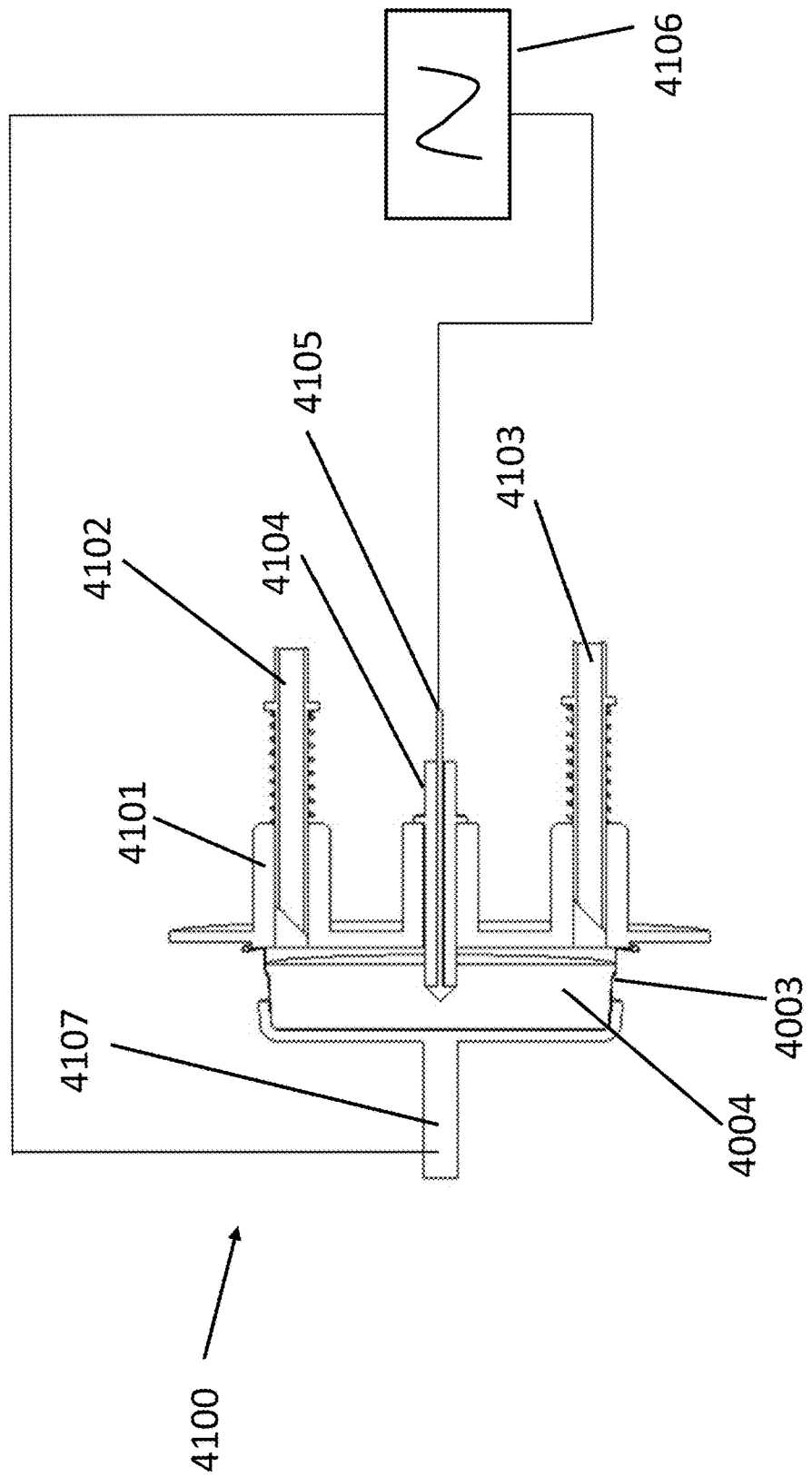
FIG. 45 is a cross-section view of a first implementation of the ohmic heating system of FIG. 44 according to an embodiment of the invention.

FIG. 45 is a cross-section view of a first implementation of the ohmic heating system 4100 of FIG. 44. The single electrical probe 4105 is shown slightly embedded in frozen contents 4004. Using an electrical insulator 4104 to cover conductor 4105 allows the use of a metallic lid, such as aluminum foil, to close the receptacle during packaging. During the secondary heating phase of a process for creating a liquid food or beverage, described in more detail above, electricity flows from electrical contact 4105 into the frozen contents 4004 to a conductive (e.g., aluminum) receptacle housing 4003, and finally to electrical contact 4107. Electrical power is supplied by a source 4106 that, in some embodiments, is an alternating current (AC) supply. Using an AC power supply is thought to avoid problems with electrolysis that may occur at one or both electrical contacts with the use of a direct current (DC) power supply.

Figure 46:
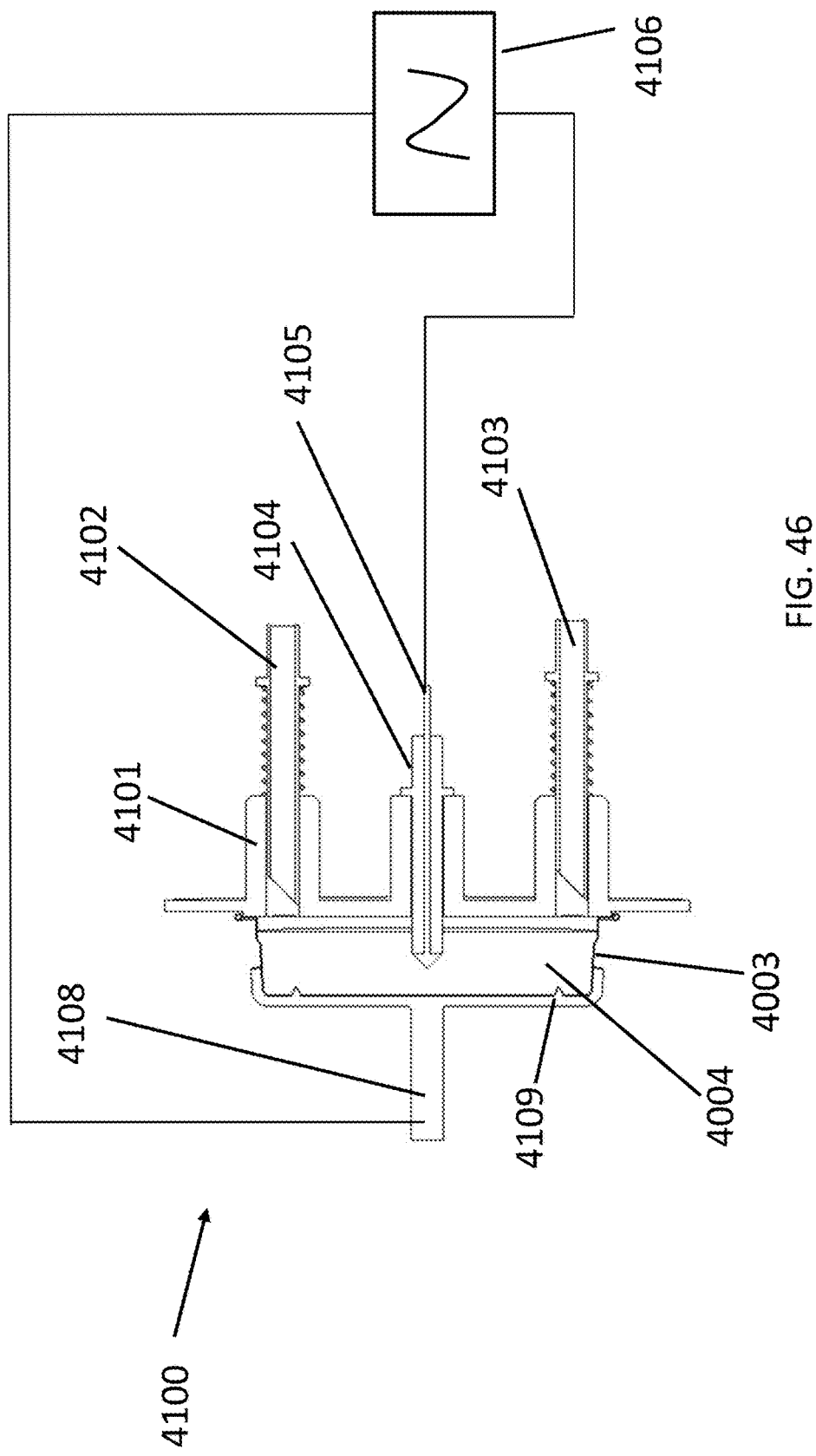
FIG. 46 is a cross-section view of a second implementation of the ohmic heating system of FIG. 44 according to an embodiment of the invention.

FIG. 46 is a cross-section view of a second implementation of the ohmic heating system 4100 of FIG. 44. In the embodiment shown, electrical contact 4108 is equipped with one or more small penetrating cones or similar shape bodies 4109 integral to the contact. These conical protrusions 4109 pierce the bottom of the receptacle housing 4003 to make a direct electrical connection between the frozen contents 4004 and the electrical contact 4108. This can be advantageous when the receptacle housing 4003 is non-metallic or the inside surface of the receptacle is covered with a non-conductive coating, e.g., a thin layer of polypropylene used to coat an aluminum receptacle to enhance food safety, eliminate chemical reactions between the aluminum and the food, and/or to provide a welding surface for the heat-sealed lid.

Figure 47:
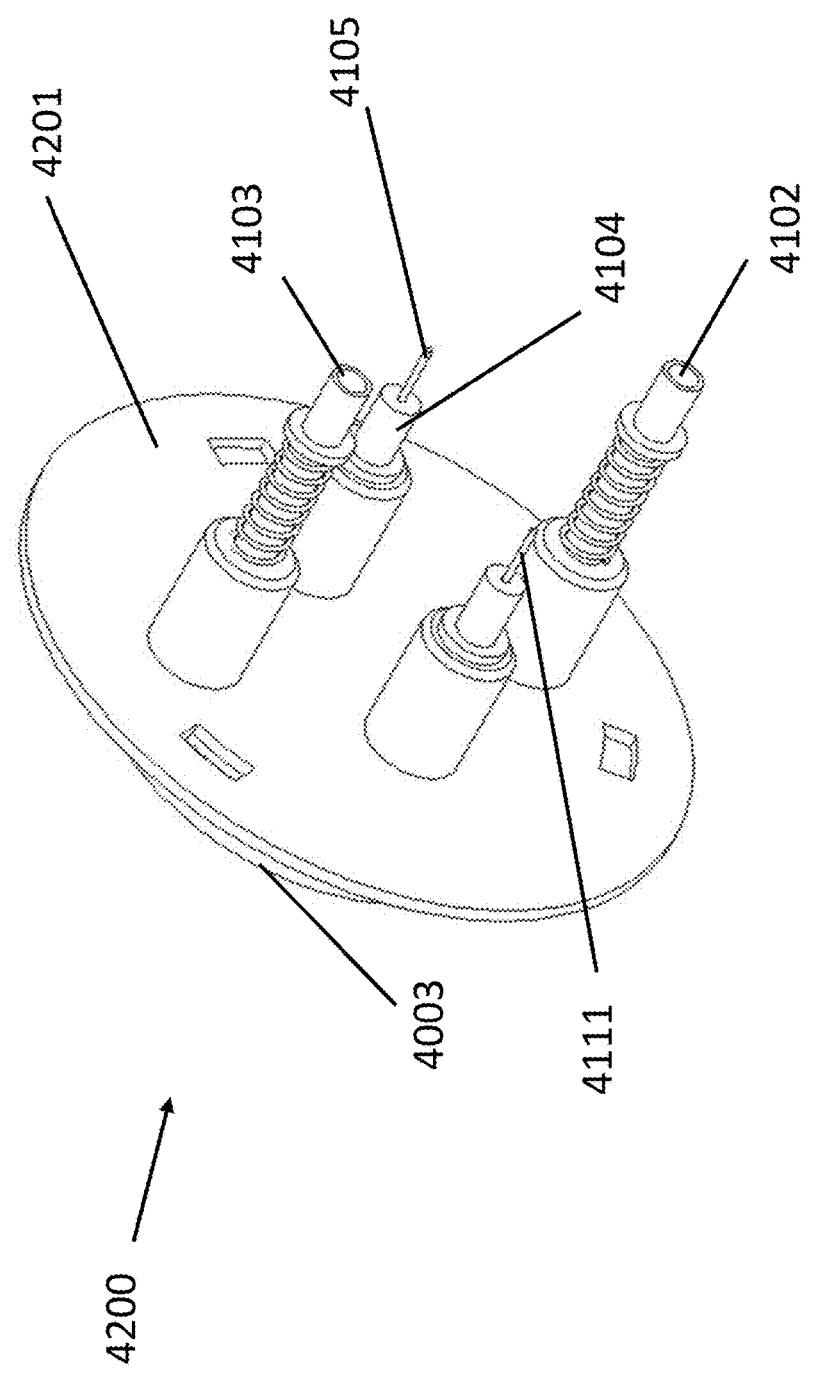
FIG. 47 is an isometric view of a cavity cover including two fluid delivery needles and two electrodes for ohmic heating according to an embodiment of the invention.
Figure 48:
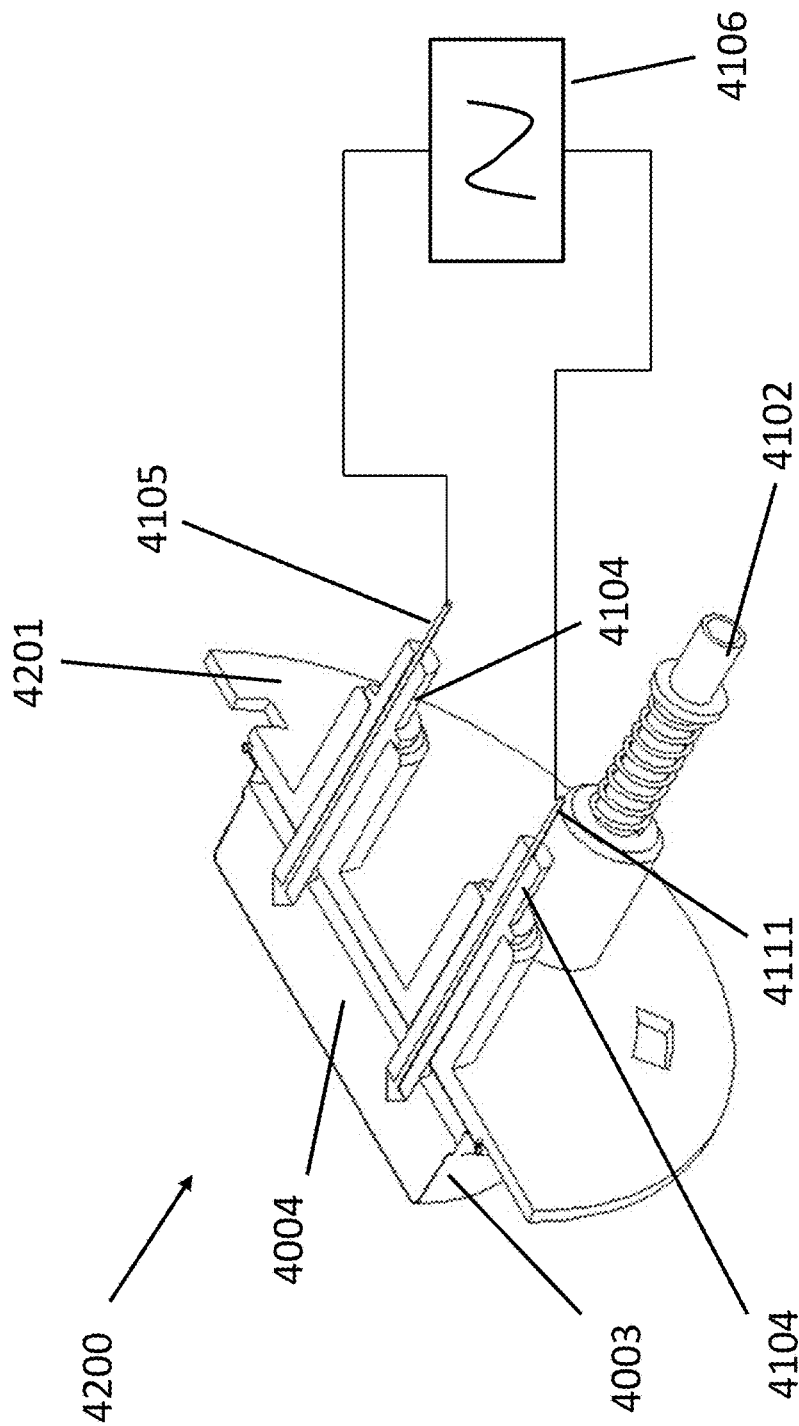
FIG. 48 is a cross-section view of the ohmic heating system of FIG. 47 according to an embodiment of the invention.

FIG. 47 shows an isometric view of a cavity cover 4200, including two fluid delivery needles 4102, 4103 and two electrodes 4105, 4111 for ohmic heating. Meanwhile, FIG. 48 is a cross-section view of the ohmic heating system 4200 of FIG. 47. System 4200 uses two electrical contacts 4105, 4111 located and held by end plate 4201. A complete electrical path includes the two electrical contacts and the frozen contents, without the need for a metallic receptacle housing 4003. Thus, this implementation will work equally well with conductive (metallic) and non-conductive (plastic) receptacle housings 4003. As described above, these electrode assemblies can be fixed or spring loaded. As with the other secondary heating sources set forth above, the implementations of ohmic heating can supply heat before, during, or after the addition of dilution fluids and/or with and without agitation. The concept can be adapted to any of the dispenser configurations set forth in more detail above, including, for example, the dispensers with vertically aligned cavities.

In some embodiments, power supply 4106 has circuitry to detect an impending breakdown of a dielectric and limit the current supply accordingly to prevent electrical arcing using known methods.

Figure 49:
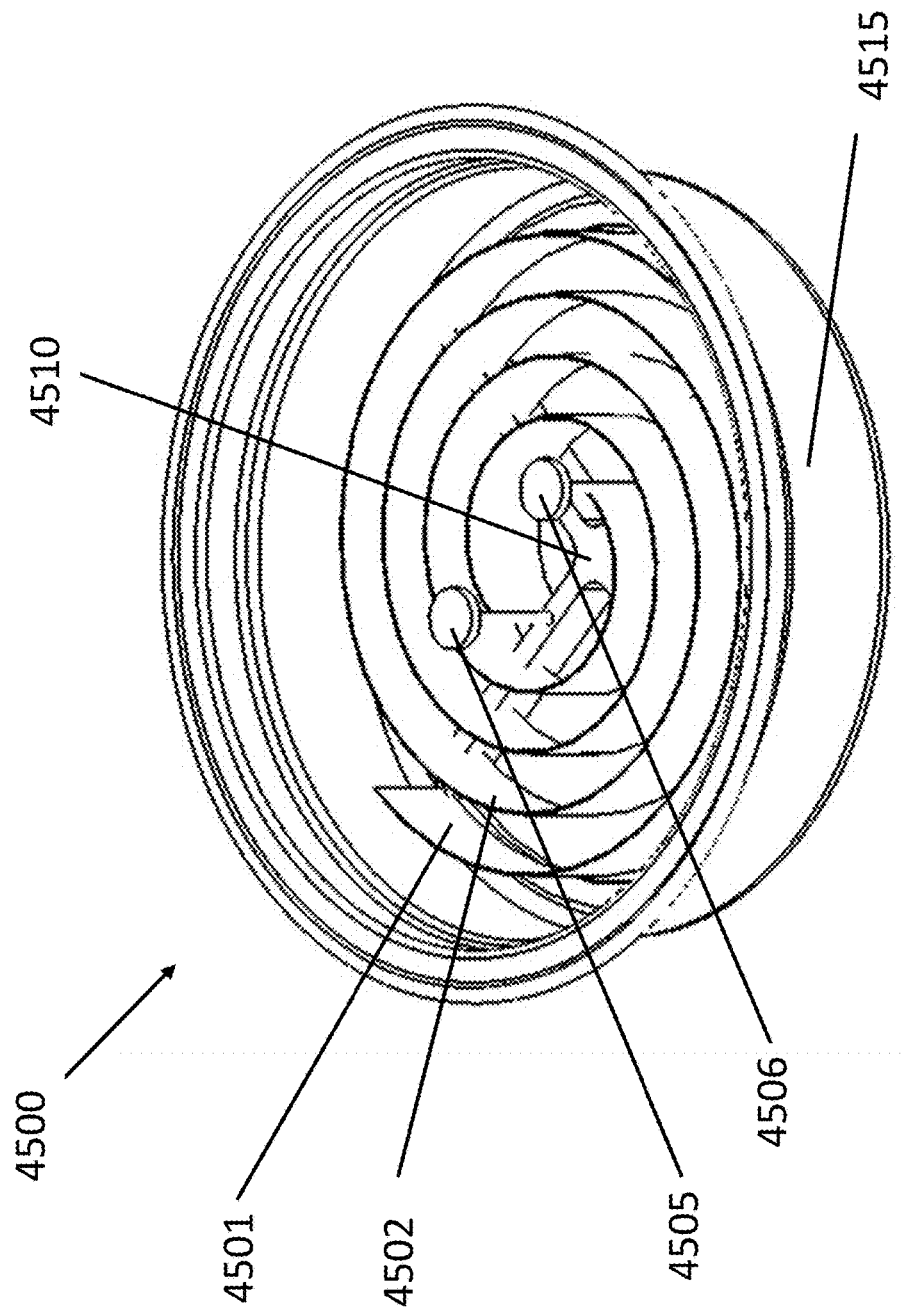
FIG. 49 is an isometric view of two spiral coiled electrodes according to an embodiment of the invention.
Figure 50:
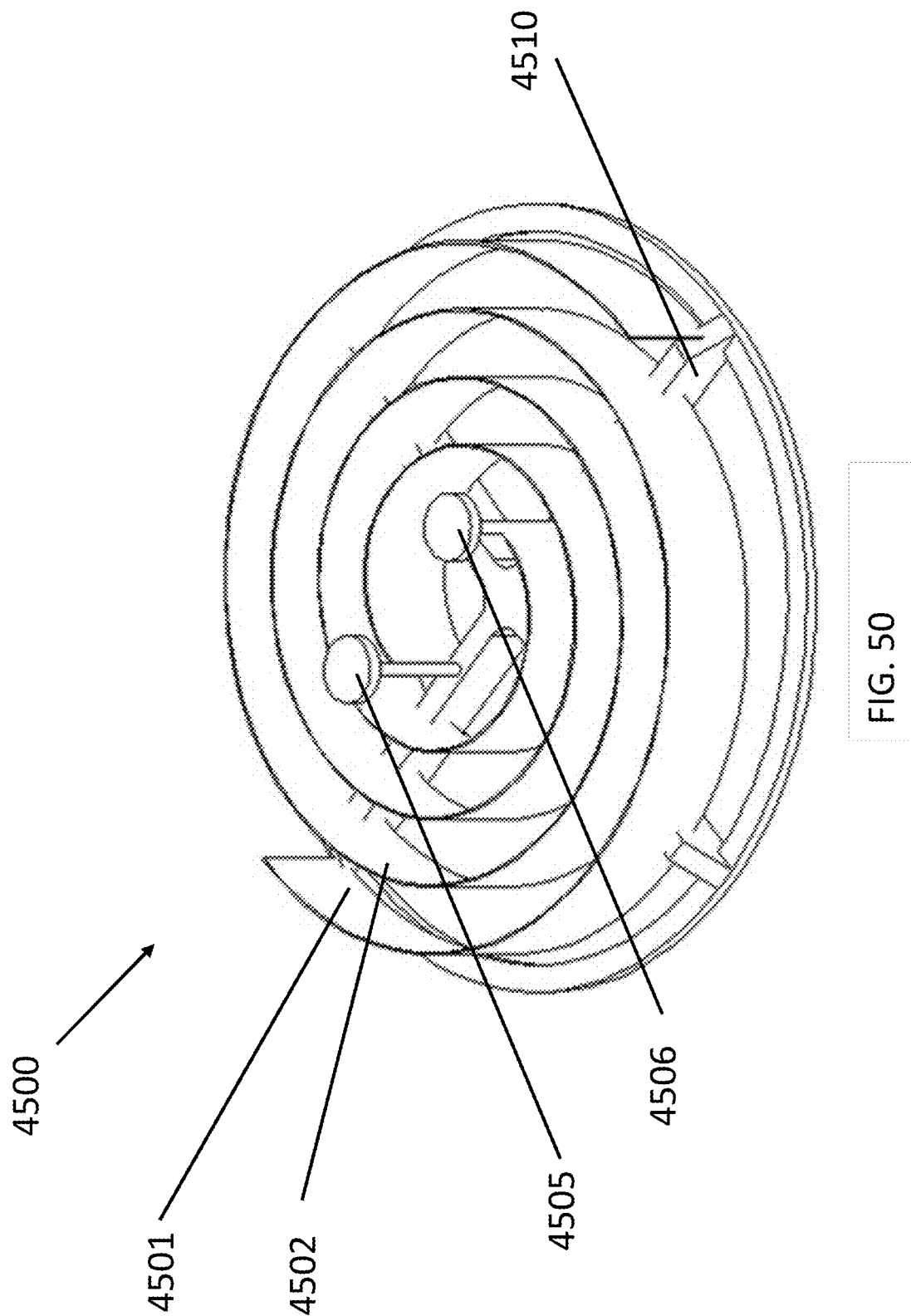
FIG. 50 is a second isometric view of the two spiral coiled electrodes of FIG. 49.
Figure 51:
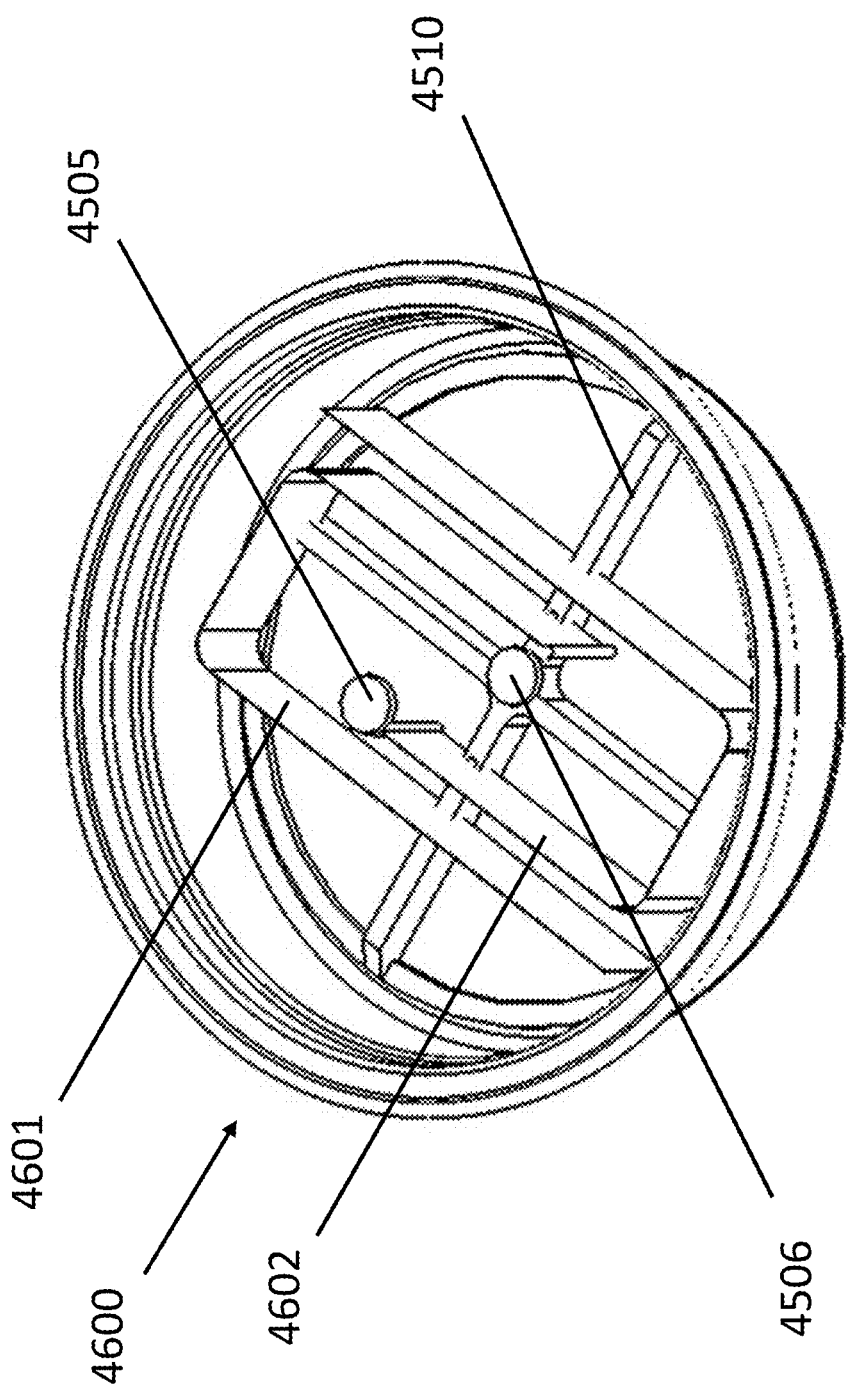
FIG. 51 is an isometric view of two rectangular electrodes according to an embodiment of the invention.

FIGS. 49-51 are isometric views of two spiral coiled electrodes 4500 and one rectangular electrode 4600 for use with embodiments of the ohmic heating systems described herein. As described above, ohmic heating operates based on the resistivity of a frozen solid or liquid to cause heating when an electric current is passed through the material. Localized heating at the point of current introduction can lead to inefficiencies or ineffective heating. More uniform heating occurs when the electrical contact surfaces at the electrode/food interface are larger rather than smaller. In one embodiment, electrical contact surfaces (electrodes) are included in the receptacle prior to forming a frozen liquid content in the receptacle to increase the surface area available for electrical contact beyond what is achieved with needle-like electrodes.

FIG. 49 shows two spiral coiled shapes 4501, 4502 that act as the electrodes. In some embodiments, these coiled electrodes are stainless steel foil material attached to contact surfaces 4505 and 4506, respectively. FIG. 50 shows the same spiral coils 4501, 4502 and contact surfaces 4505, 4506 without the cup body 4515 for clarity. An insulating frame 4510 holds the coils in place. Contact surfaces 4505, 4506 are disposed in the receptacle to make contact with electrodes in a dispenser system when inserted into the receptacle (e.g., as shown and described for the embodiment of FIG. 48). FIG. 51 shows another embodiment of two electrodes 4601, 4602 formed as an open rectangular body.

FIGS. 52-60 illustrate and describe an embodiment of a secondary heater utilizing a microwave heating system and several embodiments of the front end of a dispenser so equipped.

Figure 52:
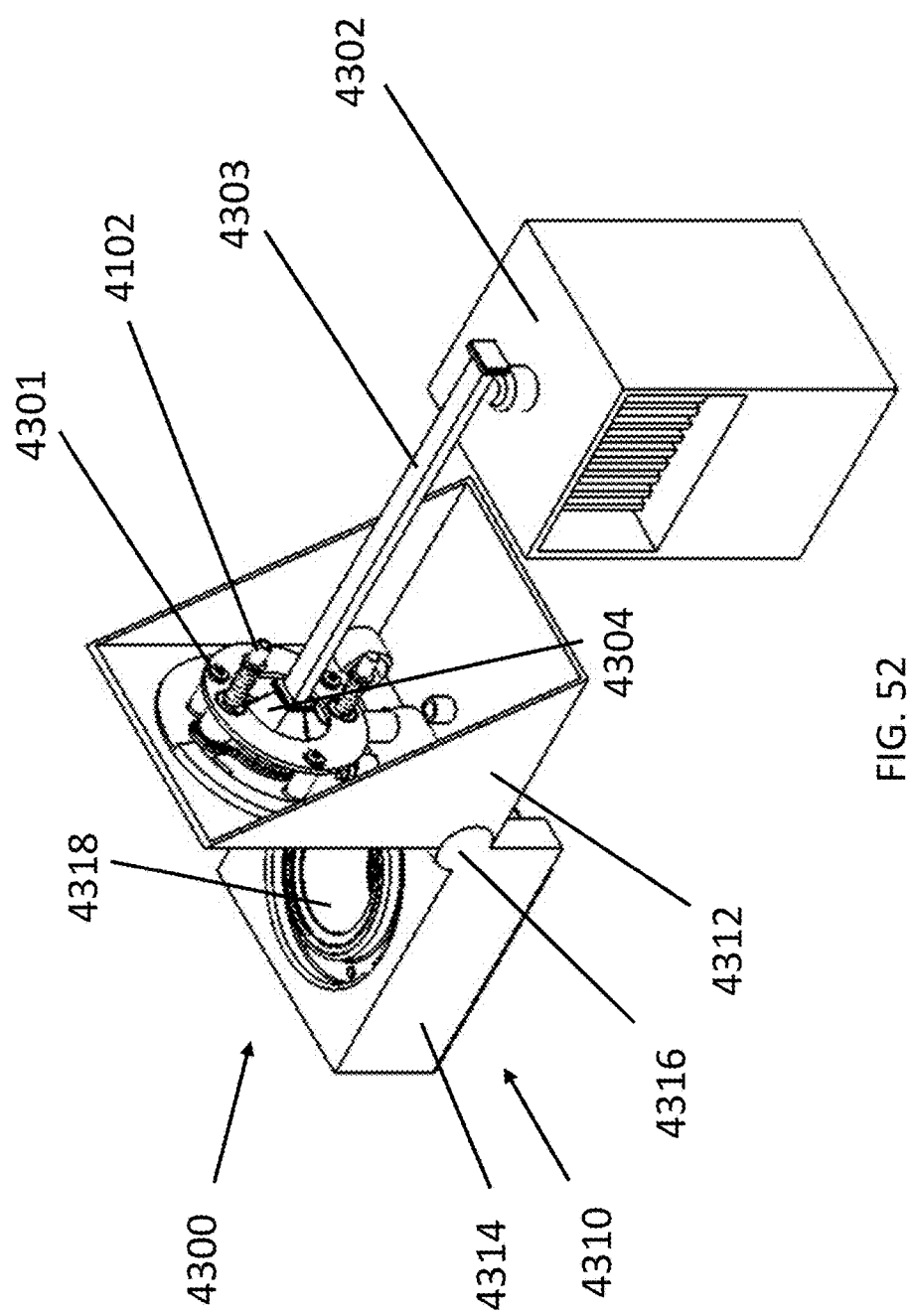
FIG. 52 is an isometric view, with a rotating cavity bottom shown open, for a heating system using microwave energy to heat frozen liquid contents according to an embodiment of the invention.
Figure 53:
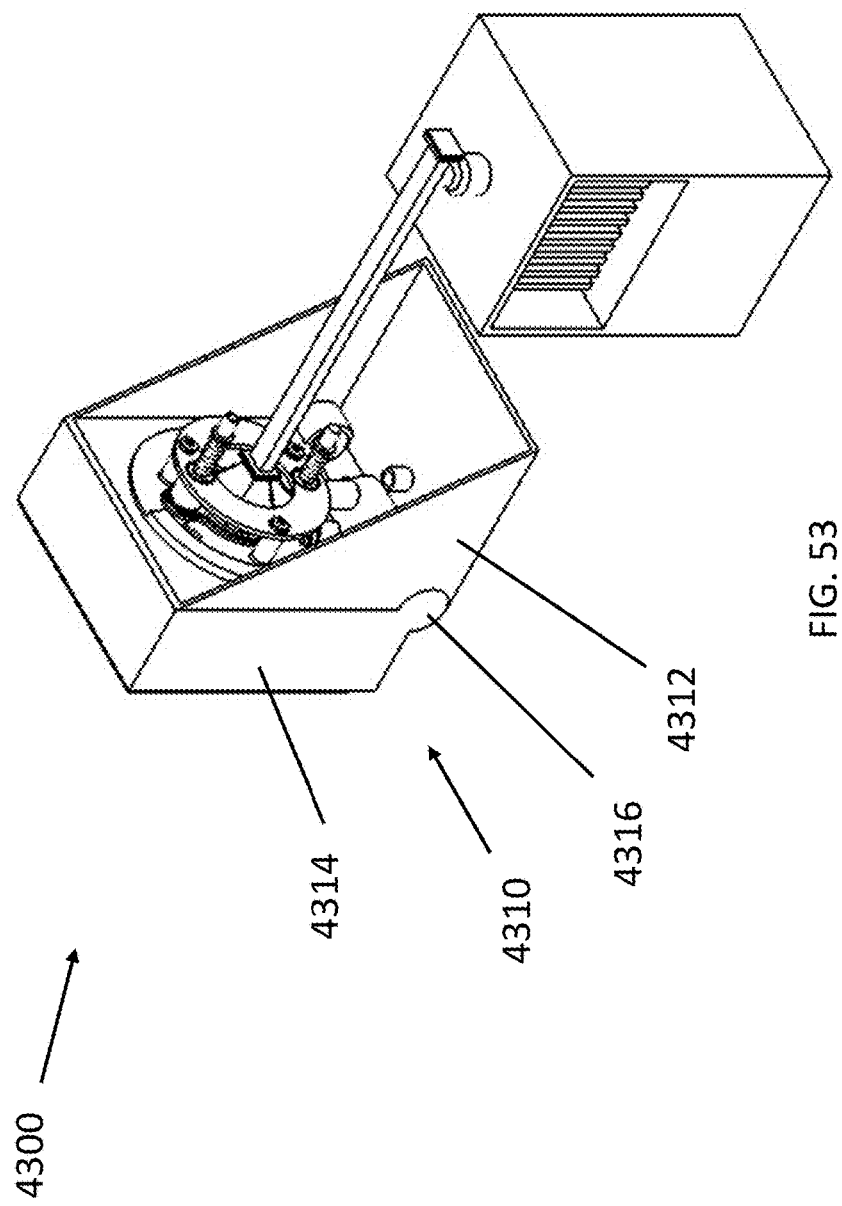
FIG. 53 is an isometric view of the rotating cavity bottom of FIG. 52, shown closed, according to an embodiment of the invention.
Figure 54:
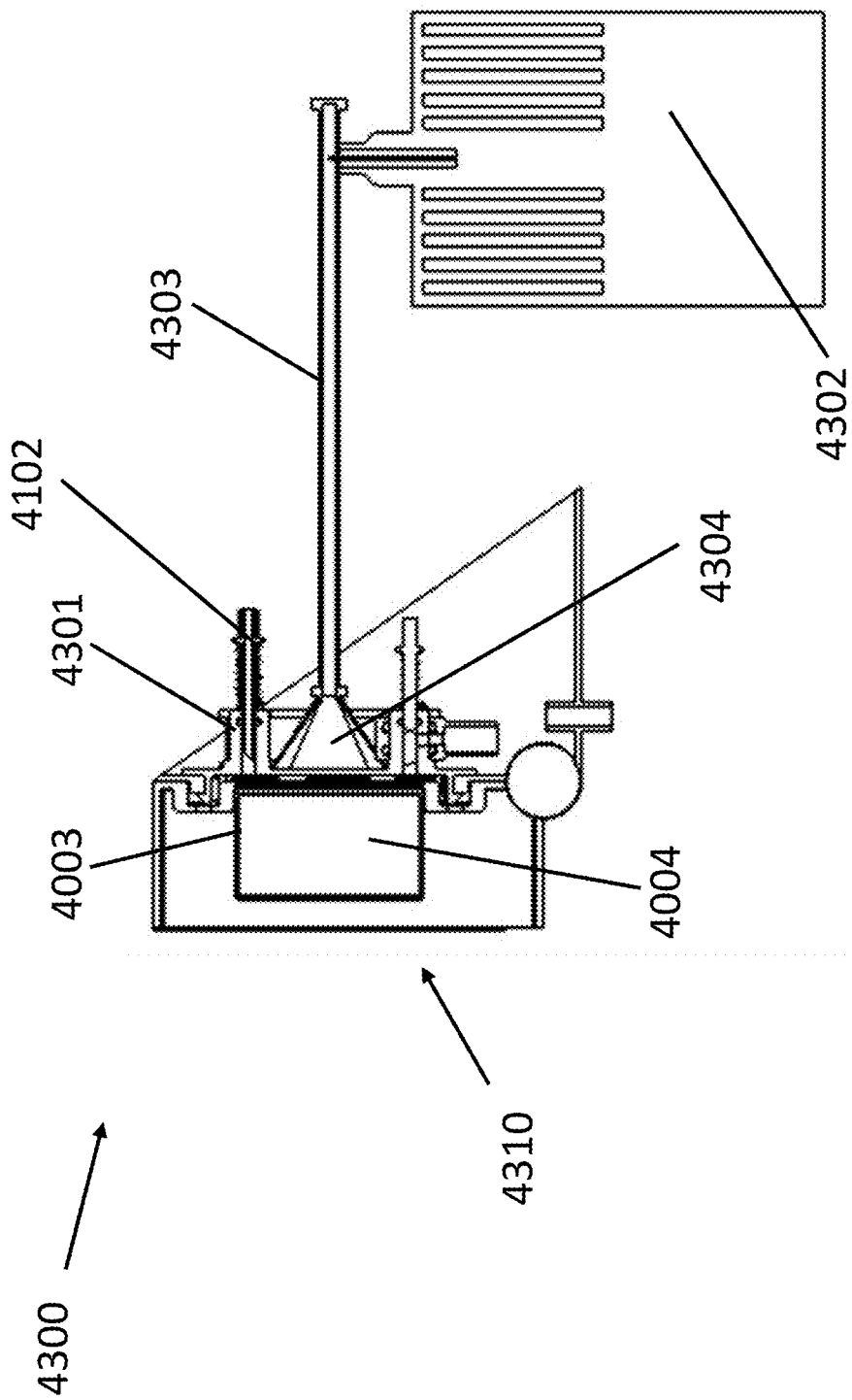
FIG. 54 is a cross-section view of the heating system of FIG. 52 according to an embodiment of the invention.

FIGS. 52-54 illustrate a microwave heater 4300 that uses a magnetron 4302 supplying a 24.125 GHZ signal through waveguide 4303 to a transmitting horn 4304, through a partially microwave transparent cavity end plate 4301 into the open space 4318 defined by the chamber body 4314 (when the chamber is closed). This very high frequency is needed to work within the small confined space of a receptacle and function with an acceptably small null zone around the walls and will become practical only if pricing evolves to be competitive with commercial models manufactured today at 2.45 GHz and if acceptable power levels can be achieved. If used, the metallic receptacle and the frozen liquid contents therein receive the microwave energy. Modifications and additions to the basic illustrated design to insure optimum signal impedance matching, protecting the magnetron from back scatter, protecting users from stray radiation, etc., are required and within the knowledge of one skilled in the art. Moreover, for any of the embodiments described herein employing electromagnetic radiation as the secondary heating source, portions of the chamber that hold the receptacle are opaque to the wavelengths the secondary heat source uses to heat the receptacle and/or the frozen contents. In some implementations, only a "window" into the chamber permits the electromagnetic radiation to enter, while the rest of the chamber does not permit the energy to pass through the remaining walls. The chamber walls are optionally insulated to reduce heat loss from the chamber.

FIGS. 52 and 53 are isometric views of a heating system 4300 that uses microwave energy to heat frozen liquid contents in a receptacle. Heating system 4300 has a chamber 4310 with a chamber lid 4312 and a chamber body 4314, joined by a hinge 4316. The chamber body 4314 has a receptacle opening 4318 sized to receive a receptacle holding frozen liquid contents. FIG. 52 shows the chamber 4310 open, while FIG. 53 shows the chamber 4310 closed. This embodiment also illustrates how a receptacle might be loaded into a cavity and thereafter the cavity can close to orient the top of the receptacle toward the rear of the dispenser for access to needle punctures and dilution liquid.

FIG. 54 shows a cross-section view of the heating system 4300 of FIGS. 52 and 53.

Techniques are known for effectively addressing challenges associated with using microwave energy to thaw and heat frozen contents. For example, by implementing proper safeguards, portions of the frozen content volume that first transition from ice to liquid can be prevented from overheating. Also, as discussed above, techniques such as pulsed heating that work for RF dielectric heating will work for heating with microwave energy. Another challenge as mentioned above associated with using microwave energy inside of a conductive receptacle is the fact that the electrical field at the surface of the conductive material will always be essentially zero. This null condition sets up a zone of no heating that extends into the receptacle for about a quarter of the wavelength from the receptacle wall. If the receptacle is large enough, with respect to the wavelength, e.g., more than several wavelengths in depth, heating can occur in the remainder of the frozen contents. While this approach may still produce hot and cold spots if a standing wave is created, melting will occur. These hot and cold spots are dealt with in microwave ovens through dispersion fans, rotating platens, etc. Those known techniques can be applied in the systems disclosed herein.

Advantageously, the dielectric loss coefficient for water and ice increases with increasing frequency up to about 18 GHz. The dielectric heating effect is also proportional to the frequency as the energy converted to heat is the same for every cycle of vibration a molecule goes through. This combination suggests a frequency of 18-24 GHz would work well in this embodiment because the null zone between receptacle wall and the heated region would be in the range of about 0.12-0.16 inches. Optionally, a waveguide is used to deliver the microwave energy (instead of a coaxial cable). For example, for a frequency of 24.125 GHz (the highest allowable microwave frequency within the industrial-scientific-medical bands set aside for open use by the FCC and similar agencies worldwide), the optimum waveguide dimensions are 0.34×0.17 inches (WR34).

Figure 55:
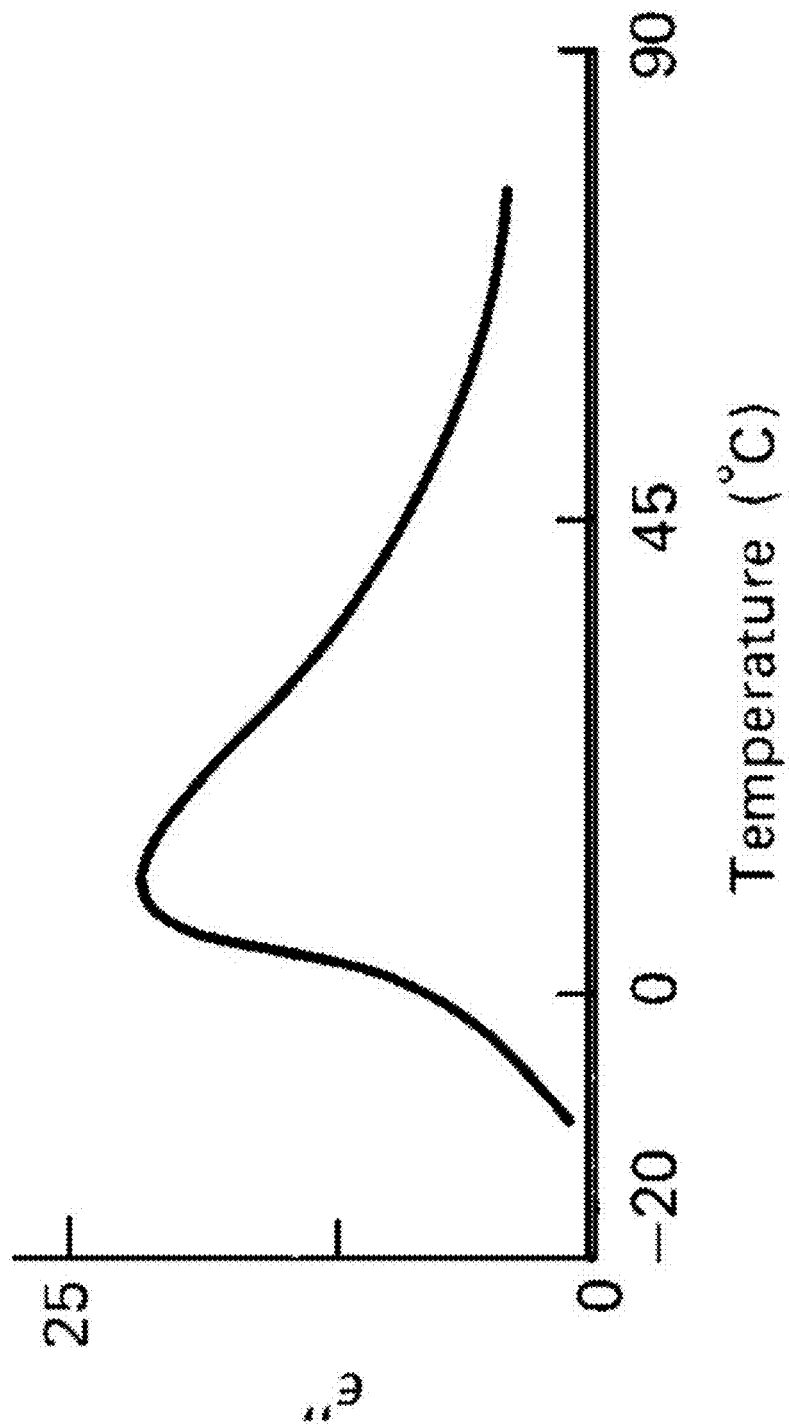
FIG. 55 is a graph depicting the dielectric loss factor of water and ice.
Figure 56D:
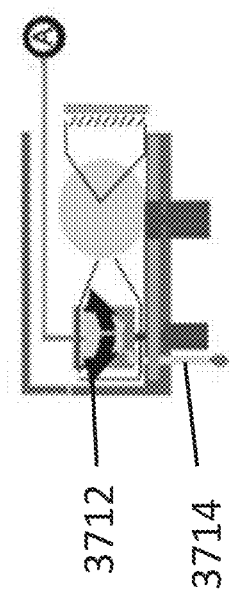
Figure 56E:
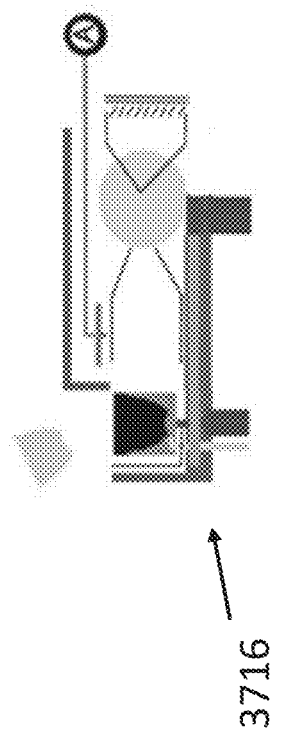
Figure 57D:
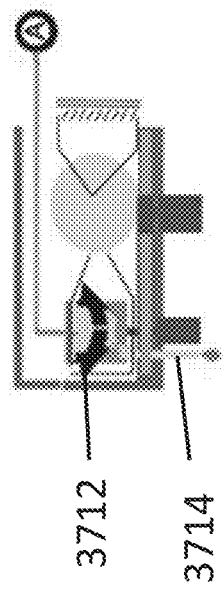
Figure 57E:
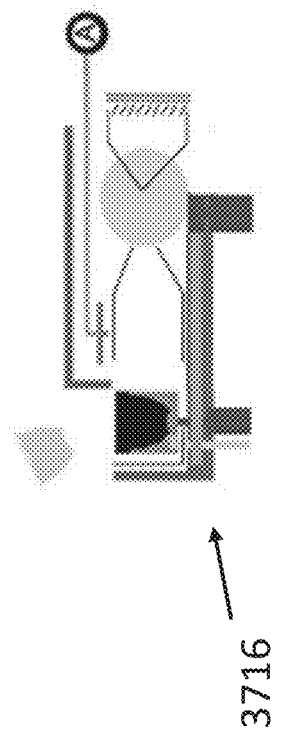
Figure 58G:
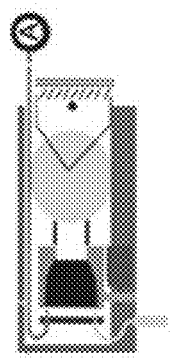
Figure 58E:
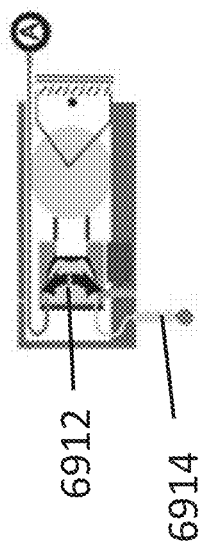
Figure 58F:
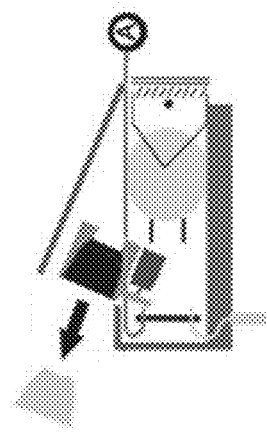

Referring to FIG. 55, one of the known problems with microwave and other forms of dielectric heating techniques involving both water and ice is the non-uniform heating nature of the process. When water molecules are captured within a crystalline structure, as is the case with ice, they are no longer free to follow the rapidly changing electrical orientation of the field between the two electrical contacts or that are created by impinging microwave energy. As shown in the graph for temperatures below 0° C., this results in a relatively low dielectric loss factor. Once the ice melts, however, the loss factor ($\varepsilon''$) rises very quickly, and the melted water, existing in small localized pockets typically formed with RF or microwave heating within the overall ice structure, heats rapidly. This non-uniform heating can even result in localized boiling and steam creation if temperatures are not allowed to equilibrate.

Several methods have been developed to deal with this well-known problem. One known technique is to pulse the application of power in on/off cycles. Doing so allows some of the heat in the small pockets of water to pass into the surrounding ice and thereby progressively enlarge the volume of each pocket until the entire ice structure is converted to water. While this technique of heating is less efficient than what is possible with a product that is initially all liquid (where RF or microwave power can be applied continuously), and assuming all the needed safeguards and systems can be produced economically at scale, it is still considerably faster than can be achieved with more conventional conduction heating methods. This is especially true when the temperature of an external heat source is necessarily limited to prevent damage to the heated liquid near the outside of the bulk frozen contents. For example, as in heating frozen orange juice, where excess heat can affect the structure of complex sugars and degrade taste.

FIGS. 56A-60 are various embodiments of the front end of a dispenser and front end components utilizing a microwave secondary heating source.

Figure 60:
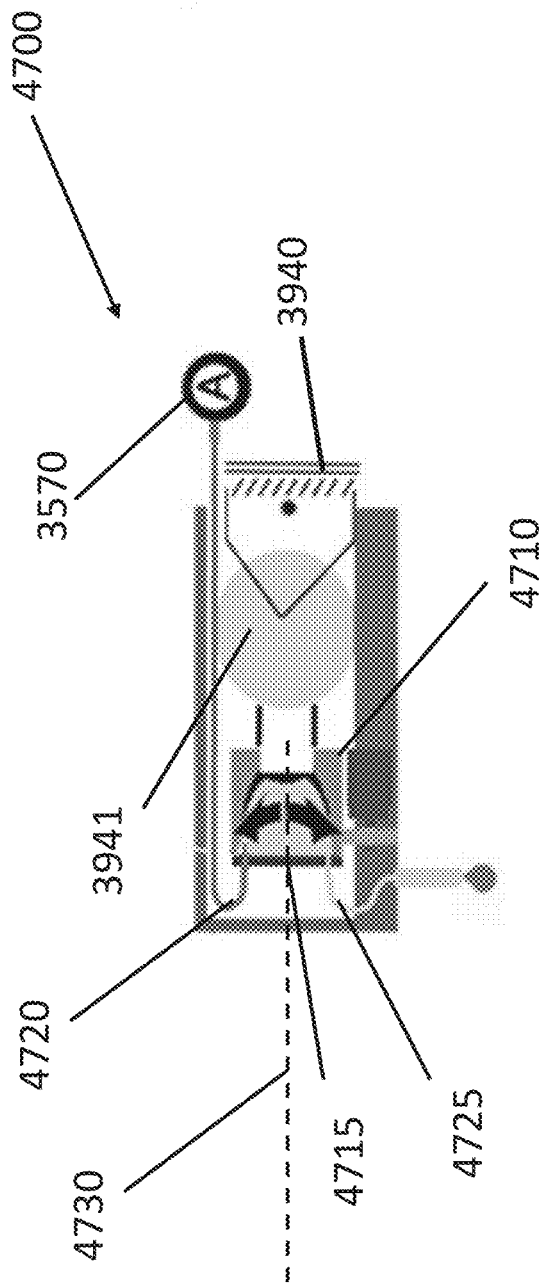
FIG. 60 illustrates portions of the front end of a dispenser system, according to some embodiments of the invention.

FIG. 60 illustrates a portion of a microwave dispenser 4700 with a chamber 4710 that holds a receptacle 3704 in a horizontal position rather than a vertical position as shown in other embodiments. A dilution liquid inlet 4720 perforates the top of the receptacle (which may be covered in a metallic foil) at a position above the location at which a perforator and product outlet 4725 is formed in the top of the receptacle. In one implementation (shown by arrows), the chamber provides agitation about central axis 4730 of the chamber 4710. In an alternate implementation, the dispenser provides agitation along the central axis 4730. Tubing joining the dilution liquid inlet 4720 to transfer point A 3570 and/or tubing joining product outlet 4725 to the ultimate product outlet is flexible to accommodate motion imparted to the receptacle.

In some embodiments, the receptacle is made entirely of a non-metallic material and is fully transparent to electromagnetic energy. For these embodiments, the design of the cavity and the surrounding drawer or other dispenser hardware is modified to contain the electromagnetic energy within the dispenser envelope so it presents neither a health/safety hazard nor an electrical disruption that would be of concern to the FCC.

FIGS. 56A-E, 57A-E, 58A-G, 59A-G and 60 illustrate different options for using electromagnetic energy to secondarily heat the frozen contents. Where the description and/or drawings use the word "microwave" to describe the type of electromagnetic energy used for heating, one knowledgeable in the art will recognize that the magnetron used to supply high frequency electromagnetic energy can be designed to develop frequencies from the low Megahertz range to the Gigahertz range.) In each case, a power supply 3940 feeds a magnetron (alternating electrical frequency generator) 3941 to deliver a beam of energy to the receptacle. In some embodiments, as illustrated in FIGS. 56A-E and 58A-E, the electromagnetic heating cycle is started before the receptacle is punctured by one or more needles. In some embodiments, as illustrated in FIGS. 57A-E and 59A-E, the electromagnetic heating cycle is started after the receptacle is punctured by one or more needles. In some embodiments, the initial puncture of the receptacle is managed to simply provide a small vent such that any vapor or steam created by the secondary heating process can escape the receptacle without any significant pressure buildup.

In some embodiments, as illustrated in FIGS. 56A-E and 57A-E, the receptacle is held within the dispenser cavity with its axis of symmetry oriented vertically during heating, dilution and agitation. In this instance, the electromagnetic energy is directed into the receptacle through the sidewalls of the receptacle. In some embodiments, as illustrated in FIGS. 58A-E and 59A-E, the receptacle is held within the dispenser cavity 4710 with its axis of symmetry oriented horizontally during heating, dilution and agitation. In this instance, the electromagnetic energy is directed into the receptacle 6920 through the lid or closed end of the receptacle. In some embodiments, wherein the receptacle material is aluminum, some other metal or otherwise conductive, a "window" in the lid or the closed end of the receptacle (depending on which side faces the emitter) is produced from a material that is more transparent to the frequency of the energy being used. In some embodiments, this window is a circular or rectangular patch (to match the shape of the emitter or receptacle) that is thermosealed over a hole in the closed end of the receptacle or a hole in the aluminum lid. In some embodiments, the entrance and exit needles are shielded by ground planes.

To load the receptacle 3704 into the dispenser cavity 4710, a top portion of the dispenser 6910 opens to expose the cavity 4710. The user loads the receptacle 3704 into the cavity 6905 and closes the top portion 6915 manually. Optionally, the dispenser closes the top portion in response to the user pressing a button or operating some other user interface (not shown). Before, after, and/or during the time when the electromagnetic energy is directed into the receptacle 6920, the dispenser can, optionally, agitate the receptacle 6912, using motor/drive 6908. Perforator and flow path 6914 direct the melted liquid food or beverage product to the user's vessel. The dispenser opens the top portion 6910 so to enable the user to remove the empty receptacle 6916, and the user closes the dispenser manually or by interaction with an interface 6930.

Figure 61:
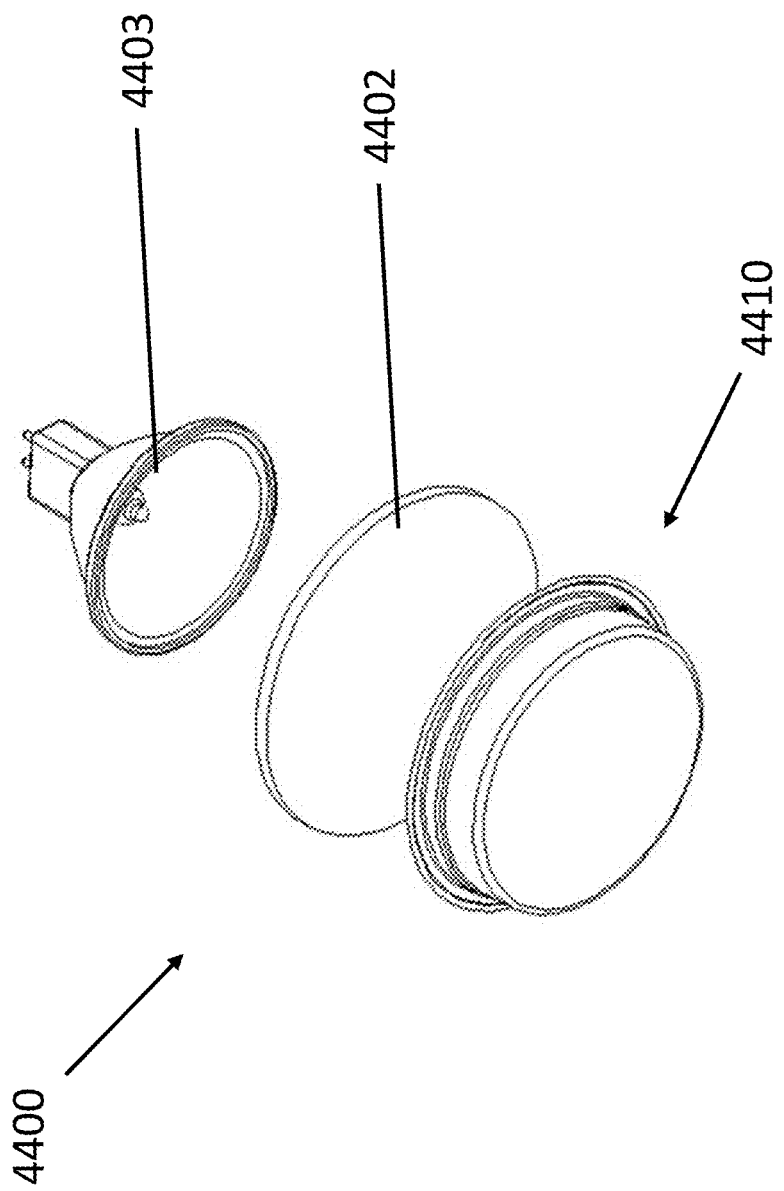
FIG. 61 is an isometric view of an infrared heating system according to an embodiment of the invention.
Figure 62A:
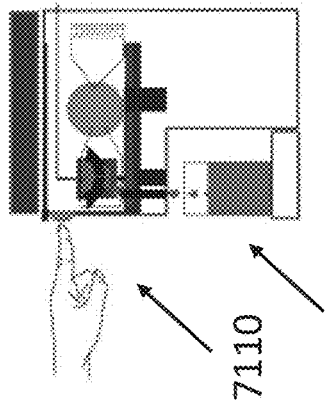
Figure 62C:
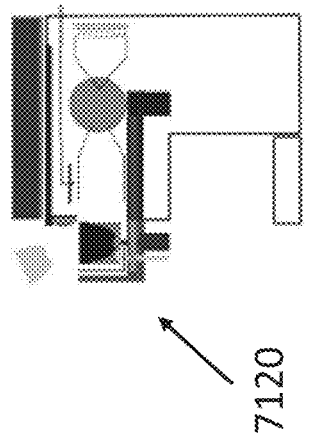
Figure 62B:
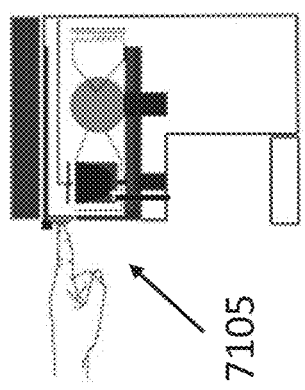
Figure 62D:
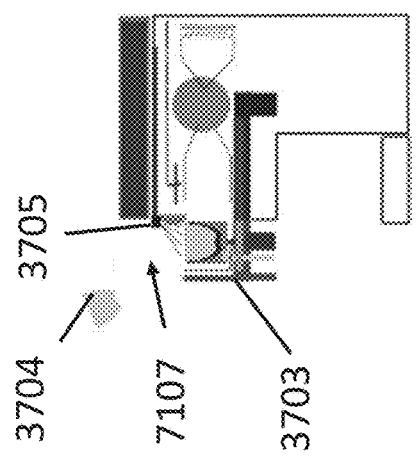
Figure 62G:
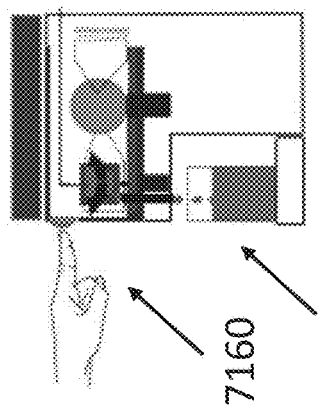
Figure 62H:
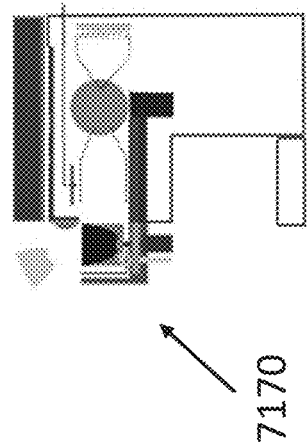
Figure 62E:
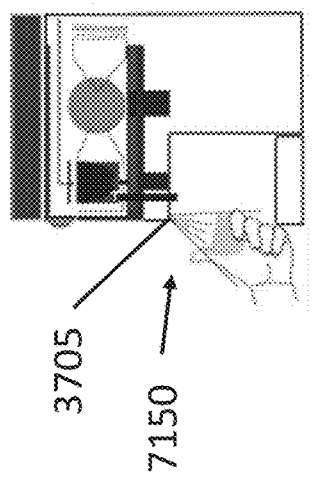
Figure 62F:
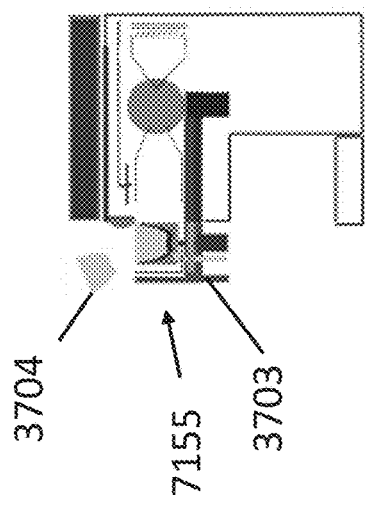
Figure 64G:
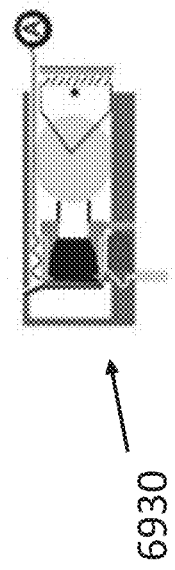
Figure 64E:
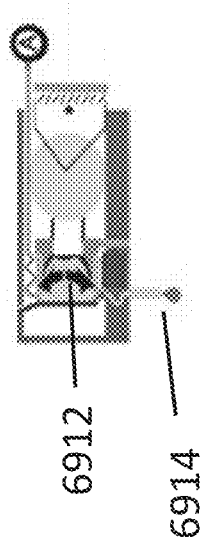
Figure 64F:
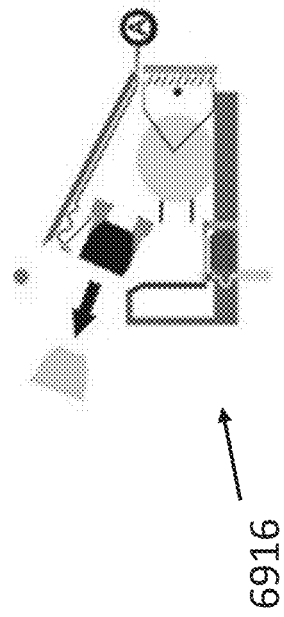

FIG. 61 is an isometric view of an infrared heating system 4400 which illuminates the frozen contents through a transparent (to IR) lid section. Heating system 4400 is yet another example of a secondary heat source that would allow the frozen contents contained within receptacle 4410 to be melted and heated using an infrared (IR) heater. In some embodiments, the heat source 4403 is a combined IR heater and reflector powered by an on-board power supply (not shown). In some embodiments, this IR heater emits an IR spectrum centered on about 2-2.5 microns, corresponding with a black body emitter of approximately 1200° K, to match an optimum absorption band for water and ice. In some embodiments, a band pass filter 4402 allowing radiation in the range of about 2.0-3.3 microns to reach the receptacle 4410 is disposed between the heat source 4403 and the receptacle 4410. Such a filter reduces high absorption peaks typical of polypropylene or polyethylene materials used for covering and sealing receptacle 4410. Reducing the energy at these absorption peaks reduces the likelihood of melting the lid material while heating the frozen contents. In some embodiments, the IR heater is an incoherent light source. In some embodiments, the heater is an infrared laser system. In some embodiments, the laser system includes beam expander optics to enlarge the coherent beam to match the full diameter of the receptacle or some smaller diameter inside of the perforation needles.

FIGS. 62A-62D illustrate an embodiment of a user interface embedded within the front end of the dispenser and user interaction with the interface. FIGS. 62E-62H illustrate another embodiment of a user interface embedded within the front end of the dispenser and user interaction with the interface. FIG. 62I illustrates yet another embodiment of a user interface embedded within the front end of the dispenser. These user interface examples are meant to be illustrative and not limiting. For example, an alternative user interface could consist of a single button or interface to start the dispense cycle with all other parameters and feedback communicated through a smart phone or simply handled automatically based on pre-programmed "recipes" stored internally on the dispenser's microcontroller.

FIGS. 62A-62D and 62E-H illustrate two possible embodiments among many for a user interface strategy for control of the machine. As shown in FIGS. 62A-62D, in some embodiments, the user presses a button 7105 to open a drawer 3703 for loading a receptacle 3704 containing the desired beverage extract or concentrate. The receptacle, once loaded into the drawer, is scanned 7107 by a sensor 3705 to determine or read certain information about the receptacle's contents from a bar code, QR code, RFID or other type of label or active device. In some embodiments, the dispenser provides immediate feedback to the user as described below in the description of FIG. 62I. In some embodiments, the drawer reopens if the data scan was not successful or if certain data such as the "Use By" date indicates that the product should not be used as-is or at all. In some embodiments, the user pushes a dispense button 7110 to signal that the machine should proceed with the production of the beverage 7115. In some embodiments, the drawer opens at the end of the dispense cycle so the user may remove the empty receptacle 7120.

In some embodiments, as shown in FIGS. 62E-62H, scanning of the information contained on the lid of the receptacle 7150 via sensor 3705 takes place before the receptacle is inserted into the machine. This scanner may be activated by way of a proximity sensor that detects a receptacle is within some acceptable distance and location envelope of the dispenser. In some embodiments, the scan is used as a key to access the dispenser. If the scan is successful and there are no "flags" indicating the receptacle is unsuitable for use, a drawer 3703 opens 7155 and the receptacle 3704 can be placed into a receptacle cavity. In some embodiments, if the receptacle loads successfully and the user confirms that the planned brewing cycle is correct, the user presses the dispense button 7160 and the dispense cycle begins 7165. As before, in some embodiments, once the dispense cycle is complete, the drawer reopens and the receptacle may be removed 7170.

FIG. 62I illustrates one possible embodiment of the user interface consisting of four buttons which may be pressed or are illuminated at different points in the dispense process. These buttons either signal to the machine or to the user the status and appropriate next steps. For example, when a receptacle has been scanned, if the scanned information indicates that a cold beverage is to be produced, the blue "COLD BEV" button 7185 could be illuminated. Similarly, if a hot beverage is being planned by the machine controller based on inputted data, the red "HOT BEV" button 7190 could be illuminated. In some embodiments, the "READY" button 7180 is used by the operator to initiate a cycle or to confirm that the scanned data is correct. In some embodiments, not shown, the blue and red lighting could be provided by a string of LED bulbs that, for example, surround the perimeter of an outward facing surface of the dispenser. In some embodiments, this string of LEDs could illuminate progressively from the beginning of a dispense cycle to the end of the cycle, communicating to the user the status of the dispensing process. One example is status light 7175 showing that the dispenser is in a heating cycle, with progress shown by sequentially illuminated ready lights around the circumference of the status light 7175.

FIGS. 63A-J illustrates a mechanism and process whereby the receptacle 3704 is held in the dispenser cavity in an inverted orientation with the lid closure facing the bottom of the dispenser. The receptacle 3704 is scanned by the sensor 3705, thereby causing the dispenser to raise a top opening of the dispenser 7210 to expose receptacle platform 7215. The top portion 7210 has an inverted chamber 7225 that has a shape that accommodates the receptacle. The user places the receptacle 3704 on the platform 7215 and closes the dispenser top opening 7210. The dispenser performs the actions needed to product the liquid food or beverage product according to information gathered by the sensor 3705. The actions may include agitation 7212 by way of motor/drive 7208. The liquid food or beverage product exits the system 7214 by way of outlet 7209. At the end of the production cycle, the dispenser raises top portion 7210 to enable the user to remove the empty receptacle 7216.

The chamber 7225 has a spring loaded section 7228 that allows chamber 7225 to accommodate a large receptacle 7220 or a small receptacle 7224. The spring loaded section 7228 presses a lid of the receptacle down on the platform 7215. In some embodiments, this lid is punctured by one or more needles to provide both the input location for diluting/melting fluids and a drain location for dispensing melted liquids into the user's cup. In some embodiments, as shown in FIGS. 63I-J, the entrance needle 7230 is a tube allowing liquid to flow into the receptacle 7238 (receptacle shown as 7220 and 7224). The outside of the needle 7230 has groves around its circumference, these groves provide and exit path 7240 for the liquid. In some embodiments, the entrance needle is heated. Needle 7230 passes through a collar 7234. Collar 7234 is atop the platform 7215. When the spring loaded section 7228 pushes the receptacle 7220 or 7224 down onto the collar, the receptacle lid material is stretched and then torn over the collar. This allows liquid to exit 7240 via the groves in needle 7230.

Needle 7230 is retracted into this collar when the dispenser top portion 7210 is open. Needle 7230 moves up a designated distance depending upon the size of the receptacle placed into the dispenser. The dispenser determines the receptacle size via the information gather by sensor 3705 and/or by feedback from a position sensor associated with the spring loaded section 7228. Optionally, needle 7230 is spring loaded and continues to extend into the receptacle as the frozen content melts.

FIG. 64A-G illustrates an embodiment wherein the receptacle is held such that its axis of symmetry 7310 is oriented horizontally and needle punctures of the receptacle occur through the sidewalls. In some embodiments, the needle providing the melting/diluting fluid 7320 is located toward the top of the dispenser cavity and the needle providing the drain to the user's cup 7315 is located toward the bottom of the dispenser. The inlet needle 7320 and outlet needle 7315 engage the sidewalls of the receptacle 3704 when top portion of the dispenser 6910 is closed 7325. Similarly, a motor or drive 7308 engages chamber 4710 when the top portion of the dispenser 6910 is closed to provide any needed agitation. These figures illustrate the use of a microwave heating source for secondary thermal energy 6920, but any of the other techniques and/or processes described herein could be equally effective so long as the geometry of any of these systems was modified to accommodate the side puncture mechanism.

FIGS. 65A-65E illustrate an embodiment wherein a long, penetrating needle 7410 is also designed to provide a pulsed, horizontally oriented spray after full penetration of the frozen contents has been completed. Dispenser sensor 3705, drawer 3703, transfer point 3570 operate in the manner described elsewhere herein. Optionally, drawer 3703 is opened and/or closed by motor 7405. For some embodiments, the needle 7410 is heated by heat source 7415, which can be an induction heater, fluid heater, or any other heat sources disclosed herein. Motor/drive mechanism 7420 lowers the needle 7410 into the receptacle, which passes through the frozen contents by melting a pathway and then forcibly penetrates the closed end of the receptacle 3704 to provide a drain to the user's cup 7430.

In some embodiments, the needle then retracts to a point where the side vent 7435 of the needle is slightly above the top of the frozen contents and in some embodiments the needle stays in place to act as a drip spout and keep the thawed content passageway open. In some embodiments, needle 7410 has four fluid ports 7440 along the circumference of the needle located at an intermediate distance 7450 from the distal end of the needle 7410. Thereafter, and in conjunction with some secondary heating of the receptacle by any of the embodiments or implementations already cited herein (omitted from the figures for the sake of clarity), a process that is designed at a minimum to melt the interface between the frozen contents and the sidewalls and closed bottom of the receptacle, the horizontal pulse spray is activated to cause frozen contents to rotate on the fluid bearing caused by the melted interface between the frozen content and inner receptacle surface.

Figure 65F:
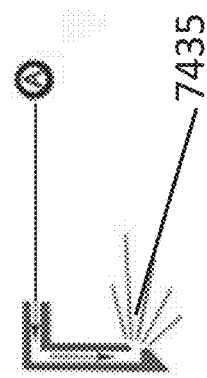
Figure 65G:
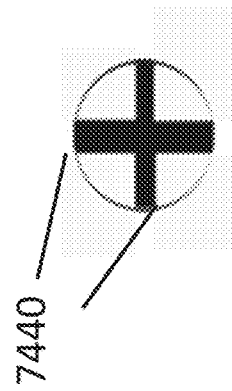
Figure 65D:
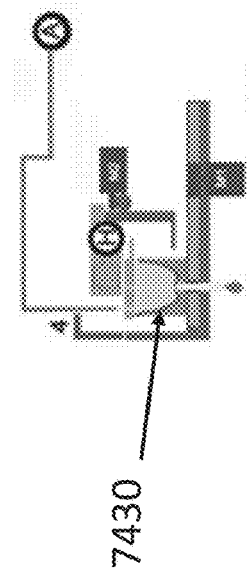
Figure 65E:
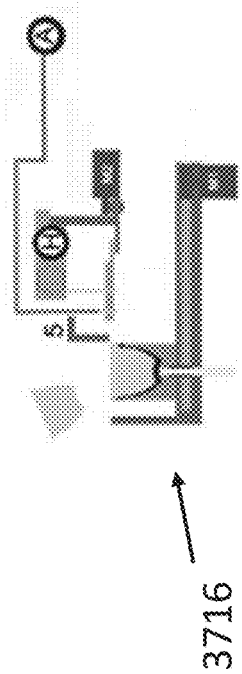
Figure 65H:
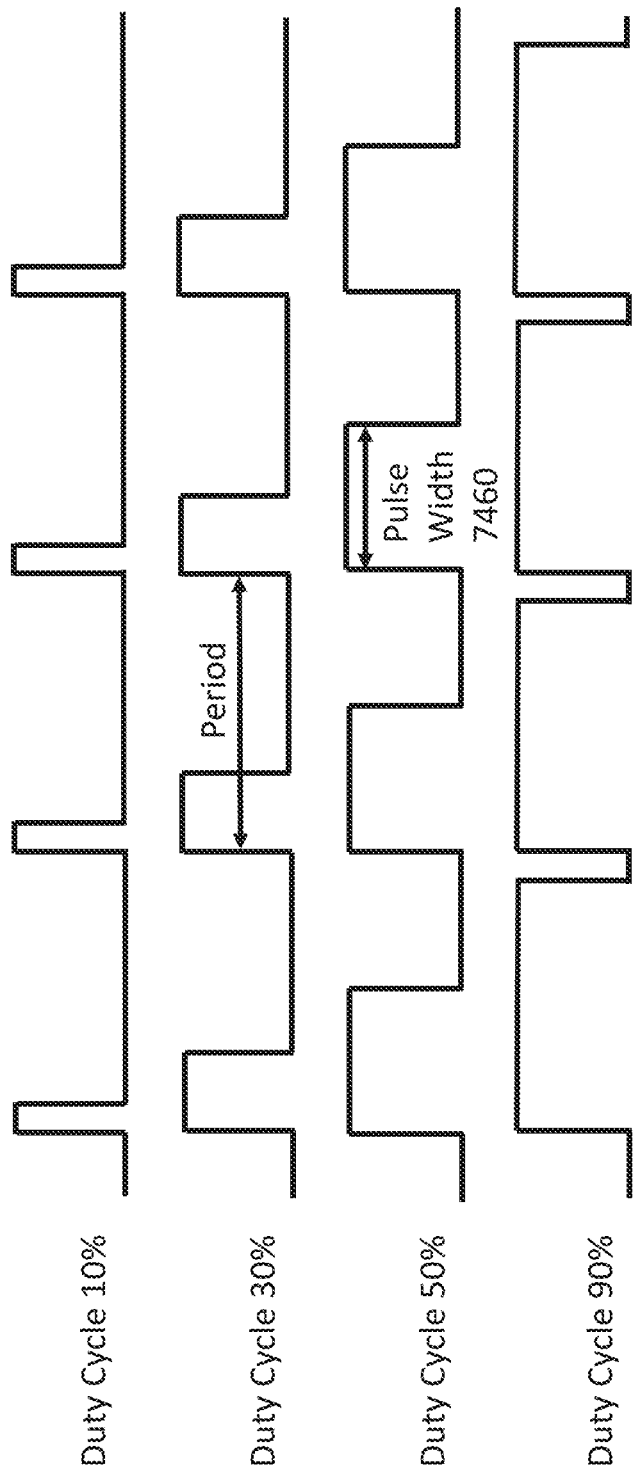

In some embodiments, this pulse driven rotation is an alternative or supplement to the mechanical agitation otherwise used to hasten the liquefaction of the frozen contents. The duty cycle of the pulsed fluid can vary as needed, depending on the mass of the frozen contents and the volume of diluting liquid available to inducing motion. FIG. 65H illustrates several possible embodiments of this pulse cycle. Fluid is supplied during the pulse width 7460 and not supplied during other times. In some embodiments, this pulse driven rotation is supplemented by pulses of air in the liquid dispense line. Upon completion of the product, the dispenser opens the drawer to enable the user to remove the empty receptacle 3716.

FIGS. 66A-74 illustrate several cavity embodiments that are designed to be easy to load and otherwise convenient to use for all receptacles and products intended for use therein. Identifying the best approaches to loading, orienting, secondarily heating, puncturing, agitating, diluting and dispensing described above, cup and matching cavity design are critical aspects of success. Whether the cavity intimately contacts all or a major portion of the receptacle surface, as well as its orientation, is largely determined by the type of secondary heat source used to add thermal energy and the technique and/or process of introducing needles and agitation. One knowledgeable in the art will recognize that there are many minor variations building on these themes that would also work.

FIGS. 66A-70B illustrate a family of embodiments of a cavity and cup system that is intended to accommodate a variety of cup sizes without the complication of various mechanisms to move one needle or another out of the way when different cups are inserted. In some embodiments, the dispenser may have a stepped cavity for receiving receptacles that fit into and are secured into the cavity differently based on the geometries of the receptacles and the steps.

Figure 66A:
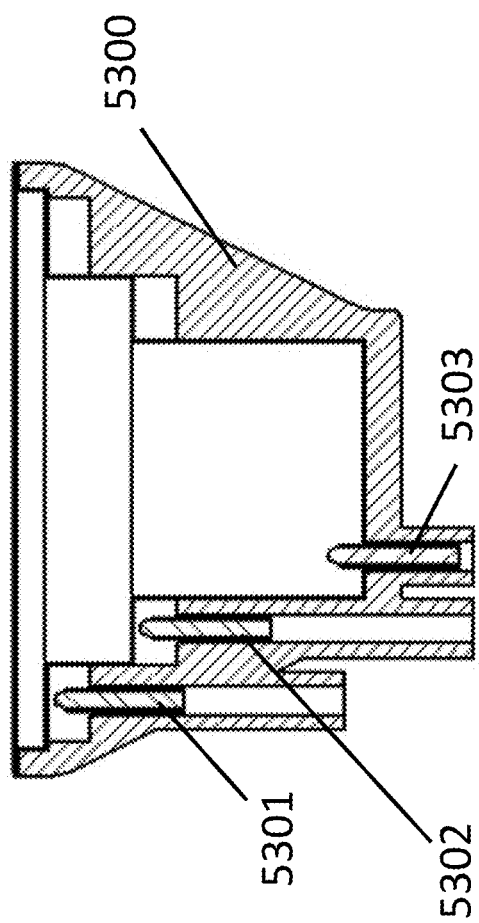
Figure 66C:
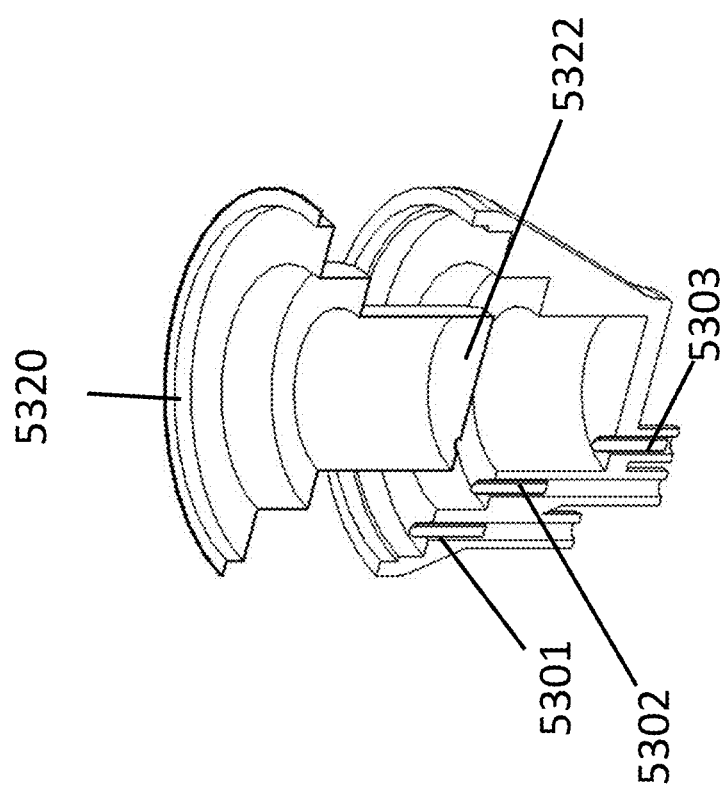

FIGS. 66-68 show three sizes of cylindrical, multi-stepped receptacles with stepped geometries for the purpose of being perforated at different depths. The steps and receptacle geometries work together in these systems to allow using and puncturing the bottom of three or more different size receptacles in a single complex cavity.

FIG. 66A specifically illustrates the embodiment of a cavity 5300 which consists of three different steps, each with a needle intended to perforate the bottom of one size of cups, but not others. Needle 5301, for example, is intended to perforate the bottom of only the smallest of the three cups shown, as in FIGS. 66A and 66B, while needle 5302 is for medium cups and 5303 is for large cups. FIG. 66B illustrates the presence of a large cup 5320 in the cavity, and the bottom 5322 of the large cup 5320 is perforated by the needle 5303.

FIGS. 67A and 67B illustrate the placement of a medium cup in the cavity and penetration by needle 5302. FIG. 67B illustrates the presence of a medium cup 5330 in the cavity, and the bottom 5332 of the medium cup 5330 is perforated by the needle 5302.

FIGS. 68A and 68B illustrate the placement of a small cup in the cavity and penetration by needle 5301. FIG. 68B illustrates the presence of a small cup 5340 in the cavity, and the bottom 5342 of the small cup 5340 is perforated by the needle 5301.

It should be noted that this fixed needle geometry is only one of many approaches for controllably receiving and perforating a variety of receptacles in a single cavity. It should also be noted that various techniques and/or processes for dealing with multiple sizes of receptacles using multiple cavities, as in a linear or circular cassette, are described elsewhere.

FIGS. 69 and 70 illustrate cavities in which receptacles may not have a stepped geometry, but rather a convexity or concavity to avoid different perforation areas designed for other receptacles. For example, in FIGS. 69A and 69B the concavity in the shape of the sidewall allows the sidewall of the receptacle to avoid a perforation from a needle intended to perforate a receptacle of a different size and volume. FIGS. 69A and 69B illustrate the fit of one size concave wall receptacle into the multi-stepped cavity.

Figure 70B:
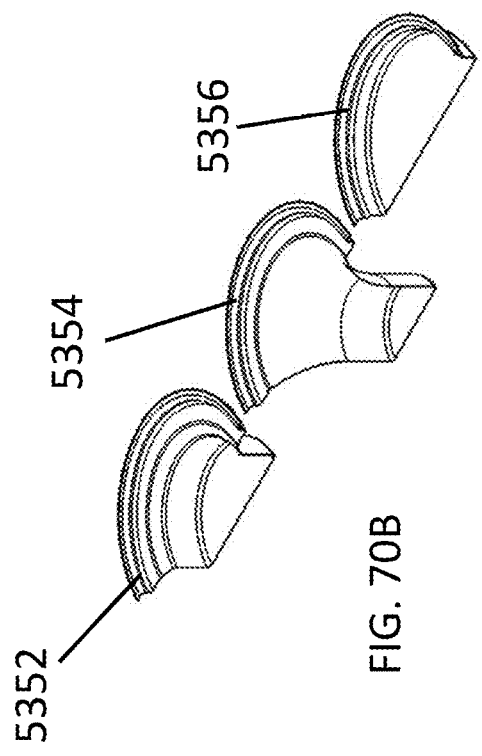
FIGS. 70A and 70B are front and perspective views of a second family of receptacles that might be used in a cavity of the type shown in FIGS. 69A-B, according to some embodiments of the invention.
Figure 70A:
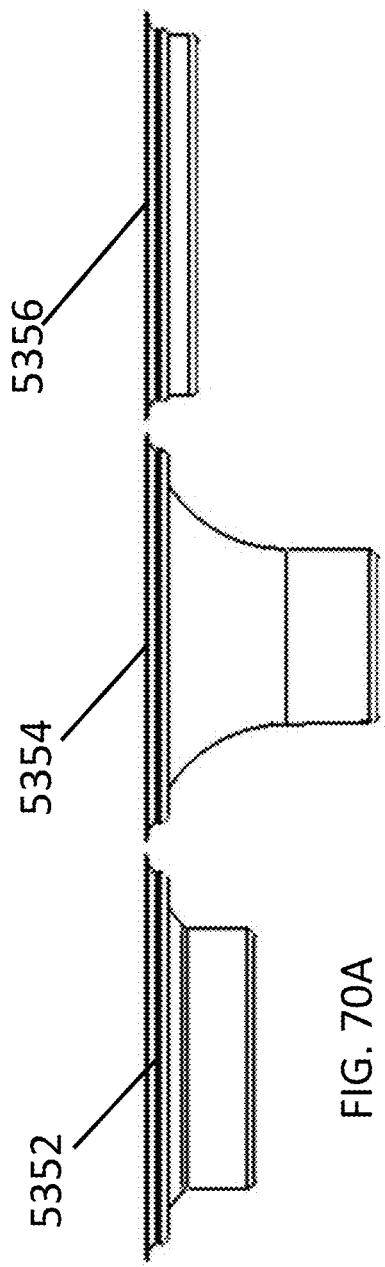

FIGS. 70A and 70B illustrate what a family of such container might look like, all intended to work within the same cavity. Particularly, container 5352 shows a medium container, contain 5354 shows a large container, and container 5356 shows a small container.

FIGS. 71-74 illustrate another approach to a single cavity which can accommodate receptacles of different sizes. In this family of embodiments, the receptacles and the cavity share a single conical taper angle 5400, thus a cup of any size could potentially fit so long as there was relief 5401 in the walls of the cavity for its outer lip and any stacking ring or similar geometry, i.e., features which would prevent its seating into the tapered shape. In some embodiments, to allow convenient loading and to prevent the outer lip or stacking ring geometry from interfering with insertion, the cavity is designed to hinge open along a line 5402 parallel with the axis of symmetry.

Figure 72:
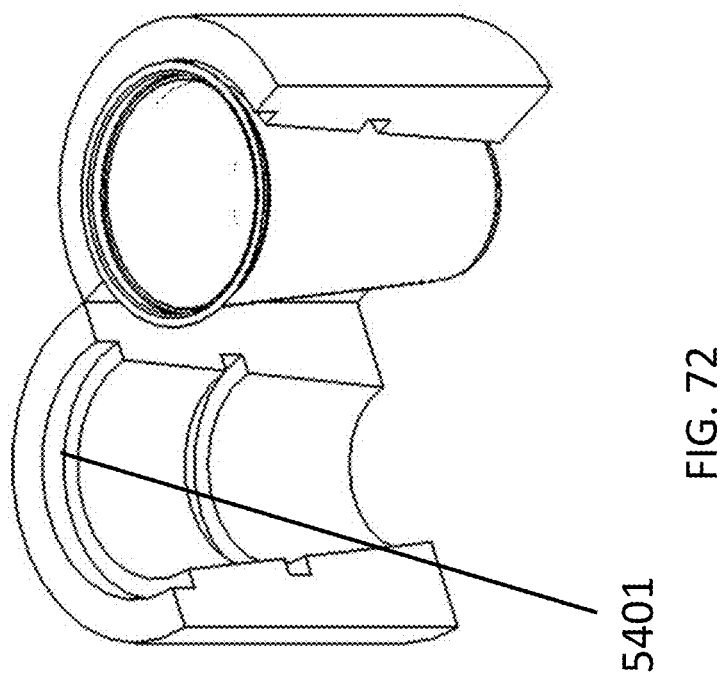
FIGS. 71, 72, 73 and 74 are perspective views of a hinged cavity that is designed to accept various sizes of receptacles sharing a common taper and standard lip/stacking ring geometry (other than diameter), according to some embodiments of the invention.
Figure 71:
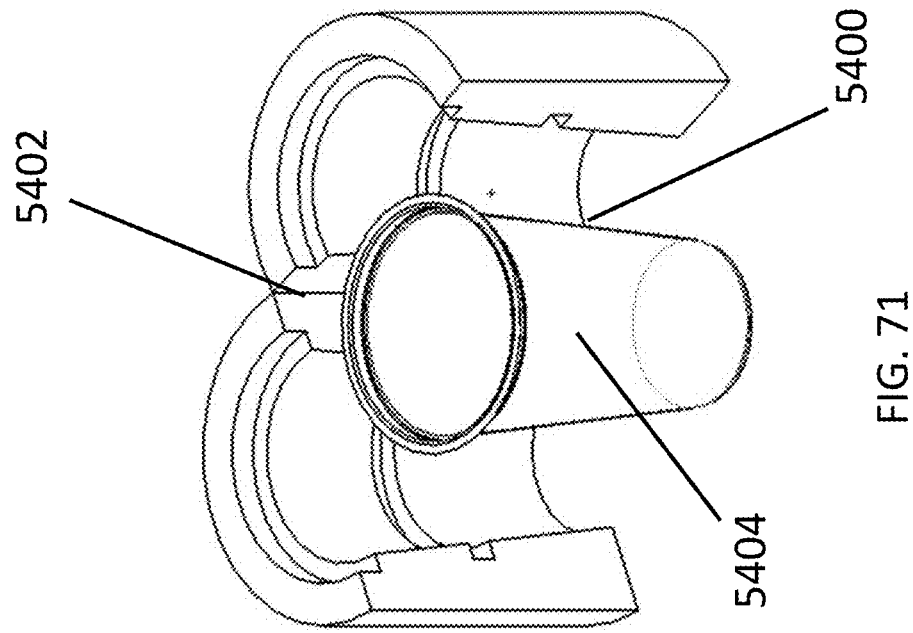

FIGS. 71 and 72 illustrate an embodiment wherein a tall receptacle 5404 almost completely fills the cavity and can be tightly held therein.

Figure 74:
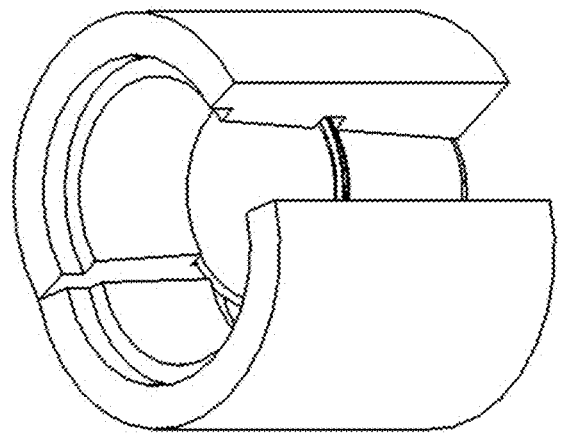
Figure 73:
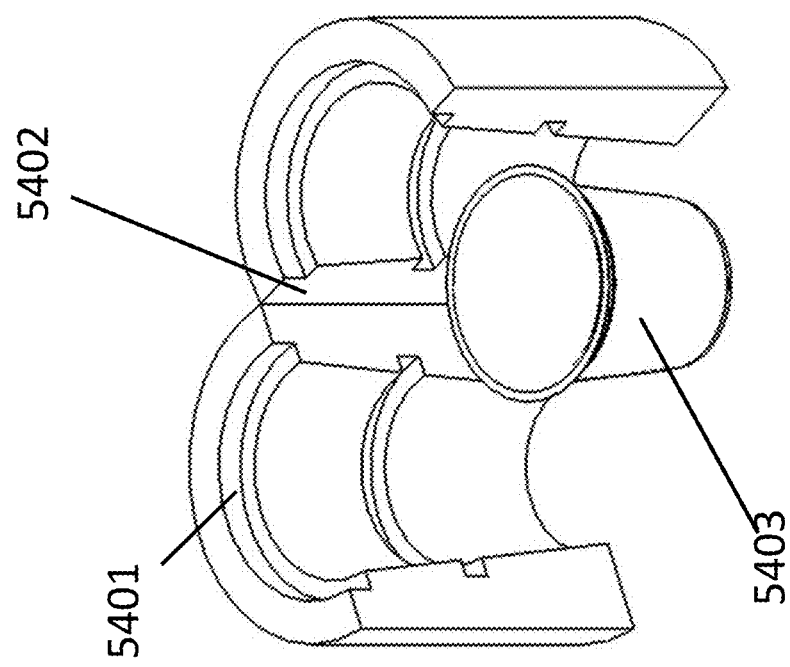

FIGS. 73 and 74 illustrate an embodiment wherein a shorter cup 5403 fills only the bottom half of the cavity. In both cases, the cavity geometry would be conducive to use of conduction heating methods as described above.

FIGS. 75A-D illustrate an embodiment wherein a single long needle, connected to the source of melt/dilution fluid (hot or cold) acts as both an inlet and exit perforator. In some embodiments, the needle would unwind from a roll or coil of tubing and channel steam or hot water into the receptacle while simultaneously boring through the frozen contents. To better describe this function, FIGS. 75A and 75B illustrate a receptacle 5504 with frozen contents 5505, a receptacle lid portion 5503, a flexible tube 5500 and tube guide 5501. Tube 5500 is reinforced on the end with a sharp penetrator 5502. In operation tube 5500 is fed through guide 5501. When it reaches the frozen contents 5505 and encounters some resistance in further movement, the microprocessor controlling the system stores the penetrator's position and then begins to pass a measured amount of low pressure steam or hot water through the tube to melt a hole in the frozen contents. FIG. 75C illustrates the stage of this embodiment where the penetrator has passed fully through the frozen contents and then forced its way through the closed end of receptacle 5506. Thereafter, as shown in FIG. 75D, the penetrator is partially withdrawn, leaving behind melted channel 5507 which is useful for draining melted liquids from the receptacle into the user's cup below (not shown). In this partially withdrawn position, the tube and penetrator can continue to funnel melting/diluting fluid into the receptacle to fully melt and dispense the remainder of the frozen contents. As noted before, some amount of secondary heating may be required (not shown in these figures) to partially or fully melt the frozen contents in conjunction with the effects of the melting/diluting liquid added through the penetrator.

In some embodiments, the dispense needle is surrounded by a sheath or rinse chamber during periods when it is not in use. In some embodiments, the external surface of the dispense needle is sanitized by water passing through an external sheath and the internal surface of the dispense needle is sanitized by water passing through is core.

FIGS. 76-84 illustrate several other possible embodiments implementing the long penetrator concept. In these figures, the long penetrator is rigid and driven through the receptacle and frozen contents using some mechanical device such as an acme or ball screw or pneumatic cylinder. In some embodiments, as illustrated in FIG. 76, a circular cassette 5600 or carousel is used to hold receptacles of various sizes. Some dispenser structure 5601 encloses and supports the necessary hardware package 5602 for driving a long penetrator and a secondary fluid delivery sheath. In some embodiments, as illustrated in FIG. 77, the mechanism shown in cross-section and without the support structure 5601 for clarity, includes drive motors 5603A and 5603B, actuation screws 5604A and 5604B, a long solid, electrically heated needle 5605, a coaxial (around the needle) liquid delivery sheath 5606, support arms 5610A and 5610B, and elements of a receptacle—the lid 5607, the frozen contents 5608 and the closed end 5609. The actuator screws and the motors in this embodiment/illustration are joined by a drive belt, but the screws could also be driven directly through an axial shaft coupling as is well known in the art.

The general sequence of operations, like that shown in FIGS. 75A-75D, is illustrated for some embodiments in FIGS. 78A, 78B, 78C, 79A and 79B. In FIG. 78A a receptacle has just been loaded into the cassette and the cassette rotated to a point where the receptacle is centered under the long penetrating needle 5605. At this point, both needle 5605 and coaxial sheath 5606 are at their uppermost positions, allowing the receptacle to freely rotate under them without contact. In FIG. 78B, the long needle 5605 has already penetrated the receptacle's lid and has begun to advance through the frozen contents. Note that coaxial sheath 5606 remains in its uppermost position. Also note, in some embodiments, coaxial sheath 5606 will advance along with needle 5605 until it reaches some defined location from which it will deliver melting/diluting fluids at the appropriate time. In some embodiments, long needle 5605 consists of a ⅛" diameter electrically operated cartridge heater. In some embodiments, this heater has embedded heater wires which only heat the outermost/distal (as regards the location of the heater wires coming out of the heater) end of the heater. In some embodiments, this heater incorporates a thermocouple or RTD or thermistor which can be used to achieve PID temperature control and the tip of the heater can be maintained at a temperature of 150° F. to 170° F., sufficient to quickly bore through the frozen contents without the risk of creating steam or overheating sensitive components in the frozen contents.

In some embodiments, the needle 5605 is slightly larger in diameter and incorporates one or more grooves to ease the passage of fluids away from the needle, especially after it has penetrated the bottom of the receptacle. In FIG. 78C long needle 5605 has reached the bottom of the frozen contents and is ready to penetrate the closed end of the receptacle. In FIG. 79A needle 5605 has penetrated the bottom of the receptacle and coaxial sheath 5606 has been deployed to the top of the lid of the receptacle. In some embodiments needle 5605 is left in this fully extended position and functions to keep the melted bore open to flow and act as a drip point for exiting fluids being dispensed to the cup. In some embodiments, as in FIG. 79B, needle 5605 has withdrawn to a point slightly above the uppermost surface of the frozen contents and coaxial sheath 5606 has fully entered the receptacle head space region. It should be noted, consistent with the description of secondary heating methods and cycles above, the entire process shown in FIGS. 78A-79B has, in some embodiments, been conducted simultaneously or following the application of secondary heating whose purpose was to warm or partially melt the frozen contents. To conclude this sequence of operations, in some embodiments melting/diluting fluids are injected through coaxial sheath 5606, complete the melting of the frozen contents, drain through the melted bore of whatever remains of the frozen contents over time, and eventually wash the receptacle clean. FIG. 80 is a close-up view of how the needle 5605 and coaxial sheath 5606 are configured for some embodiments while fluids are being passed through coaxial sheath 5606 and melting/diluting the remainder of the frozen contents.

FIGS. 81A and 81B illustrate how in some embodiments a spring mechanism can be used to control the level of pressure used to drive the long needle 5606 through the frozen contents. The mechanism consists of the needle 5606, an integral collar 5623 on the needle, a compression spring 5620 disposed between the collar and the bottom of the carrier arm 5610A, a pin or similar protuberance 5621 projected radially outward from needle 5606, and an optical sensor 5622. As the needle and support arm sub-assembly 5630 travels down the actuator screw 5604A, spring 5620 remains fully extended until needle 5606 encounters some resistance. At this point, the force needle 5606 applies to the impediment to travel (lid, frozen contents, of closed end of the receptacle) is limited by the spring 5620's compression stiffness. Activator screw 5604A continues to advance carrier arm 5610A regardless of whether needle 5606 is advancing.

As this occurs, spring 5620 compresses until pin 5621 intersects the light beam projected from one arm of optical sensor 5622 to the other. The break in the projected beam of sensor 5622 signals the microcontroller to stop driving activator screw 5604A. Thereafter, until a secondary sensor (not shown) detects that pin 5621 has returned to the position it occupies when spring 5620 is again fully extended or until some programmed time has elapsed, any movement of needle 5606 is only caused by the force applied by the spring. In some embodiments, depending on geometry data fed to the microcontroller with the, for example, the receptacle is scanned during the loading process, the microcontroller may override the signal from optical sensor 5622 and continue to drive the actuator screw. This might occur, for example, when the needle has contacted the lid or the closed end of the receptacle and more force is needed to penetrate one or both than can be created by the spring alone.

FIG. 82A illustrates a feature that may be included for some embodiments. Component 5640 is a sharply pointed, grooved end piece that may be added to the end of needle 5606. In some embodiments end piece 5640 is fabricated from a very hard, inert material, with a high thermal transfer coefficient. In some embodiments, this material is a molded silicon carbide piece. In some embodiments, the grooves 5641 wind helically around end piece 5640. In some embodiments grooves 5641 run parallel with the center axis of needle 5606. In some embodiments, end piece 5640 comprises a length that is 10-25% the length of needle 5606. In some embodiments end piece 5640 comprises 25-50% of the length of needle 5606. Referring to FIG. 82B, in some embodiments the aft end of end piece 5640 is tapered or chamfered and can be positioned relative to the end of coaxial sheath 5607 in ways that controllably shape the spray of fluid exiting from coaxial sheath 5607. This process is analogous to the way a hand sprayer on the end of a garden hose can be adjusted to achieve flow patterns that range from a harsh jet to a fine spray.

Figure 84:
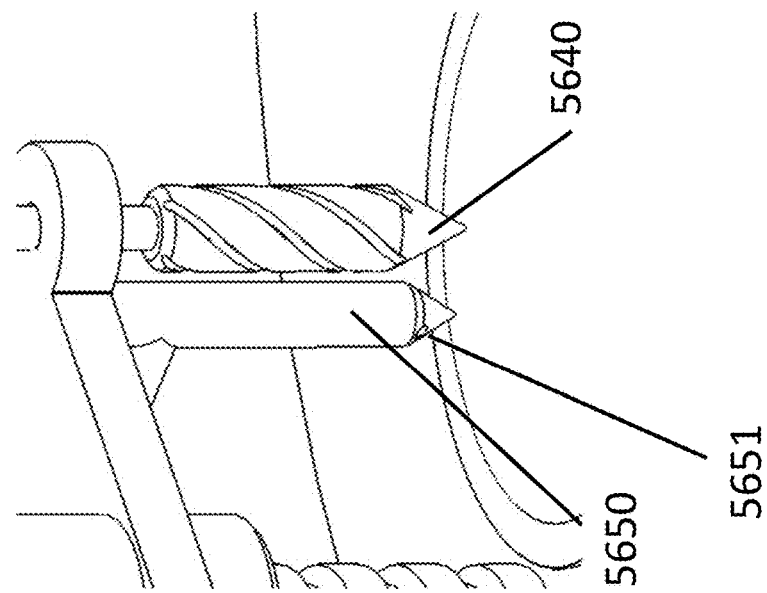
Figure 83:
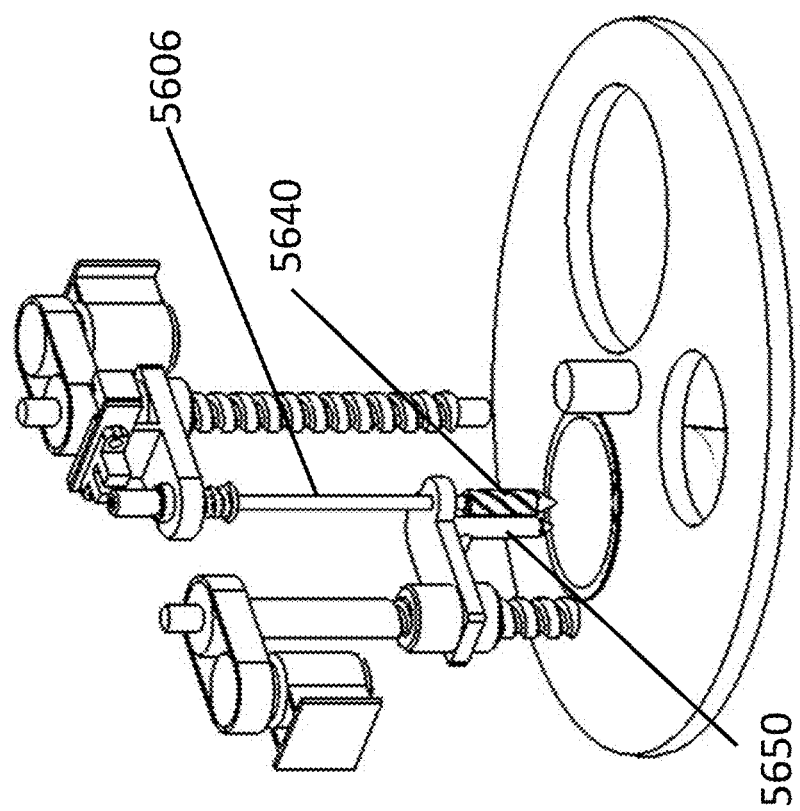

FIG. 83 illustrates how in some embodiments the fluid delivery channel is not coaxial with the long needle, but comprised as a separate, but proximate penetrator. This parallel penetrator 5650 operates similarly to the coaxial sheath 5607 described above. In some embodiments, however, it has an orifice 5651 as shown in FIG. 84 for injecting fluid into the receptacle that is not aligned axially and is not designed to provide a uniform spray. In some embodiments, this injected fluid is delivered in a pulsed pattern and directed tangentially around the periphery of the receptacle to cause the frozen contents to rotate internally.

Figure 85A:
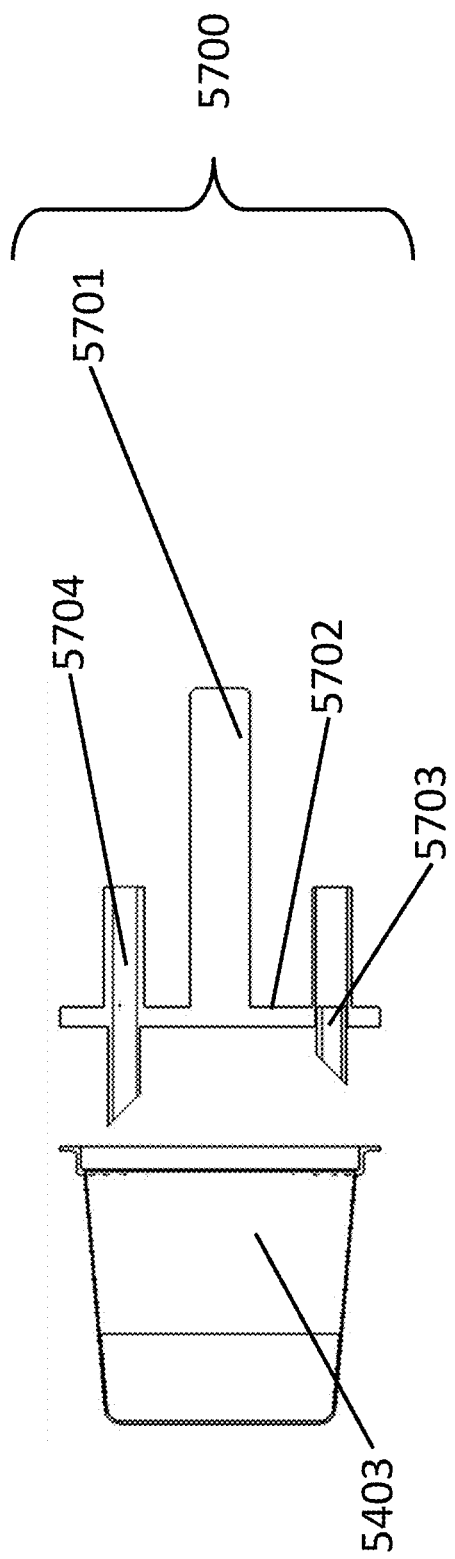
FIGS. 85A-C are side profile views of a plate penetrating assembly which is designed to work with receptacles whose axis of symmetry is disposed in a horizontal orientation, according to some embodiments of the invention.
Figure 85B:
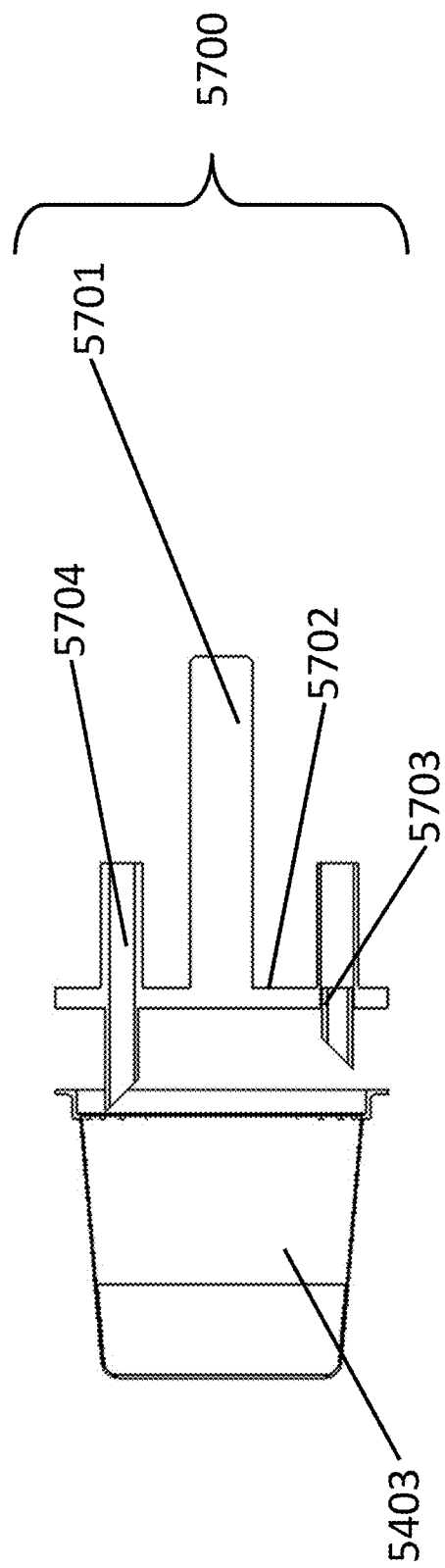
Figure 85C:
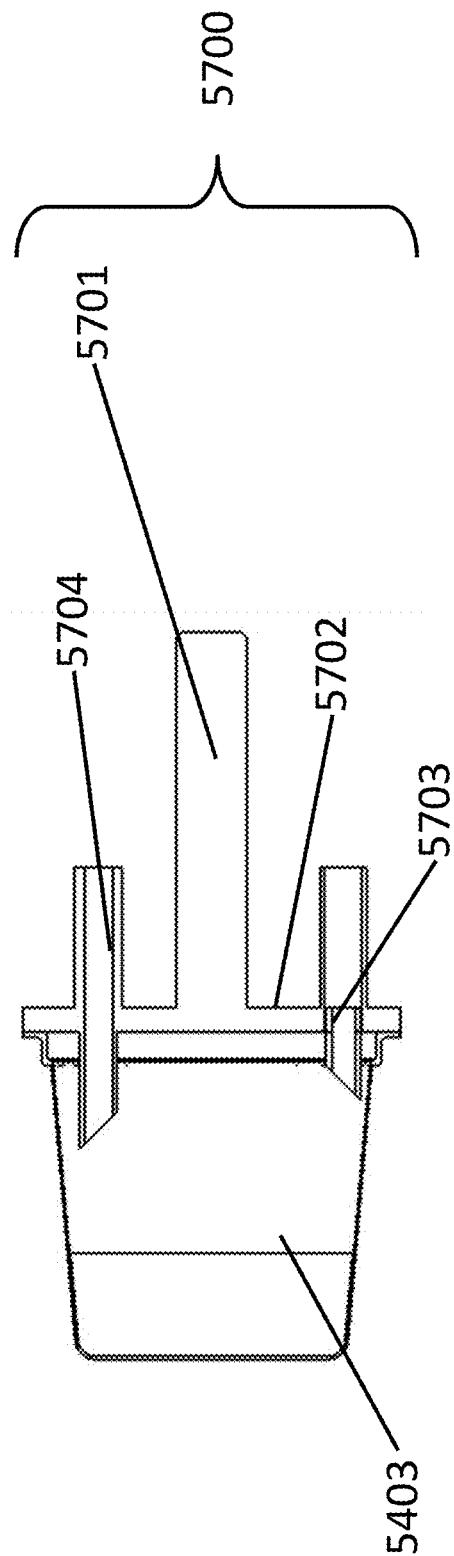

FIGS. 85A, 85B and 85C illustrate some embodiments wherein the receptacle is held in a horizontal orientation and a plate assembly 5700 including a plate 5702 and two (or more) needles (e.g., 5703 and 5704) can be advanced via shaft 5701 to penetrate the lid of receptacle 5403 (or an alternative cup, e.g., 5400) or for addition of melting/diluting liquids and draining of melted fluids (as shown in FIG. 85C). Note that for venting in some embodiments as shown in FIG. 85B, the injection needle may only partially penetrate the lid to create a sub-diameter hole (as compared to the full needle diameter) for release into the dispense cavity of any build-up of pressure that might occur during addition of secondary (non-diluting) thermal energy.

FIGS. 86A, 86B and 86C illustrate some embodiments wherein the receptacle is held in a contact heater 5800 that is closely matched to the receptacle in terms of the angle of their common conical contact surface geometries 5803A and 5803B. To minimize thermal mass, and thereby minimize the opportunities for unwanted heat to be added to a receptacle, especially a receptacle for a product intended to be consumed cold, the heater wall of heater 5800 is made as thin as practical. Additionally, for some embodiments, the main heater body of heater 5800 is separated from the dispenser cavity walls by support ribs 5802. Thermal energy is delivered through heater body 5800 to receptacle 5403 primarily through conduction.

In some embodiments, the source of this thermal energy is an electric resistance wire embedded in an insulator such as magnesium oxide, a construction well known in the art of cartridge heaters, for example. In this embodiment, the electrical heater operates directly on the sidewalls of body 5800. In some embodiments, the heater is comprised of a similarly constructed cable (e.g., a resistance wire embedded in an insulator and swaged to a high compaction ratio around the wire as is well known in the art) which, in turn, is encapsulated within the hollow walls of body 5800. In this embodiment, a liquid such as water or oil acts as a medium to transfer heat from the cable heater to the side walls of body 5800 and subsequently on to receptacle 5403. In yet another embodiment, the heating of a liquid medium such as water or oil occurs remote from the heater body 5800 and is pumped in and out of body 5800 to supply a steady flow of thermal energy to receptacle 5403. In one embodiment of this last example, the medium is water which is heated by the dispenser's water heater. In some instances, this water returns to the heater for reheat and other uses. In some instances, this water flows out of heater body 5800 and directly into receptacle 5403 as a dilution fluid. In some embodiments, this water is delivered directly from the dispenser reservoir. This latter example may be of special interest in situations where a cold beverage is to be delivered and the exit water from body 5800 is cooled below its original temperature in the reservoir. Protrusion 5801 in FIG. 86A is an entrance/exit port for electrical wires for powering a resistance heater and/or a point for plumbing inlet/exit tubing for a secondary heating medium. FIG. 86C shows a cross section view of contact heater 5800.

Figure 87A:
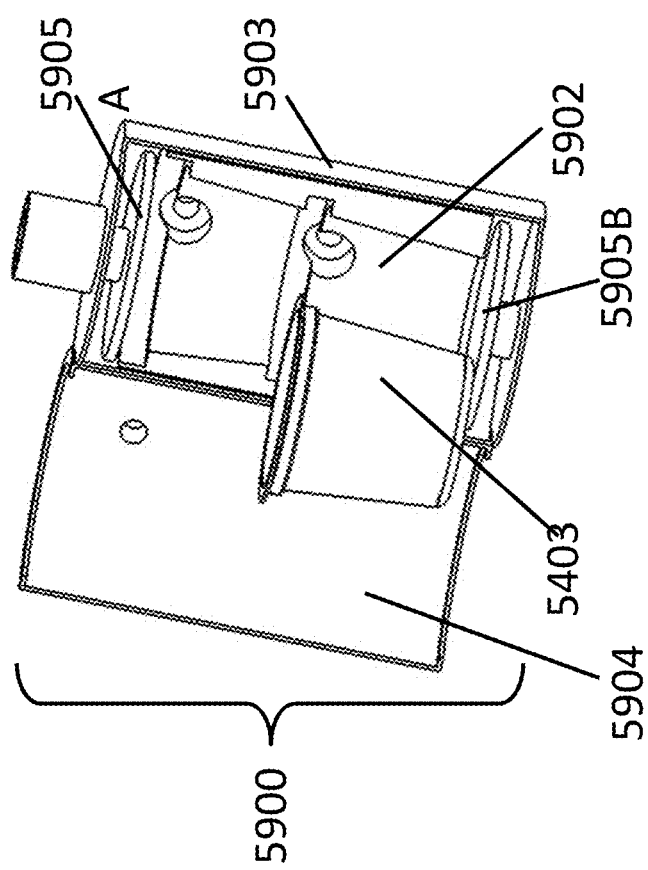
FIGS. 87A-C are perspective views of parallel plate RF dielectric heating system wherein the plates are disposed parallel to the receptacle lid and the closed end of the receptacle, according to some embodiments of the invention.
Figure 87B:
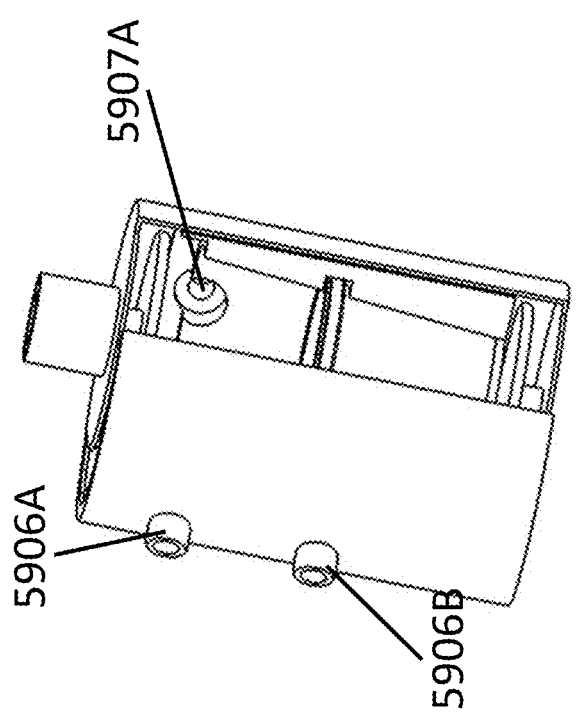
Figure 87C:
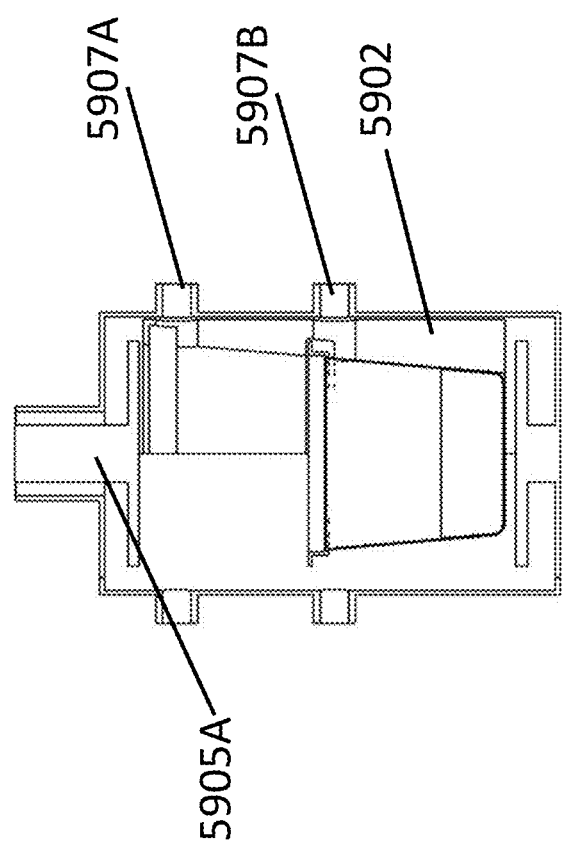

FIGS. 87A, 87B and 87C illustrate one format for IR dielectric heating methods for the frozen contents. In some embodiments, the receptacle 5403 containing frozen contents is disposed with its axis of symmetry oriented horizontally and resting on a material having a very low dielectric constant, e.g., a polypropylene support 5902. In some embodiments, two flat parallel plates, 5905A and 5905B, are disposed on either end of the cavity and oriented normal to the axis of symmetry of receptacle 5403. One plate, e.g., 5905A, is connected to the internal cable in a coaxial feed wire, delivering a high frequency RF electrical signal. Typically, this signal corresponds in frequency with one of the three bands allocated by the FCC for industrial, scientific and medical (ISM) uses, i.e., 13.56, 27.12 or 40.68 MHz. The other plate, 5905B, and the surrounding housing comprising shell hemispheres 5903 and 5904 are connected to the coaxial sheath and ground.

In operation, the user opens the cavity, sets a receptacle on the polypropylene support, and closes the cover. If secondary (non-diluting) heat is to be added, an electromagnetic signal is fed into plate 5905A at one of the allowed frequencies. The electric field created between plate 5905A and 5905B passes freely through the intervening air and any low dielectric materials, but encounters some resistance and dielectric losses as it passes through the frozen contents. This lost energy converts to heat and warms, partially melts or fully melts the frozen contents depending on the amount of thermal energy added. At the appropriate time, as determined by the microprocessor's algorithm, the receptacle is punctured by one or both needles through the side ports, e.g., 5906A or 5906B for the needle supplying melting/diluting fluid and 5907A or 5907B for the needle creating the exit penetration. In some embodiments, the dielectric material could be the exterior of the receptacles and the other plate of the dielectric is place above a dialectic lid.

Figure 88A:
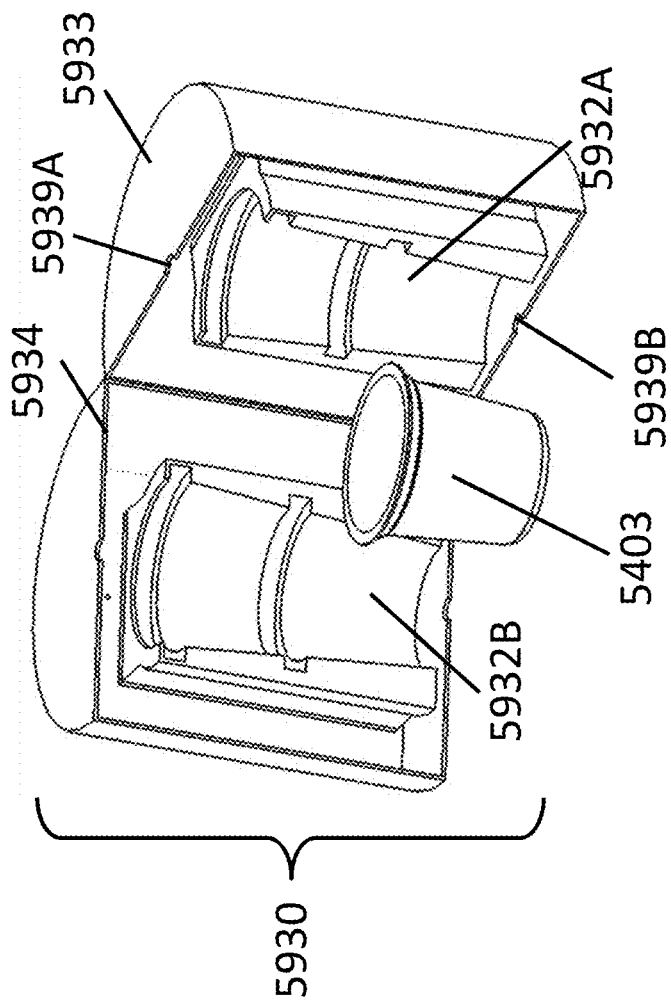
FIGS. 88A-C are perspective views of a parallel plate RF dielectric heating system wherein the plates are disposed perpendicular to the receptacle lid and close end and leave those areas open to penetration by fill and drain needles, according to some embodiments of the invention.
Figure 88B:
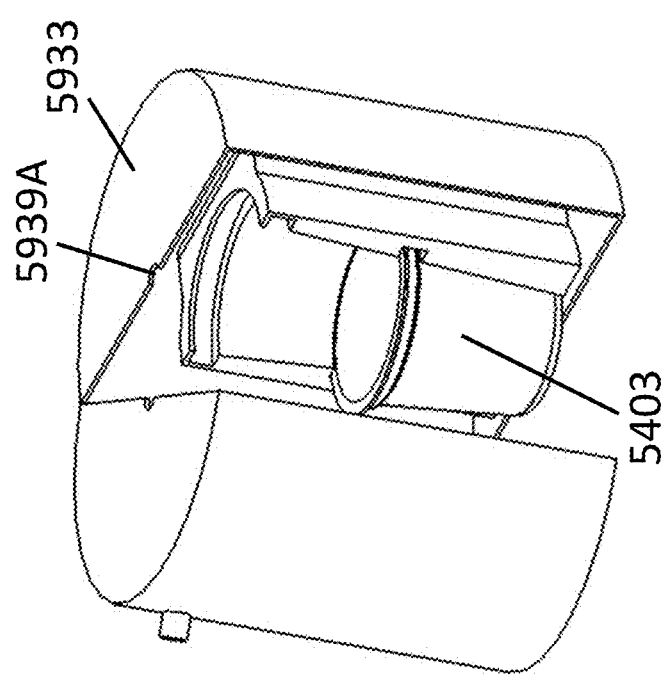
Figure 88C:
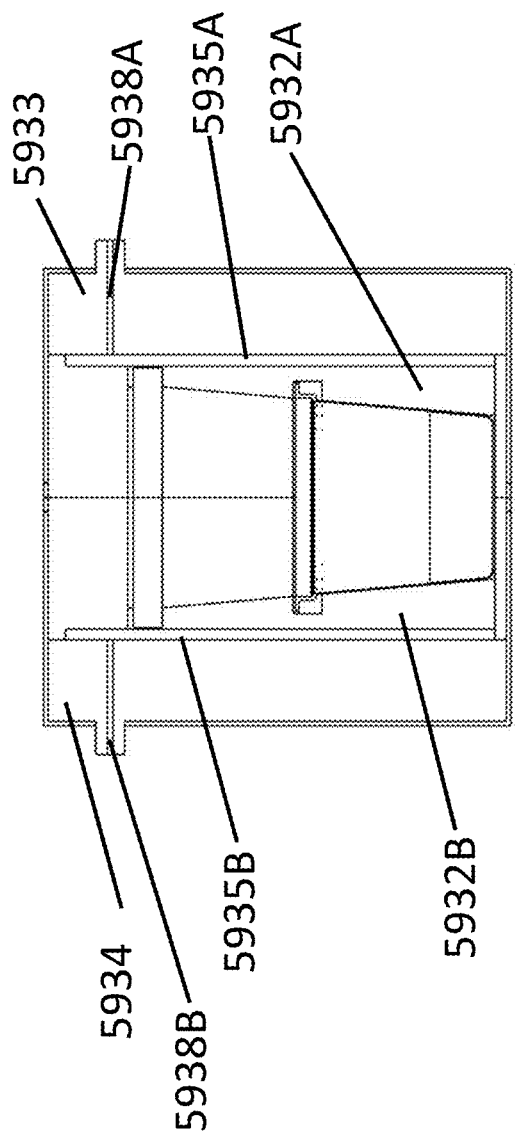
Figure 90A:
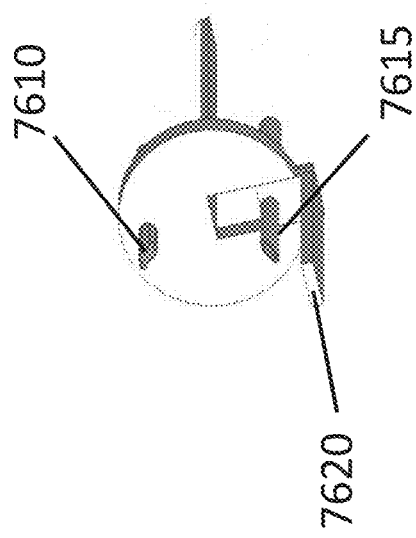
FIGS. 90A-90D are side and perspective views of a receptacle piercing mechanism wherein the entry needle is fixed while the exit needle is adjustable in its separation distance from the entry needle such that the pair can accommodate lids of different diameters, according to some embodiments of the invention.
Figure 90B:
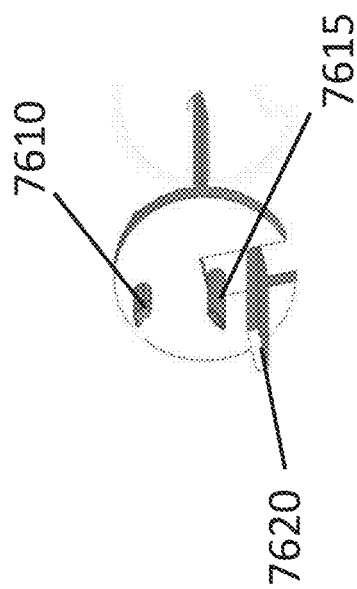
Figure 90C:
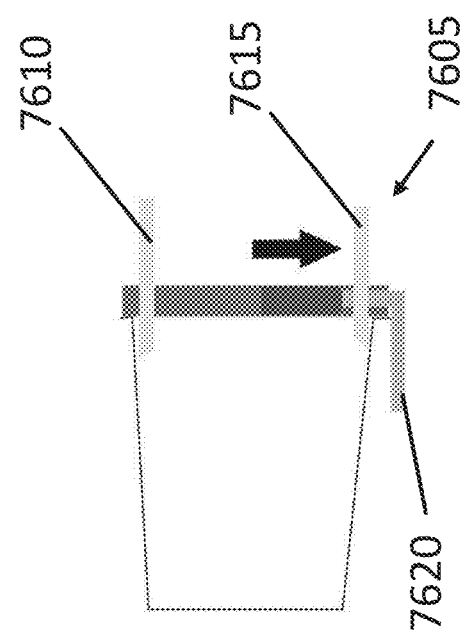
Figure 90D:
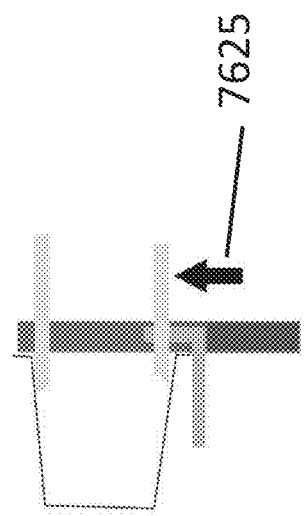

FIGS. 88A, 88B and 88C illustrate some embodiments 5930 incorporating RF heating wherein the receptacle 5403 is disposed with its axis of symmetry oriented vertically and the areas proximate to the lid 5939A and the closed end 5939B open for needle puncture. For some embodiments, hemispherical shells 5933 and 5934 swing open to make accessible a low dielectric support/capture structure for different sized receptacles such as 5403. In some embodiments, parallel plate electrodes 5935A and 5935B are disposed on either side of the receptacle and holding structure and have electrical connectivity to the feed and shield wires of a coaxial cable through insulated conduits 5938A and 5938B. As in previous example, these plates are excited at RF frequencies reserved for the ISM bands. In one exemplary use, the cavity door 5934 is swung open by the user and a receptacle 5403 is placed into the lower half of the cavity, supported by a polypropylene insert 5932A. The door is then closed and the opposite half of the polypropylene insert 5932B captures the receptacle 5403 and holds it in position. As programmed by the microprocessor, RF energy is directed to plate electrode 5935A and an electric field is established between it and plate 5935B, heating the frozen contents in amount calculated to warm, partially melt or fully melt the contents. In coordination with this heating, in some embodiments the cavity can be agitated. In coordination with this heating, one or more needles are used to penetrate the receptacle 5403 to deliver melting/diluting fluid and create an exit path to the user's cup/dispenseware.

FIGS. 89A, 89B and 89C illustrate some embodiments wherein the receptacle itself acts as the RF cell. FIGS. 89A and 89B together illustrate how, in some embodiments, the lid and the closed end of the receptacle can act as the electrodes of a parallel plate RF cell. In FIG. 89A, the exterior surface 5951 of the entire closed end of the receptacle 5403 is made from a conductive material or a conductive coating. For example, in some embodiments, receptacle 5403 is manufactured as an assembly comprised of a thermoplastic sidewall and a heat welded aluminum bottom closure. In another embodiment, the sidewall and closed end are molded as one piece and the closed end is subsequently coated with a metallic material such as aluminum using one of several potential processes such as CVD coating, thermal spraying, electro or electro-less coating, etc. For cosmetic purposes or to prevent damage to this coating, the entire surface 5951 can be over-coated with a polymer or printing material, e.g., ink, except that some small area 5952 must be left uncoated so electrical contact can be made with the end coating. The same can be said for the other end of receptacle 5403. The lid, as shown in FIG. 89B, may in some embodiments be comprised of an aluminum material or a thermoplastic material with an over-coating of an electrically conductive material. Likewise, it can be over-coated with a polymer for cosmetic or protective reasons so long as a small area 5953 remains open for electrical connectivity. Alternatively, in some embodiments, it may be preferred to use the sidewalls of the receptacle as the RF plate electrodes.

In some embodiments, as illustrated in FIG. 89C, matching rectangular areas (or areas of other matching shapes, e.g., circles) 5954 and 5955 can be prepared created on opposite sides of the receptacle's sidewalls. While these plates are not parallel, and some level of electrical field distortion will result, the offsetting benefit is that the lid area and closed end of the receptacle remain available for needle penetrations. In practice, each of these designs would function in the system in a similar manner to what was described for the parallel plate heaters shown in FIGS. 87A-87C and 88A-88C insofar as the processes of heating using RF energy and thermal effects due to dielectric losses must be coordinated with agitation, needle puncture, etc. for an overall suitable dispense operation. Aside from the differences in physical hardware required, the designs of FIGS. 89A-89C will require spring-loaded connection to an RF source and careful alignment of the receptacle in the cavity, especially in the case of the sidewall electrodes, to ensure suitable electrical connectivity is achieved.

FIGS. 90A-90D illustrate a needle penetration plate assembly 7605 which can accommodate receptacle lids with different diameters. The plate assembly 7605 is positioned such that the entry needle 7610 is toward the upper radial position of the plate (12 o'clock position) and fixed in place. The exit needle 7615 is mounted to a secondary, moveable support 7620 which aligns it vertically below the entrance needle 7610, e.g., at a 6 o'clock position, but in a manner that allows the distance between entry and exit needles to vary 7625, depending on the diameter of the lid. In some embodiments, both entrance and exit needles preferentially penetrate the lid near the inside edge of the receptacle's flange.

In some embodiments, the adjustment of a perforator or the cavity geometry may occur automatically before a receptacle is placed into the cavity. For example, the receptacle may be scanned by the dispenser or manually programmed into the user interface of the dispenser. The cavity with an adjusted geometry, i.e., with needles moved/configured to the correct place or fully withdrawn for the expected receptacle, may then open and motors or solenoids in the receptor extend the appropriate perforators to be used for that specific scanned receptacle.

In some embodiments, it is not the perforator(s) that are adjusted, but the size or shape of the cavity for receiving the receptacle. For example, the adjustment could be like the jaws of a lathe chuck that move radially to accept different diameters or tapers, or be like a collet. In some embodiments, one end of the diameter of the receptacles is fixed along with the entrance needle and the other end of the receptacle may be of different diameters and the exit needle may slide in or out to puncture at the appropriate location.

In some embodiments, a dispenser receiving a receptacle with frozen contents has an opening with a cavity of a unique shape compatible with receptacle's shape and functional requirements during the beverage creation process. The cavity may have unique convexities, concavities, steps, protrusions, dimensions, and the like to support and accommodate receptacles of like geometry. In some embodiments, the cavity may be designed to adjust to the shape of the receptacle. For example, in some embodiments a series of thin annular wedge shapes disposed around the circumference of the cavity could be configured to iris in and out radially, creating cavity shapes of different diameters suitable for larger or smaller receptacles. The action of these wedge shapes can be analogized to be like that of a flexible collet for holding machine cutting tools, but with displacements on a much greater scale. Alternatively, in some embodiments, an interior component of the cavity is supported by springs such that certain receptacles will disrupt the resting position of the springs and create necessary area for certain sized pods to fit. In some embodiments, the geometry of the cavity may be inverted and the placement of the receptacle in the cavity is inverted as well.

FIGS. 91A-E is a schematic which illustrates an implementation of secondarily heating the receptacle using hot water supplied by the internal dispenser heating system. In some embodiments, the water used for heating the receptacle passes through Transfer Point A 3570 and a 3-way diverting valve 7710 to pass through a coil heater 7715 surrounding the receptacle. The water passing through Transfer Point A 3570 can be sourced either directly from the ambient temperature water storage tank (reservoir) or as heated water that has traveled from the water storage tank through the system's water heater. In some embodiments, this coil heater is embedded in the cavity wall that directly contacts the receptacle and heats via conduction. In some embodiments, once the heating water passes through the heating coil 7715, it passes into a pressurized transfer tank 7720 wherein the working fluid (water) is separated from a source of pressure by a rubber bladder 7725. Tanks made by Extrol Corp. are exemplary of this type of tank.

In some embodiments, once heating is complete, the 3-way diverting valve 7710 is switched to prevent flow of water from Transfer Point A and to allow water from the pressurized transfer tank to flow into the receptacle 7730, acting as the melting/diluting liquid. In some embodiments, more water than is required for the final beverage volume is used for heating and this excess water is either discharged to a waste tank/tray or returned to the dispenser storage tank. This feature is especially important in making cold beverages as the reuse of water used to partially melt the frozen contents captures a portion of the available "negative energy" in the frozen contents and is cooled below the temperature of the water in the ambient storage tank. Thus, when it is used for final melting/diluting of the frozen contents, the result is a cooler beverage than would otherwise be possible. Note also that this water, if used to provide secondary heat to the receptacle, is retained within closed, sanitary tubing during its transit and does not directly contact the exterior of the receptacle. Optionally, air pump 7740 purges liquid from the heated liquid line to Transfer Point A 3570.

Figure 92A:
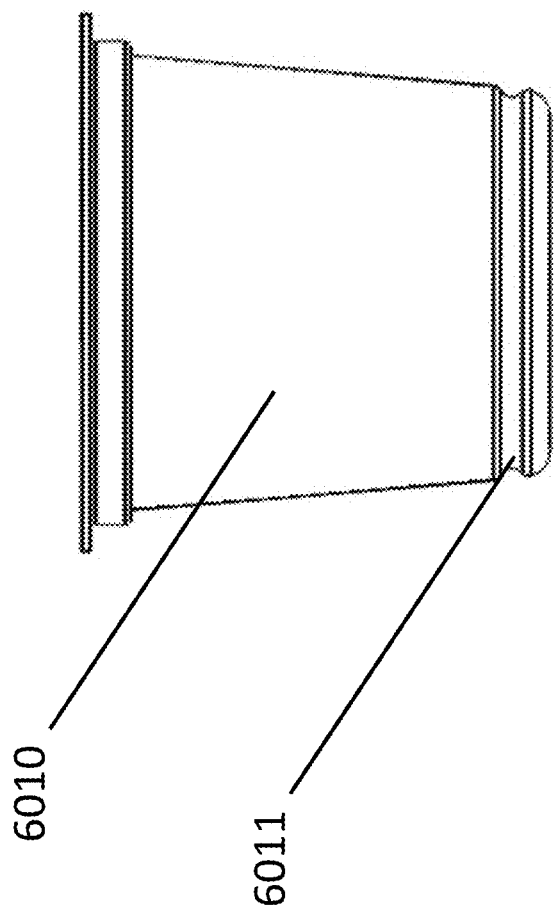
FIG. 92A is a side view of a receptacle which includes a circumferential locking ring, according to some embodiments of the invention.

Referring to FIG. 92A, in some embodiments the geometry of a receptacle 6010 is modified to include a circumferential locking ring 6011. While this ring will also lock in the frozen contents, preventing the upward displacement of those contents with a needle penetrating receptacle 6010 from the bottom as has been envisioned for some embodiments discussed previously, this securing of the frozen contents may be a benefit in some embodiments wherein the receptacle is penetrated only through the lid or through some combination of lid and sidewalls. In some embodiments, this locking ring creates an ability to hold the receptacle without resort to cavity sidewalls or other clamping techniques and/or processes, thus more efficiently exposing the sidewalls to direct impingement heating or irradiation for the addition of secondary (non-diluting) thermal energy. This configuration also allows the entire receptacle to be agitated/oscillated as described for some embodiments without the need to rotate the entire cavity. With this locking ring 6011 feature, a variety of locking mechanisms within the dispenser could be used. In some embodiments, a set of "teeth" slide radially into the locking ring where they bear lightly against the innermost radial surface of the ring. In some embodiments, a mating segmented surface shaped like the ring's profile expands and contracts under the influence of a circumferential tension spring to capture and hold the receptacle.

FIGS. 92B and 92C illustrate a long needle 6000. In some embodiments, this needle is used to fully penetrating receptacle 5403 through the sidewall near the lid section. In some embodiments, the needle comprises a fluid delivery section 6001 and a needle drain section 6002, separated by a plug 6004. Fluid delivered under pressure through the needle from the back end encounters plug 6004 and is directed out through spray hole 6003. Added fluids and melted/diluted liquid from the frozen contents drain through the perimeter slots in section 6002 to the user's cup or dispenseware.

In some embodiments, as described above, a long needle is used to penetrate the cup lid and/or walls and frozen contents such that a separate exit needle is not required. In some of embodiments this needle is also used for the injection of melting/diluting fluids. As with the use of a compressed gas in the examples above, a gas could also be injected through a needle either to lightly pressurize (~1-2 psi) the inside of the receptacle as a way of forcing liquids out of the receptacle (through the exit perforation) faster.

Figure 93:
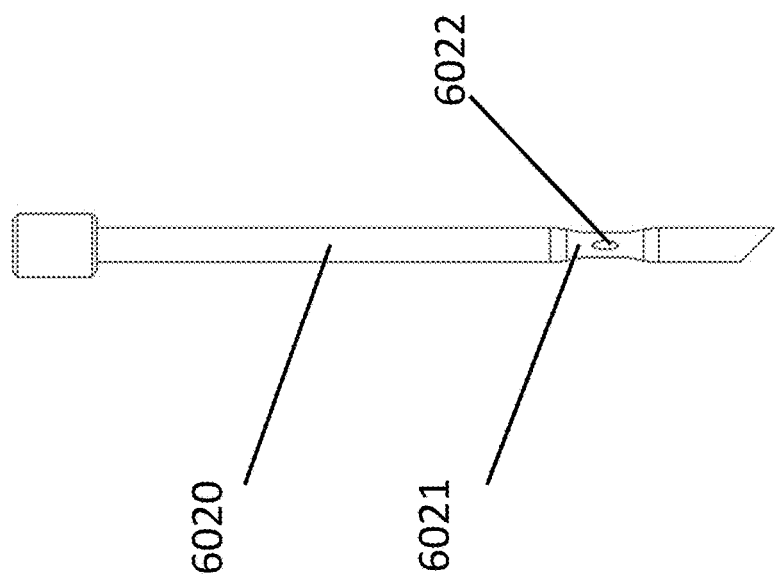
FIG. 93 is a side view of another embodiment of a long needle which can be used to penetrate the sidewalls of a receptacle, according to some embodiments of the invention.

FIG. 93 illustrates a long needle like that shown in FIGS. 92B and 92C except that needle 6020 incorporates an intentional restriction to flow 6021 (a venturi) and an orifice 6022. As is well known in the art, this flow restriction causes the gas passing through the needle to increase in speed locally causing a local reduction in pressure via the well-known Bernoulli principle. The reduced local pressure (a slight vacuum) causes local fluids and gases to be entrained in the flow through the needle and results in better evacuation of the contents from the inside of the receptacle. These entrained fluids would exit the end of the needle 6020 along with the gas and be deposited into the user's cup or dispenseware. In some embodiments, this entrained fluid also becomes frothy, adding texture to the dispensed beverage which may be advantageous.

Figure 94C:
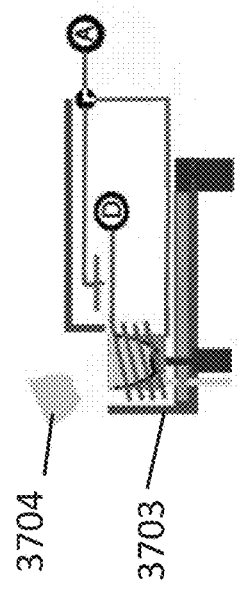
Figure 94A:
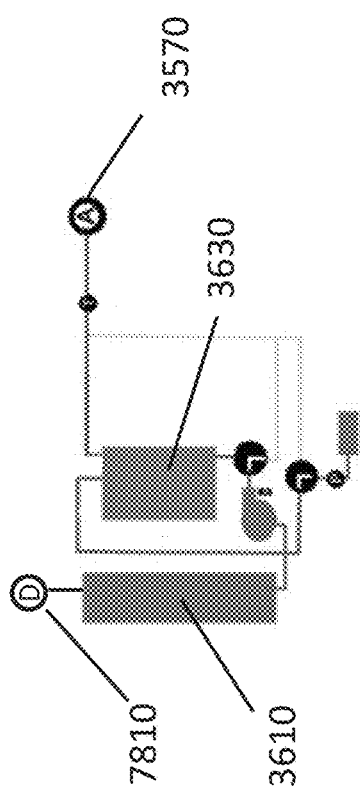
Figure 94B:
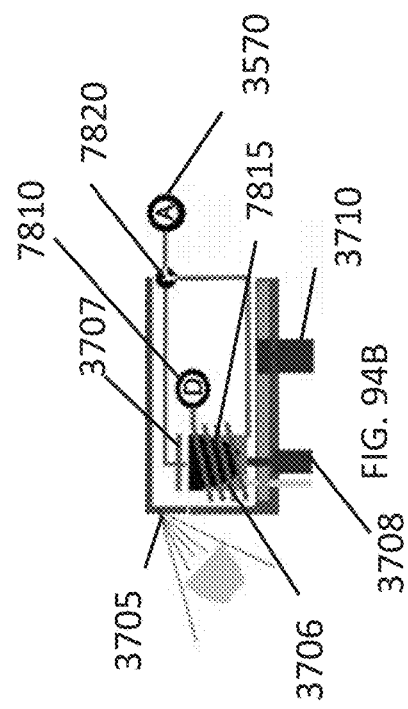
Figure 95F:
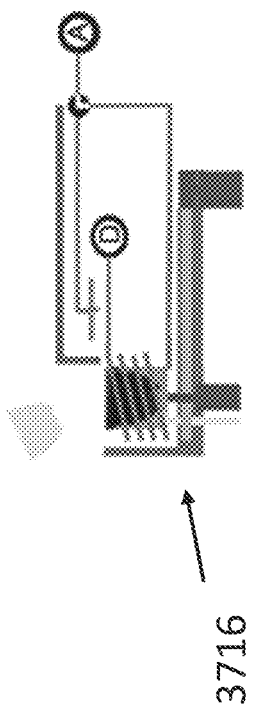
Figure 95D:
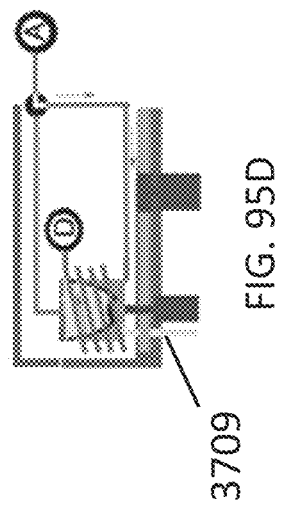
Figure 95E:
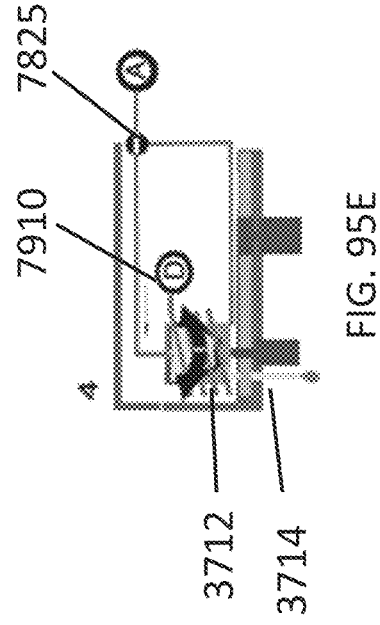

FIGS. 94A-94F illustrates an embodiment of the dispenser similar to that described above for FIGS. 91A-E except that it does not use a pressurized storage tank. Instead, water is pumped through Transfer Point A 3570, travels through the heating coil 7815, and returns to the dispenser's storage tank via Transfer Point D 7810. A portion of the embodiment shown and described in FIGS. 36A and 36B is shown in FIG. 94A with the added Transfer Point D. The water delivered to the heating coil 7815 can either pass through the heater tank 3630 or be delivered directly from the storage tank 3610. The 3-way diverter valve 7820 directs water from Transfer Point A 3570 either through the heater coil 7815 or, later in the process, directs the melting/diluting fluid into the receptacle 7825 via a perforator in lid support 3707. In all cases, the movement of the water is driven by a pump, not by passively stored pressure as is sometimes the case for the embodiment illustrated previously as in FIGS. 91A-E.

FIGS. 95A-F illustrates an embodiment of the dispenser plumbing similar to that described in FIGS. 94A-F except that the water is returned to the hot water tank 3630 instead of the dispenser's storage tank via Transfer Point D 7910. All other aspects of this embodiment are the same.

FIGS. 96A-F illustrates a secondary heating system for the receptacle which is completely separate from the system designed to supply a melting/diluting fluid into the receptacle 3704. In some embodiments, the heating fluid is a water/glycol mix. The pressurized tank 8020, e.g., a tank made like an Extrol Corp. bladder tank, contains a reservoir of heating fluid and a system, such as an electric cartridge heater, to warm this fluid (not shown). In some embodiments, this heating is controlled using a heat sensor and a heater control system, e.g. a PID-based controller, to maintain a desired fluid temperature in the tank 8020. As heating of the receptacle is required, a pump 8025 delivers fluid from the pressurized tank 8020, through Transfer Port E 8010, through the heater coil 7815, and back to the tank via Transfer Port D 8015. Once the frozen contents have been sufficiently warmed and/or melted, a separate melting/diluting fluid from the dispenser reservoir and/or heating tank is delivered to the receptacle via Transfer Port A 3570.

Figure 97A:
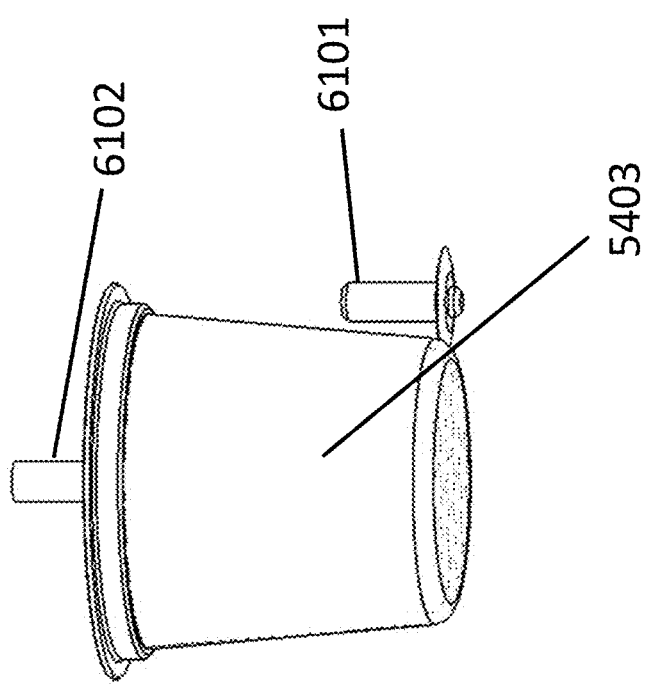
FIGS. 97A-97D illustrate an insert which is added to a receptacle in some embodiments wherein the insert is made of a material or externally doped to enhance its reception of RF energy to heat the frozen contents rapidly, according to some embodiments of the invention.
Figure 97B:
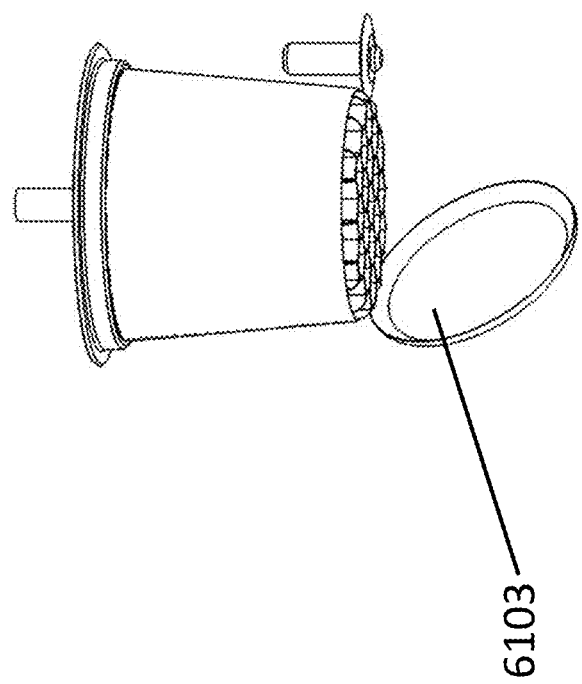
Figure 97C:
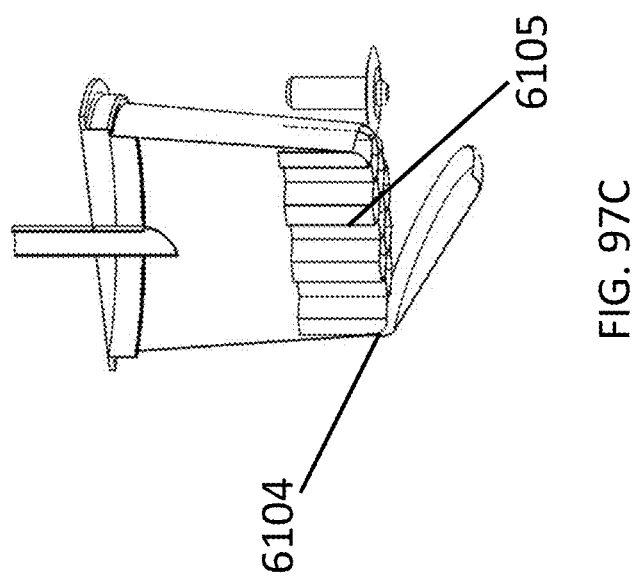
Figure 97D:
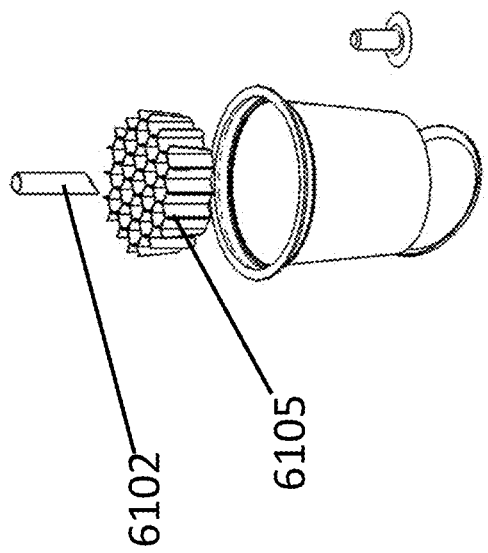

FIGS. 97A-97D illustrate some embodiments wherein the receptacle 5403 is equipped with an insert 6105 prior to being filled with an extract or concentrate. In some embodiments, the partition is made using an injection molding process during which it is doped with a material such as carbon black or fine carbon particles which enhances the effects of RF dielectric heating on the insert. In some embodiments, the process of dispensing a food or beverage comprises the steps of: (1) using a knife or cutter 6101 to slice through the sidewall of receptacle 503 along an arc near the bottom of the receptacle, said arc spanning approximately 350° so as to create a separate bottom flat 6103 and a small hinge 6104 which falls down as shown in FIG. 97B to clear a path from the full bottom surface of the receptacle into the user's cup or dispenseware; (2) minimally (only enough to cause surface effects) heating the receptacle using, e.g., an RF dielectric heating system, which warms the frozen contents, but due to the doping of the insert 6105 this RF energy preferentially heats the interfaces around each separate "mini-cube" within the insert 6105; (3) allowing the separate mini-cubes to fall out of the receptacle into the user's cup or dispenseware, still primarily in solid form; and (4) adding dilution/melting fluid through a needle 6102 to rinse out the remainder of any frozen contents in receptacle 5403 and flow into the user's cup or dispenseware to further melt the mini-cubes.

In some embodiments, cold beverages are so dispensed and thereby take maximum advantage of the "negative energy" within the entire frozen contents to yield a final beverage temperature that is below the temperature of the ambient water used directly out of the dispenser's reservoir due to the cooling effects of the melting process for the mini-cubicles. In some embodiments such as the dispensing of soups with large chunks of solid matter that are to be served hot, no insert is used in the receptacle. Instead, the frozen contents are heated until the entire water component of the frozen contents is fully melted and heated to a desired temperature between approximately 30° F. and 160° F. (Heating the contents above approximately 30° F. will require creation of a small vent in the receptacle as described above to prevent rupture of the receptacle.) Thereafter the bottom flap 6103 is created as described above and the entire mass of the frozen contents, including solid food components such as meats or vegetables, are allowed to flow into the user's cup or dispenseware. Hot water is then flowed through needle 6102 to rinse the cup and prepare it for disposal. This hot water flows out of the receptacle, into the user's cup or dispenseware to dilute and further heat the already-melted contents.

FIGS. 98A-K illustrates an embodiment wherein the receptacle 3704 containing frozen contents is inserted into the dispenser in a horizontal orientation. For example, any of the dispenser designs having a horizontal axis of symmetry can form the basis of the embodiment shown in FIGS. 98A-K. In one implementation, the dispenser includes a movable and rotatable entrance lid/needle support/exit port assembly 8110, identified in the figure simply as an entrance lid. This feature comprises a flat plate 8115 attached to a support shaft 8125, one needle 7610 which is connected via Transfer Port A 3570 to the dispenser's pump, reservoir and hot water heater, and an exit spout 7620. In some embodiments, the sequence of operations for perforating the receptacle once the receptacle is loaded 8120 is (a) rotate the entrance lid so the penetrating needle is at the 6:00 o'clock position 8130, (b) translate the entrance lid toward the receptacle 8150 such that the needle 7610 penetrates the receptacle lid 8160, (c) retract the entrance lid away from the receptacle 8175 leaving a hole in the lid that will later serve as a drain 8170, (d) rotate the entrance lid so the needle is at the 12:00 o'clock position 8180, and (e) translate the entrance lid toward the receptacle a second time 8190 and penetrate the lid with the needle 8195.

In some embodiments, this allows for a single needle to create both entrance and exit ports in the receptacle. In some embodiments one or both needle and the exit spout may be on sliders so they can work effectively with receptacles of different diameter, as shown and described in connection with FIGS. 90A-D. In some embodiments, addition of melting/diluting fluids begins immediately after step (e) above. In some embodiments, the receptacle and the entrance lid rotate or translate together to create an agitation that may enhance the liquefaction process for the frozen liquid contents. In some embodiments, secondary heating as described for other embodiments and figures herein is performed either before the needle penetration sequence, in parallel with this sequence, or after the receptacle has been fully perforated. Once melting/diluting fluids are added, the melted liquid beverage flows out of the bottom portion of the lid, through the exit perforation made in step (b) above, and into the user's cup or other dispenseware. In some embodiments, a soft rubber or other pliable bellows detail helps to seal around one or both the entrance and exit perforations to prevent leakage.

Figure 99A:
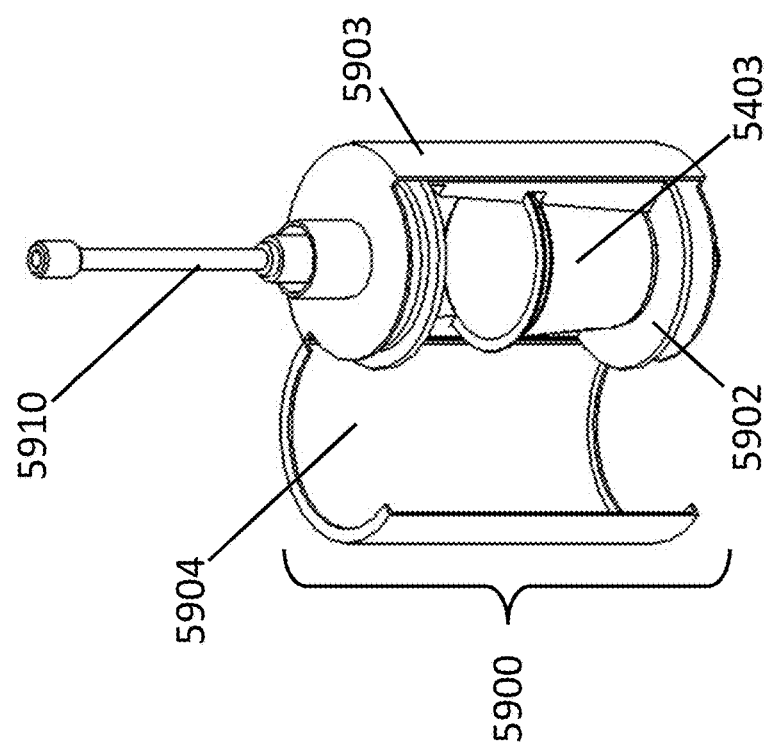
FIGS. 99A-C are side and perspective views of a vertically oriented RF heating assembly which also comprises a long needle capable of puncturing both ends of a receptacle, according to some embodiments of the invention.
Figure 99B:
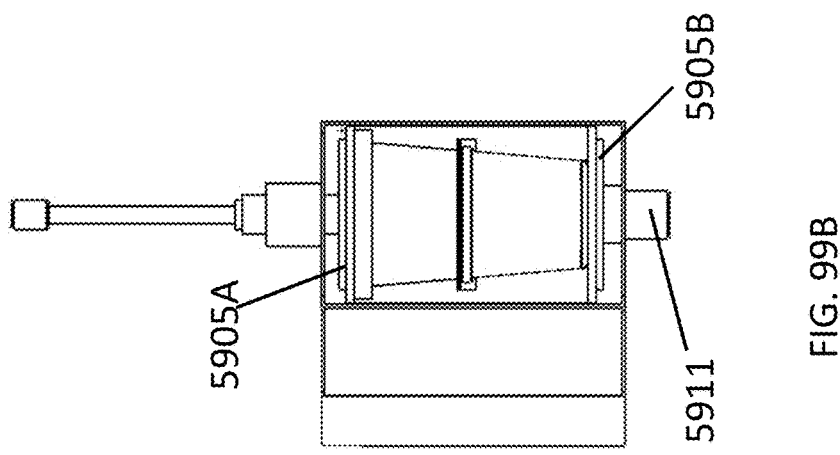
Figure 99C:
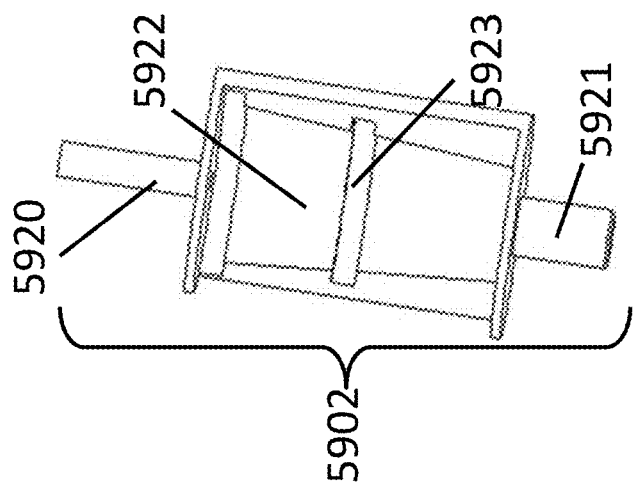
Figure 100A:
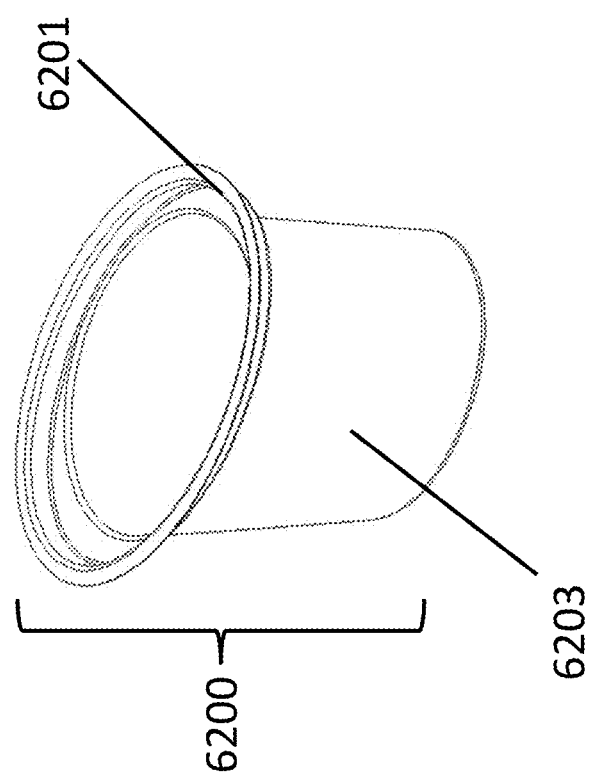
FIGS. 100A-D are perspective views of a variety of receptacles with non-circular cross-sections, according to some embodiments of the invention.
Figure 100B:
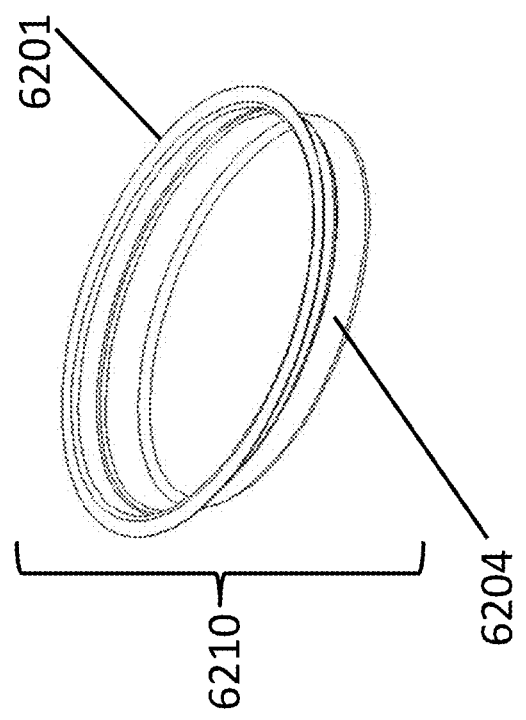
Figure 100C:
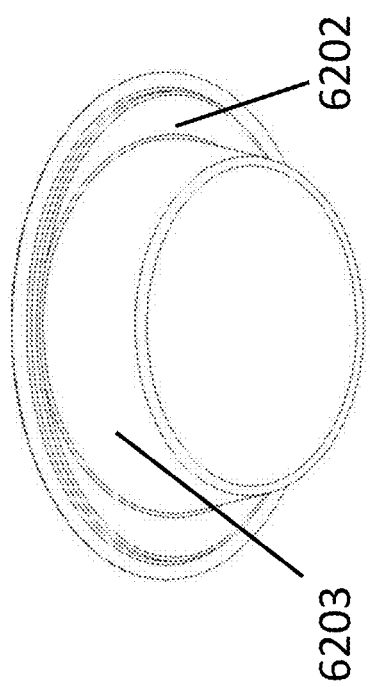
Figure 100D:
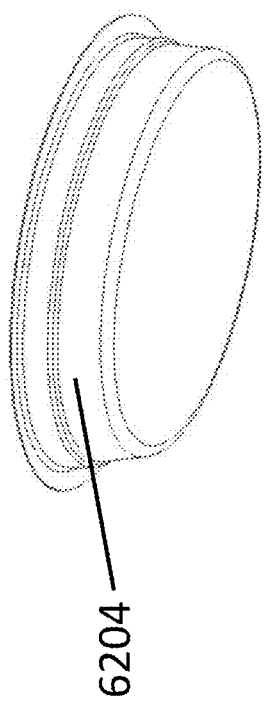

Referring to FIGS. 99A, 99B and 99C, item 5900 is the RF heating assembly described above in conjunction with FIGS. 87A-87C and 88A-88C. In some embodiments, as shown in FIGS. 99A-99C, the RF heating assembly 5900 is configured for use in a vertical orientation with a long needle 5910 which can pass through the lid, through the frozen (or melted) contents, and through the closed end of receptacle 5403 in alignment with outlet port 5911. In some embodiments, the frozen contents are warmed and melted using a RF dielectric heating process to fully melt the frozen contents with or without agitation. Once the frozen contents are so melted, further heating (if desired) will require a small vent to prevent pressure buildup. In some embodiments, the heating is temporarily stopped and needle 5910 is advanced sufficiently to puncture the receptacle lid. Needle 5910 can then be withdrawn and heating can continue if desired until a preferred temperature for the frozen contents between 30° F. and 160° F. is achieved. Thereafter, needle 5910 can be advanced through receptacle 5403 and its closed end, allowing the melted contents to run out through the channel in tube 5921, a part of the receptacle holder 5902, which passes through the lower charged electrical plate 5905B. In some embodiments, receptacle holder 5902 has an upper tube 5920, which insulates case 5903 from the charged electrical plate 5905A, contoured sides 5922 to conform to the conical angle of receptacle 5403 and larger receptacles such as item 5400 shown in FIG. 71, and recesses 5923 for the lips and stacking rings associated with each receptacle size.

Referring back to FIG. 76 and carousel 5600, in some embodiments RF dielectric heating may be configured into the dispensing process separately from the steps of penetrating the receptacle and adding melting/dilution fluids. Without regard to the specific design shown in FIG. 76 other than the carousel 5600, in some embodiments a receptacle is loaded into the carousel at one location. The carousel is rotated to a second location and brought to rest between the two parallel plates of an RF dielectric heater similar in general respects to what is described above for FIGS. 87A-87C, 88A-88C, and 99A-99C. At this second location RF energy is applied to the receptacle and melts or partially melts (as determined by the thermodynamic control algorithm within the system's microprocessor) the frozen contents. Once power is stopped, the carousel rotates to a third station where it is penetrated with either a long needle through the entire receptacle or a combination of entrance and exit needles as described above. The melted frozen contents flow out into the user's cup or dispenseware and the receptacle is rinsed clean. The carousel then rotates back to the starting position and the cup is removed and discarded.

FIGS. 100A-100D, 101A and 101B illustrate some embodiments wherein the receptacle has a non-circular cross section. In some embodiments, this cross section is elliptical as illustrated by receptacles 6200 and 6210 which can be produced in different sizes to accommodate different volumes of frozen contents. In some embodiments, the lid sealing surface 6201 and the stacking ring 6202 are of similar shape and size so they can engage with a single stepped cavity 6220. In some embodiments, the stacking ring 6202 is not uniformly offset from the edge of the sealing surface 6201 perimeter, but is instead biased toward the two ends of one axis, e.g., the long axis, and not the other, e.g., the short axis. In some embodiments, the sidewall of the main cavity 6203 is uniformly offset from the sealing surface perimeter 6201 while in other embodiments the sidewall 6204 is uniformly offset from the biased stacking ring 6202. This difference in offsets creates a space that allows penetrating needle 6222 to penetrate the bottom of one receptacle 6210, but not the other receptacle 6200 so that fixed needles can be used in a single cavity 6220. Instead, penetrating needle 6221 penetrates the bottom of receptacle 6200. In some embodiments of the dispenser associated with cavity 6220 the non-circular geometry of receptacles 6200 and 6210 allows for keying the orientation of the receptacle in the dispenser and easier scanning of such features as bar codes or QR codes with a stationary/fixed optical scanner. In some embodiments of containers used to package multiple receptacles together for shipping and sales, non-circular geometry allows denser packaging strategies. In some embodiments, non-circular geometries for the receptacle makes it easier to keep receptacle labels better aligned for reading by consumers. In some embodiments, the chamber of 101C and 101D has a more circular cross section than that of 101A and 101B.

Figure 102B:
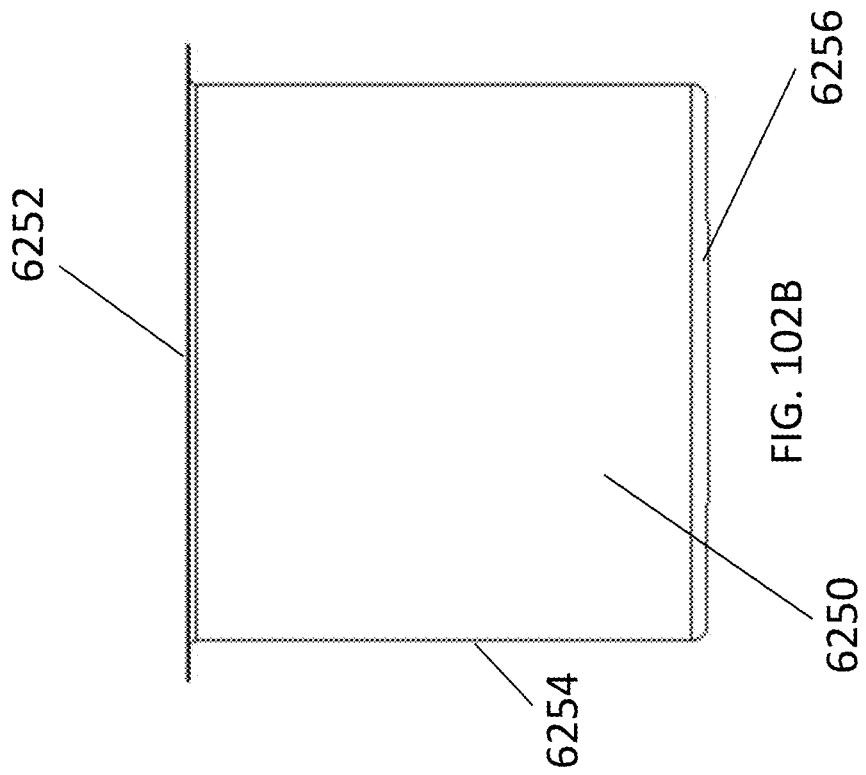
FIGS. 102A-B are side views of receptacles which are produced with no draft in the sidewalls, according to some embodiments of the invention.
Figure 102A:
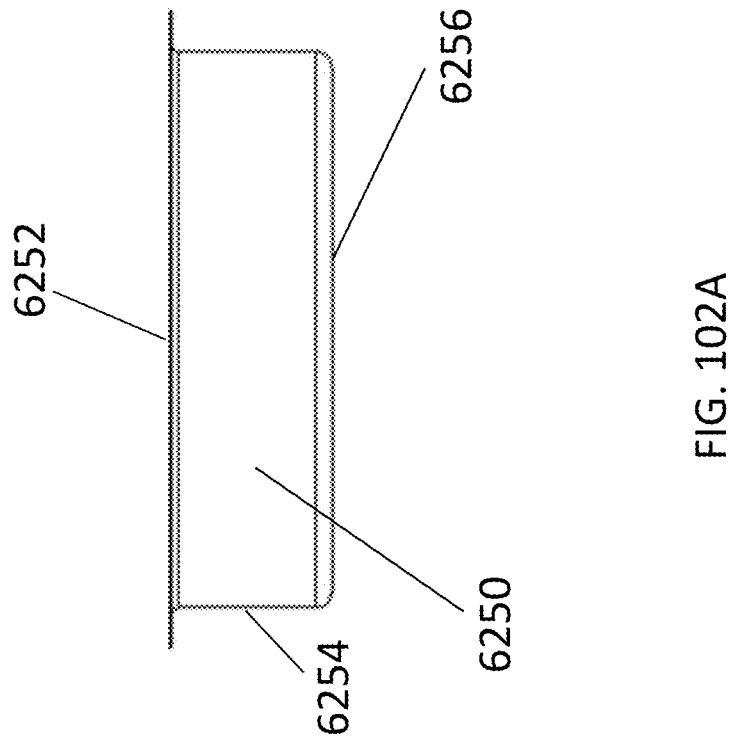

FIGS. 102A and 102B illustrate some embodiments wherein the receptacle 6250 for the liquid frozen contents is manufactured without draft in the sidewalls 6254. In some embodiments, the receptacle 6250 includes a bottom layer 6256. In some embodiments, the lip seal surface 6252 is the same for all sizes and only the height of the sidewall varies for receptacles of different capacities, making it easier to design a dispenser cavity that accommodates multiple receptacle sizes. While this design of cup eliminates opportunity for compact stacking of receptacles and reduced shipping volumes for empty containers, fabrication of aluminum receptacles using well established drawing and ironing techniques becomes possible. Additionally, this shape enhances the volume efficiency of packaged filled receptacles as compared to receptacles with tapered sidewalls. In some embodiments, receptacles of this shape are used in conjunction with secondary heating of the frozen contents so melting or partial melting of the frozen contents can occur before needle penetration of the receptacle and the dislodging of the frozen contents as a solid body is not necessary—a process that requires tapered sidewalls if flow paths around the frozen body are to be created. In some embodiments, receptacles of this shape are used in conjunction with a single long penetrating needle that functions both as a fluid delivery needle and creator of an exit perforation as described above.

Figure 103:
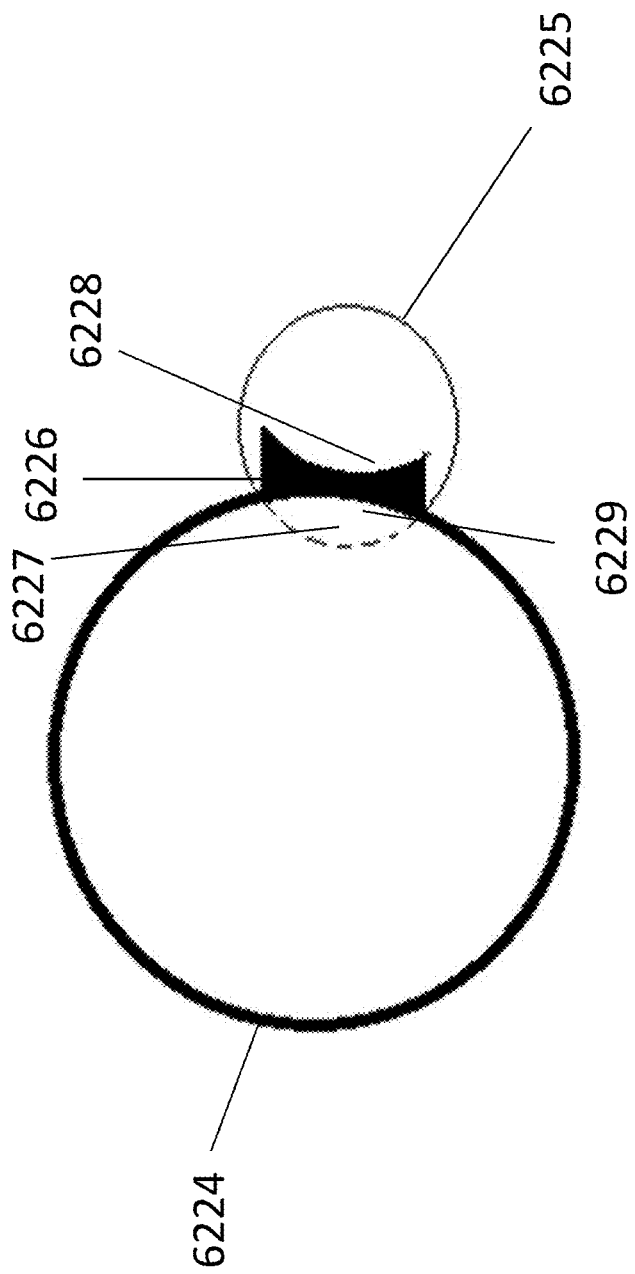
FIG. 103 is a top view of a cavity designed to receive two different diameter receptacles wherein the perimeters of their lids overlap and present a common area where a single needle could be used to penetrate either lid, according to some embodiments of the invention.

FIG. 103 demonstrates embodiments wherein there is an overlap 6227 of cavity space for two different sized pods with a moving separator 6226. This system provides two beverage creation cavities, including a larger cavity 6224) and a smaller cavity 6225. In this embodiment, the overlapping of the cavities prevents two pods of different sizes being processed at the same time and the adjustable separator provides a contiguous support ring for clamping the entire lid of the receptacle, which mitigates punctures issues. The separator may have two positions wherein one position a first edge 6229 of the separator supports the diameter of a large receptacle in a contiguous fashion and a second edge 6228 that supports the complete diameter of a smaller receptacle in second position. In some embodiments, the separator travels the entire depth of the cavities. In some embodiments, the separators position is used to detect the pod size and adjust beverage creation settings. In some embodiments, the side edges of the separator are tapered or protruding to match a receptacles dimensions and, in some embodiments, lock it in place. In some embodiments, the separator is on a hinge, clamp, slide, or is spring loaded to provide movement. In some embodiments, there a lock function to secure the separator in a certain position. In some embodiments, the separator is made of a material to withstand a certain type of heat.

In some embodiments, two cavities may have discontinuous sidewalls and be proximate to each other such that they share a common area, but also have portions of a cavity wall and areas distinct from the other. These cavities may accommodate one or more styles of receptacles. In such embodiments, the dispenser prevents two different sized pods from being loaded into the machine at the same time. The footprint of the different cavities is minimized and the overlapping area may include a perforation point that is common to both cavities and the receptacles that could occupy one cavity or the other.

The drawings and explanations provided above describe various embodiments of a system and receptacle optimized for melting, diluting, and dispensing frozen content which was originally produced from a liquid extract or concentrate of a consumable food or beverage and provided in a portion controlled package.

Key functions involved in this process include: detecting, identifying and loading a receptacle; measuring various temperatures, liquid levels, and pressures for use in key thermodynamic calculations and safety monitoring; preparing and/or selecting a "recipe" for the timing/sequence and amount for receptacle perforation, addition of a dilution liquid, secondary heat, air purges, and agitation; executing the recipe; detecting completion of the cycle and removal of the receptacle; cleaning; and communicating with the user.

For clarity, illustrative embodiments for different aspects of the system have been described with respect to the type and design of the receptacle, the nature of the frozen liquid content, the systems and processes for melting and/or diluting the frozen liquid content, and the delivery mechanism applied to the resulting liquid to create a consumable food or beverage on a just-in-time, consistent basis at the desired flavor, potency, volume, temperature, and texture. It will be apparent to one skilled in the art that these various options for receptacle type, form and characteristics of the frozen liquid content, mechanisms for melting and/or diluting the frozen liquid contents, and systems and methods for delivery of the liquefied contents can be combined in many ways to create a pleasing final product with specific characteristics which can be conveniently enjoyed by the consumer.

In some embodiments, this dispenser is designed to provide at least four styles of beverages and liquid food products with each group having its own combination and range of volume, temperature, and potency. The dispenser has a unique combination of functions to provide for a range of each product style from receptacles with frozen liquid content. The styles can be categorized into (1) a small, concentrated hot product, e.g., an espresso, (2) a larger, less potent single-serve hot product, e.g., a tea, coffee, soup, baby formula or latte, (3) a cold single-serve product, e.g., juice, coconut water, iced tea, iced coffee, energy drink and iced latte, (4) a hot batch serving, e.g., a pot of coffee or tea.

As discussed throughout the description, embodiments of the invention provide many benefits. For example, because the receptacles are single chamber mixing vessels, the receptacles do not retain filter material, spent coffee grinds, used coffee or tea leaves, or other materials that prevent the receptacles from being easily recycled as a single stream. Moreover, by providing a frozen liquid contents that is created by a large extraction process, the byproducts, such as coffee grinds, are maintained at a central facility, which can be more readily recycled or reused (such as a source of biomass energy and/or sustainable soil nutrients.) Further still, a much greater variety of final products can be supported with frozen liquid contents, as described in more detail elsewhere.

Although pushing a pressurized liquid around or through the frozen liquid contents within a receptacle can be effective at causing the contents to melt, other methods exist to enhance the speed of this process and create a more desirable outcome in terms of final beverage temperature. For example, the application of heat to the receptacle via an external, non-diluting heat source may be used for melting the frozen food or beverage into a consumable liquid food or beverage form. This latter method is especially useful when hot water is not used for the dilution process to deliver a colder beverage, as for example, a juice.

Regardless of how and when the contents are melted, the system must first ensure that a viable pathway is created for any fluids introduced into the receptacle between the entry and exit points. Otherwise an overflow and/or over-pressure condition will be created, causing leaks, spills, and possibly triggering the machine to shut down to avoid an unsafe condition. In some embodiments, the frozen food or beverage liquid is packaged to handle a flowing diluting liquid without an overflow. In some embodiments, this may involve freezing the food or beverage liquid into specific geometric shapes, structures, and proportions to provide necessary flow paths through the receptacle to its exit. In some embodiments, this may involve displacing the frozen contents from an original position to a secondary position that creates a flow path. In some embodiments, this may involve using a secondary, non-diluting heat source to partially or fully melt the frozen contents before dilution fluids are added.

In some embodiments, the heating of the receptacle melts the outside layer of the frozen content to carefully create a flow path around the outside of the frozen content before or after puncture. This localized heating is especially important if the frozen contents are to be rotated or agitated separately from the receptacle, as described above using pulsed dilution fluids to cause the contents to move.

In some embodiments, agitation is used, applied either to the receptacle and frozen contents together or to only the frozen contents, during any pre-heating and for mixing with the dilution liquid to expedite melting and thermal transfer.

In some embodiments, the negative thermal energy contained in the frozen liquid content (more technically known as the heat of fusion or enthalpy of fusion) absorbs excess heat from the diluting liquid, gas or steam used to make the consumable food or beverage as a method of facilitating a cold beverage from a dispenser without need for a refrigeration system within the dispenser. In this embodiment involving beverages intended to be served cold, melting and dilution of the frozen liquid contents is carefully managed using a combination of external heat, energy contained within an ambient temperature diluting liquid, and the use of relative motion (agitation) between the melting/diluting liquid and frozen liquid contents to enhance liquefaction with the goal to minimize the overall temperature of the finished product and deliver a chilled beverage.

In some embodiments, the dispenser has refrigeration components that chill a diluting agent for melting and diluting the frozen contents to create colder beverages. So long as the injected chilled diluting agent is warmer than the frozen contents, it will still act as a thermal resource for thawing the frozen contents.

In some embodiments, the secondary, non-diluting heater may be powered by one of direct electromagnetic energy (e.g., microwaves, RF energy, ohmic heating), hot air, steam, an electrical jacket heater, a water jacket heater, or other sources.

In some embodiments, the agitation may be one of reciprocation, spinning or vibration to facilitate and control the melting, thawing and/or heating of frozen contents.

In some embodiments, the dispenser includes detection components (sensors) including, for example, temperature and pressure sensors, and an optical reader for obtaining information about the receptacle and its contents. In some embodiment, sensors may also include magnetic sensors, mass sensors, proximity sensors, and the like.

In some embodiments, the dispensing system includes a network interface and is capable of being connected to a communication network, such as a Local Area Network (LAN), Wireless LAN (WLAN), or Bluetooth so that it may communicate with other devices, e.g., a smart phone or a server system that records information about the dispenser's use. In some embodiments, the dispenser may record data about the dispenser's use, e.g., what products are being made with it, and record the data locally to be updated to a server when a network connection is re-established. In some embodiments, this network connection can be used to diagnose issues and update software for new and future product parameters.

In some embodiments, the dispensing system may include a variety of different cavities to accommodate receptacles of one or more shapes and volumes. The receptacles may be of any shape, size, flexibility, or packaging material. For example, the receptacle could be a flexible pouch or a rigid can. The dispenser is not limited to having only one cavity. For example, there may be a cassette with multiple cavities for creating liquid food products from various sizes of receptacles. In some embodiments, two or more cavities can work in unison and their output can be dispensed to a common location for mixing multiple liquefied contents into a desired product. For example, a receptacle with a concentrated coffee extract and a receptacle with liquid dairy could be accommodated and dispensed simultaneously to create a latte style beverage. Alternatively, the separate cavities could each have a dedicated dispenser head, thus being of the single group or multi group format.

In some embodiments, the cavity of the dispenser can hold a variety of pods, each with a different depth and or diameters and multiple bottom needles are employed in the dispenser, wherein these needles are located at various depths within the cavity, the depths being determined by the types of pods designed for use therein so penetration of the pods occurs at a desired location for each pod size and each needle only interacts with one size of pod.

In some embodiments, the dispenser may have a tapered cavity for receiving tapered receptacles. In other embodiments, the dispenser may have straight sides and may be any hollow shape, including cylindrical, square, etc. In some embodiments, the receptacle is perforated on a top and a bottom or one or both sides. It may be perforated once or more than once, before, during or after the beginning or completion of thawing. Thawing may be at temperatures other than 30-33° F. dictated by the TDS-influenced melt temperature of the frozen content.

In some embodiments, the axis of symmetry of the cavity is angled away from vertical such that one portion of the circumference of the lid defines a high point of the receptacle's volume and one portion of the circumference of the bottom surface defines a low point, or vice versa. For example, if a cylinder-shaped cavity is so angled, then the liquid will flow to the lowest point along the circumference of the receptacle instead of trying to escape from a flat (nominally horizontal) bottom. Furthermore, the perforation needles or guillotine of the dispenser may be located at these extremes, maximizing the liquefied content's ability to flow and exit out of the receptacle with gravity and limiting the perforation size necessary to do so.

In some embodiment, the cavity is designed to contain or reflect electromagnetic energy. For example, the sidewalls of the cavity may be plated with a conductive metal that is grounded to the dispenser's electrical system. In some embodiments, the cavity is designed to absorb or dampen electromagnetic energy away from the sidewalls of the receptacle. For example, the walls of the cavity may be fabricated from or covered with an elastomer containing some combination of high permeability and high permittivity materials as are known in the industry to absorb microwave energy. Alternatively, coatings or paints with a high carbon particle content may be used. In some embodiments, heat conductive coatings are layered to effectively melt certain areas of frozen content faster than other areas. For example, a conductive coating may be heavier at a point of perforation.

In some embodiments, the perforation system, cavity, and receptacle are of specific compositions such that the cavity reflects certain wave energies while the perforators and receptacle conduct the energy and are heated. This heating process may be applied during the dispense cycle to increase the temperature of the diluting liquid further during the beverage creation process.

In some embodiments, the cavity walls are manufactured using high-temperature tolerant materials to resist damage from the heat source used to heat the contents in the receptacle. For example, various high temperature thermoplastic polymers are well known in the industry for their ability to withstand temperatures exceeding 400° F. Such chemistries include, but are not limited to, many types of fluoropolymers, polyetheretherketone and its relatives, polyetherimide, polyphenylenesulfide, and polyphthalamide.

In some embodiments, the machine-based system may include a mechanical function to distinguish and limit controls and settings for beverage creation.

In some embodiments, the frozen liquid contents may be crushed or macerated by the machine-based system to increase the surface area of the frozen liquid contents to increase melting rates. This mechanical function may be initiated manually by the consumer or automatically implemented by a sensor trigger.

The machine-based system may displace the frozen liquid contents, or the consumer may displace the frozen liquid contents, remove it from its packaging, and loading only the frozen liquid contents into the system cavity.

In some embodiments, dislodging frozen liquid contents from receptacle walls may create issues and otherwise make it difficult to pierce the receptacle where it is in contact with the frozen liquid contents. For such embodiments, the machine may recognize the specific frozen receptacle type, discriminating it from other frozen receptacles, using sensed criteria, like weight or temperature, and mechanically adjust the receptacle so it can be perforated in a specific location where no frozen liquid content is in contact with the receptacle. This may include flipping the receptacle upside down.

In some embodiments, the secondary, non-diluting heater may comprise heated puncture needles or the like, to facilitate the creation of a desired consumable liquid that the consumer does not desire to dilute.

In some embodiments, the flowing dilution liquid melts the entire frozen liquid contents to eliminate any waste and rinse the receptacle of any residue or contaminants as part of the final portion of the melting or dilution process. In some embodiments, the receptacle is fabricated from a readily recycled material such as aluminum. This clean, recyclable material, free of grinds and filters is thus easily recycled as part of a single stream without any additional effort by the user. In some embodiments, focused specifically on recycling, the manufacturer would introduce a deposit requirement for each receptacle to encourage its return to the point of sale for a deposit refund.

In some embodiments, the frozen content receptacles are stored within the dispensing machine. Based on a selection from a user interface, the appropriate receptacle is loaded into the beverage creation chamber or cavity. In some embodiments, the storage area is a refrigerated chamber for storing receptacles. In some embodiments, the system may automatically load receptacles to a location where they may be melted and diluted to create a beverage without a human interacting with the receptacle. The previous example may be combined with a user interface (i.e., human machine interface) on the machine to load a desired receptacle in a vending style application. In some embodiments, the storage of the frozen receptacles is at freezing temperatures and has a controlled environment with an inert gas.

In some embodiments, after the creation of the beverage, the spent receptacle may be automatically disposed into a trash or recycling compartment.

In some embodiments, the frozen liquid contents within a receptacle is warmed to a temperature just below its freezing point or is partially or fully melted in a separate temperature controlled cavity within the dispenser or in a separate appliance owned by the user such that the receptacle containing frozen contents is "prepped" for quicker dispensing before it is ever inserted into the dispenser.

In some embodiments, the receptacle material is edible and dissolvable, such that there is no spent receptacle after using and it is dissolved during the beverage creation process.

Additionally, embodiments of the present disclosure can be used with the systems and techniques set forth in U.S. Pat. No. 9,346,611. The present apparatus and methods for creating and dispensing beverages and liquid food products from a receptacle in a machine-based system at a desired temperature, volume, flavor, potency, and texture can be combined with all related systems and processes from the referenced patent application.

In another aspect of the invention, any of the dispenser systems described herein can be implemented without a chamber to hold the receptacle that contains frozen liquid contents. Rather, in the alternative implementations, the dispenser systems include an external connection that mates with a complementary connection on a frozen contents receptacle. The complementary connections enable the dispenser system to provide dilution liquid to the inside of the receptacle while minimizing leaks. Optionally, the receptacle inlet connection has an inlet seal that ruptures to permit dilution liquid flow into the receptacle. In other embodiments, the pressure of injected diluting liquid ruptures an outlet seal to provide an exit for a final food or beverage product. Although the receptacle is external to the dispenser, the various techniques for the dispenser learning information about the receptacle and/or the frozen liquid contents and the techniques for controlling the final product preparation are equally applicable.

In some embodiments, the exit needle or fluid drain from the dispenser cavity extends downward to a level proximate to the bottom of the user's dispenseware such that the dispensed beverage flows from the bottom dispenseware up to the final fill height (fluids are added to the glass from the bottom up instead of from the top down) to minimize froth and exposure to oxygen with the latter aim to reduce any oxidation of critical flavor compounds in the dispensed beverage.

In some embodiments, a platform or drip tray spins, vibrates, or reciprocates to mix the liquids in a provided beverage container.

In some embodiments, a scale sensor is used to detect a beverage container is below the dispense area to prevent spilling.

In some embodiments, an optical sensor or other type of sensor is used to detect a beverage container is placed below the dispense nozzle.

In some embodiments, the dispenser selectively mixes portions of the frozen content and diluting liquid to give the final beverage a layered appearance and flavoring.

In some embodiments, one of the dispensed liquids may be carbonated.

Any of the dispenser system embodiments herein can include a drip tray disposed beneath any of the components of the dispenser system. For example, the drip tray can be contained within the lowest part of the dispenser housing such that any uncontained liquid generated by any part of the dispenser is captured by the drip tray. Also, because the final product is dispensed into a container, such as a thermos, mug, cup, tumbler, bowl, and/or the like, the product container can be placed on a portion of the drip tray that has a grated opening to capture overflow or spillage. The drip tray can be disposed below the product outlet and/or diluting liquid outlet to capture liquid in the event that the product container is removed during the product making process. The drip tray is removable from the dispenser system, and can be removed manually or be motor driven. Optionally, the dispenser has a level sensor that detects a liquid level in the drip tray and alerts the user to empty the drip tray when a liquid threshold is reaches. Further, the dispenser can halt the final product creation process if the dispenser detects a high liquid level in the drip tray.

In some embodiments, many of the parts of the various embodiments of the dispenser systems described herein are removable and dishwasher-safe. That is, the parts may be cleaning using a standard commercial or residential dishwasher without suffering ill effects. For example, parts of the chamber, the perforator(s) used for dilution liquid supply inlets, the perforator(s) used for product outlets, and parts of the drip tray assembly can be cleaned in a standard dishwater. Alternatively, or in addition, certain implementations include self-cleaning mechanisms. For example, the dispenser may pass hot liquid or steam through the various liquid flow paths, chambers, vessels, and reservoirs to clean and sanitize those elements.

In some embodiments, a UV light source may be included in areas of the dispenser that are prone to contamination to service as a way to clean those portions. For example, the chamber that holds the receptacle can contain a UV light source that exposes the inside of the chamber and/or the dilution liquid perforator/injector and final product outlet/perforator to UV light.

The dispenser envisioned as part of this invention is smart, connected, can be easily updated over time to include new instructions and recipes, and includes a control system that monitors and manages all system functions.

As noted above, key functions involved in this process include: detecting, identifying and loading a receptacle; measuring various temperatures, liquid levels, and pressures for use in key thermodynamic calculations and safety monitoring; preparing and/or selecting a "recipe" for the timing/sequence and amount for receptacle perforation, addition of a dilution liquid, secondary heat, air purges, and agitation; executing the recipe; detecting completion of the cycle and removal of the receptacle; cleaning; and communicating with the user.

Aspects of the techniques and systems related to producing a food or a beverage at a desired temperature and a desired volume and in an automated fashion as disclosed herein may be implemented as a computer program product for use with a computer system or computerized electronic device—a system controller or microprocessor. Such implementations may include a series of computer instructions, or logic, fixed either on a tangible/non-transitory medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in many programming languages for use with many computer architectures or operating systems. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the sections below, the key functions identified for the controller are explained in more detail.

Detecting, Identifying and Loading a Receptacle

At the beginning of a dispense cycle, the system must detect that a user wishes to install a receptacle in the machine and start a programmed series of steps to accomplish that task.

In some embodiments, the user waves a receptacle near a detection sensor to initiate the cycle. In some embodiments, the sensor is one of a motion sensor, a proximity sensor, a magnetic sensor, an RFID reader, an optical switch, camera, or laser configuration and use any type of photoconductive, photovoltaic, photodiode, or phototransistor device. It may also be a Bluetooth device that recognizes the cell phone of the user.

The receptacle may include a barcode, QR code, marking, image, number, other type of glyph, patterns, external markings, RFID tags, magnetic strips, or other machine-readable labels using the appropriate sensors to convey information about the frozen content or receptacle to the dispenser via an optical sensor. In some embodiments, this information is encrypted to create a barrier to imitation by other producers. Without the code, the device stays inactive and/or will refuse to accept the receptacle. Alternatively, without the code the dispenser operates to deliver a beverage, but only with a reduced set of functions that may not yield an optimum user experience. The receptacle may alternatively include electrically resistive printing that defines what beverage it contains. Simple probes mounted in the dispenser contact the paint to read the resistance.

The information detected by the dispenser may include the composition of the frozen contents or be a derivative thereof that may indicate the mass and/or certain thermodynamic properties of the content. In some examples, the contents could be classified by its amount of protein, fat, carbohydrates, fiber, ash, or other food components. In other embodiments, it could be identified by a category, like juice, or a sub-category, like orange juice, that group receptacles with similar thermodynamic properties and desired drinking temperatures. With this information and other temperature information described below, the dispenser may use a microprocessor to adjust its beverage creation settings to carefully melt, dilute, and heat the frozen contents to a desired volume, potency, temperature, texture, etc.

Alternatively, the receptacle label or other readable data may include a representation of the thermodynamic properties derived from the frozen content's composition in the form of certain key variables. These thermodynamic properties and other properties acting as inputs may include, but are not limited to, mass, shape, density, specific heat, enthalpy, enthalpy of fusion, enthalpy of vaporization, thermal conductivity, thermal capacity, initial freezing point, freezing point depression, thermal diffusivity or any combination or derivation of the sort that is descriptive of melting and reheating properties. Other information about the frozen content and/or the receptacle includes volume of fill and/or headspace present in the receptacle.

In some embodiments, the information conveyed to the dispenser for determining certain process variables may include the date of manufacture. For example, in some embodiments the food components within the receptacle may include fresh fruit or vegetables which generate heat through respiration and lose moisture through transpiration. These processes should be included for accurate heat transfer calculations. In rare occasions, changes in thermodynamic properties based on a time variable should be accounted for. In other embodiments, the date of manufacture could be of importance in determining whether certain age sensitive components in the frozen contents have exceeded an allowable shelf life, which is optionally included in the information conveyed to the dispenser. In such embodiments, the dispenser could be programmed to reject the receptacle and prevent its processing for the safety of the user.

In some embodiments, the receptacle communicates an authentication code to the dispenser, identifying the product as having been made by an approved manufacturer. In some embodiments, this authentication code is encrypted to prevent easy counterfeiting. In some embodiments, the presence of a recognized authentication code opens a full range of process options from the dispenser whereas the absence of the code can either disable the dispenser or cause it to implement a secondary, smaller set of process options that may prevent the dispenser from delivering the optimum product in terms of temperature or volume preferred by the consumer.

In some embodiments, the dispenser also collects temperature information from the receptacle. This collection may occur outside of the dispenser or once the receptacle has been loaded into the machine. For example, the dispenser may incorporate an IR sensor which measures the surface temperature of the receptacle at the same time it is being scanned for other identifying and thermodynamic data. The thermal sensing equipment incorporated within the dispensing apparatus may include any type of sensor including, but not limited to, RTDs, thermistors, thermocouples, other heat sensors and infrared energy sensors. Alternatively, a temperature indicating strip created, for example, using a variety of different thermochromic inks may be included on the receptacle to visually signal the temperature within the receptacle via a change in the appearance or properties of the temperature strip. This temperature strip could be both a signal to a consumer as to whether the pod is properly frozen before loading into the dispensing apparatus and used by the dispenser via some type of camera/monitor to translate the visual signal into an electronic reading. Some embodiments of the thermochromic inks are based on leuco dyes which are sensitive to heat and transition from transparent to opaque/colored as the temperature is reduced to their activation point. In some embodiments, these leuco dyes are configured in a strip of small printed squares on the outside of the receptacle, each square of a different leuco dye formulation, and ordered such that as the temperature of the cup falls, the length of the strip that is opaque/colored steadily grows in length or changes in shape.

Similarly, to alert the consumer that the receptacle may have been exposed to an unacceptably high temperature prior to use, in some embodiments the outside of the receptacle may include an area covered with a material which irreversibly changes color if some activation temperature is reached or exceeded. Systems of this type, based for example on colored paper and a special wax formulated to melt at the desired temperature, are well known in the art.

In some embodiments, a probe could be used to pierce the receptacle and identify the contents based on spectrometry, chromatography, or other known techniques to identify compositional features. In other embodiments, a communication system utilizing electromagnetic sensors in the dispenser and compatible electromagnetic labels embedded in the receptacles (e.g., using RFID, NFC, Blue Tooth™ or the like) pass information about the frozen contents to the dispenser. In another embodiment, the receptacle could be weighed using a scale/weight sensor and a mass could be assigned to different products as a method of differentiation. Similarly, a mass sensor could be used to directly determine the mass of the filled receptacle.

The dispenser may include sensors to detect if a pod is acceptable or outside of an acceptable temperature and/or age range (e.g., too warm, too cold, too old, and/or spoiled). In some embodiments, the dispenser may reject a receptacle based on detected information. In other embodiments, the dispenser may render the receptacle un-usable if it detects it may be harmful to consume as, for example, exceeding recommended shelf life.

In some embodiments, the dispenser will recognize and alert the user following the insertion of an empty/used receptacle.

In some embodiments, sensor technology assists in creating a desirable product and eliminating human error. In some embodiments, this sensor method is enabled using specific geometry formed into the receptacle. For example, as shown in FIGS. 8 and 9, an indentation of a specific length could be physically or optically sensed by the dispensing machine and this measurement used to convey information about the contents of the receptacle and thereby allow the dispensing machine to automatically choose the right melting/dilution process. Physical modifications to the shape of the receptacle as exemplified in FIGS. 8 and 9 may also assist in the mixing of the dilution liquid injected into the receptacle and thereby help to speed the liquefaction of the frozen liquid contents.

In some embodiments, the dispenser includes a sliding tray or rotating door like a draw bridge to load a receptacle into the beverage creating cavity. In some embodiments, the dispenser includes a visor over the sliding tray or door with an optical sensor positioned towards the chamber of the sliding tray for receiving the receptacle. The tray or drawer may have a slide position A, inside the beverage creation cavity, and a position B, wherein the optical sensor may align with the lid of the receptacle and receive information about the frozen content inside. The optical sensor may prohibit the drawer from closing until the receptacle is read and verified for compatibility. In some embodiments, the optical sensor for reading pods may be inside the beverage creation cavity.

In some embodiments involving any dairy-based products, the dispenser detects the temperature of the inserted receptacle and is programmed to reject the initiation of creating the beverage if the receptacle is too warm. In such a case, the concern is that the dairy products may have spoiled from the increase in temperature and become unsafe for consumption. The dispenser may instruct the user to discard the receptacle. In addition, after successfully dispensing a product that involves dairy ingredients, the dispenser may initiate an extra sanitation step before the dispenser is used again. In some embodiments, the dispenser maintains data about the last product to be used in its memory, including the date of preparation. If the last product used contained dairy-based contents, and the time since this even exceeds some maximum period of time, e.g., 24 hours, then the dispenser may run a cleaning cycle prior to creation of the next beverage. In some embodiments, the cleaning cycle includes the dispensing of hot water and air purge into the drip tray at the end of the sanitation cycle.

Measuring Temperatures, Liquid Levels, and Pressures

In addition to carefully measuring/detecting various properties of the receptacle, it is also important to know the temperature of the reservoir water as part of the pending thermodynamic calculation and to carefully control other process temperatures during the dispense cycle.

The temperature of the water added to the receptacle is an important parameter in the dispense cycle as it greatly affects the finished product temperature and weighs heavily in the consumers judgement about whether the dispensed product has met their expectations. The water temperature is controlled by the system controller via mechanisms and sensors built into the dispenser. First, ambient temperature water supplied by the dispenser to the receptacle can be sourced directly from the dispenser's reservoir to the receptacle inlet needle or be first routed through a heater tank. The reservoir water itself can also range in temperature based on the season of the year if it comes from the user's tap, how long it has been given to equilibrate to room temperature, whether it has picked up waste heat from the rest of the dispenser hardware, and whether the user has chosen to add ice when, for example, a cold beverage is planned. Water routed through the heater tank can be heated to a fixed temperature for all operations as is common in most coffee brewers today or it can be controlled to some other variable temperature based on output signals from the system controller. Delivered water can be tempered, that is, a combination of waters sourced from a hot water tank and cooler water from the reservoir can be mixed together, with the final temperature determined by a set of proportional flow valves and a downstream thermal sensor. Some final "fine tuning" of the temperature of the water delivered to the receptacle can be made as it passes through a needle or tubing with a secondary heater around the needle. And finally, the water exiting the receptacle can be further heated as it leaves the receptacle and flows through some dispensing channel to the user's coffee cup or other dispenseware.

It should be noted that since the device is a dispenser and not a brewer, the maximum water temperature required for proper functioning may be considerably lower than that found in most well-known coffee brewers today where the water is typically supplied at a temperature between 190° and 205° F. to achieve the optimum level of solute extraction from, for example, coffee grounds. Accordingly, concerns about high temperature settings that may exceed the local boiling point in some high-altitude locations can be easily addressed. It is possible, for example, to use a maximum temperature setting for the water of 180-185° F. and thereby insure the boiling point will not be exceeded for any location below approximately 12,000 feet mean sea level. Thus, while the system controller could be programmed to use input from a barometric sensor or estimated altitude based on a GPS or WiFi derived location information, this complexity is not required to achieve excellent performance as well as operational safety related to boiling water concerns. In some embodiments, the temperature of the water produced by the hot water tank is kept at the hottest temperature possible for local conditions based on location inputs and then that water is tempered as needed for optimizing the thermodynamics required to dispense a beverage at the temperature desired by the user.

Thermodynamic Calculations

In some embodiments, the dispenser may have predetermined heating and agitation functions for each receptacle and these parameters will not change regardless of temperature and content of the receptacle. These settings may be established to provide beverages at an acceptable temperature from frozen receptacles of varying temperatures. In some embodiments, however, it may be desirable to use measured thermodynamic data to optimize the user's experience and provide the best possible beverage in terms of temperature, volume, potency, texture and flavor in a timely manner. This is possible, via certain equations of state and/or a table of inputs and outputs, assuming the necessary data is available.

The duration and timing for the application of secondary, non-diluting heat are two of many parameters that will affect the overall timing, efficiency, and success (achieving a positive experience for the consumer as measured by beverage/food taste, temperature, potency, volume and required time/convenience) of the dispensing operation. In some embodiments, these parameters are determined by a control algorithm built into the system controller. Inputs to this algorithm may include user preferences for dispensed product temperature, volume, and strength or potency of the consumable via input by the user to a human machine interface at the start of the dispense cycle. Also included as inputs may be data gathered during the initial product scan described above and other system sensor measurements. In some embodiments, this data will include: temperature and volume of the reservoir fluid; temperature, mass, and volume characteristics of the dispenseware; temperature of the receptacle and/or the frozen contents; knowledge about what was dispensed during the previous cycle and when that occurred; and the altitude where the dispenser is located since barometric pressure affects boiling temperature and, in most instances, it is not desirable to create steam within the system or the receptacle.

With all this information available to the system controller's algorithm, the controller will, in some embodiments, use this algorithm to calculate/select various control values for cycle timing, temperatures, durations, liquid volumes, liquid flow rates, a decision about when to puncture or vent the receptacle, etc. to arrive at the desired end of beverage quality given all the known starting conditions. In some embodiments, the system controller also makes use of ongoing data input from sensors to "learn" during the cycle and adjust ongoing temperatures or durations or volumes to correct small observed out-of-spec or adverse-trending conditions. Thus, the timing for lid venting or puncture, addition of secondary heating, addition of fluids, agitation timing and duration, and final dispense will all be set and adjusted in accordance with an algorithm. Over time (months or years) this algorithm can be updated via WiFi or other techniques and/or processes as improvements are developed, new products are introduced, dangerous or counterfeit products are discovered, or unanticipated safety concerns become known. In some embodiments, the algorithm adjusts the heating rate and maximum temperature of the frozen contents so as not to overheat certain thermally sensitive ingredients such as orange juice and thereby preserve the freshest taste possible.

It is understood that the mass and TDS or BRIX of a frozen content within a receptacle impacts the energy needed to melt and reheat the content to a certain temperature. In another embodiment, a user may choose from different size and potencies of a finished product at a standard temperature. This would require less or more of a diluting liquid, heat, and agitation supplied to the frozen content depending on the volume/potency selection.

The composition of the frozen contents impacts the temperature of a finished beverage with uniform liquid product creation settings. Each makeup of frozen contents at a given mass and temperature requires a certain amount of energy transferred to melt and reheat the contents. Many additives impact the thermodynamic metrics of a composition. Detecting these differences in the frozen content receptacles allows the dispenser to adjust its settings to provide for a desired finished liquid product from the frozen contents. For example, a dispenser may adjust its settings to create a beverage of the same volume and temperature from receptacles having the same mass, but with one pod having a higher sugar content than the other. The additional sugar in one receptacle depresses the freezing point of the content and it impacts the specific heat, enthalpy of fusion, thermal conductivity, etc. such that it requires a different amount of energy and/or a different melting environment to create a beverage of the same volume and temperature as the receptacle with less sugar content. Techniques are known for estimating the heat characteristics of foods and beverages and can be used with embodiments of the inventions herein.

In some embodiments, the dispenser can derive some thermal property representation of the frozen content in a variety of ways. This information can include multiple variables for increased precision of a final beverage. Alternatively, the information can be a single variable that represents a baseline of the ease of melting and reheating. Some examples of thermodynamic properties and how they may impact the beverage creation settings are described below.

Thermal conductivity is the property of a material to conduct heat. Increased thermal conductivity will facilitate the heat being uniformly distributed throughout the frozen contents. Thermal conductivity is also very important at the interface between the frozen contents and any diluting liquid and may be increased by agitation applied to the frozen content or other efforts to disrupt the thin surface layer of otherwise stagnant fluid at the interface. In general, increases in the amount of food components including, protein, fat, carbohydrates, fiber, and/or ash comprised in the frozen content will increase the thermal conductivity of the content.

Enthalpy of fusion, also known as the latent heat of fusion, is the change in system enthalpy required for the state to change from a solid to a liquid at the same temperature. In the case of this dispensing system, the enthalpy of fusion is the amount of energy required to melt a quantity of the frozen contents once it has already been warmed to its melting temperature. Enthalpy of fusion plays an important role in the ability of this dispenser system to create chilled beverages from frozen content without the use of a secondary mechanical cooling system because a significant amount of heat can be removed from the diluting liquid. The greater the enthalpy of fusion of the frozen content, the more energy it will take to melt the contents. Therefore, more energy will be required to melt and reheat the frozen contents to a certain temperature for products with a higher enthalpy of fusion.

Thermal capacity or heat capacity is a measurable physical quantity determined as a ratio of heat given or taken from an object to the resulting temperature change of the object. Specific heat, a measure which is independent of the mass of an object, is described in metric units as the heat required to raise the temperature of one gram of material by 1° Kelvin. Like enthalpy of fusion, the specific heat of a given composition plays an important role in the amount of heat necessary to first increase the temperature of the solid frozen composition to its melting point, and then to further heat the contents once it is a liquid. It is important to note that the specific heat may differ when a composition is in liquid versus solid form. For example, the specific heat of water in its solid form is about half of its value for its liquid form. This means it requires about half the energy to increase frozen water 1° Kelvin as compared to a similar mass of liquid water.

It is important to note when calculating the beverage creation settings for the dispenser that these variables are highly inter-related. The entire reaction environment must be considered in making any adjustment for new conditions. For example, merely accounting for heat energy from the diluting liquid and/or an alternative heat source will not yield the desired final product equilibrium temperature if variables such as agitation and dilution liquid flow rate are not considered. For example, the flow rate, pressure, and agitation supplied to a receptacle may be used to increase the thermal transfer between the supplied heat and the frozen content.

The determination of beverage creation functions and settings may include an equation with one or more variables. For example, the dispenser could use temperature, mass, specific heats, and enthalpy of fusion in a multi-variable equation to determine the most efficient way to prepare a beverage or liquid food product to deliver it to the consumer's cup at a specific temperature, consistency, and volume. Alternatively, the determination of settings and functions may be based on a processor using a table of inputs and outputs in a database. For example, a receptacle with a detected category and temperature may be included in a database and thereby associated with variable functions to melt, dilute, and reheat. The database may be stored within the dispenser or at a remote location and accessed via a communications network. In some embodiments, a combination of equations and tables of inputs and outputs may be used to determine the proper beverage creation settings, including adjustments for dispenser altitude, voltage and in use voltage drop.

One embodiment of an algorithm for preparing a completely liquid food/beverage from a frozen content follows:
input: scan pod bar code or QR code to gather:
content mass ($M_{fc}$)
content volume when liquid ($V_{fc}$)
melting point of content ($T_{mp}$)
latent heat of fusion of content ($H_{fc}$)
specific heat capacity of solid content ($C_s$—use average)
specific heat capacity of content when liquid ($C_l$—use average)
final product acceptable temperature range
final product acceptable volume range
input: dispenser thermal sensor determines frozen content temperature ($T_{fc}$)
input: user provided desired volume ($V_d$) and temperature of final product ($T_d$), limited by scanned ranges (or these values are set by coded information)
input: dispenser thermal sensors determines ambient water temperature ($T_a$) and hot water temperature ($T_h$)
determine: amount of heat needed to bring entire frozen content to melting point and then to liquefy the entire content ($Q_t$):

$$Q_t = [M_{fc} \times C_s \times (T_{mp} - T_{fc})] + H_{fc}$$

$T_{mp}$ will likely be an empirically determined temperature rather than a sharp melting point for "mixed" foods/beverages
determine: amount of heat needed to bring liquid content at melting point to desired product temperature, accounting for heat loss during the beverage creation process ($Q_d$):

$$Q_d \times M_{fc} \times C_l \times (T_d - T_{mp})$$

determine: amount of excess heat available from hot dilution water ($Q_{ex}$):

$$Q_{ex} = (V_d - V_{fc}) \times (\text{volumetric heat capacity}) \times (T_h - T_d)$$

determine: amount of additional heat needed, if excess from dilution is not enough ($Q_{add}$):

if $Q_{ex} < Q_l + Q_d$: $Q_{add} = Q_l + Q_d - Q_{ex}$ for the supply of this additional heat, we will need to apply a loss factor for a microwave heat source, we will need to apply an "absorption" factor based on food/beverage content Determine: mix of hot water and ambient water, if excess from dilution is too much:

if $Q_{ex} >= Q_l + Q_d$:

$$V_h = V_{dil}/((Td-Th)/(Ta-Td)+1)$$

$$V_a = V_{dil} - V_h$$

where:
   $V_h$ is volume of hot water
   $V_{dil}$ is volume of total dilution ($V_d - V_{fc}$)
   $V_a$ is volume of ambient water or chilled water.

While calculation of every combination of mass and temperature of a frozen composition, requiring a certain amount of energy be added to enable it to be melted and heated to the desired temperature with a diluting liquid and other techniques and/or processes of melting and reheating is possible, it is not always that easy. In a thermodynamic modeling equation for creating a liquid food product at a desired temperature, it is important to account for heat energy lost to atmosphere, receptacle walls, and other similar effects. In addition, ambient conditions in the environment where the product is being created may also play a factor in achieving a desired final temperature of a dispensed product. These other factors, over time, are predictable, however, and the principles of machine learning may be included in the overall analysis process.

Preparing Recipes

Although there are many possible embodiments for taking temperature and compositional information from a frozen liquid pod to adjust settings to create a desired beverage, in general there should be consistent changes in the output of dispenser functions based on certain increases and decreases in temperature, mass, and presence of certain compounds. Part of the controller logic will be to prioritize one strategy over another for how to accomplish the required thermodynamic result. For example, if the requirement is to add more heat to a specific receptacle than a previous sample, the dispenser may adjust and implement a longer pre-heat, a hotter pre-heat, a hotter diluting agent, or more agitation to add the energy necessary to increase the temperature of the finished beverage to yield a final beverage that is nominally the same as one created from the initially warmer pod, ceteris paribus. Any described beverage creation settings above may be combined strategically to transfer additional energy to the colder receptacle. These different strategies are implemented as specific recipes—a set of steps to be taken and monitored by the dispenser to achieve the desired goal.

As noted above, the principals of machine learning may be applied to the calculation of the dispenser properties. For example, the scans of the pod and the temperatures of various components may be taken as initial input. Thereafter, however, the dispenser conducts a series of short "experiments" to validate or refine the inputted thermodynamic properties. For example, the secondary heat source is activated for five seconds and the resulting impact on temperature is noted. Given this level of energy input and the originally inputted properties of the frozen contents, a specific temperature rise will be expected. If the measured temperature rise differs sufficiently, the values for specific heat, thermal conductivity, etc. may be adjusted to match the observed reality more closely. These new parameter values can be used to immediately recalculate the planned dispenser "recipe" to yield a beverage more closely matching the users stated preferences.

In some embodiments, at least one criterion of the receptacle or frozen liquid contents establishes or inhibits the settings of the accommodating machine-based system for creating a desired product. These criteria might include, but are not limited to, weight, color, shape, structure, and temperature.

In another embodiment, the dispenser may have predetermined heating and agitation functions for each receptacle that do not change regardless of temperature and content. The settings may be established to provide beverages at an acceptable temperature from frozen receptacles of varying temperatures.

In some embodiments, the dispenser includes an active device to heat or cool the user's dispenserware (glass, cup or mug) before or during the time the dispenser is melting/dispensing the frozen contents. In some embodiments, this device is a surface plate that is heated or cooled by a thermoelectric device. In some embodiments, the dispenserware communicates its actual temperature to the dispenser for more accurate adjustment of the dispensed fluid temperature. Any such features will modify the recipe from that originally developed based on thermodynamic properties or standard tables.

In some embodiments, the characteristics of the user's glass, coffee cup, bowl other container (hereinafter "dispenseware") are also communicated to the dispenser via bar code, QR code, RFID, or other techniques and/or processes. This information is of interest to the dispenser to (1) ensure the receiving dispenseware for the melted and dispensed beverage liquid or food is of sufficiently large volume to receive all of the dispensed material without overflowing and (2) to better understand the cooling effect the dispenseware will have on the dispensed food or beverage so that the dispensed temperature setting for the control system can be adjusted. In some embodiments, the temperature of the dispensed beverage, as measured in the dispenserware after the dispensed fluid and the dispenserware have come to thermal equilibrium, is the temperature specified by the user as his/her preferred beverage/food temperature.

The adjustable settings specified by the recipe may include, but are not limited to: dilution liquid amount, flow rate (including pauses) and injection pressure, temperature, timing, whether steady or pulsing flow, duration of pulses; use of high pressure air during dispense; amount and frequency/pattern for supplying secondary, non-diluting heat; agitation duration and timing including any periods of rest between agitation phases; the positioning of the receptacle; the receptacle perforation location(s), size, shape, number, and timing on the receptacle; any follow-up cleaning function such as a rinse of the injection cavity; or maintenance notification. The variability, sequence, timing, reoccurrence, duration, and combination of these functions may be implemented in many ways to create a liquid product with desired characteristics. In further embodiments, the dispenser incorporates and adjusts the use of air to be co-injected with the diluting liquid as a supplement to the diluting and/or melting liquid added to the receptacle to improve mixing of the contents and the efficiency of liquefaction.

In some embodiments, the machine-based system may include a thermocouple to detect the temperature of the frozen liquid contents and/or its receptacle and automatically adjust its settings to create a beverage of a desired flavor, strength, volume, temperature, and texture. This may include disabling the dilution function and engaging a melting component that does not dispense a liquid. Furthermore, the consumer may enter an exact desirable characteristic, like temperature or potency, and the machine-based system may use this in combination with available sensor technology to achieve desired parameters.

Diluting fluid injection rates can vary widely depending on the type and size of the beverage/food product being dispensed. As discussed previously, these values will for some embodiments be calculated and set by the system controller. As a rough guide, however, a range of probable flow rates can be estimated, considering the creation of a 2-oz. espresso dispensed over 30 seconds on the low side and considering a 32-oz. carafe dispensed over 90 seconds on the high side. These flow rates suggest a range of flows of 0.02-0.25 gallons per minute as a specification for the fluid flow pumps. It is understood that faster and slower flow rates are within the scope of the invention, as are larger and smaller serving sizes.

In some embodiments, the rate and timing of fluid flows are adjusted based on whether the water is sourced directly from the reservoir or must first pass through the heating chamber and whether some system or method is employed to take maximum advantage of the cooling effects possible from the frozen contents when making a cold beverage. For example, in some embodiments, ambient temperature or tempered (mixed hot and ambient) water is first used to apply some heat to the exterior of a receptacle by passing it through a water jacket in close contact with the receptacle. As heat is passes to the receptacle, the temperature of the fluid passing through the water jacket is reduced. If this cooled water can be captured and stored in secondary container, e.g., a pressurized device (similar in function to a commercial product such as an Extrol tank), then the fluid can be subsequently flowed to the interior of the receptacle to further melt and dilute the frozen contents without use of additional pumps or motors. If the intermediate storage tank is large enough, it is not necessary to worry about balancing the volumes of heat transfer fluid and what is later to be injected into the receptacle. (Excess fluid in the storage tank can be returned to the reservoir at the end of a dispense cycle or discarded.) In this way, it is possible to capture much of the "coldness" or "negative thermal energy" of the frozen contents to permit the dispensing of cold beverages without onboard mechanical refrigeration inside the dispenser.

In some implementations, information about the hardness of the frozen liquid content is included in information gathered by dispenser, e.g., by way of QR code, RFID, or the other techniques described herein. The dispenser can use this information to determine whether, when, and where to puncture the receptacle during the product making process. For example, if the dispenser receives information that indicated the hardness of the frozen content is too soft to allow a perforator to dislodge the contents from its position in the receptacle, the dispenser may use a secondary heat source to partially melt the contents before perforating the receptacle in a location corresponding to the content's position opposite the location of perforation. In alternate embodiments, the dispenser has a hardness sensor (e.g., an ultrasonic hardness sensor or other known hardness sensor) that determines the hardness of the frozen contents.

Alternatively, the dispenser could heat the entire contents of a receptacle to an average temperature that remains relatively cold, potentially forming a partially melted "slush", based on, for example, detected information that identifies the receptacle as containing a high TDS orange juice frozen liquid contents. The dispenser can then add the appropriate amount of an ambient temperature dilution liquid to create a chilled orange juice of the correct concentration. In this example, the dispenser softens the frozen liquid contents to enable easy mixing of the contents and dilution liquid, but the dispenser does not overheat the contents. This approach takes advantage of the relatively lower freezing point of the high TDS content to provide a chilling effect on the incoming ambient dilution liquid. Any or all the steps of the process can include agitation.

In some embodiments, these functions may be combined into a recipe that creates a beverage in the least amount of time or using a minimum amount of energy. In some embodiments, the amount of time for a source of heat to achieve a certain temperature may be included in determining the beverage creation settings. For example, a heated diluting agent may be a faster source to melt the frozen content, but takes far longer to reach a certain required temperature of the frozen contents than would otherwise be required if that energy were added using electromagnetic radiation. As an example, a machine may be programmed to use more electromagnetic radiation to heat the frozen contents if the dispenser was only recently powered on and the temperature of the cavity or water in the heater tank is low. Conversely, if the water tank with the diluting agent is already hot, then the dispenser may revert to less electromagnetic radiation to create a desired product faster.

Alternatively, the combinations of these functions may be used to create a more uniform consistency when dispensing. For example, the settings of the dispenser may be adjusted to create a steady melting rate of the frozen contents or just the external portion of the frozen content to initiate flow so that potency of the liquid product is consistent for a longer duration of the dispense.

In some embodiments, the variables of the melting component, or plurality thereof, and dilution components, or plurality thereof, are programmable and adjustable to create a wider range of characteristics for creating beverages and liquid food products. For example, decreasing the temperature of a pressurized liquid used for dilution will decrease the temperature of a consumable liquid product created by the machine-based system and apparatus.

In some embodiments, the perforation properties may be programmable or automatically established using sensor technology that assists in recognizing the receptacle type, size, contents, bottom location and other properties. This sensor technology may also be used to inhibit certain settings from being applied. For example, a frozen broth concentrate receptacle may inhibit a consumer from implementing settings that would over-dilute and waste the product. As another example, a frozen broth concentrate receptacle may inhibit a consumer from implementing settings that would overheat, for example, an orange juice concentrate.

Executing Recipes

Once the recipe has been established, the dispenser controller is responsible for executing the instruction set. This execution may be open-loop in that the instructions are carried out without feedback as to whether the desired outcome is being achieved. Or this execution may be closed-loop, relying on various sensors to determine whether key parameters are changing as expected and then modifying flows or additions of heat to keep the process within acceptable limits.

It is also contemplated as part of the techniques described herein that the machine-based system includes sensor technology that can automatically adjust the settings of the melting and/or dilution component to produce a desired beverage or liquid food outcome.

In addition to monitoring the temperature of the receptacle and/or the entire contents of the receptacle, in some embodiments the dispenser can monitor the pressure inside of the receptacle. For example, before applying heat to the receptacle, the dispenser can perforate the receptacle with a needle having a lumen in fluid communication with a pressure sensor. Then, during a heating step, the dispenser can modulate the rate at which heat is applied to the receptacle based on detecting pressure increases inside the receptacle. In an alternative example, the dispenser can dispose a transducer (e.g., a stress gauge or a displacement gauge) in contact with a portion of the exterior of the receptacle. The transducer, such as a capacitive displacement sensor, can detect pressure increases inside the receptacle based on portions of the receptacle slightly bulging during heating.

In some embodiments, the backpressure of the incoming liquid is measured with a pressure sensor to allow changes to the dispensing process for the diluting/melting liquid. For example, if a pressure higher than a threshold is detected, it may be the result of an insufficient flow path from the inlet, past the frozen contents, to the outlet. In such a case, the dispensing pump injecting liquid into the receptacle can be stopped temporarily to allow for some melting of the frozen contents to occur and, thereby create a larger/better flow path to the outlet before more liquid is added. This feature may prevent loss of liquid outside the receptacle or dispenser and lead to greater accuracy in the overall volume of the dispensed product.

In some embodiments, the dispenser controller manipulates the timing, sequence, amount, and manner of the heating of, the agitation of, and/or the addition of dilution liquid to the receptacle and/or frozen liquid contents to control the melting and/or thawing of the frozen liquid contents. Optionally, the dispenser manipulates the temperature of the dilution liquid added to the receptacle and/or final product. In some embodiments, the dispenser causes at least portions of the frozen liquid contents to transition from a frozen phase to a liquid phase while reducing or preventing the transition of the liquid and/or solid phases to a gaseous phase. For example, the dispenser can expose the receptacle and/or the frozen liquid contents to a non-diluting source of heat at a rate or a flux that causes the frozen liquid contents to melt but does not cause the resulting liquid to boil. Similarly, the dispenser can control the total amount of non-diluting heat supplied to the receptacle and/or frozen liquid contents during a multi-step food or beverage creation process to achieve an intermediate average temperature of the contents. When the dispenser then supplies a predetermined amount of diluting liquid at a known temperature to the interior of the receptacle, the diluting liquid and contents combine to form the product of the desired temperature and volume.

In some embodiments, the dispenser can contain sensors to determine the temperature of a heated and/or ambient dilution liquid. Based on these readings, the dispenser modulates the heat, agitation, and dilution actions described herein to achieve the desired heating profile as well as a final product having the desired characteristics. For example, while supplying heat and agitation to a receptacle, the dispenser can monitor the temperature of the receptacle and modulate the heat supplied to ensure that its temperature remains below a predetermined value (e.g., below boiling or below a temperature at which the content's quality would be degraded). In a further example, the dispenser can supply heat in an intermittent fashion, either with or without agitation, with pauses in heating to allow the entire contents of the receptacle to equilibrate, again either with or without agitation during the pauses. Doing so is expected to increase the accuracy of the temperature reading with respect to the entire receptacle contents and decrease the likelihood of generating "hot spots" in the receptacle. Likewise, the dispenser can control the frequency of the agitation (e.g., the speed at which vibration, reciprocation, etc. is modulated) depending on the characteristics of the receptacle, frozen liquid contents, and/or final intended food or beverage product.

In some embodiments, the dispenser reads the temperature of a dispensed liquid and continually adjusts the beverage creation settings throughout the dispensing process. In some embodiments, a non-diluting heat source and a diluting agent may work harmoniously in the beverage creation cavity to heat, melt and/or dilute the frozen content.

Detecting Completion of the Cycle

In some embodiments, the dispenser will visually enunciate when the dispensing process is completed. In some embodiments, the dispenser will emit an audible signal when the dispensing process is complete. In some embodiments, the dispenser will send a text message or other similar communication to the user when the dispensing process is complete.

In some embodiments, the tray may dispose a spent receptacle into a recycling container attached to the dispenser when the drawer is opened.

Cleaning

In some embodiments, the dispenser will supply hot water or steam through the injection needles and the secondary heating plumbing into the cavity volume to help clean the system and reduce the likelihood of carry-over of taste or aroma into a subsequent product. In some embodiments, this liquid and any steam condensate will flow to the drip tray where it evaporates, flows to drain, or is removed by the user.

Communicating with the User

In some embodiments communication with the dispenser and operation of any Apps will be via WiFi.

In some embodiments, the desired potency, volume, texture, temperature, or other beverage characteristic is programmed or selected from a range of options by the consumer. The dispenser may take this desired output in combination with temperature and compositional information about the frozen contents to carefully adjust settings to create the desired finished product.

Receptacle and Packaging

Central to this system is the use of a portion-controlled receptacle that can be used to hold the liquid frozen contents. As noted within the drawings, this receptacle can comprise a wide variety of shapes and sizes providing it interfaces properly with a suitable dispenser. Similarly, it can comprise a wide variety of materials providing they are rated as food safe and are capable of meeting specified requirements for use and storage temperatures and gas permeability. Other optional design criteria are detailed below.

In some embodiments, the receptacle for holding/storing the frozen liquid contents using the techniques described herein includes a cup-shaped portion having a continuous and closed bottom portion, a continuous sidewall extending from the bottom portion, and a sealable top opening defined by a continuous sidewall that tapers outwardly as it extends away from the bottom portion. The wall is uninterrupted by filters or other internal features that would interfere with certain puncture, frozen liquid content displacement and flow implementations.

In some embodiments, the receptacle includes a cavity for storing the frozen liquid content. The receptacle can be in any shape, styling, color, or composition, and may be styled to enhance the liquefaction environment in cooperation with the dispensing apparatus. The packaging may be flexible, have a definitive shape, or combination thereof. For aesthetic or functional reasons, for example, to complement pod detection or motion drive functions applied to the pod, the walls of the receptacle may be concave and/or convex to provide for different pod sizes while keeping certain interfacing dimensions constant. Likewise, the color and/or shape can be used to convey information to the dispenser.

In some embodiments, the apparatus for creating a food or beverage from frozen liquid contents advantageously includes a receptacle that is filterless, as distinguishable from the filtered receptacles currently available, as exemplified, for example, by U.S. Pat. No. 5,325,765, among other filtered beverage receptacles. A filterless receptacle, and, for example, (1) the (virtually) complete removal of the frozen liquid contents during melting and/or dilution and subsequent delivery and (2) the use of a homogeneous material of construction, renders the receptacle ideally suited for recycling.

In some embodiments, the receptacle is configured to be accommodated by a machine-based system and capable of receiving a liquid dispensed therefrom to further facilitate the melting and/or dilution of the frozen liquid contents into a consumable liquid product with a desired set of characteristics.

The frozen liquid contents may be packaged in a material that provides control of gas migration, e.g., the receptacle may be comprised of a material highly impermeable to the migration/passage of gas, especially oxygen, for creating a long-lasting storage package for preserving freshness and aroma of the packaged frozen liquid contents. For example, the receptacle may be comprised of an aluminum or steel substrate or other metal material and typically prepared with a coating approved by the FDA for contact with food, e.g., polypropylene, if needed. As another example (e.g., if recyclability is not a critical concern), the receptacle may be comprised of a multi-layer barrier film including, for example, a layer of EVOH plastic. In some embodiments, if the receptacle is fabricated from a metal, the receptacle will preferably be made from a highly thermally conductive material such as aluminum and thereby be supportive of faster heat transfer, especially if a heated dilution liquid is not the primary technique for melting the frozen liquid contents (i.e., if secondary non-diluting heat is planned).

In some embodiments, the packaging may include edible packaging materials that may be dissolved and consumed.

In some embodiments, the receptacle and its closure are comprised of a gas impermeable, recyclable material such that a spent receptacle, including the closure and other packaging features, can be recycled in its entirety In some embodiments, an inside coating is also formulated to promote ease of release of the frozen liquid content from the inner surface. Considerations for selection of the coating include that the coating must be food safe and not exhibit unacceptable levels of chemical leaching into the frozen liquid contents during storage or into the product during the melting and/or diluting process. Similarly, it must not absorb desirable flavor and aroma compounds or oils from the frozen contents, especially during filling and dispensing operations when the contents are in liquid form. Other factors include that the coating must have a favorable coefficient of static friction, porosity measure, and surface roughness measure to reduce the force required to release the frozen liquid contents from the receptacle relative to an uncoated surface. The coating must maintain the previously mentioned desirable characteristics under the temperature range to which the receptacle will be exposed (e.g., about −20° F. to about 212° F.)

In some embodiments, the coefficient of static friction of the coating for promoting the ease of release of the frozen liquid content ranges from 0.05 to 0.7. In other embodiments, the coefficient of static friction of the coating ranges from 0.3 to 0.4. In other embodiments, the coefficient of static friction of the coating ranges from 0.1 to 0.2. In other embodiments, the coefficient of static friction of the coating ranges from 0.05 to 0.1. In other embodiments, the coefficient of static friction of the coating ranges from 0.08 to 0.3. In other embodiments, the coefficient of static friction of the coating ranges from 0.07 to 0.4. In other embodiments, the coefficient of static friction of the coating ranges from 0.1 to 0.7.

In some embodiments, the coating includes one or more of polypropylene, ultra-high-molecular-weight polyethylene, polytetrafluoroethylene, fluorinated ethylene propylene, high-density polyethylene, low-density polyethylene and/or mixtures and/or co-polymers of these materials, e.g., polypropylene/polyethylene mixture.

In some embodiments, the materials of the receptacle may include coatings or layers that are heat sensitive and provide a visual indication that the receptacle is or is not cold enough (due to food safety or thermodynamics) to be used in the dispenser. Alternatively, a coating or layer on the surface of the receptacle, such as a special wax with the right melting temperature, may irreversibly indicate if a receptacle was exposed to temperatures that would spoil internal ingredients.

In some embodiments, the frozen liquid contents are dislodged from the bottom of the receptacle by the action of a needle. Tapered sidewalls of the receptacle help the frozen liquid contents release from the bottom portion of the receptacle. The tapered sidewalls also provide for a flow path around the frozen liquid contents after the contents have been displaced into what was formerly the empty space of the receptacle. Another factor impacting the amount of force required to dislodge the frozen liquid contents is the size of the frozen liquid content itself. Relatively smaller frozen liquid contents volumes will be in contact with relatively less interior surface area of the chamber, thereby reducing the amount of force required to dislodge the contents relative to larger frozen liquid contents.

In some embodiments, the receptacle may be large enough that it can contain the melted contents and all the added dilution liquid from the machine-based system and the finished product can be consumed immediately therefrom.

In some embodiments the bottom of the receptacle incorporates a dome structure (bistable or otherwise) which can be distended downward, away from the bottom of the receptacle during filling and freezing of the liquid contents and subsequently inverted upward to a its second stable position after freezing to hold the frozen liquid contents away from the bottom of the receptacle to facilitate needle penetration and/or flow of diluting liquids around the exterior surface of the frozen liquid contents en route to the exit perforation. In some embodiments, the dome is inverted at the factory prior to shipment of the product to consumers. In some embodiments, the consumer inverts the dome immediately prior to use or the machine inverts the dome as a part of insertion and needle penetration. These embodiments are merely examples and not cited to limit the functions or features of the receptacle that may facilitate dislodging frozen liquid contents or beverage creation. Moreover, in the example above, the frozen liquid content is displaced upward into a headspace by the perforating needle or dome. However, in other embodiments, wherein the receptacle is oriented differently in the dispenser, e.g., upside down or horizontally, the frozen liquid content can be displaced in a different direction (e.g., downward or sideways) into an unfilled region of the receptacle and remain within the scope of the invention.

The receptacle may alternatively include a physical structure acting as a key to define a property of the frozen contents within. In some embodiments, this geometry of the receptacle is detected by the dispenser and, based on this special geometry, various settings for beverage creation are adjusted to correspond with factory or user-generated parameters for that beverage.

In some embodiments, the receptacle is a pouch that expands when the diluting liquid is injected.

In some embodiments, the receptacle includes a closure for sealing the receptacle to assist in maintaining a MAP gas environment. In this case, a hermetic seal formed between a lid and the receptacle may be accomplished using a variety of methods, including, but not limited to a patch, glue, cork, heat seal, crimp, and/or the like. In some embodiments, the closure may be designed to be manually removable, e.g., with a pull tab on a lid as previously noted, so that the frozen liquid content can be used in other ways if a machine-based system for preparing a consumable beverage is not available. In some embodiments, the apparatus may require a manual perforation instead of a machine implemented perforation before loading the receptacle into the machine-based dispensing system.

In some embodiments, the frozen liquid content is packaged with headspace, with no headspace or limited headspace. As mentioned elsewhere, headspace refers to any excess atmosphere within a sealed receptacle, which, optionally, is located between a top portion of the frozen liquid contents and the lid or closure portion of the receptacle. Furthermore, any headspace in the packaging receptacle may be advantageously filled using a MAP gas, such as argon, carbon dioxide, nitrogen, or another gaseous compound which is known to be less chemically active than air or oxygen.

In some embodiments, the top or outermost layer or envelope of the frozen liquid contents may be layered with a frozen, de-aerated coating of water which may act as a preservative barrier.

In some embodiments, the frozen liquid contents are vacuum sealed in a flexible receptacle.

In some embodiments, the frozen liquid contents are packaged in a receptacle in a manner that minimizes the surface area contact of contents with the atmosphere, especially oxygen gas, but also any gas that carries off aroma.

In some embodiments, the frozen liquid contents may be packaged and structured in a receptacle of a specific size and shape that allows the receptacles to be accommodated by current machine-based dilution systems or systems on the market that are designed for extracting solutes or brewing coffee for the facilitation of creating a beverage of a desired flavor, potency, volume, temperature and texture.

In some embodiments, the packaging of the frozen liquid contents includes additional barriers or secondary packaging that protects the frozen concentrates from melting or exposure to ultraviolet light during distribution. For example, packaging frozen liquid contents in a receptacle that is further packaged within a cardboard box adds a layer of insulation and would thereby slow temperature loss or melting of the frozen liquid contents, e.g., when such temperature loss or melting is undesirable. Another example would be the inclusion of freezable gel packs in the secondary packaging to further extend the frozen state of the contents, especially during transport from the point-of-purchase to the user's home or office freezer.

In some embodiments, the receptacles with frozen liquid contents are provided in a controlled portion arrangement, wherein the controlled portion arrangement can comprise a single-serving sized format, or a batch-serving sized format for producing multiple servings.

In some embodiments, the machine-based system may accommodate the receptacle, or a plurality thereof, in any method, shape, or form to facilitate the melting and dilution of the frozen liquid contents. In some embodiments, a machine-based system may accommodate multiple receptacle types and sizes for a larger array of product possibilities.

In some embodiments, the liquid comprising the frozen liquid content may be frozen after it has been measured and delivered into the receptacle. In some embodiments, the fluid used to create the frozen liquid content may be frozen prior to delivery to the receptacle, e.g., pre-frozen in a mold, extruded, frozen, and cut to size, or by other techniques and/or processes and then deposited/packaged into the receptacle as a frozen solid of some desirable shape. This may be done in cooperation with the dimensions of a receptacle with a tapered portion such that the frozen liquid content does not interfere with areas of the receptacle designated for needle puncture. For example, the frozen liquid content can be shaped to be displaced away from a puncture area because its diameter is larger than that of a top, bottom, or other first or second end of a receptacle, as shown in FIG. 1A. Stated another way, the frozen liquid contents may be created in a first phase or separate step, and then received, inserted, and sealed in a receptacle that can be accommodated by a machine-based dispensing system.

In some embodiments, the packaging may be distributed above freezing temperatures if the quality of the content can be maintained by some other FDA food safe method, e.g., a syrup used to make carbonated beverages. In some embodiments, the frozen liquid contents may be frozen and never melted prior to use, melted once or numerous times during distribution. Distributing and maintaining the receptacles at a temperature below the freezing point of the frozen liquid contents may increase aspects of quality preservation and nutrient-rich food safety, but is not required for all embodiments. In some embodiments, the liquid used to make the frozen contents is flash-frozen and kept frozen in its receptacle until it is ready to be melted and/or diluted immediately prior to being prepared for consumption.

In some embodiments, the frozen liquid content can also be packaged as a plurality of frozen liquid contents, configured in a layered and/or blended format. In some embodiments, the frozen liquid contents can be configured in any shape or multiple geometric shapes so long as the contents will fit within the cavity volume of the receptacle while maintaining an unfilled region and are capable of being repositioned for certain puncture implementations by an accommodating system.

In some embodiments, the frozen liquid contents may be crushed or macerated to increase the surface area of the frozen liquid contents to increase melting rates.

Similarly, the frozen liquid content can be of a shape and size to facilitate fracture by a needle penetrating the bottom or top of the receptacle.

In certain embodiments, sufficient open space remains within the mixing chamber of the receptacle to allow the frozen liquid contents to be displaced into the open space of the chamber to not interfere with liquid inlets and outlets (e.g., needles) and/or incoming and outgoing liquid. In some embodiments, the frozen liquid contents in the receptacle occupy less than half of the total volume of the mixing chamber of the receptacle. In other embodiments, the frozen liquid contents occupy more than half of the total volume of the mixing chamber.

In summary, embodiments of the invention provide a filterless single chamber mixing vessel containing a frozen liquid contents that enables the creation of a diverse variety of food and beverage products. The receptacles are maintained as a sealed environment, optionally including an oxygen barrier, that preserves the final product, or a concentrated version thereof, in a frozen state until a user decides to create the product. Moreover, even after perforation by one or more inlet or outlet needles, the receptacle remains essentially a sealed mixing chamber in which a product is created by mixing a fluid or fluids with the frozen liquid contents while also providing for a controlled fluid outlet. Upon insertion into any of the dispenser embodiments described herein or other known single serving beverage makers/brewing systems, the receptacle functions as a filterless single chamber mixing vessel by accepting a melting and/or diluting liquid (e.g., water) that melts and combines with the frozen liquid contents to produce the desired product. Such use of embodiments of the receptacles described herein enables existing beverage makers/brewing systems to function as a dispenser without requiring a modification to the system, thereby allowing a user flexibility to use his or her existing system as a dispenser or brewer.

The Extract or Concentrate

The final beverage quality delivered to the consumer is most fundamentally dependent on the nature and quality of the material used to create the frozen liquid contents. Regardless of whether this material is a pure extract or a concentrate, its essence—the flavor, aroma, appearance, and texture—needs to be captured at peak quality and maintained at that level until used. Key attributes of this extract or concentrate are captured in the embodiments below.

In some embodiments, the frozen liquid content can be one of a coffee or tea extract, lemonade, a fruit juice, a soup or broth, a liquid dairy, an alcohol, a syrup, a viscous liquid, a pre- or pro-biotic, a cocktail mixer, a baby formula, a nutraceutical, or any liquid food product that is frozen. Frozen liquid content can be matter created with or without nutritive value, may be flavored naturally or artificially, and be packaged with or without a preservative, and/or the like. The frozen liquid contents may compose carbohydrates, proteins, dietary minerals, and other nutrients that support energy or metabolism. The frozen liquid contents may include or be enhanced with additives such as vitamins, calcium, potassium, sodium, and/or iron, among others. The frozen liquid contents may include preservatives such as antimicrobial additives, antioxidants and synthetic and/or non-synthetic compounds. Examples of preservative additives may include lactic acid, nitrates and nitrides, benzoic acid, sodium benzoate, hydroxybenzoate, propionic acid, sodium propionate, sulfur dioxide and sulfites, sorbic acid and sodium sorbate, ascorbic acid sodium, tocopherols, ascorbate, butylated hydroxytoluene, butylated hydroxyanisole, gallic acid and sodium gallate, an oxygen scavenger, disodium EDTA, citric acid (and citrates), tartaric acid, and lecithin, ascorbic acids, phenolase, rosemary extract, hops, salt, sugar, vinegar, alcohol, diatomaceous earth and sodium benzoate, among others. It will be understood that this listing of additives is intended to be within the scope of the techniques described herein, and the specifically referenced additives are exemplary only, and can also include derivatives thereof as well as other chemical compounds.

The frozen liquid contents or matter may or may not have suspended solids, and may include non-dissolvable solids. In some embodiments, the concentrate, extract, or other consumable fluid from which the frozen liquid contents are made may include additives that completely dissolve in a solvent before freezing. In some embodiments, the frozen liquid contents may also include a mass of a composition that is not dissolved within the frozen liquid contents during the packaging process, but is dissolved by the machine-based system during the creation of a beverage or food product with desired characteristics.

In some embodiments, the liquid beverage used to create the frozen contents is received as a slurry or liquid, to be frozen, and sealed in the receptacle in turn, or in unison. In some embodiments, the frozen liquid contents are of a potency, shape, and size, and are structured within a receptacle such that a machine-based system can easily melt and/or dilute the liquid frozen liquid contents, converting the contents to a consumable liquid of a desired flavor, potency, volume, temperature, and texture.

Coffee liquids are typically measured in terms of their total dissolved solids (and less commonly by their sugar levels using a BRIX scale) using various standard methods such as those developed by the Specialty Coffee Association of America (SCCA). Similarly, there are other beverages (juices, coconut waters, and more) that can be measured as concentrates based on at least one variable. For example, cream or condensed milk is typically measured as a function of its fat content. Like coffee, these liquids with high fat percentages may be frozen within a receptacle to be melted and diluted into dairy-based beverages such as shakes and lattes with lower fat percentages. For example, one oz. of cream or condensed milk having a milk fat content of 26% and frozen within a receptacle can be diluted with 7 oz. of liquid by a dispenser to create an 8-oz. dairy based beverage with 3.25% milk fat, the equivalent of whole milk. In another example, a one-oz. portion frozen in a receptacle may have a milk fat level of 8% or 16% and be diluted with 7 oz. of liquid to create an 8-oz. beverage with milk fat contents similar to 1% and 2% milk, respectively. In a further embodiment, two ingredients or additives may be combined in various ratios as a concentrate for other beverages. For example, frozen content comprising a high milk fat dairy product, a concentrated sweetener and coffee extract with a high TDS may be melted and diluted into a latte with the favorable ratios of each ingredient that yield a very pleasing beverage.

In some embodiments, the depth or volume of the frozen liquid contents is controlled. For example, by maintaining the frozen liquid content's volume/depth within a selected range or below a threshold, embodiments of the invention ensure that the frozen liquid contents are completely melted before the full volume of dilution liquid has passed through the receptacle. In such embodiments, a portion of the fluid passes through the receptacle after the time when the frozen liquid contents have fully melted. This additional fluid washes the interior of the receptacle and product outlet flow path clean of residue. Doing so both enhances the recyclability of the receptacle and reduces contamination of the product outlet flow path. In addition, by keeping the size of the frozen liquid contents within a volume range or below a certain threshold depth, one can more easily ensure that the final product achieves the proper temperature range for the particular product.

In some embodiments, controlling the level of total dissolved solids of the frozen liquid contents (e.g., as measured by TDS and/or Brix) makes it easier to ensure proper final product strength in view of the volume of the frozen liquid content and the amount of dilution liquid planned for use. Relatively larger volumes of frozen liquid contents require a lower level of total dissolved solids than relatively smaller volumes of frozen liquid contents for the same final product using the same dilution and melting liquid. The desired final product strength, as measured by TDS, also determines the needed TDS of the frozen liquid contents, e.g., a 2-oz. espresso with a final desired TDS of 6% will require a relatively higher TDS for the frozen liquid contents than would an 8-oz. cup of coffee with a final TDS of 1.25%.

In some embodiments, an additional benefit of making the frozen liquid contents with a relatively higher TDS and a proportionally lesser depth of required fill in the receptacle is that it will permit an outlet needle from a dispenser or known brewer to pass through the frozen liquid contents or displace the frozen liquid contents more easily, thereby enabling the needle to access the open space above the frozen liquid contents without interference from the contents.

In some embodiments, the receptacles disclosed herein have a size and shape intended to fit in known single-serve brewing systems that have known outlet needle penetration depths and locations. Because these locations and dimensions are known, receptacles of these embodiments have frozen liquid contents produced with a TDS level that enables the contents to be in contact with substantially the entire end layer of the receptacle while having a contents height that is less than the penetration depth of the needle. In this way, embodiments of the invention are customized for known single serving brewing systems based on the known dimensions and characteristics of those systems.

In some embodiments, the variables defining the frozen liquid contents, like temperature, volume, shape, size, proportions, etc. can also be adjusted during manufacturing of the liquids used to make the frozen liquid contents to better facilitate making a desired food or beverage from a machine-based system with limited machine settings/controls. When making a hot beverage for example, as previously noted, this may mean packaging a relatively smaller volume of higher TDS liquid into the receptacle to make it easier to achieve higher temperatures for smaller volume beverages such as espressos. Alternatively, freezing a relatively larger volume of a lower TDS fluid as the basis for the frozen liquid contents in a receptacle may be a better choice when preparing a receptacle intended to produce a cold beverage such as a juice as the greater volume of frozen material provides more "negative thermal energy" to cool the diluting fluid without use of external refrigeration, ceteris paribus.

In some embodiments, concentration specifics of frozen contents for the creation of desired coffee products are detail in International Patent Application No. PCT/US2016/023226, incorporated by reference herein. This application defines the concentration limitations of coffee extracts and how they may be used to create desired beverages from existing dispensers designed for dissolving solutes or extraction as opposed to melting and then diluting a liquid.

Tea, like coffee, is a product which may be extracted to yield a higher level of total dissolved solids than is desirable in a final beverage. This high concentration extract may be frozen within a receptacle to be subsequently melted and diluted to produce a finished beverage that has a favorable strength for most consumers. Extracts from traditional tea extraction systems are generally produced within the range of 2.5° to 6.2° Brix (roughly 2% to 5% total dissolved solids) and diluted down to a drinkable Brix of less than 1°. However, this can vary with tea variety and technique of extraction. Tea extract can also be concentrated to a lesser or greater degree. For example, a Centritherm Evaporator can concentrate such extracts up to 57.8° Brix (roughly 50% total dissolved solids) on a continuous basis with reports of minimal damage to the product quality. In a preferred embodiment, this tea extract may be placed in a receptacle at a concentration level and portion size such that it may subsequently achieve a desired potency and temperature when reacting with a diluting agent of a set volume and temperature. With the proper dispenser, the extract may be melted and diluted to create either a hot or cold tea beverage.

In another embodiment of this overall process, a product like coconut water can also be concentrated, using techniques such as evaporation or freeze concentration, to create a concentrate stronger than its natural level (as extracted from the coconut shell). Unprocessed coconut water, as extracted from the shell, has a Brix level between 3° and 5°. This coconut water can be concentrated to higher Brix levels, frozen in a receptacle as a concentrate, and later melted and diluted to a preferable potency. For example, a 1-oz. coconut water concentrate might have a Brix level of 40° and be packaged frozen within a receptacle to be melted and diluted with 7 oz. of water to create a coconut water beverage with a brix of 5°. Alternatively, a 1-oz. coconut water concentrate can have a brix level of 24° and be packaged frozen within a receptacle to be later melted and diluted with 7 oz. of water to create a coconut water with a brix of 3°. In a further example, a 1-oz. coconut water concentrate can have a Brix level of 60° or more and be frozen within a receptacle to be later melted and diluted with 19 oz. or less of a liquid to create a coconut water beverage with a Brix of at least 3°. In some embodiments, the size of the frozen contents, the amount of secondary heat added to warm or melt the contents, and the heat of a diluting liquid may be adjusted to create a coconut water beverage of a preferable cold temperature.

Like coconut water, fruit juices have a pure or naturally occurring Brix level before they are concentrated. The FDA has established standards for what constitutes a "100% natural juice" rating for a variety of fruits and products as shown in Table 1 below. Actual juice measurements for any lot may range from 80-120% of the listed Brix levels and still be classified as 100% natural juices. As alternative feed stocks for different receptacles, all of these pure juices may be concentrated using a variety of techniques well known in the art. These concentrated juices with Brix levels higher than their naturally occurring state may be frozen within a receptacle and later melted and diluted to a preferable strength and temperature.

TABLE 1

FDA minimum Brix levels for single-strength (100%) juice

| Juice | Brix |
| --- | --- |
| Acerola | 6.0 |
| Apple | 11.5 |
| Apricot | 11.7 |
| Banana | 22.0 |
| Blackberry | 10.0 |
| Blueberry | 10.0 |
| Boysenberry | 10.0 |
| Cantaloupe Melon | 9.6 |
| Carambola | 7.8 |
| Carrot | 8.0 |
| Casaba Melon | 7.5 |
| Cashew | 12.0 |
| Celery | 3.1 |
| Cherry, dark, sweet | 20.0 |
| Cherry, red, sour | 14.0 |
| Crabapple | 15.4 |
| Cranberry | 7.5 |
| Currant (Black) | 11.0 |
| Currant (Red) | 10.5 |
| Date | 18.5 |
| Dewberry | 10.0 |
| Elderberry | 11.0 |
| Fig | 18.2 |
| Gooseberry | 8.3 |
| Grape | 16.0 |
| Grapefruit | 10.0 |
| Guanabana (soursop) | 16.0 |
| Guava | 7.7 |
| Honeydew melon | 9.6 |
| Kiwi | 15.4 |
| Lemon | 4.5% |
| Lime | 4.5% |
| Loganberry | 10.5 |
| Mango | 13.0 |
| Nectarine | 11.8 |
| Orange | 11.8 |
| Papaya | 11.5 |
| Passion Fruit | 14.0 |
| Peach | 10.5 |
| Pear | 12.0 |
| Pineapple | 12.8 |
| Plum | 14.3 |
| Pomegranate | 16.0 |
| Prune | 18.5 |
| Quince | 13.3 |
| Raspberry (Black) | 11.1 |
| Raspberry (Red) | 9.2 |
| Rhubarb | 5.7 |
| Strawberry | 8.0 |
| Tangerine | 11.8 |
| Tomato | 5.0 |
| Watermelon | 7.8 |
| Youngberry | 10.0 |

Note, for clarification, in Table 1, the values for lemon and lime juice are indicated as anhydrous citric acid in percent by weight. In addition, Brix values determined by refractometer for citrus juices may be corrected for citric acid (e.g., for grapefruit, orange, and tangerine).

In addition to the above, concentrated variations of whey and nutraceutical products may be concentrated. For example, many protein, pre- and pro-biotic drinks are not milk based, but whey based. The whey may be concentrated as an ingredient of the frozen contents and diluted to a preferable consistency.

Melting and Diluting

The primary function of the dispenser described by this invention is to melt and dilute a liquid frozen concentrate to a beverage having desirable temperature and volume in a timely manner. This section describes several specific embodiments of the dispenser directly related to this function.

The melting system may use any source of heat, motion, or a combination thereof to expedite the liquefaction of the frozen liquid contents. This applies to heating frozen contents indirectly via the outside of the receptacle using a secondary, non-diluting heater and to methods for heating the frozen contents directly, including contact with diluting fluids. Therefore, the melting system may include various sources of heat and/or motion. Electromagnetic radiation (e.g., radio frequency energy, microwave energy, ohmic/resistive, etc.), a heated coil, hot air, hot water, a thermoelectric plate, a heated liquid bath, electric or water jackets, steam, a chemical reaction and the like are all examples of possible sources of heat that may expedite the rate of melting. One skilled in the art, however, will recognize that various other physical action principles and mechanisms therefore can be used to expedite liquefaction.

In some embodiments, the consumer may desire a beverage with no dilution of the frozen liquid contents. e.g., the frozen liquid contents are already at the correct flavor, volume and potency. For example, the frozen liquid contents may already be at a desired TDS level for consumption, e.g., an espresso, or hot fudge sauce and need to only be melted and dispensed at the desired temperature and texture. For example, the machine-based system may melt the frozen liquid contents by putting a thermally conductive receptacle against a coil heater or by irradiating it with infrared light or by impinging a heated gas or steam against the outside of the receptacle and then puncturing the receptacle after the contents reach a desired temperature. Furthermore, the frozen liquid contents may be conveniently dispensed from the machine-based system into a subsequent container. In some examples, the lid is removed prior to or after melting and heating for direct consumption from the receptacle.

In some embodiments for creating desired products that require dilution, a diluting agent is heated and/or allowed to flow to create a consumable liquid product of a desired flavor, potency, volume, temperature, and texture in a just-in-time manner from the frozen liquid contents. In some embodiments, the diluting component may also act as the melting component. In some embodiments, a diluting agent is heated and/or allowed to flow such that it complements an arbitrary melting component (e.g., an electric heater) to create a consumable liquid product with desired characteristics in a timely manner.

In some embodiments, water is heated to steam inside the dispenser and used to externally heat the receptacle or the exit path for the melted/diluted fluid. In some embodiments, this external heat may be used at different levels (quantities) or locations based on different possible objectives. For example, these objectives could include, but are not limited to: (a) melting just the outer layer of the frozen liquid contents to allow it to be more easily displaced away from the closed end of the receptacle; (b) partially melting the bulk of the frozen liquid contents as a supplement to lower temperature water being used for melting/dilution, especially for juices and other beverages where a lower temperature final product is desired; (c) fully melting the frozen liquid contents as a way of dispensing an undiluted melted liquid from the receptacle; (d) partially or fully melting the bulk of the liquid frozen contents when only a small amount of diluting liquid is to be added and a hot beverage temperature is desired, as for an espresso; (e) secondarily warming the melted/diluted beverage once it leaves the receptacle as it flows through the exit channel to a drinking cup or mug or other container to heat the final beverage to a more desirable temperature; (f) heating one of the needles used to perforate the receptacle to facilitate some level of easy penetration into the frozen liquid contents. In some embodiments, steam used for these purposes may be replaced by hot air or some other heated gas produced either inside the dispenser body or externally using electricity or some combustible fuel such as natural gas. The use of steam or a hot gas may provide a greater level of control in the heating/melting of the frozen liquid contents which may be especially important when cold beverages or food products are desired as the final consumable. This process also assumes a process for carefully metering/controlling the amount of steam or hot gas added to the total energy balance.

In some embodiments, a receptacle loaded into a dispenser is heated before puncturing the receptacle bottom. This allows the frozen liquid content to remain in contact with the bottom and sidewalls of the receptacle to increase the transfer of heat into the frozen liquid content. In such an implementation, the bottom of the receptacle is punctured after a selected time has passed, or after the receptacle has reached a selected temperature. The additional delay in perforating the closed end/bottom of the receptacle is intended to allow some amount of melting/diluting fluid to enter the receptacle and fully surround the frozen contents, filling any air gap between the sidewall and the displaced frozen content before an exit perforation is created. Doing so enables a continuation of the efficient transfer of heat from the receiver into the liquid and the frozen content without the insulating effects of an air gap The finished food or beverage serving can be made from the frozen liquid content of the receptacle at the temperature desired by the consumer, and via a method that is appropriate for direct consumption by the consumer. In one embodiment, the frozen liquid content is melted and diluted with a cool, a chilled, an ambient temperature liquid, or a slightly warmed liquid such that the frozen liquid content is melted and minimally heated for a beverage that is normally consumed cold, like a juice, iced coffee, soda, etc. In this way, and by taking advantage of the negative thermal energy (enthalpy of fusion) properties of the frozen liquid contents, it is possible to deliver a beverage to the consumer which is colder than the liquid supplied to the interior of the receptacle.

In some embodiments, the frozen liquid contents are melted and diluted simultaneously. For example, in some embodiments, a liquid may be introduced into the receptacle containing frozen liquid contents to melt and/or dilute the frozen liquid contents simultaneously or in unison.

In some embodiments, the addition of supplemental heat is controlled to limit the speed or localization of the liquefaction and vaporization of the frozen contents. In some embodiments, a non-diluting heat source may heat the receptacle to melt the frozen contents therein, or the dispenser may heat an ambient temperature liquid as a diluting liquid as it travels through the receptacle and beverage creation cavity.

In some embodiments, a secondary, non-diluting heat source may be applied to the receptacle while the receptacle is being agitated. In further embodiments, a diluting liquid may be dispensed through the receptacle while it is being agitated and heated by a non-diluting heat source. The combination of agitating while melting provides a technique for a more even distribution of heat. Agitating the receptacle will allow heat to disperse throughout the receptacle instead of allowing certain areas to overheat.

In some embodiments, the diluting liquid does not travel through the receptacle, but rather bypasses an injection through the receptacle and is dispensed in a location proximate to the dispensed location of the melted frozen content.

In some embodiments, the cavity in which the receptacle is held has a mixing area that receives the melted liquid product from the receptacle and combines it with dilution liquid. In some embodiments, a perforator injects a pressurized air stream to rinse the receptacle clean and increase the pressure at which the melted frozen content mixes in a beverage container with the diluting agent. This may include an air compression system within the dispenser. The dispensing of the diluting liquid and melted frozen content may happen in unison, or one dispense may happen before the other. In another embodiment, the dispense of the liquids could alternate multiple times. In some embodiments, an amount of the diluting liquid is dispensed through the receptacle and an amount is dispensed directly into a beverage container.

In some embodiments, water is only heated to one temperature in the dispenser, but the dispenser also includes a fluid path that bypasses the heating element before being injected into a receptacle such that the water added to the receptacle is near ambient temperature. Bypassing the water heater could be done in at least two ways: (a) a 3-way valve after the piston pump could divert ambient water from a reservoir either through a hot water heating tank en route to the dispense head or directly into the dispense head; or (b) a simple tee at the base of the water reservoir may feed two separate piston pumps in which one piston pump feeds water through the water heater en route to the dispense head and the other piston pump feeds water directly to the dispense head. In some embodiments, the plumbing system may include a dispense channel or bypass system to mechanically refrigerate diluting agents. Any of the described techniques enables the dispenser to control the temperature of the dilution liquid supplied to the receptacle.

In some embodiments, the secondary non-diluting heat source is hot water or steam which is used once and discarded. In some embodiments, this discarded water or steam condensate is collected in a collection reservoir which may be one or more of: a drip tray or pan; a secondary tank dedicated to the purpose; a drain to the users sink. In some embodiments, the discarded water or steam condensate flows to a collection reservoir under the force of gravity. In some embodiments, the discarded water or steam condensate is directed to a pump and pumped under pressure to a collection reservoir.

While heat from some source is very important, agitation of the frozen liquid contents is also an efficient technique for increasing its rate of melting or liquefaction. From a fluid dynamics perspective, one effect of agitation is breaking up boundary layers between solids and the heating liquid. Another effect is increasing the relative velocity between the two. A third is the increased incidence of physical contact between solids, or even the small amount of kinetic energy converted to heat. Agitation also increase the residence time of the dilution liquid in the receptacle and likewise increases the length of the flow path of liquid through the receptacle from the liquid inlet to the liquid/product outlet. Advantageously, this causes the liquid injected into the receptacle continues to flow within the receptacle during agitation, and does so for a longer time relative to a lack of agitation. The observed results for this combination of effects are clear. Melting of the frozen contents occurs much faster with agitation than without and dispensed beverages are usually cooler.

In some embodiments, motion is introduced using a centrifuge. In some embodiments, agitation may be one or more of rotational, rocking, whirling, rotary or linear reciprocation, including agitation both back and forth and/or up and down (e.g., shaking), or a vibration platform or the like as a technique of expediting the melting rate. In such examples, the perforation needles may be given a similar range of motion so that they may implement or complement a range of motion. For example, in a centrifuge system the needles may spin with the receptacle.

While vibratory-level oscillation is more effective than no agitation, the efficiency of liquefaction increases with the amplitude and energy level of the interaction between solid (frozen or partially frozen) components and the melting/diluting liquid. In some embodiments, this larger amplitude agitation is induced by mechanical or fluidic forces. Mechanical forces include imparting relatively larger angle rotations of the cavity and/or the receptacle, typically motor driven, either through a direct axial connection or through a belt, gear or friction drive arrangement. Asymmetric oscillation, wherein the clockwise and counterclockwise amplitudes of rotation about a neutral point are unequal over short periods of time has proven especially efficient as it prevents the creation of regular patterns, standing waves, etc. with a resulting increase in the local chaotic nature of the fluid. Multi-rotation motion, i.e., spinning complete revolutions for several seconds in one direction and then the other is also useful. This motion creates less chaotic movement of the fluid, but may introduce opportunities for preferentially directing the centrifugally driven fluids out of the receptacle. It must be weighed against the increased complexity of plumbing needed to allow full rotations as compared to angular reciprocation involving less than one revolution.

In some embodiments, the driving motors for mechanical agitation are DC driven motors that are driven by the magnitude and polarity of the DC voltage fed to them by the controller, sometimes through a special motor power supply optimized for the motor. In some embodiments, the driving motors are stepper or servo motors that can be more precisely programmed to execute specific patterns of motion and can be used, if keying features are incorporated into a receptacle and cavity, to return the keyed feature to a specific location for loading, unloading, scanning, and the like.

In some embodiments, melting/diluting fluids are injected into the receptacle tangentially once a small liquid bearing interface has been melted between receptacle inner surface and frozen contents. This liquid is injected to cause the frozen contents to spin inside the receptacle for faster liquefaction of the frozen contents. In some embodiments, the volume of the melting/diluting fluid that can be added to the receptacle is limited and insufficient to keep the frozen contents spinning long enough to achieve the desired level of melting. In some embodiments, an alternative technique to cause the frozen contents to spin is the injection of compressed air or other gas through the needle such that this gas impinges upon the frozen contents near its outer circumferential edge in a tangential direction. In some embodiments, this gas is developed/compressed and stored in an appropriate vessel inside or proximate to the dispenser prior to when it is needed using mechanical or chemical techniques and/or processes as are well known in the art, e.g., mechanical pumps or chemical reactions known to produce a gas.

In some embodiments, a mechanical or chemical system or method of producing a gas continuously at the required pressure is used to supply the injection needle. For example, a larger pump could be used. In some embodiments, the flow of this gas to the injection needle is timed and controlled by the dispenser system controller and coordinated with the flow of melting/diluting liquid through the same or a separate needle, before or after the injection of gas, or interspersed with the gas. For example, a small amount of liquid could be injected, followed by a burst or prolonged stream of gas, followed by more liquid, and so on, until the planned cycle is complete.

Fluid-based techniques of inducing agitation take advantage of the low friction coefficient that exists between frozen contents within the receptacle and the receptacle walls once a thin film of liquid has been melted between the two surfaces creating a liquid bearing interface. Under this circumstance, it is possible to use steady or pulsed flows from the injection needle, directed tangentially near the sidewall of the receptacle, to cause the frozen contents to begin to spin. Fluid induced agitation is particularly attractive in its reduction of mechanical complexity and cost within the dispenser. These benefits must be weighed against the loss of process control flexibility and limits imposed by the amount of melting/diluting fluids that may be available for some types of beverage or food receptacles.

In some embodiments, a long needle passes fully through the receptacle and the frozen contents and remains in place as a drip guide for the contents or the dilution fluids exiting the receptacle to the user's cup or dispenseware. In some embodiments, this needle is shaped like a bayonet and is electrically heated to facilitate its passage through the frozen contents. Once the needle is in place, extending through the lid and closed end of the receptacle, a second needle is introduced into the receptacle and begins to inject a fluid tangential to the diametric curvature of the sidewalls of the receptacle to induce the frozen contents to spin within the stationary receptacle utilizing the thawed contents as a lubricant to spinning. In some embodiments, the stationary receptacle is externally heated before and/or during the puncturing with the bayonet and introduction of fluids as a way of increasing the entropy of the system and facilitating liquefaction. The content, as it melts, flows past the bayonet and drips off its lowermost tip. In some embodiments, the last of the frozen contents melts before all the diluting liquid has been injected, allowing a clean cup to be removed from the dispenser once the needle/bayonet is withdrawn.

In some embodiments, the receiver and receptacle together are agitated to aid speed of thawing. In some embodiments, the receiver and receptacle are stationary and the frozen content is agitated. In some embodiments neither the receptacle nor the frozen contents are agitated.

Liquid Reservoirs

The liquid reservoir plays a passive, but important role in the overall operations of the dispenser. Several characteristics important to the reservoir of a system optimized for melting and diluting a frozen liquid concentrate are described below.

In some embodiments, the system includes a single reservoir of dilution liquid. In some embodiments, the system includes a plurality of reservoirs. In some embodiments, the plurality of reservoirs is connected such that they equilibrate to the same fluid level. In some embodiments, the machine-based system may connect to a piping system that distributes a diluting agent from a larger liquid reserve or from an appropriate plumbing system (a very large reservoir), e.g., a filtered water system tied into a building's water supply. In some embodiments, the water in the reservoir is replenished automatically via a plumbed line to the user's home or office water supply.

The diluting liquid in the reservoir may be water, however, any liquid, including carbonated liquids, dairy liquids, or combinations thereof, including any nutritive or nonnutritive liquids suitable for human consumption, may be used to dilute the frozen liquid contents to a desired composition.

In some embodiments, the liquid for dilution may be carbonated to create soft drinks and the machine-based system may include a carbonating component.

In some embodiments, a diluting liquid may be increased to a certain temperature or pressurized to melt the frozen liquid contents with room temperature or chilled fluids to make chilled or iced beverages.

In some embodiments, the dispenser has at least two reservoirs: one for ambient water and one for water that has been heated. In some embodiments, the dispenser has fluid paths to supply hot water separately from ambient water to the receptacle and/or final food or beverage container. In some embodiments, the dispenser includes an injection path to supply carbon dioxide to the ambient water reservoir to carbonate the water. In some embodiments, the dispenser has a separate vessel that receives water from the ambient water reservoir or another water supply, and the carbonation system carbonates the water in the separate vessel. In some embodiments, water can be carbonated in-line along a flow path. Thus, implementations of the invention include the ability to carbonate liquid that is supplied directly to the final food or beverage container.

Perforators

The technique for perforating a receptacle to either add diluting fluid or create an exit path for the melted fluid to drain into a cup or bowl (dispenseware) is also an important function that must be performed by the dispensing system in most circumstances. This section more fully describes various embodiments of the perforators used and the nature of the holes they create.

The perforation may be made before, after, or during the time when the frozen liquid contents are melted and/or diluted. In some embodiments, the frozen liquid contents are melted and exit the receptacle before being diluted by a dispensed diluting agent for an ideal beverage. In some examples of the present techniques the frozen liquid contents may be diluted using a dispensed liquid before the contents are distributed into a subsequent or secondary receptacle.

In some embodiments, a perforator may be a needle, guillotine, blade, crusher or the like. It may be retractable utilizing any known mechanical techniques and/or processes, e.g., a pivot to rotate the perforator away from the receptacle to avoid piercing the receptacle, a telescoping mechanism to slide the perforator away from obstructing an inserted receptacle, a screw mechanism driven by a stepper motor or the like to raise or lower the perforator as needed, a spring driven device, a flexible tube that is "dispensed" from a roll or coil and retracted back to this location after use, or other alternative.

In some embodiments, the receptacle may be perforated either by the consumer or by the machine-based system. For example, the consumer may remove a patch to expose a perforation built into the receptacle before it is received by the machine-based system. Alternatively, the machine-based system may perforate the sealed receptacle using a variety of methods, including a puncture needle or pressure to rupture the receptacle.

In some embodiments, multiple perforations may be provided in the receptacle at multiple locations. In general, since there is no need for filtration of the melted frozen liquid contents, the perforations described herein are intended for the introduction of a melting/diluting liquid, gas, or steam or to allow the melted frozen liquid contents or a gas to exit the receptacle.

In some embodiments, the perforations may be staged—one perforation then another or multiple perforations staged at different intervals in the dispensing process. In some embodiments, the receptacle is perforated by the machine-based system in a location that allows the entire frozen liquid contents to exit the receptacle before or after melting so as not to waste any of the beverage product and to remove any recycling contaminants from the receptacle.

The perforation used to add dilution liquid may be suitable for subsequent use with a straw or other techniques and/or processes to allow consumption directly from the receptacle, as opposed to dispensing the diluted and/or melted contents into a secondary container.

In some embodiments, the receptacle is perforated and a push-rod or the like is introduced to displace the entire frozen liquid contents out of the receptacle before melting and diluting. In some embodiments, the frozen content is squeezed from the receptacle. In other embodiments, a perforator pushes the frozen content from the receptacle. A blade may be used to remove the lid, or alternatively, pressure may cause the lid to burst and be removed from the pod.

In some embodiments, the packaging may become perforable only after exposure to higher temperature or mechanical action. For example, the packaging may be made of a sponge-like material that the frozen liquid contents can permeate when heated. In an alternative example, the frozen liquid content is thawed or liquefied from the action to allow a machine-driven needle to penetrate the receptacle and contend with less force.

In some embodiments, the perforators may be moved by a motor or solenoid. In some embodiments, the perforator may be moved linearly. In some embodiments, the perforator may be moved through some more complex path, for example, in a circular path around the periphery of the opening. In some embodiments, this circular path could describe a full circle to fully release a portion of the lid. In other embodiments, the circular path could describe less than a full circle to leave a small "hinge" in the lid to retain the lid to the receptacle and keep it from coming loose. In some embodiments, the size of this circular opening could be sufficient to release larger solids such as chunks of meat or vegetables in a soup concentrate. In some embodiments, the perforation sizes may enable the flow of solid frozen structures to be dispensed into a beverage container for the creation of iced or slushy beverages.

In some embodiments, the fixed or adjustable perforators may be spring loaded to prevent damage to the perforator or the dispenser if the frozen contents blocks the penetration of the needle. The pressure of the spring load may be detected by the dispenser when interrupted by a receptacle or its frozen contents. The spring load and release may also be used to begin a sequence involving the melting and diluting processes, for example, to trigger or terminate a supply of heat, agitation, or a diluting agent.

In some embodiments, the needles may be attached to flexible tubing to provide for channels that may move and adjust with movement, e.g., to accommodate planned agitation of the receptacle as a way of enhancing the liquefaction of the frozen contents.

In some embodiments, the cavity of a dispenser for receiving receptacles of different sizes may alternatively have perforators that can be retractable based on the shape of the receptacle being received.

In some embodiments, the perforators are constructed of thermally stable polymers. In other embodiments, the perforators are constructed of one or more metals, such as stainless steel or aluminum. In some implementations, regardless of the materials of construction, the perforators resist physical degradation when exposed to temperatures between about −40° F. and about 300° F. In some embodiments, the perforators resist physical degradation when exposed to temperatures between about 0° F. and about 250° F.

In some embodiments, the characteristics of the perforators for use on the outlet side of the dispenser and the perforators for use on the inlet side are the same. In some embodiments, these characteristics are different.

In some embodiments, the receptacle is perforated only through the lid. In some embodiments, the receptacle is perforated through both the lid and the bottom.

In some embodiments, the receptacle is perforated along a sidewall. In some embodiments, the perforation of the side walls is done as close to the bottom of the receptacle as possible and the orientation of the receptacle is angled so that liquefied contents flow to the perforated area. In other embodiments, the sidewall or top of the receptacle is perforated and then the receptacle is rotated to orient the perforations to a low point of the receptacle's volume to enable the liquefied contents to exit.

In some embodiments, the receptacle is rotated with respect to the perforation area or areas, such that the flow of contents outside the receptacle is controlled. In some embodiments, the frozen contents may be partially or completely removed from the receptacle during the beverage creation process.

In some embodiments, a needle may have multiple penetration depths to puncture receptacles of one or more heights at different coordinates.

In some embodiments, the needle(s) can pierce the receptacle completely, creating both an entrance and exit perforation. For example, a long needle could first puncture the lid and then pass through the frozen contents and out the closed end of the receptacle, creating both an entrance and exit path for diluting liquid. In some embodiments, the needle is retracted from the second (exit) perforation, leaving a channel for water to pass through the frozen contents and exit the pod. In some embodiments, the needle can be designed such that its cross section is smooth where it finally bears against the lid, but incorporates one or more grooves in/along its side in the zone near the needle or bayonet tip and/or the zone occupied by frozen contents to facilitate fluid and gas flows out the closed end of the receptacle and into the user's cup or dispenseware.

In some embodiments, the needle is retractable. In other embodiments, the needle is discontinuous such that liquids may exit from one location on the needle and reenter the needle at a different location while the needle is inside the receptacle. In some embodiments, the entrance is a tube allowing liquid to flow into the receptacle—the outside of this tube/needle has groves around its circumference, these groves provide an exit path for the liquid.

In some embodiments, the needle is heated or uses hot water or steam to facilitate its passage/boring through the frozen content. Heating of the needle may be continuous over its length or it may be heated in different zones. In some embodiments, one or more of these zones are equipped with a thermocouple, RTD or thermistor to allow control of a maximum temperature of the needle to avoid overheating the frozen contents and/or creating steam. The needles may be heated throughout the beverage creation process, separately or in conjunction with heating of the receptacle to help prevent clogging or overpressure issues during the dispensing process.

Needle shapes can be circular or non-circular, e.g., triangular, rectangular, bayonet-like, or knife shaped. The needle can have chambers or groves that run its length to allow liquid to travel along the exterior of the needle. The ends of the needles are preferably sharp or pointed to facilitate movement through the lid, the frozen contents and the closed end or ends or sides of the receptacle. The needles may be of a constant diameter or non-circular cross-section along their length or they may have varying cross-sections. For example, a needle may have a special end "cap" that incorporates various geometric features of use in passing the needle through the receptacle and frozen contents including a point, straight spline or bayonet or spiral grooves, and even a back taper to allow easier flow of fluids over the rear surface of the point and along its sides or through its grooves. The sides of the needle can be smooth or can include one or more grooves to provide a more convenient flow path for fluids, similar in function to the groove found in the side faces of a bayonet. The needle may have internal channels with various inlets and outlets to allow free movement of thawed frozen content or dispenser fluids.

In some embodiments, the needle may of a composition such that it is heated in a controlled fashion from electromagnetic radiation or other heat source. For example, the needle could be made from a ferrous-based metal alloy that can be passively heated using RF electromagnetic energy.

In some embodiments, a perforation heating system may be implemented as a mechanism for keeping the needles/perforators sanitary.

In some embodiments, an internal structure of the receptacle, like a push-plate, may work in combination with the perforators to facilitate dislodging the frozen content and/or creating flow paths.

In some embodiments, interior or exterior areas of the receptacle are collapsible to reposition the frozen contents for beverage creation.

In some embodiments, there are two "entry" perforators. One perforator is in fluid communication with a first path that includes a liquid heater and is intended to provide warm or hot fluid to the receptacle. A second perforator is in fluid communication with a second path that flows directly from the reservoir, bypassing the liquid heater, and is intended to provide chilled or ambient temperature fluid to the receptacle. Either, both, or neither of these perforators and flow paths may be used to supply fluid to a receptacle based on the recipe developed by the controller for the selected beverage.

In some embodiments, a needle may make a small vent hole in a receptacle lid or sidewall and then retreat so any pressure build-up inside the receptacle can be relieved. In some embodiments, such a vent hole is used because fluids are being injected before an exit hole and exhaust path to the normal dispense path are created or because secondary heating is being applied prior to any penetration of the receptacle. Relieving internal pressure is intended to ensure the lid does not separate or the receptacle rupture. Since the working fluid of concern is a gas, a very small vent hole (on the order of 1 mm diameter) is adequate.

In some embodiments, a bellows surrounds the vent or entrance hole and is plumbed to a drain or waste tray so any gases or fluids are directed to a point of disposal. In some embodiments, this vent line is periodically flushed with cleaning fluids to prevent or remove any buildup of bacterial growth.

In some embodiments, the dispenser determines or estimate the enthalpy of vaporization for the frozen contents and adjusts the ventilation settings among others to prevent overpressure. The primary concern is any pressure which might be created due to the presence of steam or excess moisture during the supplemental heating process prior to the injection of water. An overpressure condition represents a safety concern, as a receptacle could rupture from an overpressure and spray the machine or the user with hot water. An overpressure condition also represents a hygiene concern, as the overpressure may cause portions of the melted frozen contents within the receptacle to backflow into the dispenser plumbing. To help prevent loss of fluids later in the dispense cycle through the initial perforation upon injecting diluting fluids, it is preferable to have the liquid inlet dispenser needle puncture the receptacle lid at the same point as the vent was created.

In some embodiments, given the complex tradeoffs that occur with a newly sealed receptacle (immediately after packaging), between the reduction in volume of the gas in the headspace during cooling of the receptacle and the expansion in volume (as much as 9%) of the frozen contents as it transitions from liquid to solid during initial freezing, the ratio of headspace to frozen content volume can be selected to create an overall "near-neutral" impact on internal pressure. In this situation, and within a defined temperature range for frozen storage (e.g., between 0° and 32° F.) the net effect on internal pressure may be small enough that venting is not required so long as steam is not generated by the heating.

In some embodiments, the vent hole proposed for avoiding any buildup of internal pressure will be subsequently enlarged due to full penetration of the needle for the addition of melting/diluting fluids. Thus, in some embodiments, the vent hole and the final puncture are made by the same needle. This leads to two ways of sealing the hole. The first, one which has been well established in the industry, is use of a flexible (typically rubber) bellows which bears against the lid and surrounds the opening. The bellows is diametrically sized to accommodate the full needle diameter and any fluid flow volume anticipated and designed to provide enough axial force to create a viable seal against the lid. The second way of sealing relies on creating a tight fit between the sides of the penetrating needle and the edges of the lid. This latter method does not apply to the vent hole until it is enlarged.

System Cleaning and Maintenance

To ensure the dispensing system continues to function properly and deliver food safe products, regular cleaning and maintenance are needed. Various embodiments facilitating these requirements are described below.

The types of cleaning and rinsing operations conducted by the dispenser have three purposes. One is cleaning to prevent or reduce microbial buildup in the dispenser flow channels. The second is to prevent carryover tastes from one dispense cycle affecting a subsequent dispense cycle. The third is to pre-heat or pre-cool various system elements when transitioning from dispensing a hot beverage, for example, to a cold beverage, or vice versa.

In some embodiments, the first type of rinse, which may include some anti-microbial chemical additives, could be implemented when the dispenser is first commissioned, when the dispenser is used after some prolonged period of inactivity, or after certain types of frozen contents, e.g., those containing dairy products, have recently been dispensed. In some embodiments, full system cleansings of this type involve adding an anti-microbial chemical to the reservoir and pumping this fluid throughout the entire system, using, for example, a special receptacle in the cavity to help sanitize the needles, bellows, tubing, the cavity itself, and the drain lines. In some embodiments, the volume of flow from this type of cleaning is sufficient that the user is advised to capture the dispensed cleaning fluid in a cup or bowl rather than discharging it into the drip tray.

In some embodiments involving the second type of rinse, the type intended to prevent carryover, no special chemicals are added and the volume of fluid used is much lower. In some embodiments, hot water is simply passed through the supply needle and captured by the cavity and drain needles to remove any residual film of the previous dispense solution from contact surfaces. In some embodiments, this rinse occurs after the empty receptacle has been removed by the user and the system cavity is empty. In some embodiments, the rinse occurs while the receptacle is still in the cavity, but a special valve near the final dispense point simply diverts the flow to the cup tray or a waste reservoir instead of into the user's cup or dispenseware. In some embodiments, only after this short rinse cycle has occurred, will the drawer holding the receptacle open so the user may remove and discard it.

In some embodiments, the third type of rinse to pre-heat or pre-cool certain system elements may occur independently or following either of the two previous types of rinse, primarily if the next product to be used is normally dispensed cold. Unlike the other types, in this instance the rinse water may, for some embodiments, be recycled either back to the reservoir or to the heater tank. With this option for recycling, limitations on the volume of water used to adjust system component temperatures are of less importance. In some embodiments, this method of rinsing is combined with a rinse to reduce carryover in that during the first portion of the rinse cycle the fluids used are diverted to a waste reservoir while the latter portions are recycled.

In some embodiments, the cavity and/or needles of the dispenser are self-contained and easily removable for cleaning. In some embodiments, the needles may be retracted to a cleaning cavity which uses steam or hot water for rinsing potential contamination away from the needles. Alternatively, steam and/or hot water may be applied within the beverage creation cavity to sanitize needles both internally and externally and other beverage creation components. In some embodiments, the dispenser includes a system to wipe or scrub the needles. In some embodiments, the dispenser includes a detergent compartment that receives food and beverage safe cleaning compounds to be flushed throughout the system followed by a rinse. The rinse of the system may be initiated by the user, or alternatively by specific beverage usage quantity and type conditions identified by the dispenser.

In some embodiments, the receptor or cavity is fully enclosed and includes a flow path for removal of excess liquids or liquids used for system cleaning. In some embodiments, this excess liquid is caused to travel to a cup tray or other reservoir for evaporation and/or disposal or to a drain line. This feature would allow a planned rinse cycle to occur for cleaning of the entrance needle on a scheduled basis depending, for example, on the frequency of operations and/or depending upon the type of food or beverage product recently dispensed.

In some embodiments, the dispense head and cleaning system are fed with water from the reservoir.

In some embodiments, at the end of any successful dispense cycle, a small purge of heated water may be used at the end of the product creation to keep the dispensing channels clean at the end of creating a cold beverage. A short purge of air may also be used to remove excess water from flow channels and tubes to further reduce the potential for bacterial growth inside the machine.

In some embodiments, after the dispense is complete, a measured volume of diluting liquid (e.g., water) is supplied to the interior of the receptacle where the liquid provides a final rinse/cleaning of the receptacle interior, and then flows out of the receptacle to be collected in a collection reservoir such as a drip pan, separate tank, or the like. Similarly, in some embodiments, after the dispense is complete, a measured amount of fluid (e.g., water or steam) is supplied to the chamber of the receptacle where the liquid provides a rinse/cleaning of the chamber, and then flows out of the chamber to be collected in a collection reservoir such as a drip pan, separate tank, or the like.

The following sections provide embodiments for the initial startup and routine dispenser operational sequences.

Startup

In one embodiment, the dispenser is removed from its shipping package, setup, and put into operation as follows:
  Remove dispenser from packaging
  Remove bag tape and instructions about operation
  Plug dispenser into an AC outlet
  Turn dispenser on. The tank is illuminated and the front indicator RGB button blinks white
  Remove reservoir tank(s)
  Insert water filter pack into tank(s) or install system filter into opening in rear of dispenser.
  Fill tank(s) with water and install reservoir tank(s) into dispenser.
  Once filled, reservoir tank(s) are installed and unit becomes "Ready." Front indicator RGB button is illuminated a steady white color.
  Drawer opens revealing a Hot Water Dispense Pod. This is a molded plastic receptacle with a printed bar code for dispensing only hot water from the dispenser. This receptacle is removed and the drawer is closed.
  Following the initial setup, the machine goes through a rinse cycle as a preventative measure in case any contamination has occurred since it was packaged. Similarly, if the controller recognizes that the machine has not been used for a period greater than a configurable number of days, a preventative rinse cycle is initiated to remove any bacterial growth that may have occurred since last use.
  A receptacle containing frozen contents for making a desired product is waved in front of the drawer. A proximity sensor triggers the bar code scanner to operate.
  Bar code scanner reads the lid of the portion pack (receptacle) and the drawer opens. The trim on the front of the dispenser or cup alcove or the edge of the drawer itself will illuminate red or blue respectively depending on whether the portion pack is a hot or cold product.
  The drawer opens and will stay open until the operator either pushes on the drawer or presses the illuminated white dispense button.
  The drawer closes. Depending on the information gathered from the receptacle (e.g., whether the final product is a hot or cold food or beverage), the following sequence of events occurs:

Dispenser Operations

In one embodiment, a process for making a cold food or beverage product follows:
  The front indicator RGB button illuminates blue.
  A temperature sensor reads the outside temperature of the portion pack.
  A small amount of ambient water is dispensed into the receptacle.
  Supplemental heat (e.g., steam) may be introduced against the outside of the receptacle if needed to partially or fully melt the frozen contents so the ambient water added will yield a final dispensed food or beverage temperature in the range of 35-45° F.
  Agitation begins and lasts for a period determined by the control system algorithm.
  Additional ambient water is added over a similar or different period determined by the control system algorithm.
  If pressure exceeds a specific value, dispensing of water is slowed.
  If pressure continues to increase, dispense is halted.
  If pressure drops back to normal range, dispense continues at normal rate.
  An ambient air purge may be used during dispense to aerate the contents of the receptacle while dispensing.
  An air purge is run at the end of the dispense cycle for a set period.
  At conclusion of dispense, the drawer opens.

In one embodiment, a process for making a hot food or beverage product follows:
  The front indicator RGB button illuminates red.
  A temperature sensor reads the outside temperature of the portion pack.
  A small amount of hot water is dispensed into the receptacle.
  Supplemental heat (e.g., steam) may be used if needed to partially or fully melt the frozen contents so the hot water added will yield a final dispensed food or beverage temperature in the range of 140-160° F.
  Agitation begins and lasts for a period determined by the control system algorithm.
  Additional hot water is added over a similar or different period determined by the control system algorithm.
  If pressure exceeds a specific value, dispensing of water is slowed.
  If pressure continues to increase dispensing of water is halted.
  If pressure drops back to normal range, dispense is continued at normal rate.
  A hot air purge may be used during the dispense cycle to aerate the contents of the portion pack while dispensing.

In one embodiment, a process for dispensing hot water follows:
  The front indicator RGB button illuminates red.
  Holding down the dispense button causes hot water to be pumped through the hot water pod. Releasing the dispense button ends the process.

Preparation for Next Cycle

In one embodiment, after a dispense cycle (hot or cold), the dispenser operates as follows in preparation for the next operation:
  Air purge is run at the end of dispense for set period to clean out the dispensing tubing and thereby minimize carryover to the next product.
  At conclusion of dispense, drawer opens.
  The front indicator RGB button illuminates white.
  Operator will either remove the portion pack and press the drawer to close it or will remove portion pack and press the dispense button again and the drawer will close.

Further activation will not occur due to the absence of a bar code on a fresh pod being read.

State Variables

In some embodiments, the following state conditions will be monitored by the control unit:

Tank heating
Water low (In some embodiments, if a "Low Water" condition is detected, the illuminated tank and the white dispense button will flash in unison.)
Portion pack temperature outside normal range (high)
No portion pack
Cancel dispense
Hard power off
Clogged plumbing User Controls In some embodiments, the user will be able to use a supplied smart phone App to control the following functions:

Timed power off, i.e., sleep
Adjustments for dispensed food or beverage temperature
Adjustments for dispensed volume
Timer
Sleep
Data acquisition To further clarify the details of the various aspects of this invention, several illustrative examples are provided below.

Example 1

Example 1 illustrates the range of coffee extract strength (TDS) that can be used to successfully create an SCAA gold standard beverage. In this example, a filterless single chamber mixing receptacle contains a frozen liquid contents. The receptacle has a profile like that shown in FIG. 32 including a height of about 1.72 inches, a top ID of about 1.80 inches, a draft angle of about 5 degrees, and a bottom ID of about 1.45 inches. The receptacle is sealed on top with a perforable layer and the end layer is perforable (e.g., by a dispenser/brewer needle, such as, but not limited to, the needles described above). The frozen liquid coffee extract is in contact with substantially the entire end layer and a portion of the sidewalls.

To produce a final coffee beverage product having a TDS of between about 1.15% and about 1.35% TDS (with an optional target of 1.25% TDS—the center point of the SCAA gold cup standard), the frozen liquid contents, at 15° F., is melted and diluted with eight oz. of water at 195° F. Table 1 shows several alternative implementations of the frozen liquid contents of this embodiment as well as the impact on various parameters of varying the amount of frozen liquid contents and degree of concentration of the contents.

As shown in Table 2, to keep the coffee beverage temperature above 140° F. (e.g., to accommodate the addition of milk or cream while maintaining a beverage temperature above 120° F.), the frozen liquid contents weight is between about 0.15 and about 1.2 oz. at a degree of concentration of between about 60% TDS and about 8% TDS (where smaller contents require higher concentration). When included in the receptacle, the length of the empty space above the frozen liquid contents and below the top layer (i.e., headspace) is between about 0.6 and about 1.6 inches, which yields an empty space volume of between about 41% and about 91%.

We have discovered that maintaining a frozen liquid contents height of about 1.0 inches or less from the end layer of the receptacle increases the ease of release of the contents from the end layer. Thus, the contents can be further restricted to a height of between about 1.0 and about 0.1 inches, thereby having a corresponding degree of concentration of between about 60% and about 11% TDS.

It may be desired to limit the range of degree of concentration of the frozen liquid contents to no more than 35% TDS as a practical extraction limit. In such a case, the frozen liquid contents possess a weight of about 0.30 to about 1.1 oz., leaving a headspace of between about 0.7 and about 1.45 inches with an empty volume of about 45% to about 85%.

Example 2

Example 2 illustrates the range of coffee extract strength (TDS) that can be used to successfully create an espresso beverage. In this example, a filterless single chamber mixing receptacle contains a frozen liquid content. The receptacle has a profile and dimensions that are also the same as the one described in FIG. 32. In this example, the frozen liquid content is again a concentrated coffee extract that is in contact with substantially the entire end layer and a portion of the sidewalls.

To produce a final espresso beverage product having a TDS of between about 9.15% and about 9.35 TDS (with an optional target of about 9.25 TDS), the frozen liquid contents, at 15° F., is melted and diluted with sufficient water at 195° F. to yield a dispensed volume of 4 oz., sometimes described as a double espresso. Table 3 shows several alternative implementations of the frozen liquid contents of this embodiment as well as the impact on various parameters of varying the amount of frozen liquid contents and degree of concentration of the contents.

TABLE 2

| Contents Volume (in³) | Contents Weight (oz) | Contents Height Above End Layer (in) | Empty Space Above Contents (in) | Empty Space In Receptacle Volume (%) | Contents TDS (%) | Contents Brix (°Bx) | Final Product Temperature (° F.) |
|---|---|---|---|---|---|---|---|
| 0.3 | 0.18 | 0.13 | 1.57 | 91 | 57 | 67 | 188 |
| 0.5 | 0.30 | 0.25 | 1.45 | 85 | 35 | 41 | 183 |
| 0.7 | 0.42 | 0.37 | 1.33 | 79 | 25 | 29 | 178 |
| 0.9 | 0.54 | 0.49 | 1.21 | 73 | 20 | 24 | 175 |
| 1.5 | 0.90 | 0.81 | 0.89 | 56 | 12 | 14 | 162 |
| 2.0 | 1.20 | 1.07 | 0.63 | 41 | 10 | 12 | 153 |
| 2.9 | 1.74 | 1.49 | 0.21 | 14 | 7 | 8 | 137 |

TABLE 3

| Contents Volume (in³) | Contents Weight (oz) | Contents Height Above End Layer (in) | Empty Space Above Contents (in) | Empty Space In Receptacle Volume (%) | Contents TDS (%) | Contents Brix (°Bx) | Final Product Temperature (° F.) |
|---|---|---|---|---|---|---|---|
| 1.0 | 0.64 | 0.54 | 1.16 | 70 | 58 | 68 | 145 |
| 1.1 | 0.70 | 0.60 | 1.10 | 67 | 53 | 62 | 140 |
| 1.2 | 0.76 | 0.65 | 1.05 | 64 | 48 | 56 | 134 |
| 1.3 | 0.83 | 0.71 | 0.99 | 61 | 45 | 53 | 128 |

Similar results can be obtained by using other receptacle designs disclosed herein with the various implementations of the frozen liquid contents set forth in the Tables 2 and 3. Thus, the scope of the invention is not limited to the use of the specific implementations of frozen liquid contents in the receptacles with the profile as shown in FIG. 32. It is also understood that frozen liquid contents having higher or lower TDS values than those given in the illustrative examples above are within the scope of the invention Example 3

Example 3 illustrates a range of options available when two or more receptacle sizes can be accommodated in a single dispenser. In this example, the dispenser is designed to accommodate at least two receptacles of different capacities and shapes, with each receptacle providing at least two styles of finished products. A first receptacle has a lower volume capacity relative to a second receptacle. The two receptacles have the same top diameter, but their depths vary. The lower volume capacity receptacle is shorter in height and has a bottom diameter larger than the higher capacity receptacle. The higher volume capacity receptacle has a non-linear sidewall (e.g., concave, stepped, etc.). The lower capacity receptacle has a capacity of 1 oz. and has a shape as shown in FIGS. 67A-B (which reaches only the second step of the receiver), while the higher capacity receptacle has a capacity of 2.25 oz. and has the shape as shown in FIGS. 69A-B. Both sizes of these receptacles are equipped with a visual mark that is capable of being read by the optical reader on the dispenser machine that identifies the final product style for which it is intended and, for some products, a range of settings applicable to the final beverage or food. The headspaces of the receptacles have been flushed with an inert gas at the time of manufacture. The receptacles themselves are made of materials that are steam heatable, recyclable, and have superior oxygen and moisture barrier properties. Materials of construction is aluminum with a very thin polypropylene film on both inner and outer surfaces. They are flat-bottomed or domed-bottomed to facilitate standing and drainage The lower capacity receptacle is designed to provide for two of the four product styles, including (1) hot, condensed beverages, e.g., an espresso, and (2) single-serve sizes of larger hot beverages that are easy to produce in a concentrated format, e.g., teas and coffees. In one example, 0.75 oz. of a frozen coffee extract with a TDS of about 20 intended as an espresso is contained within the 1 oz. receptacle, and the receptacle is marked in a way to convey this information to the dispenser. The dispenser detects the mark on the receptacle (e.g., with its optical sensor), and in this example, presents to the user the options to create a 2 oz., 3 oz., or 4 oz. espresso beverages from the receptacle containing the frozen contents. In addition, following receptacle detection, a button blinking red may communicate the beverage will be dispensed hot and perhaps remind the user to use the appropriate cup to receive the final dispensed product. The dispenser also establishes a beverage recipe based on the receptacle detected and/or the settings selected by the user. In this example, the dispenser establishes a pre-heat duration, time of puncture, time of dilution liquid injection, temperature of diluting liquid, and volume of diluting liquid based on information acquired by the dispenser and a 2-oz. serving selection by the user. Alternatively, the selection of the espresso volume may be completed by a device connected to the dispenser over a network or alternatively via a user interface system on the dispenser.

The receptacle is next loaded into the beverage creation cavity of the dispenser and is secured in place. The larger bottom diameter of this first, smaller receptacle is supported on a step within the cavity, this step having been designed to prevent the receptacle from occupying a lower depth of cavity where a second perforator is located to puncture the higher capacity receptacles. The perforator perforates the receptacle as it is installed. Once the receptacle is secured the user may initiate one final action, e.g., the press of a button on the dispenser or a connected device, to commence functions for product creation.

The second, higher capacity receptacle described above is designed to provide for three of the four product styles, including cold single-serve beverages, single-serve sizes of larger hot beverages that include components that are more difficult to concentrate, e.g., dairy, and large batch servings of hot beverages. In one example, a 2.25-oz. receptacle contains 2 oz. of a frozen concentrated orange juice with a BRIX of 47.2 intended to create an 8-oz. cold serving of juice. The dispenser gathers information about the frozen contents in the receptacle (by, e.g., reading an optical mark on the receptacle with an optical sensor) and establishes the necessary process settings to create an 8-oz. cold orange juice qualifying by FDA standards as 100% juice (BRIX of 11.8) from the receptacle contents. In addition, following receptacle detection, a button on the front of the dispenser blinks blue to communicate the beverage is a cold one, and perhaps remind the user to use the appropriate cup to receive the final dispensed product. (Optionally, the dispenser may have a sensor which checks for the presence of a glass or cup of the minimum size needed to receive the full 8-oz. serving.) In this example, the dispenser establishes a pre-heat duration, time of puncture, time of injection, temperature of diluting liquid, volume of diluting liquid, and a flow rate of the injected diluting liquid based on information acquired by the dispenser.

The receptacle is next loaded into the beverage creation cavity of the dispenser and is secured in place. As shown in FIG. 69A, the higher capacity receptacle has a lower section that is narrower than the intermediate step that enables the lower section to extend past the intermediate step to the bottom of the cavity. (Note: the use of the words "bottom" and "top" in these descriptions help to clarify the concept and is not intended to limit the orientation of the beverage creation cavity only to those whose axis of symmetry is vertical. One knowledgeable in the art will recognize that the cavity could also be oriented horizontally or at any other angle and the appropriate hardware could be configured to make the system function as needed.) The non-linear side walls allow the receptacle to avoid the intermediate perforation step and still have the same flange diameter of the first, lower capacity pod. The bottom depth of the cavity has a retractable perforator, and in this embodiment, it defers puncturing inwards into the receptacle until later.

Once the receptacle is secured, the user may initiate one final action, e.g., the press of a button on the dispenser or a connected device, to commence automated functions for product creation. Based on the detection of the beverage style, the dispenser creates a vent opening in the lid of the receptacle and initiates a period of supplemental preheat to only melt the outer-most portions of the frozen content inside the receptacle while keeping most of the content frozen. In this instance, because the desired beverage is to be cold, the enthalpy of fusion of the frozen content is to be used to lower the temperature of a diluting liquid to a chilled temperature between 40° and 50° F. After the outer portion of the frozen orange juice content is melted, as predicted by the algorithm for the frozen contents and the amount of energy added (open loop) or as determined via closed-loop feedback from information gathered by one or more thermal sensors, the perforator located beneath the bottom depth of the cavity is thrust upwards into the receptacle, perforating it and allowing the liquid content to flow out a channel of the perforator, through a nozzle in the dispenser, and into a beverage container. In addition, the entry perforator, the same one that created the vent hole, penetrates again, but to a greater depth. It creates a larger diameter than the vent hole in the lid at the same location as the vent hole. The hole forms a tight-fitting seal around the entry needle, whereupon the needle delivers about 6 oz. of ambient water into the receptacle at a slower rate than typically used for hot beverages to give the cooler injected liquid more time to interact with the frozen contents and promote fully melting the contents.

Agitation is added to expedite the mixing of the frozen content and the diluting liquid to the target potency and temperature. In this way, the dispensed product created may reach refrigerated temperatures when equilibrium is reached between the frozen content and the ambient temperature diluting agent. The final product is a chilled glass of orange juice with a Brix of 11.8, meeting the FDA standard for 100% orange juice.

Example 4

In this example, involving the higher capacity receptacle of FIGS. 69A-B, the dispenser detects the temperature of the frozen contents in the receptacle as being too warm and rejects the initiation of creating a cold beverage. Assuming the receptacle does not contain a dairy product or some other product which could spoil and create a health hazard if allowed to thaw, the dispenser may instruct the user to place the receptacle in the freezer. Alternatively, if the temperature of the receptacle has exceeded some maximum allowable value for the stored product, the dispenser may instruct the user to discard the product as unsafe for use.

Example 5

In this example, a 2.25 oz. receptacle contains 0.9 oz. of frozen condensed milk, ½ oz. of frozen heavy cream, 10 grams of sugar, and ½ oz. of a frozen coffee extract with a TDS of 24, collectively intended to create a hot serving of a café latte. The dispenser reads a visual mark on the receptacle with an optical sensor and establishes the process settings to create an 8-oz. hot latte with a coffee concentration of 1.5% TDS and target dairy and sweetness levels. In addition, following receptacle detection, a button blinking red on the front of the dispenser may communicate the beverage will be dispensed hot. In this example, the dispenser establishes a pre-heat duration, time of puncture, time of injection, temperature of diluting liquid, volume of diluting liquid, and the flow rate of the injected diluting liquid based on information acquired by the dispenser from the receptacle markings. As in the examples above, the receptacle is next loaded into the beverage creation cavity of the dispenser and is secured in place.

Once the receptacle is secured, the user may initiate one final action, e.g., the press of a button on the dispenser or a connected device, to commence functions for product creation. The dispenser creates a vent opening in the lid of the receptacle and initiates a period of supplemental heating to melt most of the frozen content. As before, this period can be open-loop or closed-loop controlled. In this instance, since the desired beverage is to be hot and a full 2 oz. of frozen content must be melted and heated, a longer preheat is required than a similar sized hot coffee beverage created from the first lower capacity receptacle in Example 3. After most of the mass of the frozen content is melted, based on thermal sensor readings and/or total energy input, the perforator located beneath the bottom depth of the cavity is thrust upwards into the receptacle, perforating it and allowing the liquid content to flow out a channel of the perforator, through a nozzle of the dispenser, and into a beverage container.

In addition, a perforator with a larger diameter than the vent hole in the lid is inserted at the same location as the vent hole of the receptacle, creating a tight-fitting seal around the penetrator for delivery of 6 oz. of water, heated to 190° F. by the water heater, to the receptacle. The water fully melts any remaining frozen content, mixes with, dilutes, and heats the content of the receptacle to allow dispensing of a beverage of the target temperature and potency. Agitation and flowrate may be controlled to homogenize the melted contents and the dispensing liquid as much as possible within the receptacle. The last portion of the injected water rinses the receptacle clean and removes all dairy residue from the injection and exit perforators.

Example 6

In this example, a 2.25 oz. receptacle contains 2 oz. of a frozen coffee extract with a TDS of 44.8 and is intended to create a large batch serving of coffee. The dispenser reads a visual mark on the receptacle with an optical sensor and establishes the process settings to create 64 oz. of hot coffee with a TDS of 1.4. The dispenser detects the water level in the reservoir and instruct the user to add more water if necessary. Following receptacle detection, a button blinking red on the front of the dispenser may be used to communicate the beverage is hot and a reminder may notify the user to choose a large beverage container to receive the dispensed product. Or the dispenser senses the presence of a carafe which has been designed to be easily detected (e.g., proximity sensor, RFID chip, bar or QR code, etc.) by the dispenser as being suitable for a 64 oz beverage serving.

In this example, the dispenser establishes a pre-heat duration, time of puncture, time of injection, temperature of diluting liquid, volume of diluting liquid, and the flow rate of the injected diluting liquid based on information acquired by the dispenser. As in previous examples, the receptacle is next loaded into the beverage creation cavity of the dispenser and is secured in place. Once the receptacle is secured, the user may initiate one final action, e.g., the press of a button on the dispenser or a connected device, to commence functions for product creation. The dispenser creates a vent opening in the lid of the receptacle and a period of supplemental heating is initiated to melt a small outside layer of the frozen content. In this instance, the beverage with be diluted with a large amount of heated liquid and requires a preheat only sufficient to soften the frozen contents for receptacle perforation.

Once the preheat has commenced, the perforator located beneath the bottom depth of the cavity is thrust upwards into the receptacle, perforating it and allowing the liquid content to flow out a channel of the perforator, through a nozzle of the dispenser, and into a large beverage container. In addition, a perforator with a larger diameter than the vent hole in the lid is inserted at the same location as the vent hole in the top lid of the receptacle, creating a tight-fitting seal for delivery of 62 oz. of water, heated to 190° F. The added water melts any remaining frozen portions of the contents, mixes with, dilutes, heats and dispenses the contents of the receptacle to create a large batch serving of coffee.

Example 7

In this example, a receptacle having any one of the geometries disclosed herein contains a frozen liquid contents that is sized to permit at least 5 mm of space between the frozen liquid contents and the end layer (bottom) of the receptacle and at least an additional 5 mm of space between the frozen liquid contents and the cover layer (top) of the receptacle, both when the contents are displaced from the end layer by a needle. The frozen liquid content is further sized to provide a final beverage product at a temperature between about 140° F. and 190° F. when the contents (at 15° F.) are combined with 8 oz. of water at 195° F. The frozen liquid content has a concentration level to produce a coffee beverage having a final product strength of between 1.15 TDS and 1.35 TDS when combined with 8 oz. of water. Still further in this example, the frozen liquid contents (at a temperature between 0° F. and 32° F.) has a hardness level such that force from a dispenser and/or known single serve brewer needle (e.g., a hollow needle of about 2.5 mm outer diameter with about a 4 mm long diagonal pointed section) contacting the contents will dislodge it from the inner surface of the receptacle rather than embedding in the contents or displacing only a portion of the contents away from the receptacle's surface.

Example 8

In this example, based on the detection of the beverage style and a 2 oz. setting for an espresso selected by the user, the dispenser first creates a ventilation opening in the top lid of the receptacle to allow any internal pressure generated during the beverage making process to escape to atmosphere. In this example, a hot beverage is desired and the beverage creation recipe calls for too small a diluting volume of heated water to properly melt and heat the 0.75 ounces of frozen contents to a desired temperature. Accordingly, the preheat duration is calculated to melt the entire frozen content and increase the temperature of the resulting liquid to about 85° F. before dispensing or adding a diluting agent. This heat up of the frozen/melted contents to 85° F. can be accomplished either in an open-loop manner based on knowledge of the thermal properties of the contents or in a closed-loop, feedback driven system wherein one or more thermal sensors track the heat-up of the contents and cut power to the secondary heater at the appropriate time. A reciprocating motion is also applied in unison with the supplemental heat to homogenize the content and expedite melting. The intensity of the supplemental heat and its overall duration is also controlled to minimize the local vaporization of any of the frozen contents to steam.

Once the approximate 85° F. temperature is reached, the perforator located beneath the cavity in which the receptacle is disposed is thrust upwards through the bottom of the receptacle, perforating it and allowing the liquid content to flow out a channel of the perforator and through a nozzle of the dispenser into a beverage container. A perforator with a larger diameter than the vent hole made earlier (to ensure a tight fit around the periphery of the perforator) is inserted at the same location as the vent hole in the lid of the receptacle, creating a substantially leak-free fitting between the perforator and the receptacle lid so 1.25 oz. of water heated to 190° F. can be dispensed into the receptacle to mix, dilute and dispense the melted frozen content to create an espresso beverage with a TDS of 7.5, volume of 2 oz., and temperature of approximately 150° F. The hot water injection occurring at the end of the dispense cycle rinses the receptacle clean of all extract to optimize the suitability of the receptacle for recycling. Agitation may be added in sync with the dispensing of the hot diluting agent to better flush the receptacle and dispensing channels of any residue. The empty receptacle may then be removed and recycled.

Example 9

In this example, a 1 oz. receptacle contains 0.5 oz. of a frozen concentrated tea extract with a TDS of 40 and 0.25 oz. of a frozen peach concentrate with a Brix of 50, intended to create a hot peach green tea beverage. The dispenser gathers information from marks or other indicators on the receptacle and, for this beverage, does not provide an option to select a volume (the options being controlled by the information associated with the receptacle). Following receptacle detection, a button blinking red on the dispenser may communicate the beverage will be dispensed hot. The dispenser establishes a recipe based on the information associated with the receptacle detected by the dispenser. In this example, the dispenser establishes a pre-heat duration, time of puncture, time of injection, temperature of diluting liquid, and volume of diluting liquid based on information acquired. The receptacle is next loaded into the beverage creation cavity of the dispenser and secured in place, resting on an intermediate step in the cavity that accommodates more than one receptacle size.

Once the receptacle is secured, the user may initiate one final action, e.g., the press of a button on the dispenser or a connected device, to commence automated functions for product creation. Based on the detection of the beverage style settings, the dispenser creates a vent opening in the top lid of the receptacle and a supplemental preheat duration is initiated to only soften and liquefy an outside portion of the frozen content so the perforator beneath the step can penetrate the receptacle without great force, displacing the frozen content away from the entry point, if needed. After the outlet perforator has perforated the receptacle, a perforator with a larger diameter than the vent hole in the lid is inserted at the same location as the vent hole in the lid of the receptacle. This creates a tight fitting for the addition of 7.25 oz. of water heated to approximately 190° F. (as calculated by the processor based on the original recipe and subsequently modified based on an actual temperature measurement made of the receptacle after the preheat), which will be dispensed into the receptacle to mix, melt, dilute and dispense with the receptacle's content to create an 8-oz. beverage with a desired concentration of green tea and peach flavoring.

The pre-heat function and 7.25 oz. of approximately 190° F. diluting agent bring the final dispensed product to a temperature of approximately 150° F. The final hot water injection rinses the receptacle clean of substantially all contents. Agitation may be added in sync with the dispensing of hot diluting agent to better flush the receptacle and dispensing channels of any residue. The agitation may also increase the melting rate of the frozen content and provide for a longer rinse of pure water for sanitation. The empty receptacle may then be removed and recycled.

As will be apparent to one of ordinary skill in the art from a reading of this disclosure, the present disclosure can be embodied in forms other than those specifically disclosed above. The embodiments described above are, therefore, to be considered as illustrative and not restrictive. Those skilled in the art will recognize, or be able to ascertain, using no more than routine experimentation, numerous equivalents to the specific embodiments described herein.

The invention claimed is:

1. A method of producing a melted food or beverage liquid product from a receptacle having an interior containing frozen liquid contents, comprising the steps of:
   receiving the receptacle in a chamber of a dispenser, the dispenser including a non-diluting heat source, a liquid heater, a first flow path that bypasses the liquid heater, and a second flow path that includes the liquid heater;
   identifying a characteristic of one or more of the receptacle, the frozen liquid contents, or the melted food or beverage liquid product wherein the characteristic is identified using one or more of an optical sensor, a thermal sensor, an electromagnetic sensor, a mass sensor, or a user interface;
   supplying an amount of heat to the frozen liquid contents using the non-diluting heat source, the amount of heat being based on the identified characteristic, wherein supplying the amount of heat to the frozen liquid contents causes at least a first portion of the frozen liquid contents to melt and thereby yields a first portion of the melted food or beverage liquid product;
   supplying an amount of liquid to the interior of the receptacle, the amount of liquid including at least one of a first volume of liquid supplied via the first flow path, a second volume of liquid supplied via the second flow path, or a mixture thereof, wherein at least one of the amount of liquid, the first volume, the second volume, or the mixture is based on the identified characteristic, and wherein supplying the amount of liquid to the interior of the receptacle yields a remaining portion of the melted food or beverage liquid product;
   perforating the receptacle; and
   dispensing the melted food or beverage liquid product from the receptacle.

2. The method of claim 1, wherein supplying the amount of liquid to the interior of the receptacle comprises:
   withdrawing the amount of liquid from a reservoir of the dispenser;
   passing the withdrawn amount of liquid to a diverter valve; and
   configuring the diverter valve to pass a first portion of the withdrawn amount of liquid corresponding to the first volume of liquid through the first flow path and a second portion of the withdrawn amount of liquid corresponding to the second volume of liquid through the second flow path.

3. The method of claim 1, wherein the first flow path and the second flow path each extend between a reservoir of the dispenser and a transfer point of the dispenser, and wherein supplying the amount of liquid to the interior of the receptacle comprises:
   withdrawing the amount of liquid from the reservoir;
   passing a first portion of the withdrawn amount of liquid corresponding to the first volume of liquid through the first flow path and a second portion of the withdrawn amount of liquid corresponding to the second volume of liquid through the second flow path;
   combining the first volume of liquid and the second volume of liquid at the transfer point and
   delivering the amount of liquid from the transfer point to the interior of the receptacle.

4. The method of claim 3, further comprising providing insulation along one or more of a portion of the first flow path or a portion of the second flow path configured to reduce heat transfer between the first flow path and the second flow path.

5. The method of claim 1, wherein supplying the amount of liquid to the interior of the receptacle comprises:
   perforating the receptacle using one or more of a first perforator of the dispenser or a second perforator of the dispenser to create one or more fluid inlets into the receptacle, the first perforator being in fluid communication with the first flow path and the second perforator being in fluid communication with the second flow path; and
   supplying the amount of liquid to the interior of the receptacle via the one or more fluid inlets.

6. The method of claim 1, wherein at least a portion of the first flow path comprises stainless steel.

7. The method of claim 1, wherein the first flow path extends between a first reservoir of the dispenser and a transfer point of the dispenser and the second flow path extends between a second reservoir of the dispenser and the transfer point, and wherein supplying the amount of liquid to the interior of the receptacle comprises:
   withdrawing the first volume of liquid from the first reservoir via the first flow path and the second volume of liquid from the second reservoir via the second flow path;
   combining the first volume of liquid and the second volume of liquid at the transfer point; and
   delivering the amount of liquid from the transfer point to the interior of the receptacle.

8. The method of claim 1, wherein supplying the amount of heat to the frozen liquid contents comprises providing an amount of heated fluid proximate to an exterior surface of the receptacle.

9. The method of claim 8, further comprising collecting the amount of heated fluid or an amount of condensate from the amount of heated fluid in a collection reservoir of the dispenser.

10. The method of claim 1, further comprising agitating the receptacle in response to one or more of supplying the amount of heat to the frozen liquid contents using the non-diluting heat source or supplying the amount of liquid to the interior of the receptacle.

11. The method of claim 10, wherein agitating the receptacle comprises selectively agitating the receptacle based on the identified characteristic.

12. The method of claim 1, wherein perforating the receptacle comprises selectively timing the perforating the receptacle based on the identified characteristic.

13. The method of claim 1, wherein one or more of the supplying the amount of heat to the frozen liquid contents, the supplying the amount of liquid to the interior of the receptacle, or the perforating the receptacle are controlled to provide the melted food or beverage product at a temperature colder than ambient temperature.

14. The method of claim 1, wherein one or more of the supplying the amount of heat to the frozen liquid contents, the supplying the amount of liquid to the interior of the receptacle, or the perforating the receptacle are controlled to provide the melted food or beverage product at a temperature colder than a temperature of the amount of liquid supplied to the interior of the receptacle.

15. The method of claim 1, wherein perforating the receptacle comprises perforating the receptacle after completely melting the frozen liquid contents.

16. The method of claim 1, further comprising:
after dispensing the melted food or beverage liquid product from the receptacle, supplying an additional amount of liquid to the interior of the receptacle; and
collecting at least a portion of the additional amount of liquid supplied to the interior of the receptacle in a collection reservoir.

17. The method of claim 1, further comprising:
after dispensing the melted food or beverage liquid product from the receptacle, supplying an amount of fluid to the chamber of the dispenser; and
collecting at least a portion of the amount of fluid or an amount of condensate from the amount of fluid supplied to the chamber in a collection reservoir.

18. The method of claim 1, wherein the identified characteristic is a target temperature of the melted food or beverage liquid product.

19. The method of claim 1, wherein the identified characteristic is a target potency of a melted food or beverage liquid product.

20. The method of claim 1, wherein supplying the amount of liquid to the interior of the receptacle includes measuring a volume of the amount of the liquid supplied to the interior of the receptacle.

21. The method of claim 1, wherein the amount of heat, the amount of liquid, and the proportion are controlled to minimize a time for producing the melted food or beverage liquid product.

22. The method of claim 1, further comprising contacting at least a portion of a wall defining the chamber of the dispenser with an amount of cooling fluid after dispensing the melted food or beverage liquid product from the receptacle.

23. The method of claim 12, wherein the selectively timing the perforating the receptacle based on the identified characteristic comprises setting a length of time between the supplying the amount of liquid to the interior of the receptacle and the perforating the receptacle.

24. The method of claim 1, wherein the supplying the amount of liquid to the interior of the receptacle comprises controlling a rate of flow of the amount of liquid into the interior of the receptacle, the rate of flow being based on the identified characteristic.

25. The method of claim 24, wherein controlling the rate of flow comprises adjusting a stroke of one or more pumps of the dispenser.

* * * * *